United States Patent
Bennett

(10) Patent No.: US 9,582,449 B2
(45) Date of Patent: *Feb. 28, 2017

(54) INTERCONNECTION SYSTEM

(75) Inventor: Jon C. R. Bennett, Sudbury, MA (US)

(73) Assignee: Violin Memory, Inc., Santa Clara, CA (US)

(*) Notice: Subject to any disclaimer, the term of this patent is extended or adjusted under 35 U.S.C. 154(b) by 516 days.

This patent is subject to a terminal disclaimer.

(21) Appl. No.: 13/443,324

(22) Filed: Apr. 10, 2012

(65) Prior Publication Data

US 2013/0042119 A1 Feb. 14, 2013

Related U.S. Application Data

(63) Continuation of application No. 11/405,083, filed on Apr. 17, 2006, now Pat. No. 8,726,064.
(Continued)

(51) Int. Cl.
*G06F 11/00* (2006.01)
*G06F 13/00* (2006.01)
(Continued)

(52) U.S. Cl.
CPC ...... *G06F 13/4027* (2013.01); *G06F 13/1684* (2013.01); *G06F 13/4243* (2013.01);
(Continued)

(58) Field of Classification Search
CPC ............ G06F 13/1684; G06F 13/4027; G06F 13/4243; G06F 13/4247; G06F 13/00;
(Continued)

(56) References Cited

U.S. PATENT DOCUMENTS

| 3,728,679 A | 4/1973 | McIntosh |
| 3,970,798 A | 7/1976 | Epenoy |

(Continued)

FOREIGN PATENT DOCUMENTS

| JP | 09-265357 A | 10/1997 |
| WO | WO 99/30240 A1 | 6/1999 |

(Continued)

OTHER PUBLICATIONS

Argument and Amendment from South Korean Application No. 10-2013-7023247, dated Jan. 10, 2014, 16 pages.
(Continued)

*Primary Examiner* — Fahmida Rahman
(74) *Attorney, Agent, or Firm* — Brinks Gilson & Lione

(57) ABSTRACT

An interconnection system, apparatus and method is described for arranging elements in a network, which may be a data memory system, computing system or communications system where the data paths are arranged and operated so as to control the power consumption and data skew properties of the system. A configurable switching element may be used to form the interconnections at nodes, where a control signal and other information is used to manage the power status of other aspects of the configurable switching element. Time delay skew of data being transmitted between nodes of the network may be altered by exchanging the logical and physical line assignments of the data at one or more nodes of the network. A method of laying out an interconnecting motherboard is disclosed which reduces the complexity of the trace routing.

12 Claims, 136 Drawing Sheets

Related U.S. Application Data

(60) Provisional application No. 60/674,189, filed on Apr. 21, 2005, provisional application No. 60/698,626, filed on Jul. 11, 2005.

(51) Int. Cl.
*G06F 13/40* (2006.01)
*G06F 13/16* (2006.01)
*G06F 13/42* (2006.01)
*H04L 12/931* (2013.01)

(52) U.S. Cl.
CPC .......... *G06F 13/4247* (2013.01); *H04L 49/40* (2013.01); *Y02B 60/1228* (2013.01); *Y02B 60/1235* (2013.01)

(58) Field of Classification Search
CPC .. G06F 11/00; G06F 13/4022; G06F 11/3027; Y02B 60/1228; Y02B 60/1235; H04L 49/40
See application file for complete search history.

(56) References Cited

U.S. PATENT DOCUMENTS

| | | |
|---|---|---|
| 4,128,882 A | 12/1978 | Dennis |
| 4,240,143 A | 12/1980 | Besemer |
| 4,263,651 A | 4/1981 | Donath |
| 4,322,849 A | 3/1982 | Calabrese |
| 4,323,849 A | 4/1982 | Smith |
| 4,383,314 A | 5/1983 | Tam |
| 4,386,323 A | 5/1983 | Jansen |
| 4,543,630 A | 9/1985 | Neches |
| 4,558,455 A | 12/1985 | Epenoy |
| 4,701,756 A | 10/1987 | Burr |
| 4,703,451 A | 10/1987 | Calabrese |
| 4,756,011 A | 7/1988 | Cordell |
| 4,805,195 A | 2/1989 | Keegan |
| 4,845,709 A | 7/1989 | Matsumoto |
| 4,860,201 A | 8/1989 | Stolfo |
| 4,881,165 A | 11/1989 | Sager |
| 4,910,669 A | 3/1990 | Gorin |
| 4,922,409 A | 5/1990 | Schoellkopf |
| 5,041,964 A | 8/1991 | Cole |
| 5,053,942 A | 10/1991 | Srini |
| 5,144,166 A | 9/1992 | Camarota |
| 5,200,746 A | 4/1993 | Yoshifuji |
| 5,283,877 A | 2/1994 | Gastinel |
| 5,285,441 A | 2/1994 | Bansal |
| 5,313,501 A | 5/1994 | Thacker |
| 5,467,040 A | 11/1995 | Nelson |
| 5,507,029 A | 4/1996 | Granato |
| 5,621,774 A | 4/1997 | Ishibashi |
| 5,652,530 A | 7/1997 | Ashuri |
| 5,828,253 A | 10/1998 | Murayama |
| 5,832,286 A | 11/1998 | Yoshida |
| 5,872,959 A | 2/1999 | Nguyen |
| 5,920,704 A | 7/1999 | Olnowich |
| 5,923,830 A | 7/1999 | Fuchs |
| 5,960,034 A | 9/1999 | Lo |
| 5,974,487 A | 10/1999 | Hartmann |
| 5,974,503 A | 10/1999 | Venkatesh |
| 6,015,144 A | 1/2000 | Yoshii |
| 6,031,847 A | 2/2000 | Collins |
| 6,105,144 A | 8/2000 | Wu |
| 6,138,185 A | 10/2000 | Nelson |
| 6,157,229 A | 12/2000 | Yoshikawa |
| 6,185,654 B1 | 2/2001 | VanDoren |
| 6,205,571 B1 | 3/2001 | Camporese et al. |
| 6,208,667 B1 | 3/2001 | Caldara |
| 6,233,650 B1 | 5/2001 | Johnson |
| 6,238,220 B1 | 5/2001 | Hsu |
| 6,260,151 B1 | 7/2001 | Omizo |
| 6,295,568 B1 | 9/2001 | Kelley |
| 6,297,684 B1 | 10/2001 | Uyehara |
| 6,301,167 B1 | 10/2001 | Lee |
| 6,301,244 B1 | 10/2001 | Huang |
| 6,317,352 B1 | 11/2001 | Halbert |
| 6,321,345 B1 | 11/2001 | Mann |
| 6,335,647 B1 | 1/2002 | Nagano |
| 6,335,930 B1 | 1/2002 | Lee |
| 6,345,321 B1 | 2/2002 | Litaize |
| 6,356,610 B1 | 3/2002 | Ott |
| 6,359,815 B1 | 3/2002 | Sato |
| 6,369,605 B1 | 4/2002 | Bonella |
| 6,370,200 B1 | 4/2002 | Takahashi |
| 6,378,018 B1 | 4/2002 | Tsern |
| 6,417,713 B1 | 7/2002 | DeRyckere |
| 6,422,644 B1 | 7/2002 | Miller |
| 6,425,114 B1 | 7/2002 | Chan |
| 6,445,719 B1 | 9/2002 | Schneider |
| 6,446,174 B1 | 9/2002 | Dow |
| 6,449,667 B1 | 9/2002 | Ganmukhi |
| 6,473,439 B1 | 10/2002 | Zerbe |
| 6,473,827 B2 | 10/2002 | McMillen |
| 6,493,205 B2 | 12/2002 | Bauer |
| 6,493,250 B2 | 12/2002 | Halbert |
| 6,502,161 B1 | 12/2002 | Perego |
| 6,553,450 B1 | 4/2003 | Dodd |
| 6,557,110 B2 | 4/2003 | Sakamoto |
| 6,601,178 B1 | 7/2003 | Gulick |
| 6,611,518 B1 | 8/2003 | Ngo |
| 6,618,791 B1 | 9/2003 | Dodd |
| 6,625,687 B1 | 9/2003 | Halbert |
| 6,636,932 B1 | 10/2003 | Regev |
| 6,636,993 B1 | 10/2003 | Koyanagi |
| 6,647,027 B1 | 11/2003 | Gasparik |
| 6,658,509 B1 | 12/2003 | Bonella |
| 6,678,783 B2 | 1/2004 | Ozawa |
| 6,681,338 B1 | 1/2004 | Kollipara |
| 6,684,314 B1 | 1/2004 | Manter |
| 6,697,974 B2 | 2/2004 | Craft |
| 6,735,397 B2 | 5/2004 | Herrity |
| 6,799,235 B2 | 9/2004 | Bormann |
| 6,803,872 B2 | 10/2004 | DeRyckere |
| 6,807,377 B1 | 10/2004 | Watanabe |
| 6,833,618 B2 | 12/2004 | Ono |
| 6,845,461 B1 | 1/2005 | Kim |
| 6,871,253 B2 | 3/2005 | Greeff |
| 6,874,097 B1 | 3/2005 | Aliahmad |
| 6,882,082 B2 | 4/2005 | Greeff |
| 6,904,050 B2 | 6/2005 | Chao |
| 6,928,571 B1 | 8/2005 | Bonella |
| 6,937,681 B2 | 8/2005 | Watanabe |
| 6,961,347 B1 | 11/2005 | Bunton |
| 6,968,419 B1 | 11/2005 | Holman |
| 6,983,354 B2 | 1/2006 | Jeddeloh |
| 6,996,686 B2 | 2/2006 | Doblar |
| 7,012,811 B1 | 3/2006 | Jiang |
| 7,013,361 B2 | 3/2006 | Liron |
| 7,064,992 B2 | 6/2006 | Bell |
| 7,065,101 B2 | 6/2006 | Ziegler |
| 7,085,950 B2 | 8/2006 | Ehmann |
| 7,111,140 B2 | 9/2006 | Estakhri |
| 7,113,012 B2 | 9/2006 | Amin |
| 7,123,660 B2 | 10/2006 | Haq |
| 7,130,317 B2 | 10/2006 | Annadurai |
| 7,139,347 B2 | 11/2006 | Fujita |
| 7,149,950 B2 | 12/2006 | Spencer |
| 7,164,615 B2 | 1/2007 | Park |
| 7,167,361 B2 | 1/2007 | Lin |
| 7,193,429 B2 | 3/2007 | Okuyama |
| 7,205,803 B2 | 4/2007 | Chung |
| 7,206,888 B2 | 4/2007 | Byers |
| 7,280,538 B2 | 10/2007 | Li |
| 7,304,520 B2 | 12/2007 | Cho |
| 7,328,362 B2 | 2/2008 | Chiang |
| 7,343,500 B2 * | 3/2008 | Igari ............... G06F 1/3203 713/300 |
| 7,366,852 B2 | 4/2008 | Hung |
| 7,430,728 B1 | 9/2008 | Rahut |
| 7,433,441 B2 | 10/2008 | Jenkins |
| 7,490,189 B2 | 2/2009 | Eberle |
| 7,516,029 B2 | 4/2009 | Kim |

(56) References Cited

U.S. PATENT DOCUMENTS

| | | |
|---|---|---|
| 7,525,356 B2 | 4/2009 | Hui |
| 7,539,800 B2 | 5/2009 | Dell |
| 7,551,640 B1 | 6/2009 | Klecka |
| 7,609,695 B2 | 10/2009 | Zhu |
| 7,643,517 B2 | 1/2010 | Annadurai |
| 7,653,776 B2 | 1/2010 | Cornelius |
| 7,668,271 B2 | 2/2010 | Kim |
| 7,668,272 B1 | 2/2010 | Obeidat |
| 7,734,867 B1 | 6/2010 | Keeton |
| 7,751,713 B2 | 7/2010 | Perkins |
| 2001/0039601 A1 | 11/2001 | Leung |
| 2002/0009169 A1 | 1/2002 | Watanabe |
| 2002/0026600 A1 | 2/2002 | Jung |
| 2002/0084458 A1 | 7/2002 | Halbert |
| 2002/0112119 A1 | 8/2002 | Halbert |
| 2002/0124153 A1 | 9/2002 | Litaize |
| 2002/0178314 A1 | 11/2002 | Cho |
| 2003/0001880 A1 | 1/2003 | Holtz |
| 2003/0018880 A1 | 1/2003 | Litaize |
| 2003/0019327 A1 | 1/2003 | Fujimoto |
| 2003/0046489 A1 | 3/2003 | Yagi |
| 2003/0058021 A1 | 3/2003 | Lee |
| 2003/0061447 A1 | 3/2003 | Perego |
| 2003/0091039 A1 | 5/2003 | Ziegler |
| 2003/0095575 A1 | 5/2003 | Annadurai et al. |
| 2003/0105928 A1 | 6/2003 | Ash |
| 2003/0117172 A1 | 6/2003 | Wu |
| 2003/0120895 A1 | 6/2003 | Litaize |
| 2003/0126485 A1 | 7/2003 | Wilcox |
| 2003/0163606 A1 | 8/2003 | Fukaishi |
| 2003/0193927 A1 | 10/2003 | Hronik |
| 2003/0206164 A1 | 11/2003 | Juenger |
| 2003/0208511 A1 | 11/2003 | Earl |
| 2003/0236939 A1 | 12/2003 | Kleveland |
| 2004/0004897 A1 | 1/2004 | Kang |
| 2004/0117501 A1 | 6/2004 | Kyung |
| 2004/0122985 A1 | 6/2004 | Parra |
| 2004/0153902 A1 | 8/2004 | Machado |
| 2004/0230718 A1 | 11/2004 | Polzin |
| 2004/0243769 A1 | 12/2004 | Frame |
| 2004/0256638 A1 | 12/2004 | Perego |
| 2005/0005184 A1 | 1/2005 | Lindt |
| 2005/0007805 A1 | 1/2005 | Ware |
| 2005/0010726 A1 | 1/2005 | Rai |
| 2005/0010737 A1 | 1/2005 | Ware |
| 2005/0060483 A1 | 3/2005 | Azuma |
| 2005/0071693 A1 | 3/2005 | Chun |
| 2005/0086549 A1 | 4/2005 | Solomon |
| 2005/0089037 A1 | 4/2005 | Kojima |
| 2005/0144490 A1* | 6/2005 | Igari ............................ 713/300 |
| 2005/0146939 A1 | 7/2005 | Conley |
| 2005/0190622 A1 | 9/2005 | Choi |
| 2005/0246362 A1 | 11/2005 | Borland |
| 2006/0026450 A1 | 2/2006 | Bounitch |
| 2006/0069930 A1* | 3/2006 | Dixon ................. G06F 13/4226 713/300 |
| 2006/0089107 A1 | 4/2006 | Domino |
| 2006/0253721 A1 | 11/2006 | Johnson |
| 2006/0277310 A1 | 12/2006 | Kalos |
| 2007/0002663 A1 | 1/2007 | Schaefer |
| 2007/0088754 A1 | 4/2007 | Brannon |
| 2007/0162516 A1 | 7/2007 | Thiel |
| 2008/0175586 A1 | 7/2008 | Perkins |
| 2008/0175589 A1 | 7/2008 | Perkins |
| 2009/0052892 A1 | 2/2009 | Perkins |
| 2009/0147573 A1 | 6/2009 | Hemink |
| 2009/0324220 A1 | 12/2009 | Perkins |

FOREIGN PATENT DOCUMENTS

| | | |
|---|---|---|
| WO | WO 99/41667 A1 | 8/1999 |
| WO | WO 02/37293 A1 | 5/2002 |
| WO | WO 2004/102403 A2 | 11/2004 |
| WO | WO 2004/109500 A2 | 12/2004 |
| WO | WO 2004/109525 A2 | 12/2004 |
| WO | WO 2004/109526 A2 | 12/2004 |

OTHER PUBLICATIONS

Notice of Preliminary Rejection for Korean Application No. 10-2007-7025635, dated Jul. 31, 2012, 5 pages (with translation).

Chakraborty, W. et al. Dynamic Thermal Clock Skew Compensation using Tunable Delay Buffers. ACM. 2006.

Despaux, 0., 'DDR SDRAM Controller Using Virtex-4 FPGA Devices,' 2004 Xilinx, Inc., XAPP709 (v1.0) Sep. 10, 2004, pp. 1-9.

Elpida, 'Low Power Function of Mobile RAMTM Deep Power Down (DPD),' Elpida Memory, Inc. 2005-2006, Date Published May 2006 (K) Japan, URL: http://www.elpida.com, pp. 1-4.

Fan, X., et al., 'Memory Controller Policies for DRAM Power Management,' ISPLED'01, Aug. 6-7, 2001, Huntington Beach, California, USA, Copyright 2001 ACM 1-58113-371 05/01/0008, 6 pages.

Graefe, G., 'Write-Optimized B-Trees,' Proceedings of the 30th VLDB Conference, Toronto, Canada, 2004, pp. 672-683.

V Hu et al. Inter-Signal Timing Skew Compensation of Parallel Links with Voltage-Mode Incremental Signaling. IEEE. 2008.

Kubiatowicz, J. et al., "The Alewife CMMU: Addressing the Multiprocessor Communications Gap," Massachusetts Institute of Technology, Laboratory for Computer Science, Cambridge, MA, pp. 1-3, 1994.

Lee et al. Inter-Pin Skew Compensation Scheme for 3.2-Gb/s/pin Parallel Interface. Journal of Semiconductor Technology and Science. vol. 10. No. 1. Mar. 2010.

Ni, Lionel M. et al., "Performance Evaluation of Switch Based Wormhole Networks," 1045-9219/97, 1997, IEEE, pp. 462-474.

Micron, 'Calculating Memory System Power for DDR,' 2001 Micron Technology, Inc., pp. 1-26.

Samsung Electronics Flash Memory, '1G x 8 Bit / 2G x 8 Bit / 4G x Bit NAND Flash Memory,' K9XXG08UXA, Date Unknown, published prior to Jan. 10, 2006, 50 pages.

Sanders, D.A., et al., 'Terabyte IDE RAID-5 Disk Arrays,' 2003 Conference for Computing in High Energy and Nuclear Physics, LaJolla, California, Mar. 24-28, 2003, pp. 1-8.

Sequin, C.H. et al., "Communication in X-Tree, a Modular Multi-processor System," University of California, Computer Science Division, Electrical Engineering & Computer Sciences; Berkeley, CA, 1978, pp. 194-203.

Veanes, Margus et al., "Cycletrees: Flexible Interconnection Graphs for Parallel Computing", UPMAIL Technical Report No. 97, Uppsala, Sweden, Feb. 21, 1995, 36 pages.

Will, Robert, "A High-Speed Channel Controller for the Chaos Router," Dec. 8, 1992, pp. 1-21.

Xie, Hong et al., "A Graph for Interconnecting Processors in Parallel Computing," University, Murdoch, W.A, 6150 Australia; Proc. ICCI'94, 1994 Int. Conf. on Computing and Information, pp. 885-901.

Argument and Amendment filed on Mar. 21, 2011 in the Korean Intellectual Property Office (KIPO) for Korean Patent Application No. 10-2009-7008236, 9 pages.

International Search Report for International Application No. PCT/US2006/014527, dated Apr. 10, 2007, 7 pages.

Written Opinion of the International Searching Authority for International Application No. PCT/US2006/014527, dated Apr. 10, 2007, 9 pages.

International Search Report for International Application No. PCT/US2007/022316, dated Mar. 28, 2008, 3 pages.

International Search Report for International Application No. PCT/US2008/074628, dated Mar. 24, 2009, 3 pages.

Written Opinion of the International Searching Authority for International Application No. PCT/US2008/074628, dated Mar. 24, 2009, 5 pages.

International Search Report for International Application No. PCT/US2008/078752, dated Mar. 31, 2009, 3 pages.

(56) References Cited

OTHER PUBLICATIONS

Written Opinion of the International Searching Authority for International Application No. PCT/US2008/078752, dated Mar. 31, 2009, 5 pages.
International Search Report for International Application No. PCT/US2008/083969, dated Apr. 30, 2009, 3 pages.
Written Opinion of the International Searching Authority for International Application No. PCT/US2008/083969, dated Apr. 30, 2009, 5 pages.
International Search Report for International Application No. PCT/US2010/062061, dated Sep. 20, 2011, 9 pages.
European Patent Office Communication from EPO application No. 06 750 534.7-2212 dated Jun. 5, 2009 (6 pages).
Nov. 13, 2009 Response to European Patent Office Communication from EPO application No. 06 750 534.7-2212 dated Jun. 5, 2009 (14 pages).
European Patent Office Communication from EPO application No. 07 861 460.9-2212 dated Mar. 23, 2010 (3 pages).
European Patent Office Communication from EPO application No. 07 861 460.9-2212 dated Oct. 15, 2010 (5 pages).
May 28, 2010 Response to European Patent Office Communication from EPO application No. 07 861 460.9-2212 dated Mar. 23, 2010 (17 pages).
European Patent Office Communication from EPO application No. 08836238.9, 2212/2201463 dated Oct. 1, 2010 (1 page).
European Search Report from EP Application No. 08836238.9 2212/2201463 dated Sep. 14, 2010 (7 pages).
Feb. 23, 2010 Non-Final Office Action, U.S. Appl. No. 11/405,083 (19 pages).
Jan. 21, 2011 Non-Final Office Action, U.S. Appl. No. 12/245,349 (20 pages).
Jul. 21, 2009 Non-Final Office Action, U.S. Appl. No. 11/405,083.
Jul. 21, 2010 Final Office Action, U.S. Appl. No. 11/405,083 (20 pages).
May 19, 2010 Non-Final OA U.S. Appl. No. 11/075,269.
May 19, 2010 Non-Final Office Action, U.S. Appl. No. 11/975,269, 19 pages.
Notice of Preliminary Rejection dated Jan. 24, 2011 from the Korean Intellectual Property Office (KIPO) for Korean Patent Application No. 10-2009-7008236.
Notification of the First Office Action dated Dec. 26, 2008 from the Patent Office of the People's Republic of China for Chinese Patent Application No. 2006800130653, 7 pages.
Response to Jul. 21, 2009 Non-Final Office Action, U.S. Appl. No. 11/405,083, filed in the PTO on Oct. 7, 2009.
Response to May 19, 2010 Non-Final Office Action, U.S. Appl. No. 11/975,269, filed in the PTO on Nov. 9, 2010, 7 pages.
Response to Office Action for U.S. Appl. No. 11/405,083 filed Nov. 17, 2010, 16 pages.
Jun. 22, 2011 Final Office Action, U.S. Appl. No. 11/975,269—14 pages.
Korean Intellectual Property Office (KIPO) Office action for Korean Patent Application No. 10-2010-7009902, dated Aug. 3, 2011 16 pages (including English translation).
Response to Jun. 22, 2011 Final Office Action, U.S. Appl. No. 11/975,269, filed in the PTO on Jun. 24, 2011—7 pages.
Response to Feb. 23, 2010 Non-Final Office Action, U.S. Appl. No. 11/405,083, filed in the PTO on May 12, 2010 (30 pages).
Extended European Search Report and response for European Application No. 11168486.6, dated Apr. 19, 2012, 10 pages.
Extended European Search Report and response for European Application No. 11168489.0, dated May 1, 2012, 10 pages.
Extended European Search Report and response for European Application No. 11168492.4, dated May 2, 2012, 13 pages.
Extended European Search Report and response for European Application No. 11168494.0, dated Apr. 19, 2012, 21 pages.
Extended European Search Report and response for European Application No. 111688499.9, dated Apr. 30, 2012, 11 pages.
Extended European Search Report and response for European Application No. 11168502.0, dated May 1, 2012, 9 pages.
Extended European Search Report and response for European Application No. 11168504.6, dated Apr. 19, 2012, 10 pages.
Notification of Reasons for Rejection and Response for Japanese Application No. 2008-507797, dated Apr. 5, 2012, 5 pages.
Notification of Reasons for Rejection and Response for Japanese Application No. 2009-124465, dated Jun. 6, 2012, 13 pages.
Communication from the European Patent Office for European Application No. 11168499.9, dated Oct. 22, 2012, 4 pages.

\* cited by examiner

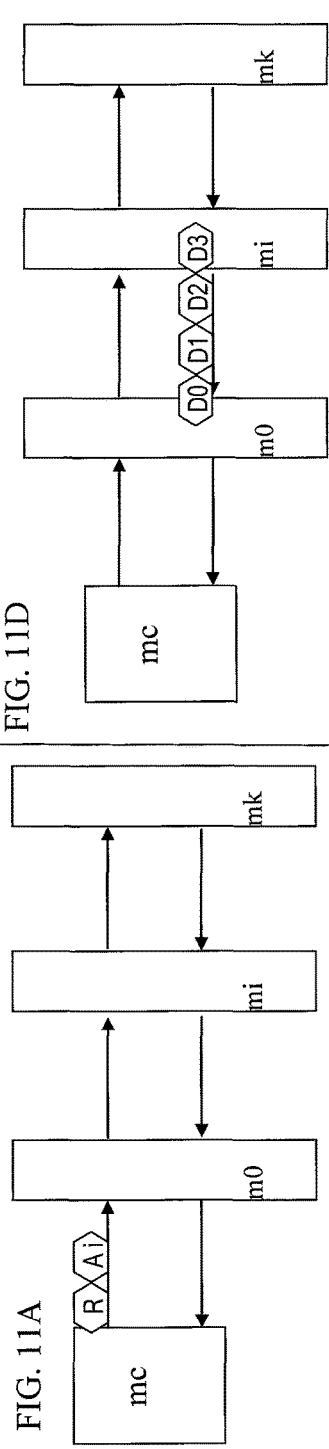
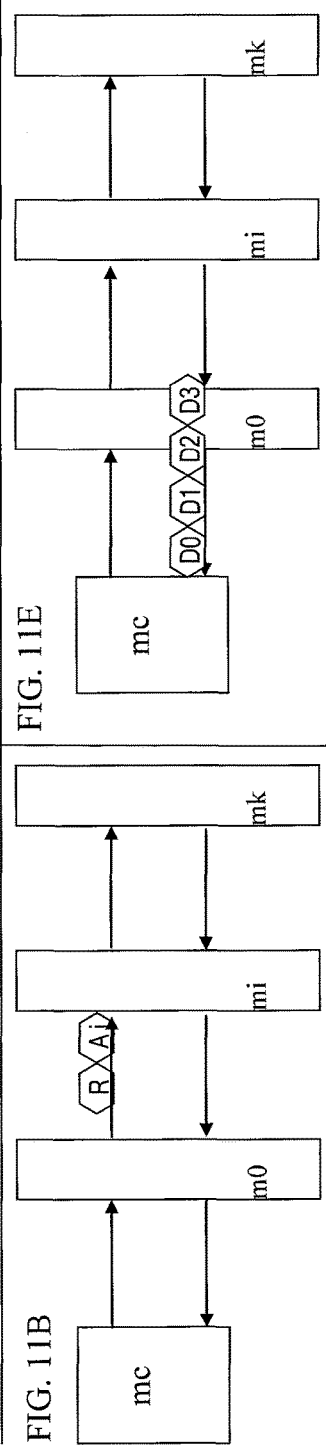
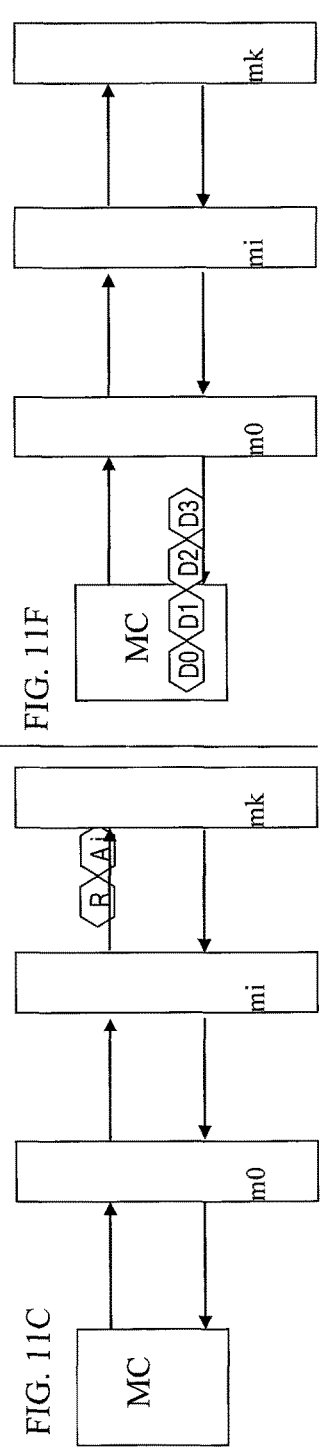

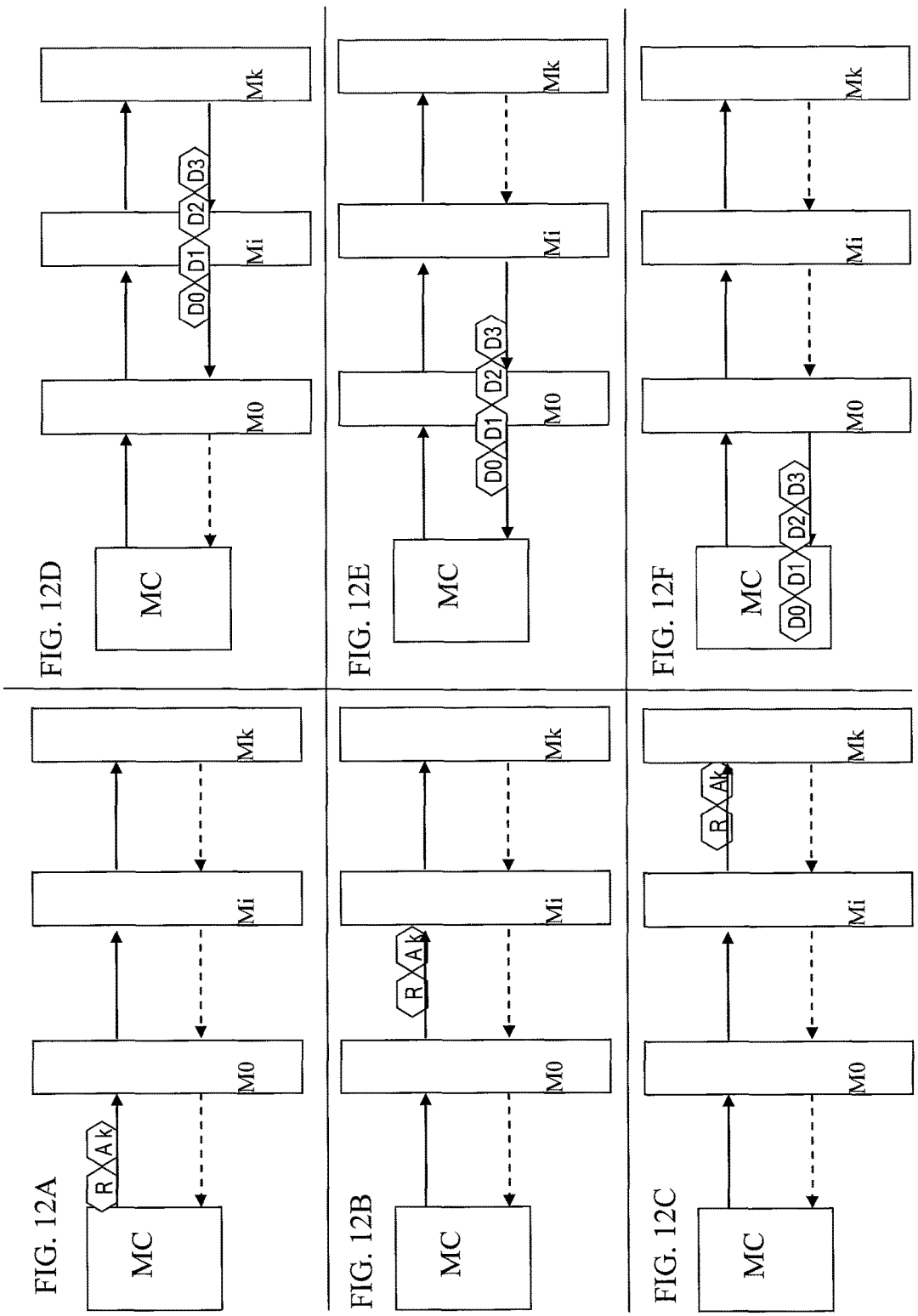

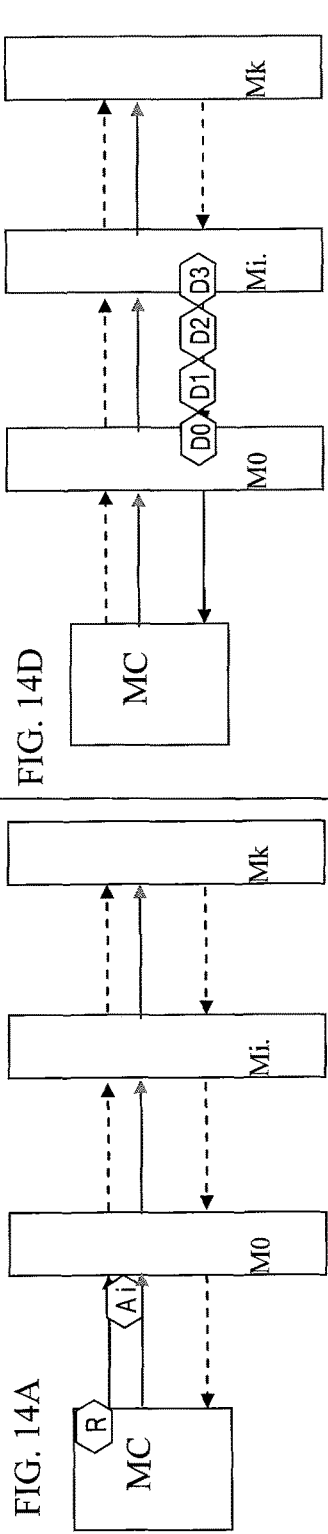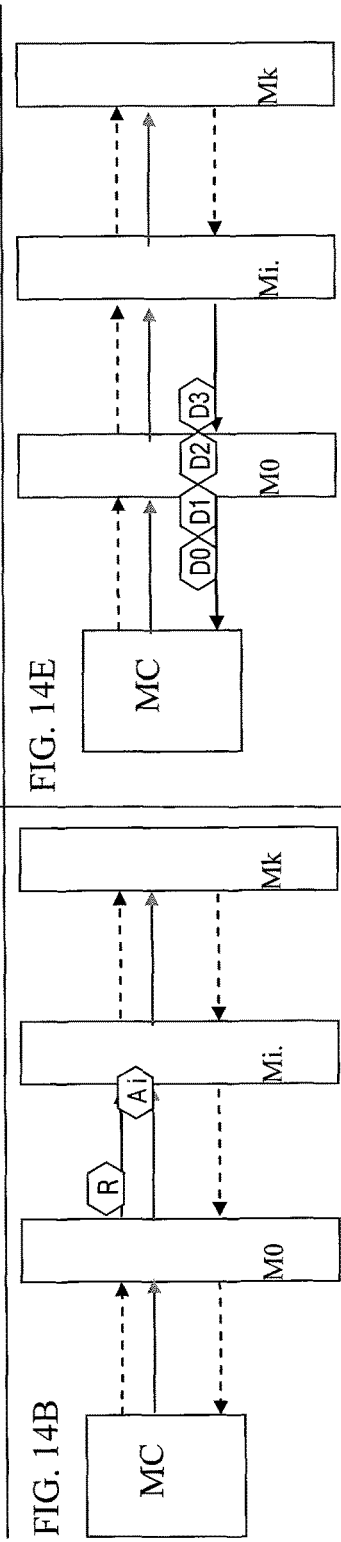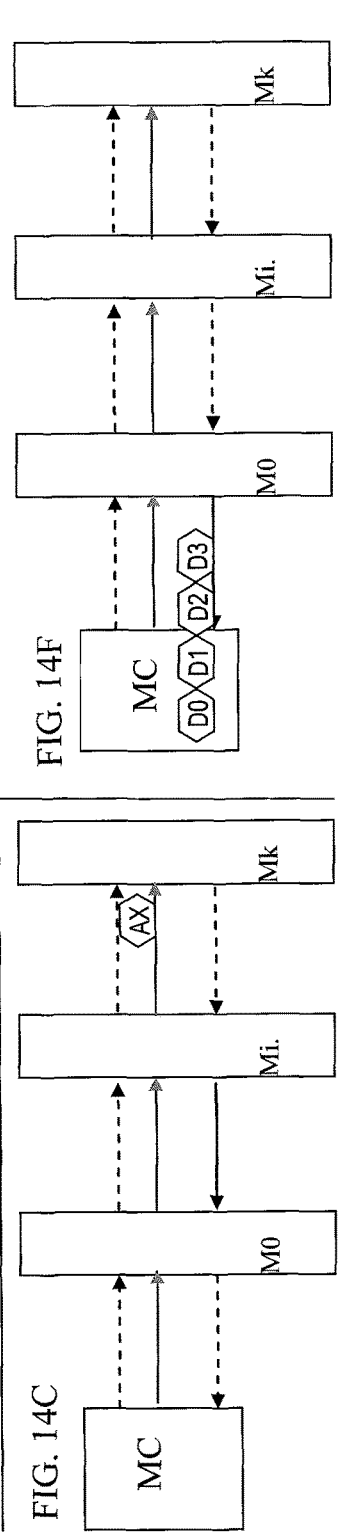

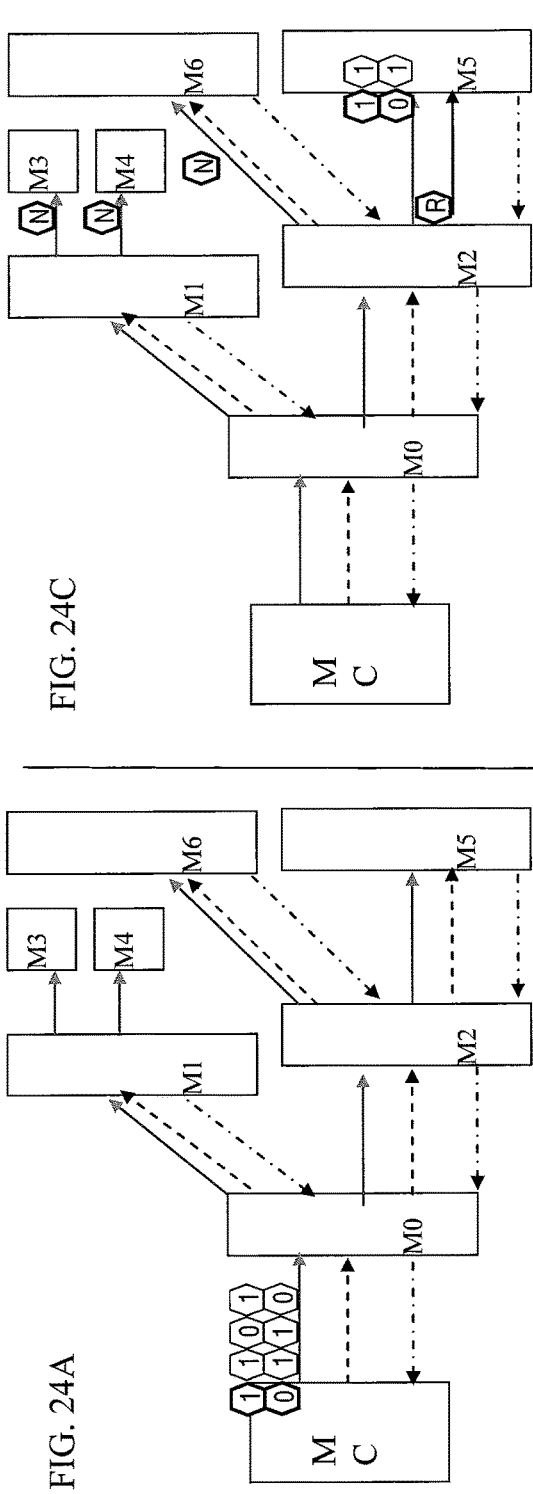
FIG. 24C
FIG. 24A
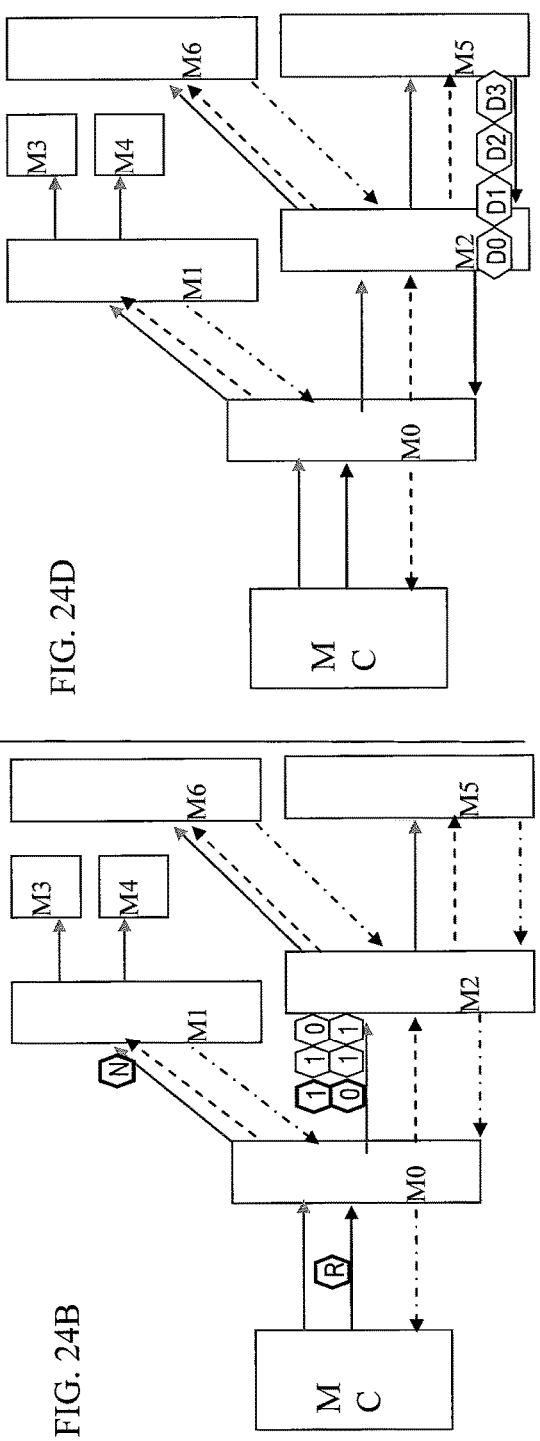
FIG. 24D
FIG. 24B

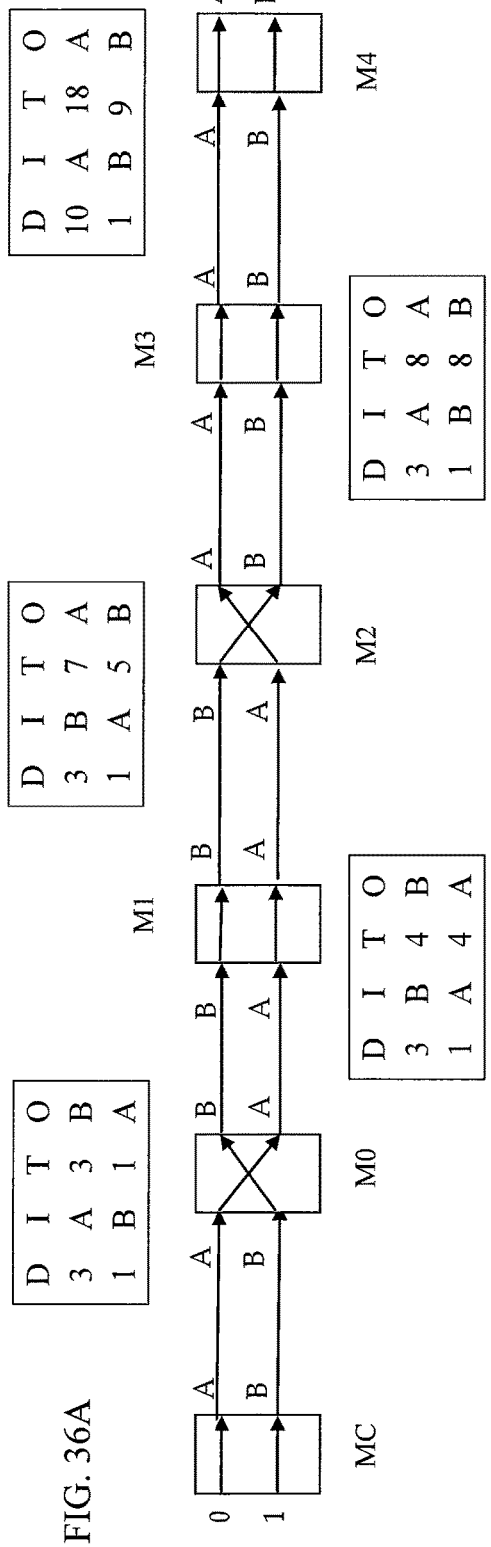
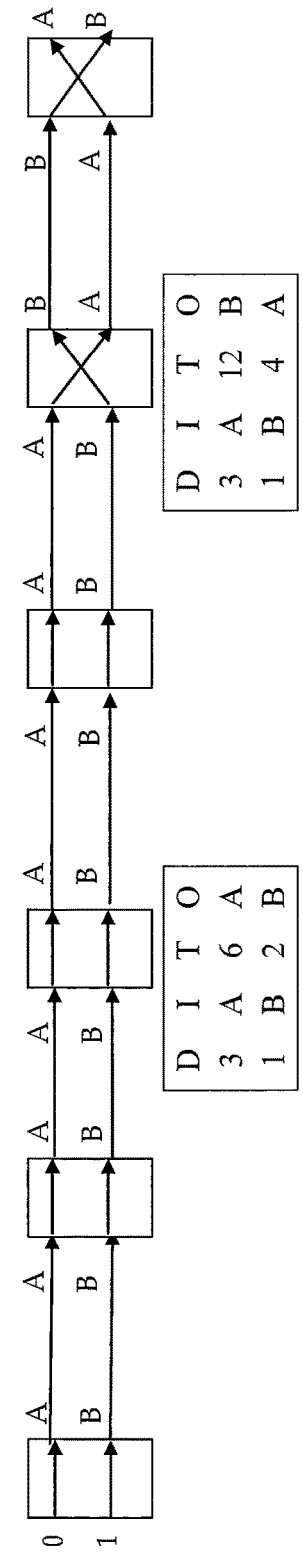
FIG. 36A
FIG. 36B

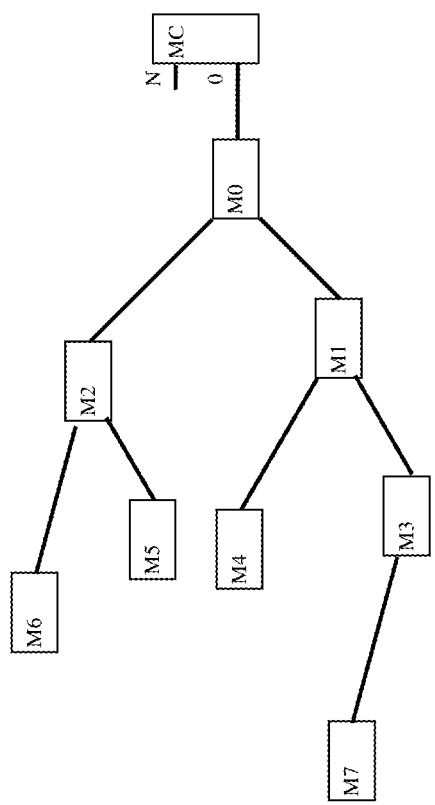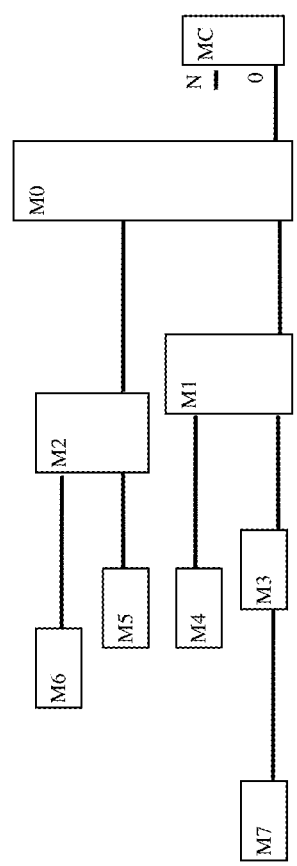
FIG. 46A
FIG. 46B

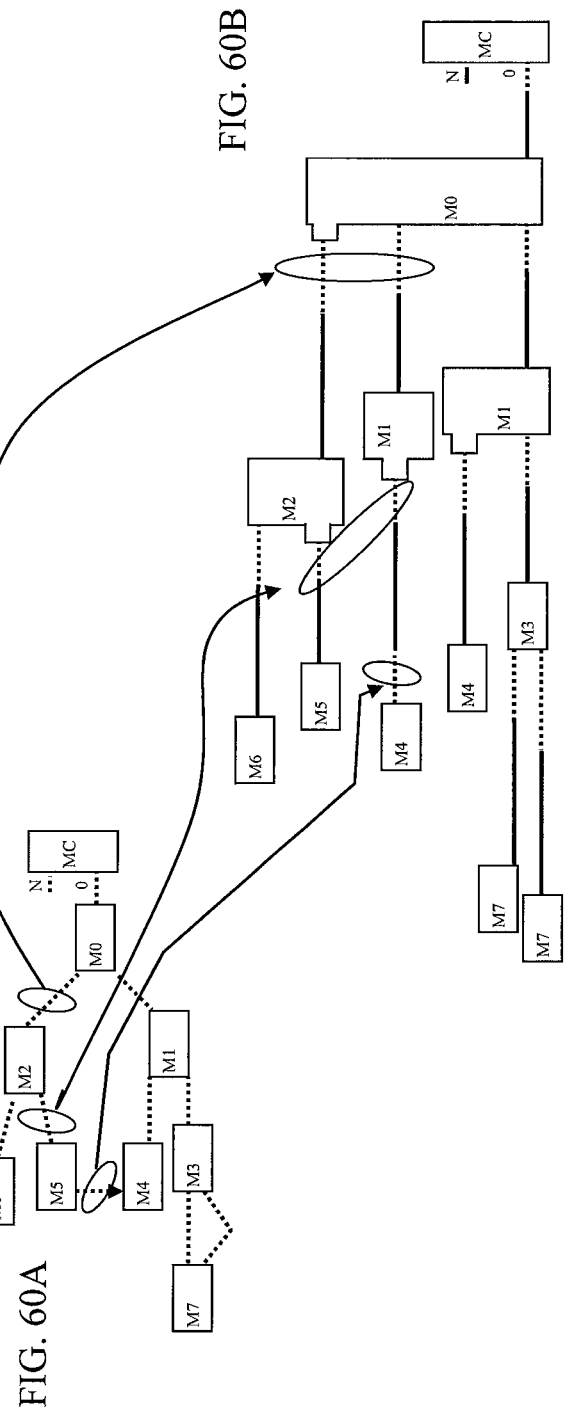

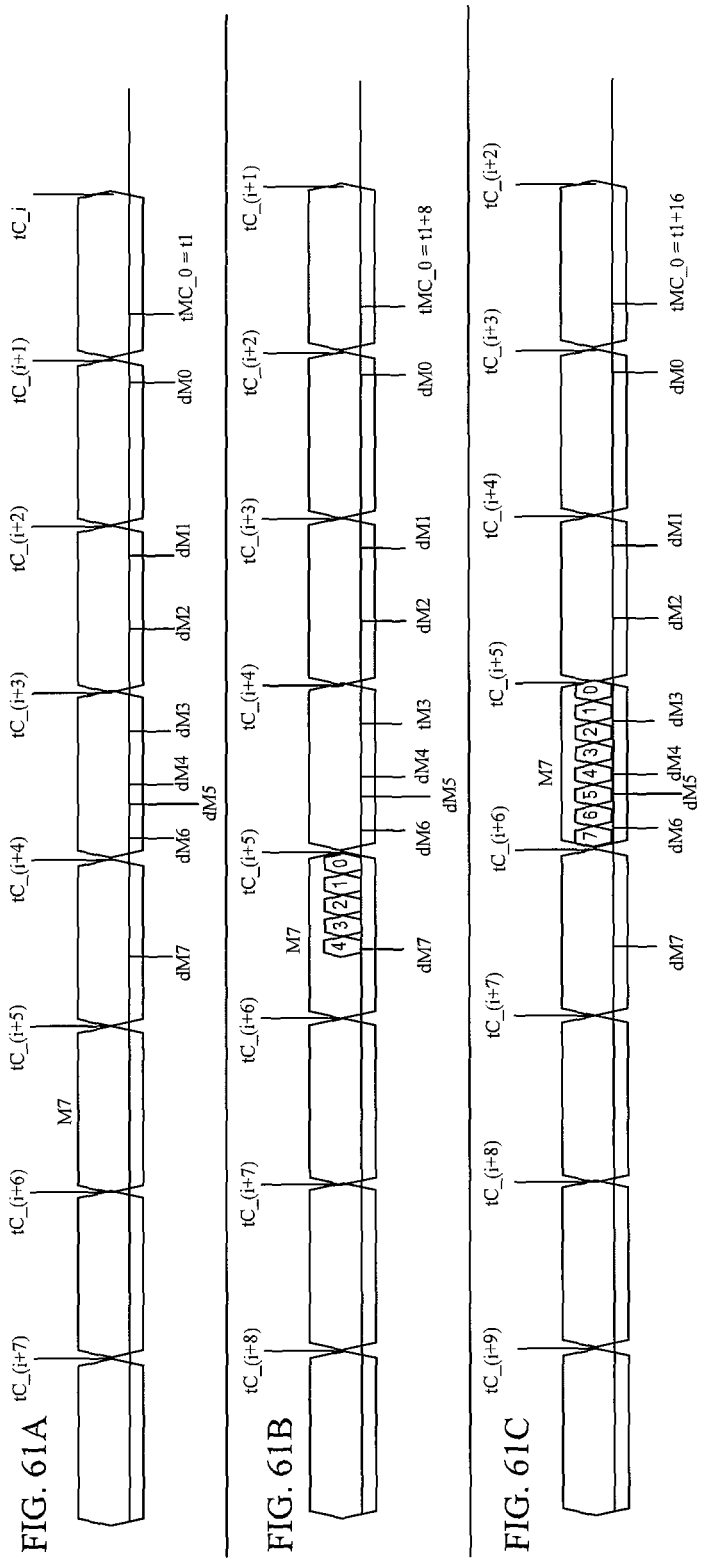

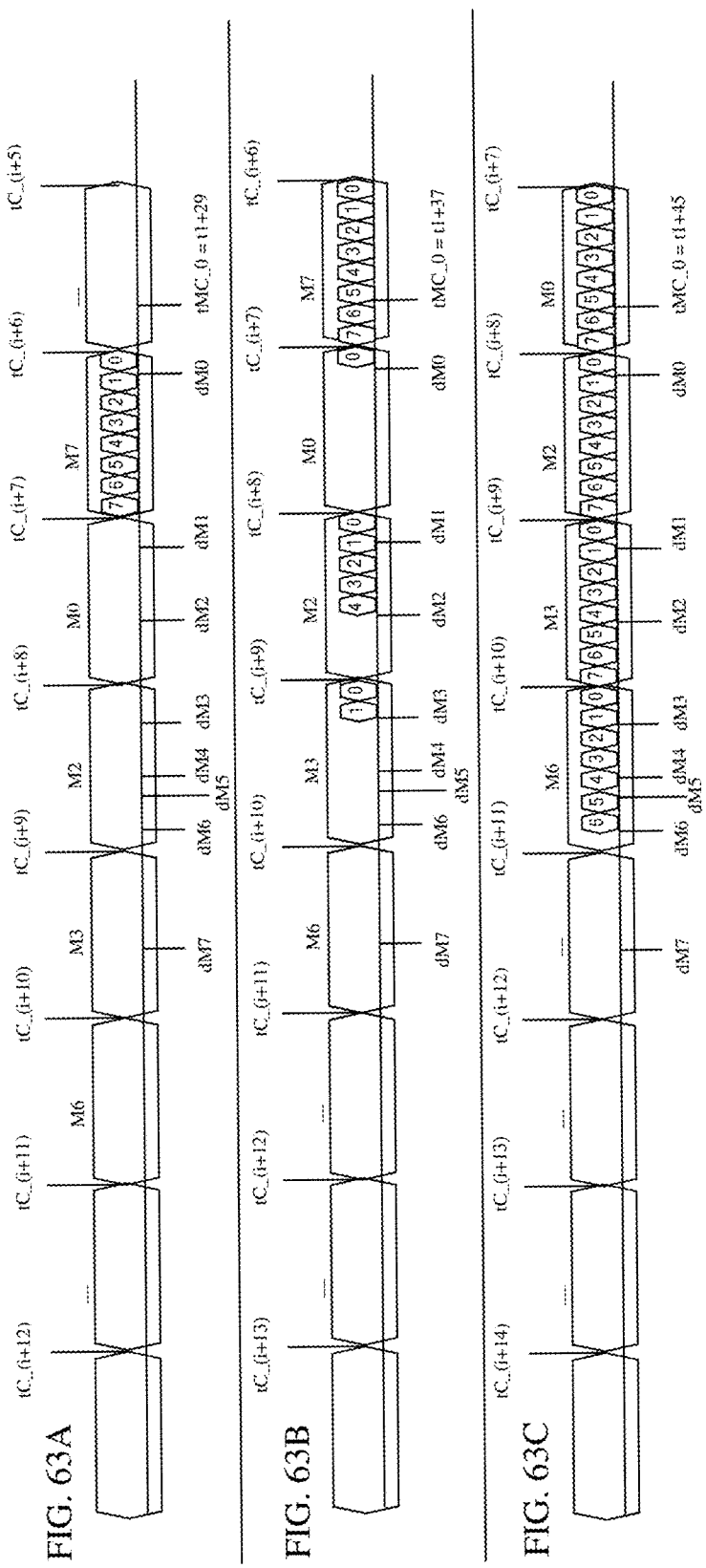

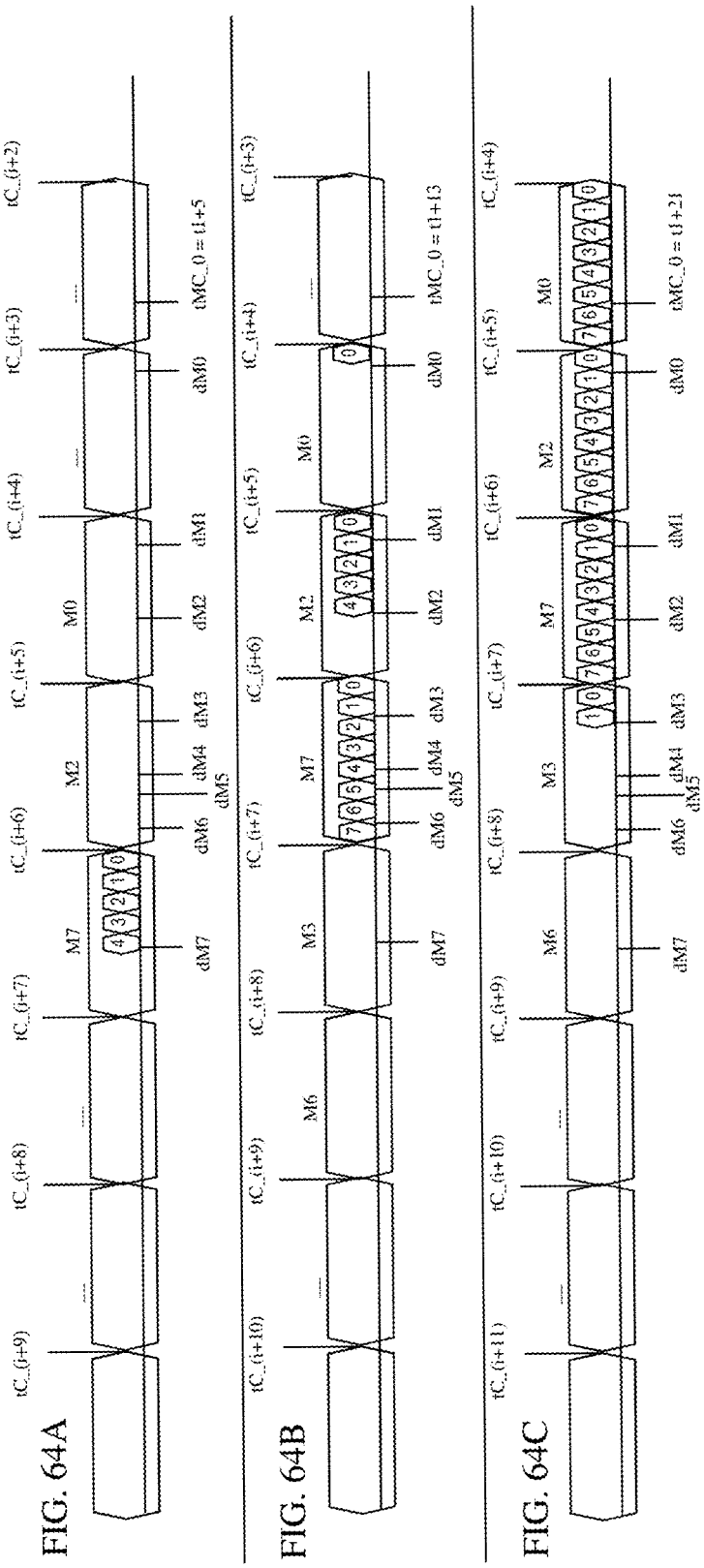

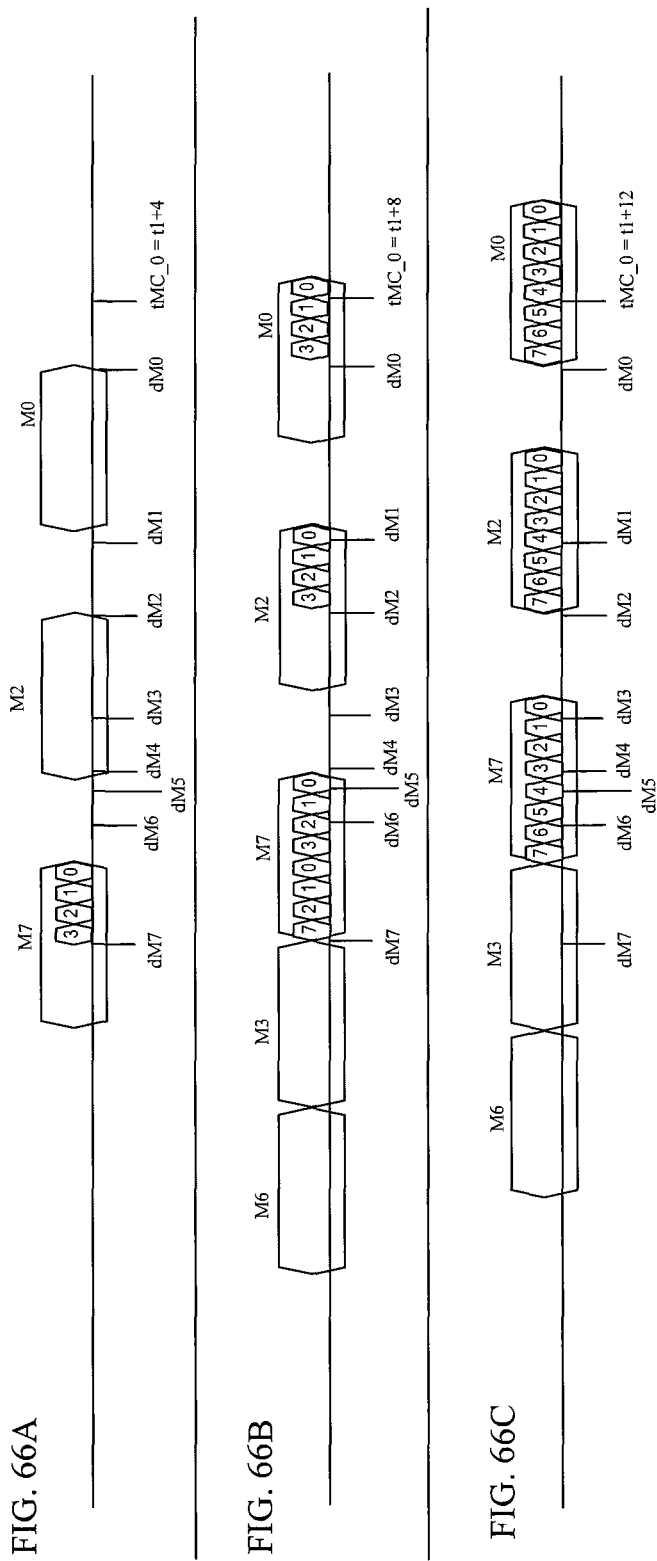

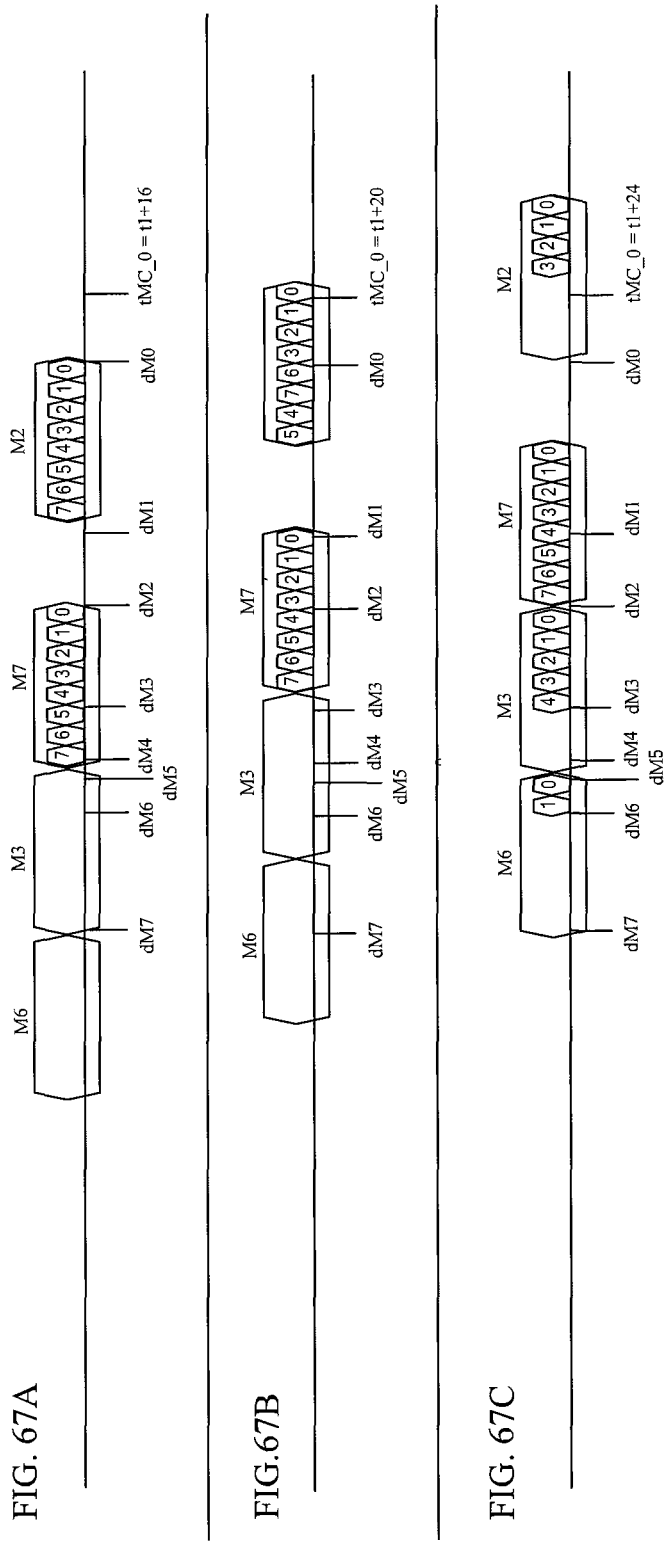

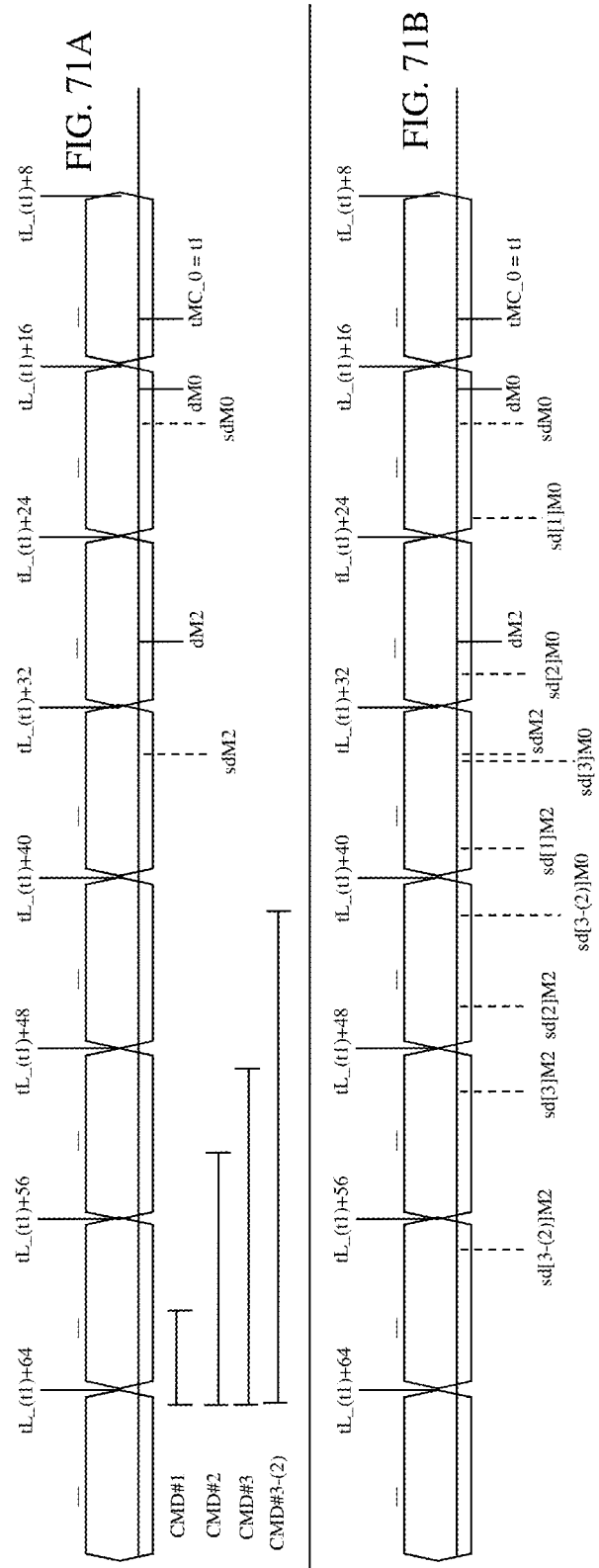

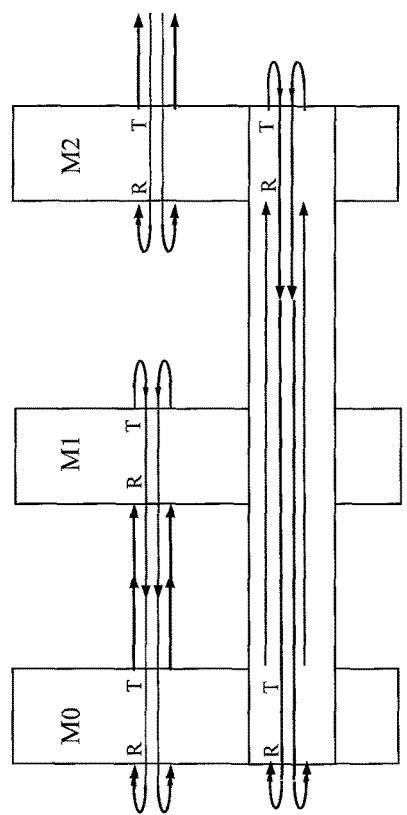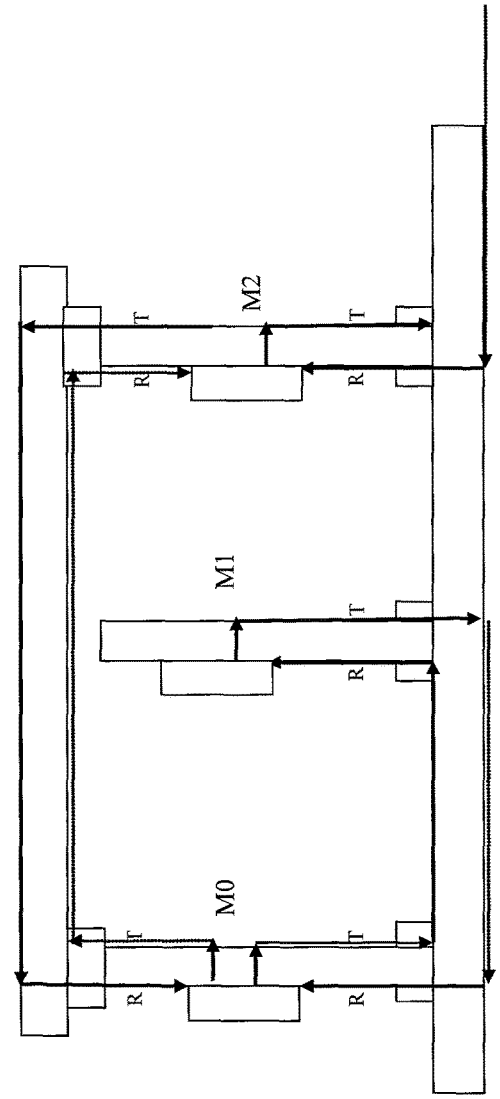
FIG. 75A
FIG. 75B

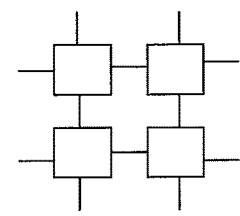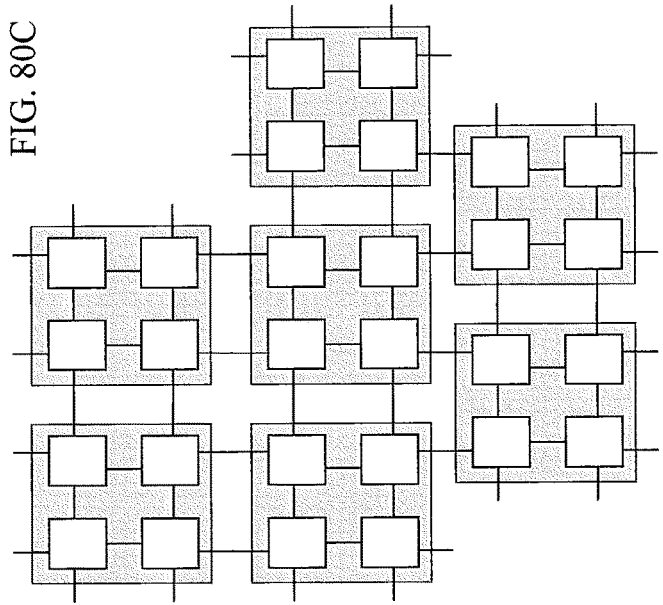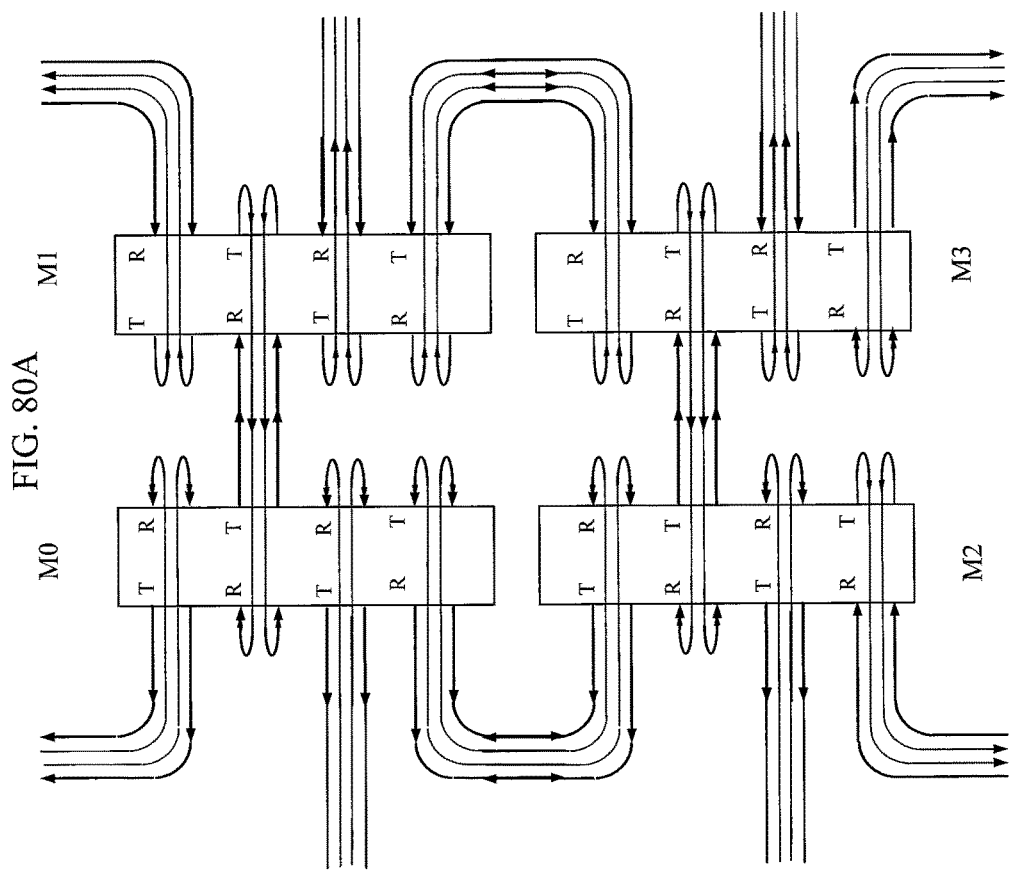

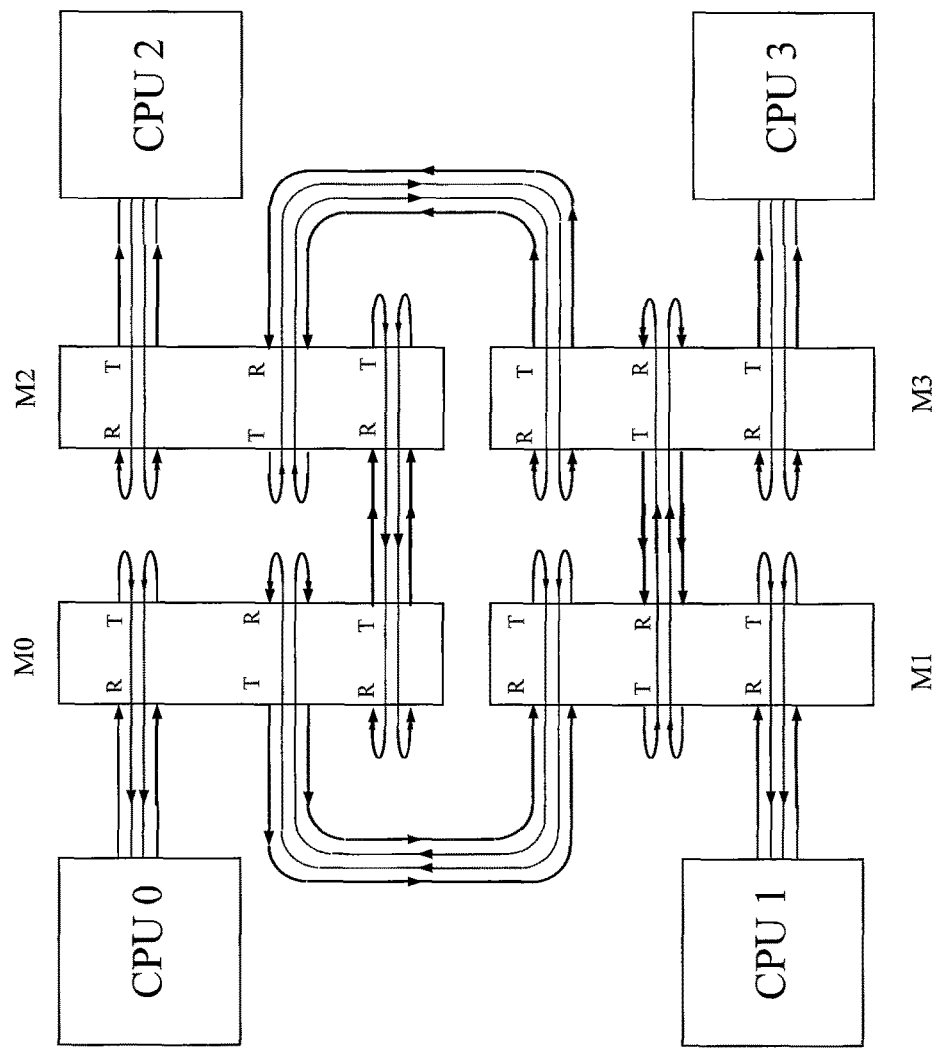
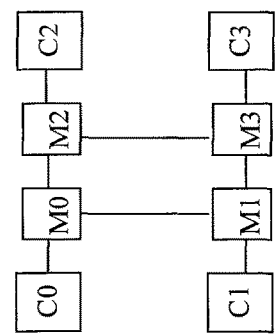
FIG. 83A
FIG. 83B

INTERCONNECTION SYSTEM

This application is a continuation of U.S. Ser. No. 11/405,083, filed on Apr. 17, 2006, now U.S. Pat. No. 8,726,064, which claims the benefit of U.S. Provisional Application Ser. No. 60/674,189, filed on Apr. 21, 2005, and U.S. Provisional Application Ser. No. 60/698,626, filed on Jul. 11, 2005, each application being incorporated herein in its entirety by reference.

BACKGROUND

Generally, the evolution of computer and communications products has been governed by such principles as "Moore's Law", where both the density of the components increases, and the cost of such a component decreases with time. This has also often been accompanied by increases in transfer and computation speed. These trends have often increased the power dissipation density and required new solutions to either dissipate the heat or operate in the high temperature environment. In high speed circuits, both signal propagation delay and the design and manufacturing tolerances may place limitations on the realizable speeds attained in practice.

Contemporary memory system architectures may demonstrate tradeoffs between cost, performance and the ability to upgrade, for example; the total memory capacity of the system. Memory capacity is commonly upgraded via memory modules or cards having a connector/socket interface. Often these memory modules are connected to a bus or interconnecting wiring disposed on a backplane to utilize system resources efficiently. In addition to upgradeability, many of these contemporary memory systems also require high throughput for bandwidth intensive applications, such as graphics.

System resources which may be considered in design include, for example, integrated circuit die area, package pins, signal line traces, connectors, backplane board area and power and response speed.

One popular type of memory module is a Dual In-line Memory Module (DIMM). The DIMM is a rectangular low-profile circuit board that has electrical contact points arranged on both sides along one long edge. The contact points form electrical connections to the main board's memory bus when the DIMM is inserted into a DIMM memory socket.

Memory systems provide an upgrade path through the usage of modules. A socket and connector interface may be employed which allows each module to be removed and replaced by a memory module that is faster or includes a higher capacity, or merely for the replacement of a failed memory module. A memory system may be configured with unpopulated sockets or less than a full capacity of modules (i.e., empty sockets/connectors) and provided for increased capacity at a later time with memory expansion modules.

Memories used in computing and communications systems include, but are not limited to, random access memory (RAM) of all types (e.g., S-RAM, D-RAM); programmable read only memory (PROM); electronically alterable read only memory (EPROM); flash memory, magnetic memories of all types including Magnetoresistive Random Access Memory (MRAM), Ferroelectric RAM (FRAM or FeRAM) as well as NRAM (Nanotube-based/Nonvolatile RAM) and Phase-change memory (PRAM), and magnetic disk storage media. Other memories which may become suitable for use in the future include quantum devices and the like.

There is a need for memory system and computing system architectures or interconnect topologies that provide flexible and cost effective upgrade capabilities while providing high bandwidth to keep pace with microprocessor operating frequencies. Alternatively, lower power consumption, lower memory latency, and similar attributes for the same or similar operational characteristics are also needed.

At present, the size and performance of memory systems may be limited by power consumption, by cooling capacity associated with the power consumption and device density, by response time due to, for example, data skew, by the complexity of the circuit boards needed to interconnect the memory elements, and by the economic costs of these considerations. Improvements in memory and communications systems architectures and apparatus are needed to mitigate some or all of these problems.

SUMMARY

An interconnect system for use with components of a computing or telecommunications system is disclosed, the interconnect system having a plurality of nodes, and each node has a port having at least one of an input link or an output link. Each link has lanes ("lines"). A first lane of a first node transmits control data, and a second node is configurable such that a control signal received on a first lane of the second node controls a future time status change of a second lane of the second node. The status of an output lane of the first port may be changed at a future time determined by the control signal. The future time may have a value that is at least one of a fixed time, a time dependent on the position of the node in the interconnect system, or a time value contained in the control signal.

In another aspect, an interconnect system is disclosed, including a plurality of nodes, each node having a port having at least one of an input link or an output link, each link further comprising a first lane and a second lane. The interconnect system further includes a motherboard having a plurality of connectors, each of the plurality of connectors interfacing with one of a plurality of memory modules. A memory module may communicate with at least one of the plurality of nodes. Each signal lane has at least one of a signal receiver or a signal transmitter. When a first lane of a first node transmits a first signal, and a second node is configured such that the first signal received on a first lane of the second node controls a future time power status of a second lane of the second node.

Each node may be configurable such that the control data controls a destination of data received by the node. The destination of the data may be selected from one of local-to-the-node, or a port.

In another aspect, an interconnect system has a plurality of nodes, and each node has a port having at least one of an input link or an output link, each link further comprising a plurality of lanes and the node may be configurable such that a control signal may received on a selected lane of the plurality of lanes. Control data and signal data may be received on the same or different lanes. The signal data may be analog data or digital data. The digital data may be organized as words. A word is used herein in a generic sense, without restricting the number of bits in a word, or whether the word is transmitted serially or in parallel, except as specifically stated. Thus a word can be, for example, any one of a "nibble". "byte", full word, double word, words with and without parity, and may have non-standard numbers of bits.

In another aspect, an interconnect system has a plurality of nodes, each node having a port having at least one of an input link or an output link, each link further comprising a first lane and a second lane means for controlling the future time status of a second lane based on a signal received by the first lane. The status change may occur between states selected from one of powered on, powered off or standby. A powered on state may permit at least one of transmission or reception of the control or data signal, a standby state has lower power consumption than the powered on state, and a powered off state has lower power consumption condition, with respect to the standby state.

In yet another aspect, an interconnect system has a plurality of signal lanes, and each lane may be capable of at least one of transmitting or receiving a data signal comprising a bit of a data word. The data word may have a first bit and a second bit and each of the first bit and the second bit may be logically exchanged between two signal lines such that a differential time delay between the first bit and the second bit may be altered when the word is received at a distal end of the signal lanes. The exchange of bits may be performed at either a proximal or a distal end of the signal lines. Subsequently, the bits may be rearranged so that the word has the correct logical assignment of data to bits in the word at the receiving node. Alternatively, the bits may be arranged at a sending node such that the bits are in the arrangement at a receiving node.

In still another aspect, an interconnect system has a plurality of nodes, and the nodes form a network connected by links having lanes. The first node may be a source of data, and second node may be a destination of data, and at least one of the first node or the second node may be configured to exchange the logical assignment of data to lanes such that the difference in arrival time of data at the second node is changed.

The data may be a word having at least two bits, and a first bit is assigned to a first lane and a second bit is assigned to a second lane. A module controller, may make the logical assignment of bits of a word to lanes at the input to the first node such that the bits are received in a desired order at the second node. Alternatively, the logical reassignment may be performed at a third node disposed between the first node and the second node.

In a further aspect, an interconnect system has a plurality of nodes, the nodes forming a network connected by links having lanes. The first node may be a source of signals, and second node may be a destination of signals and a means is provided for reducing a differential time delay between signals on two or more lanes between the first node and the second node.

A node is disclosed, the node having an input port, and an output port and each of the input port and the output port may have a plurality of lines. A switch may be configurable such that each of the plurality of input lines are connected to one of output lines, such that a time skew between signals on the plurality of output lines may be altered when measured at a second node having an input port having input lines communicating with the distal end of the output lines from the output port of the first port.

A memory module is disclosed, having a read-write memory device and a configurable switching element (CSE). The CSE may have a first port for at least one of receiving or transmitting signals, and the first port may have a plurality of signal lanes; The CSE may be configurable to interpret received control signals to perform functions which may include: changing the state of a signal lane of the plurality of signal lanes at a future time; routing received signals to the read-write memory device, or routing the received signals to a second port, as examples. The state of each of the plurality of signal lines may be one of powered up, or powered down or standby, as examples.

In another aspect, the future time has a value that is at least one of a fixed time, a time value determined by the control signal or a configurable value, and may be separately determinable for each of the plurality of lanes.

In another aspect, the CSE of the memory module may be configurable such logical data assignment received by the receiving signal lines and the logical assignment of data to be transmitted by the transmitting signal lines is alterable.

The memory module CSE may be configurable such that a signal received on any one signal line of any of the first, the second or the third ports of the memory module may be transmitted on any of the of signal lanes of the first, the second or the third ports. The transmitting and receiving signal lines may be uni-directional, bi-directional or reversible lanes.

In a further aspect, at least one of a data signal, a control signal or a synchronization signal is transmitted on each of the lines or lanes of a link connecting to a CSE or a memory module during a fixed time interval. The fixed time interval may be determined such that at least one of data edge tracking, clock, clock phase, or frame synchronization is maintained.

A memory module is disclosed having a means for storing data, a means for controlling the future time status of one or more input or output interfaces, and a means for routing data to at least one of output interfaces or the means for storing data.

In another aspect, the memory module has a means for exchanging a logical and a physical interface assignment for a signal so that a differential time delay between logical signals on an output interface of a first memory module is altered when measured at an input interface of a second memory module. In another aspect, the means for exchanging a logical and a physical interface assignment for a signal so that a differential time delay between logical signals may be altered may include, but is not limited to, fixed arrangements of the electrical traces on the module, the board(s) the module is attached to, a chip package substrate, connections, be they physical or proximal, between chips in a multichip module alone or in combination with other fixed and/or dynamic means.

In another aspect, the means for exchanging a logical and a physical interface assignment for a signal so that a differential time delay between logical signals may be altered may include, dynamic switching functions performed both inside a configurable switching element (CSE) as well as by other switching elements disposed between two or more CSEs, which may include digital switches, analog/RF switches, mechanical switches such as microelectromechanical systems (MEMS) devices, configurable proximity communications devices or other similar devices, alone or in combination with other dynamic or fixed means.

A configurable switching element (CSE) is disclosed, having at least two signal lines, where a first signal line may be configured to receive a control signal, and a second signal line may have a controllable state. The state of a second line may be one of powered on, powered off, or standby, as examples. A control signal received by the first signal line controls the state of the second signal line. Address data received on at least one of the signal line, and data received on another signal line may be routed to at least one of another signal line or a memory interface. The memory interface is connectable to a means for storing data.

In another aspect, a configurable switching element (CSE) has a first interface for at least one of receiving or transmitting signals, the interface having a plurality of signal lines, and the CSE is configurable to interpret received control signals to perform at least one of: changing the state of one of the plurality of signal lines of the first interface or a second interface, based on a received control signal, or routing received signals to another interface, which may be a memory interface, a second interface for receiving or transmitting signals, or the transmitting aspect of the first interface. The state of each of the plurality of signal lines is one of powered up, powered down, or standby, as examples.

In another aspect, the CSE is configurable such a logical data exchange between the receiving signal lines and the logical assignment of data of to transmitting signal lines is performed. There may be a third interface configurable so that a signal received on any signal line of any of the first, the second or the third interfaces is transmitted on any of the plurality of signal lines of the first, the second or the third interfaces.

A configurable switching element (CSE) is disclosed, having a means for controlling the future time status of one or more input or output interfaces and, a means for routing data to the output interfaces or to a means for storing data.

In another aspect the CSE has a means for exchanging a logical and a physical interface assignment for a signal so that a differential time delay between signals on a first output interface and a second output interface is altered when measured at an interface of a second CSE.

A interconnection network to accommodate nodes in a network is disclosed having connection interfaces with a top end and a bottom end, an may have a plurality of signal lines forming first, second and third link connections; a network formed by one or more of the first, second or third links joining the connection interfaces wherein at least two of the following configurations of the connection interfaces are joined by traces:

(a) the first through third links being disposed such that all of the links lead away from the connection interface on a first side;

(b) the first through third links being disposed such that a link having a line closest to the top end leads away from the first side of the connection interface, and the two remaining links lead away from the second side of the connection interface and the links leading away from the second side of the connection interface are disposed adjacently;

(c) the first through third links being disposed such that a link having a line closest to the bottom end leads away from the second side of the connection interface, and the two remaining links lead away from the first side of the connection interface and the links leading away from the first side of the connection are disposed adjacently;

(d) the first through third links being disposed such that a link having a line closest to the top end and a link having a line closest to the bottom end lead away from the first side of the connection interface, and a link having a line disposed intermediate between the first two links leads away from the second side of the connection interface;

and (e), (f), (g), and (h) where (e), (f), (g) and (h) are (a), (b), (c), and (d), wherein the top and bottom ends are interchanged by rotating the pattern of (a), (b), (c) and (d) by 180 degrees about an axis orthogonal to the connector.

In another aspect, the links may be disposed in layers of a flat printed wiring assembly, or as metallic elements in layers on a substrate. Other components such as memory means, a CSE and other active and passive circuitry may be fabricated on the same substrate, wiring assembly.

In another aspect, at least three connector interfaces are disposed parallel to each other.

A method of laying out a network interconnect is disclosed, the method comprising: disposing a plurality of connection interfaces such that the tops of the connection interfaces are positioned opposite each other and the bottoms of the connection interfaces are disposed opposite each other; forming a network of connections between the plurality of connection interfaces, where at least two of the following connection interface configurations are used:

(a) the first through third links being disposed such that all of the links lead away from the connection interface on a first side;

(b) the first through third links being disposed such that a link having a line closest to the top end leads away from the first side of the connection interface, and the two remaining links lead away from the second side of the connection interface and the links leading away from the second side of the connection interface are disposed adjacently;

(c) the first through third links being disposed such that a link having a line closest to the bottom end leads away from the second side of the connection interface, and the two remaining links lead away from the first side of the connection interface and the links leading away from the first side of the connection are disposed adjacently;

(d) the first through third links being disposed such that a link having a line closest to the top end and a link having a line closest to the bottom end lead away from the first side of the connection interface, and a link having a line disposed intermediate between the first two links leads away from the second side of the connection interface;

and (e), (f), (g), and (h) where (e), (f), (g) and (h) are (a), (b), (c), and (d), wherein the top and bottom ends are interchanged by rotating the pattern of (a), (b), (c) and (d) by 180 degrees about an axis orthogonal to the connector.

A network controller is disclosed, having a first interface communicating with a computer; a second interface having to a link to a node; and means for determining the differential time delay between signals on lanes of a link disposed between a first node and a second node.

In another aspect, the network controller may have a means for assigning logical signals to lanes disposed for communicating between first and second nodes so as to alter the differential time delay between the logical signals received at the second node.

In yet another aspect the network controller may have a computer interface; a first data interface, the first data interface capable of transmitting and receiving signals; and, a processor configured to generate address values for transmitting by the first data interface, the processor further configured to logically assign data values to signal lines such that a delay differential of logical data on at least two signal lines may be altered when received at a receiving device.

BRIEF DESCRIPTION OF THE DRAWINGS

The present invention will be understood more fully from the detailed description of several example embodiments which follows and from the accompanying drawings which, however, should not be taken to limit the invention to the specific embodiments shown, but which are for explanation and understanding only.

FIG. 11A-F show aspects of a memory system believed to be similar to one being developed by INTEL and known as FB-DIMM;

FIG. 12A-F show an arrangement of memory modules incorporating CSEs;

FIG. 14A-F show another arrangement of memory modules having separate command and data lines between modules;

FIG. 24A-D show a configuration similar to FIG. 23 where links may be placed in a lower power state;

FIG. 36A-B show an example where the time delays between module pairs are substantially unequal;

FIG. 46A-B, shows the arrangement of FIG. 45 in an more elaborate network;

FIG. 60A-B shows an arrangement with multiple signaling paths, where the signaling paths may be disjoint from the data paths;

FIG. 61A-C shows a time line for data being transmitted from a module to a module controller;

FIG. 63A-C shows a further example of a time line where multiple commands are being executed;

FIG. 64A-C shows an example of variable delay scheduling corresponding to FIG. 62;

FIG. 66A-C shows an example of scheduling where the restriction of data to slotted transmission times has been removed;

FIG. 67A-C shows another example of scheduling where the restriction of data to slotted transmission times has been removed;

FIG. 71A-C shows a further timing diagram with multiple commands;

FIG. 75A-B shows an aspect where the connections between modules may be on other than a motherboard.

FIG. 80A-C shows a grouping of modules in the form of a grid;

FIG. 83A-B shows modules in a grid configuration connected to a processor;

FIG. 119 shows a physical board layout corresponding to a portion of the tree of FIG. 118;

Figure 119:
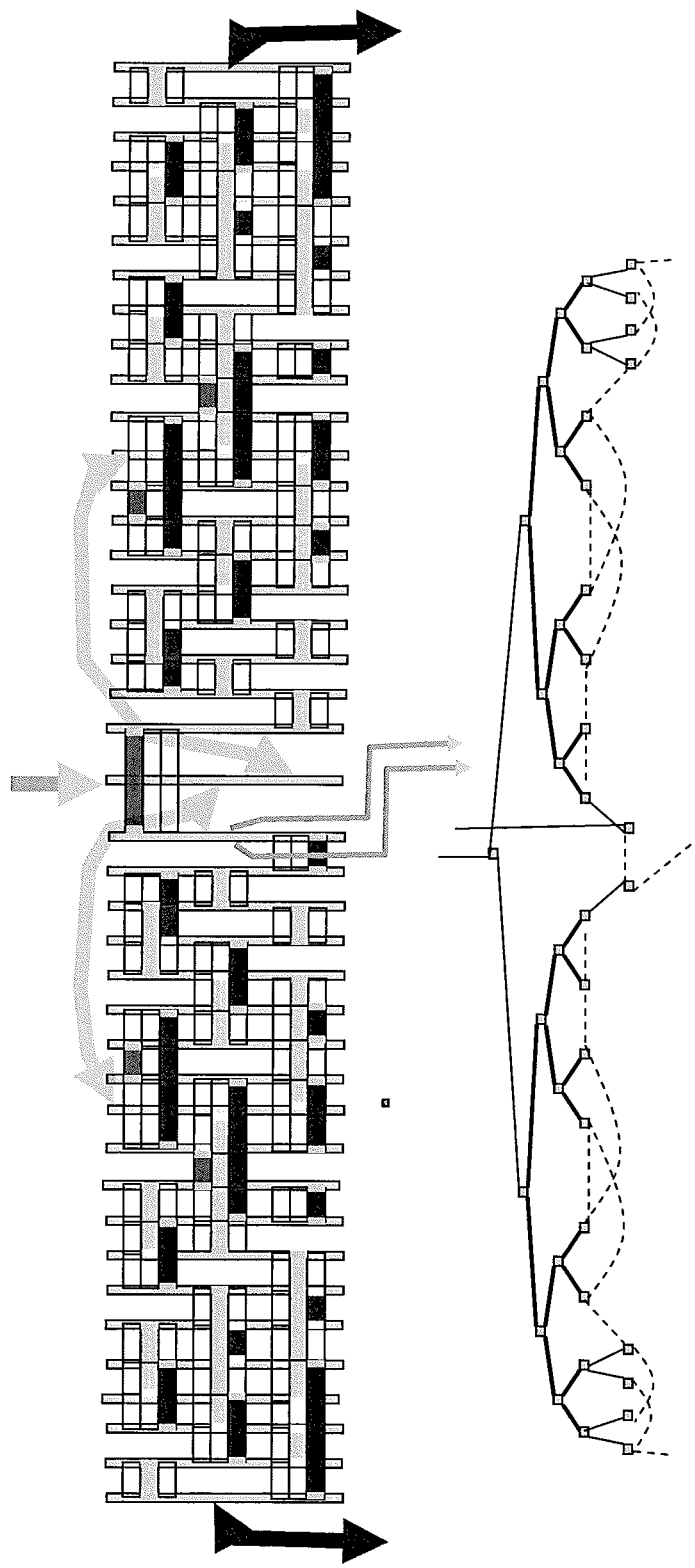
Figure 121:
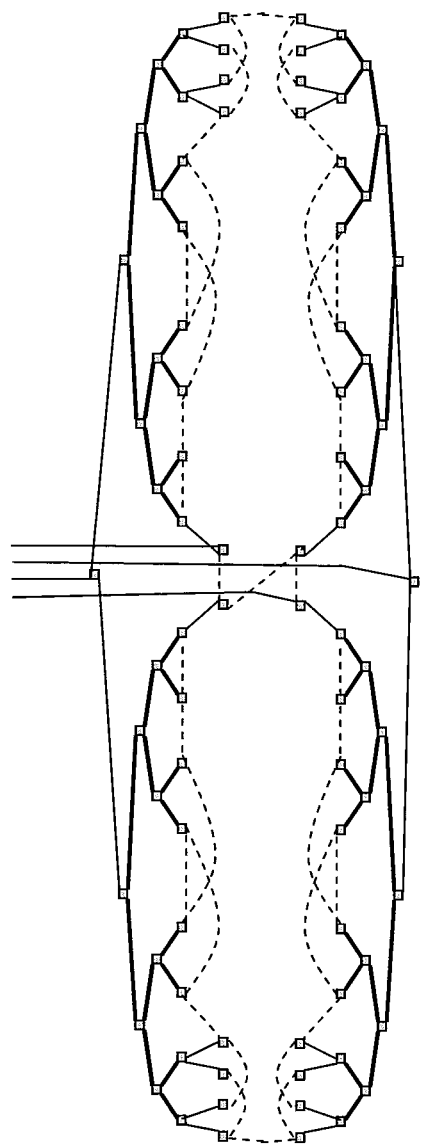
Figure 122:
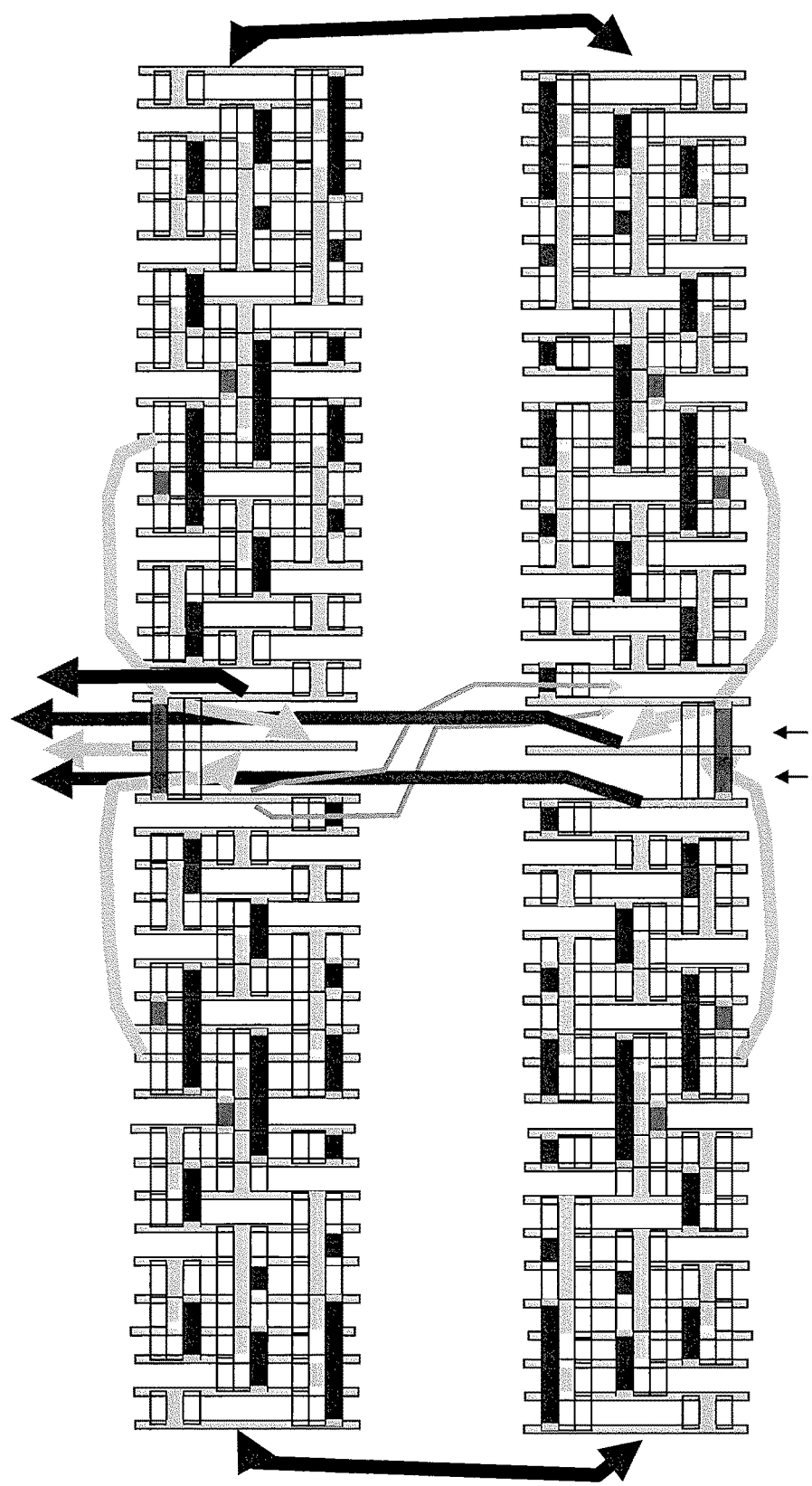
Figure 123:
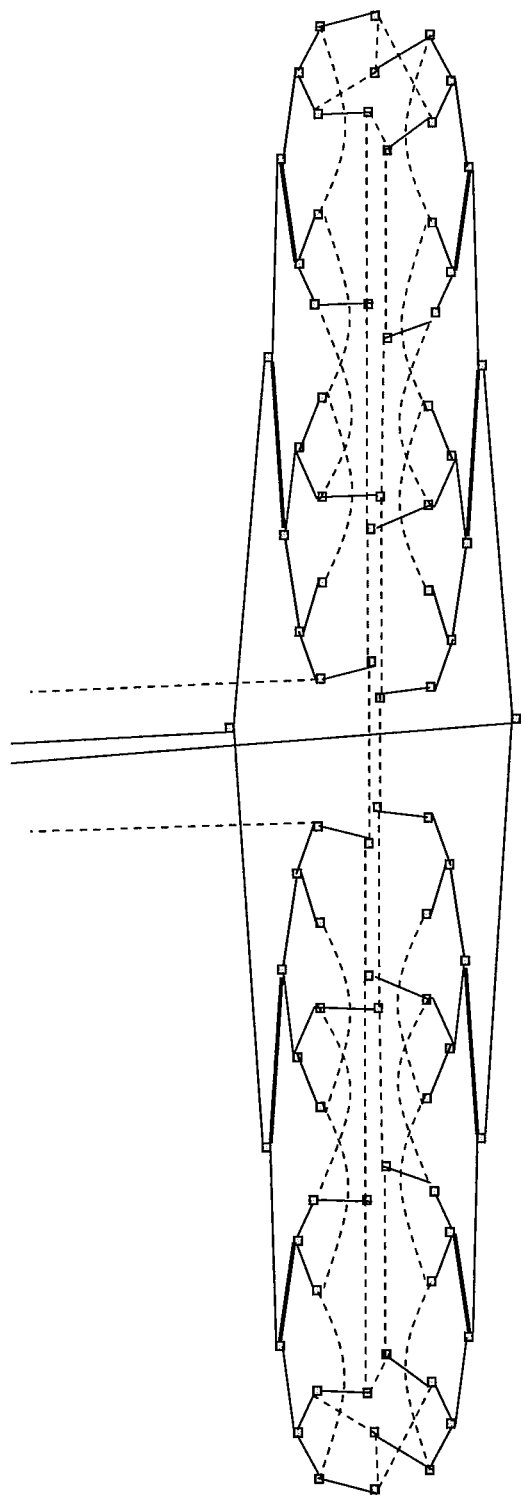
Figure 124:
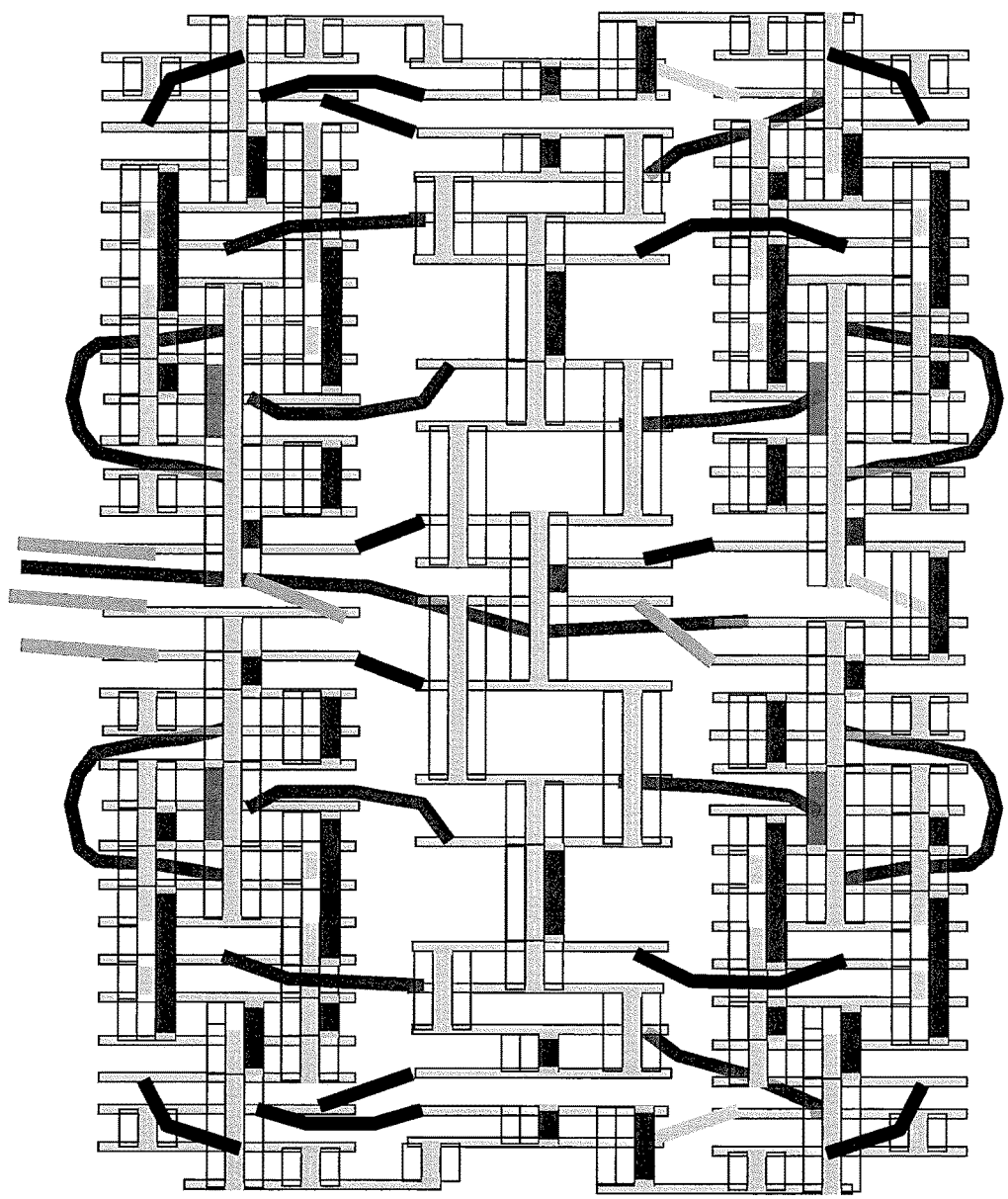
Figure 125:
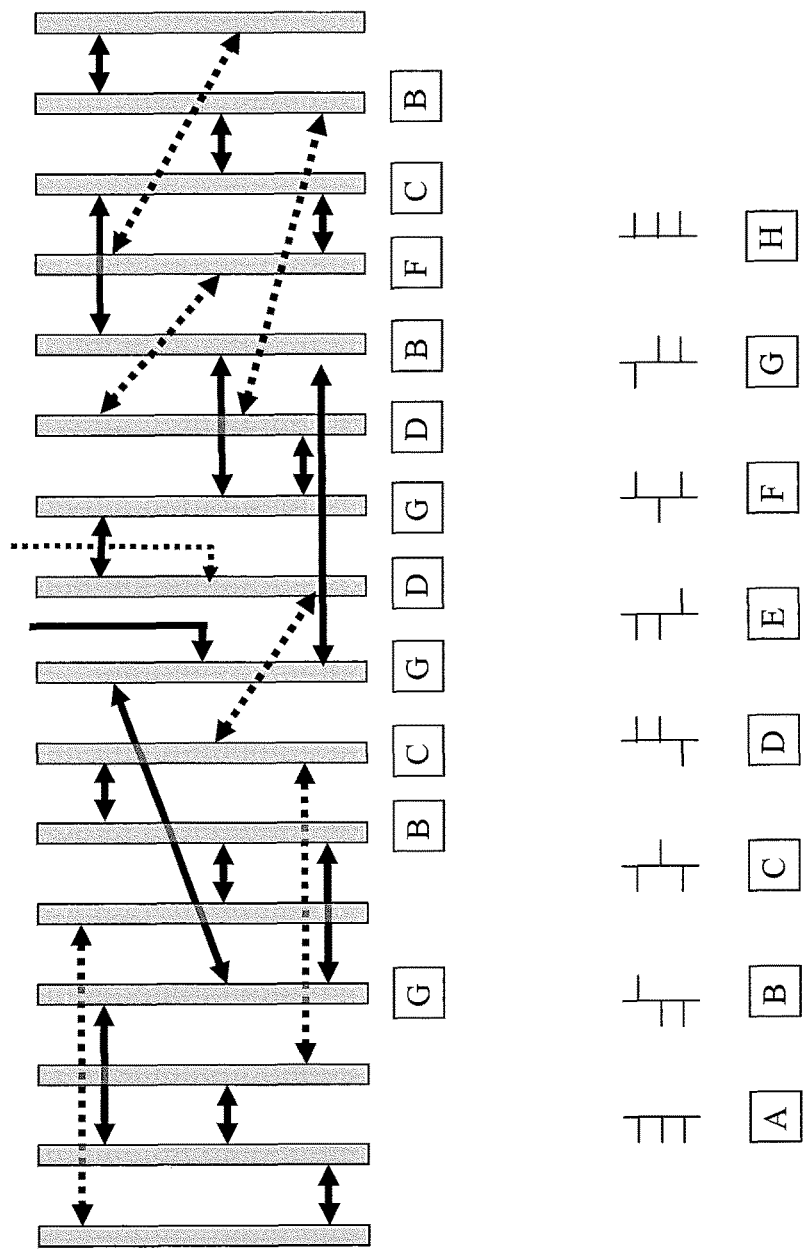

FIG. 120A-D shows the relationship between the lanes in FIG. 119 and the layers of a multilayer circuit board;

FIG. 121 shows another tree logical diagram for an 82 module arrangement;

FIG. 122 shows the physical layout corresponding to the logical tree of FIG. 121;

FIG. 123 shows yet another logical layout of an 82 module arrangement;

FIG. 124 shows the physical layout corresponding to the logical tree of FIG. 123; and FIG. 125 shows the physical attributes of the individual module connector routings which may be used to lay out the physical board arrangements.

DETAILED DESCRIPTION

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The instructions can be used to cause a general-purpose computer, a special-purpose processor, such as a DSP or array processor, or the like, that is programmed with the instructions to perform the operations described. Alternatively, the operations might be performed by specific hardware components that contain hardwired logic or firmware instructions for performing the operations described, or by any combination of programmed computer components and custom hardware components, which may include analog circuits.

The methods may be provided, at least in part, as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions or data for execution by a computing machine or special-purpose hardware and that cause the machine or special purpose hardware to perform any one of the methodologies or functions of the present invention. The term "machine-readable medium" shall accordingly be taken include, but not be limited to, solid-state memories, optical and magnetic disks, magnetic memories, optical memories, and carrier wave signals. The description of a method as being performed by a computer should not preclude the same method being performed by a person.

For example, but not by way of limitation, a machine readable medium may include read-only memory (ROM); random access memory (RAM) of all types (e.g., S-RAM, D-RAM); programmable read only memory (PROM); electronically alterable read only memory (EPROM); magnetic random access memory; magnetic disk storage media; flash memory; electrical, optical, acoustical or other forms of propagated signals (e.g., carrier waves, infrared signals, or digital signals).

Furthermore, it is common in the art to speak of software, in one form or another (e.g., program, procedure, process, application, module, algorithm or logic), as taking an action or causing a result. Such expressions are merely a convenient way of saying that execution of the software by a computer or equivalent device causes the processor of the computer or the equivalent device to perform an action or a produce a result, as is well known by persons skilled in the art.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

A connector or connector interface as described herein, such as a memory module connector interface, is not limited to physically separable interfaces where a male connector or interface engages a female connector or interface. A connector interface also includes any type of physical interface or connection, such as an interface where leads, solder balls or connections from a memory module are soldered to a circuit board. For example, in the stacked die approach, a number of integrated circuit die (e.g., memory devices and buffer devices) may be stacked on top of one another with a substrate forming the base and interface to a memory controller or processor through a ball grid array type of connector interface. As another example, the memory devices and buffer device may be interconnected via a flexible tape interconnect and interface to a memory controller through one of a ball grid array type connector interface or a physically separable socket type connector interface. Connection types may include the interface between integrated circuit chips, interconnection conductors on a substrate, between substrates, or on printed circuit boards, or the like.

A memory module may include memory and may also have a controller for the memory, a configurable switching element (CSE) and other circuitry for processing, transmitting or receiving signals. However a memory module may only include the memory and one or more of the other elements may be separately mounted. Except as specifically mentioned, the allocation of the functions to specific modules is intended for convenience in discussion, as a person of skill in the art will appreciate that the actual physical aspects and computational aspects may be arranged in a variety of equivalent ways.

"Bus" or "link" means a signal line or a plurality of signal lines or "lanes", each having one or more connection points for "transceiving" (i.e., either transmitting, receiving or both). Each connection point may connect or couple to a transceiver (i.e., a transmitter-receiver) or one of a single transmitter or receiver circuit. A connection or coupling is provided electrically, optically, magnetically, by way of quantum entanglement or equivalents thereof. Other electrical connections, by the same or similar means are used to provide for satisfaction of such additional system requirements as power, ground, auxiliary signaling and control, or the like. Such additional connections are occasionally described so as to clarify the description, however such additional connections are well known to persons skilled in the art, and the lack of description of these connections in any example should not be taken to exclude their inclusion.

A link carries signals on a signal lines or lanes. Signals fall generally into any of several categories including clock and control signals, address signals, command signals, and data signals. Data signals carry data that may be stored in, or retrieved from, a memory device or interface. Address signals specify the location or range of locations within a memory device or system where data is to be read from or written to, and may also select which of one or a plurality of memory devices or interfaces is to be accessed. Command signals instruct a memory device or interface as to what type of operation is to be performed, e.g., read, write, refresh, and possibly as to which of several access modes (such as a burst or broadcast mode) should be used for a data transfer. Clock and control signals synchronize the other signals passing between controller and the memory devices. Although a link may use a separate signal line for each signal (e.g., 32 address lines to transfer a 32-bit-wide address in one clock cycle and 32 data lines to transfer a 32-bit-wide data word in one clock cycle), various schemes also exist to re-use one or more signal lines for different signals, various schemes also exist to re-use one or more signal lines for command signals control signals address signals and data signals during different clock cycles of a memory transaction.

It should be appreciated that when lanes or lines are discussed as being connected to an interface or to a port, it is convenient to describe the lines or lanes as being active, being powered on or powered off, being in standby mode, or the like. This is meant to be interpreted as referring to the status of the connection at an interface with a port at a node.

The lane or lines themselves may be merely metallic traces on a circuit board, or the like, serving to provide connections between nodes.

A "breadth-first" convention is often used in numbering the nodes in a tree; that is, to start at a root of the tree and work across all the elements at a given level before moving on to the next level. This numbering is for convenience only. For implementation purposes many different numbering schemes might be used, including two or more numbering schemes simultaneously. For signaling purposes the convention "port 0, port 1, etc" may refer to relative rather than absolute ports. By convention, "southbound", "downstream" or "secondary" refers to the direction heading away from a module controller or root while "northbound", "upstream" or "primary" refers to the direction heading towards the module controller or root. There may be more that one root or module controller, and each of them may be operable contemporaneously.

Figure 1:
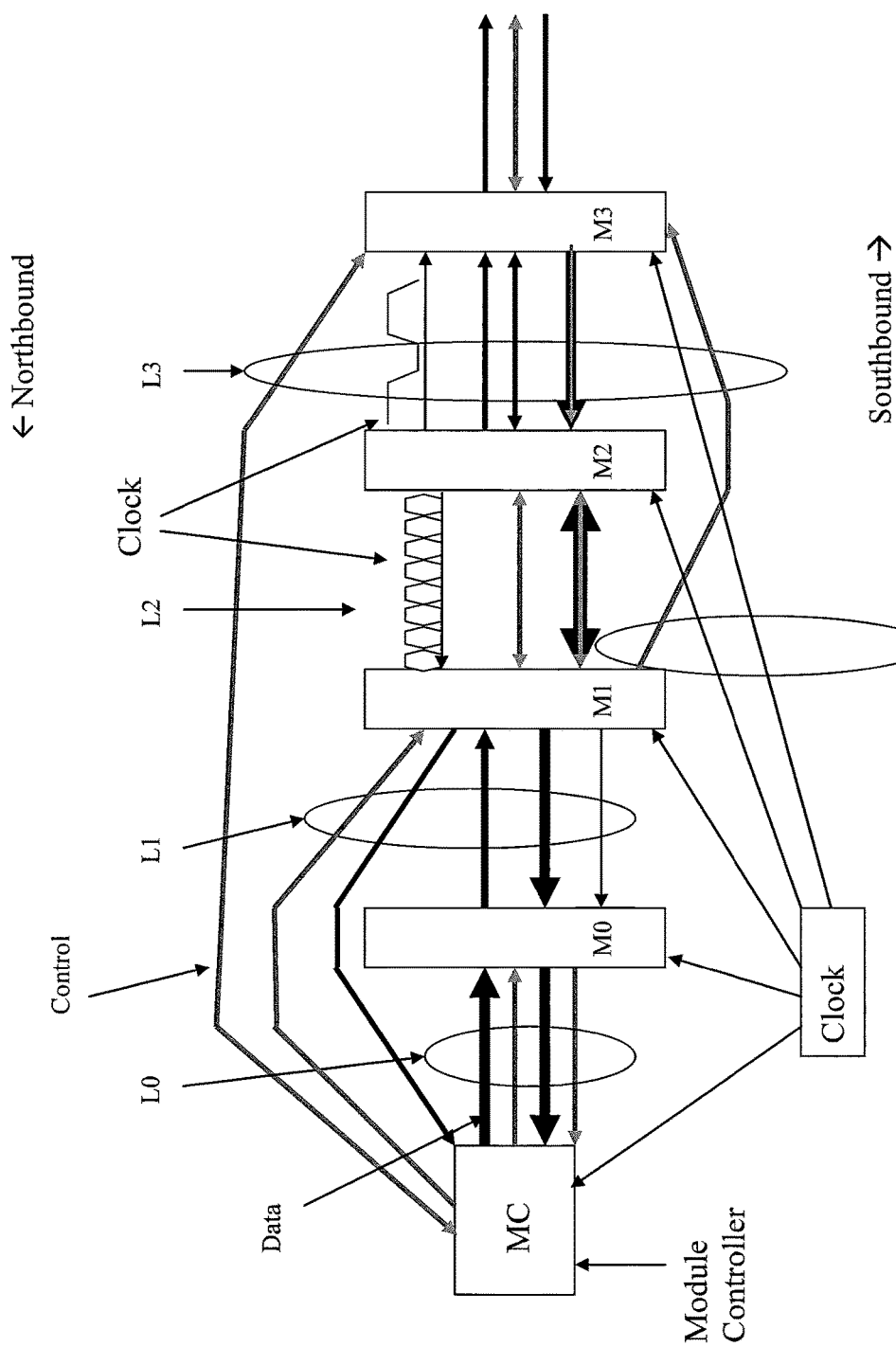
FIG. 1 is a representation of interconnected elements of a network for the purpose of introducing terminology and symbology to be used in the present application.

FIG. 1 is provided to identify some of the symbology and terminology to which may be used in the examples which are described. This is done for convenience, clarity and conciseness, and a person skilled in the art will recognize that a variety of equivalent terminology may be used. However, for the purpose of the description provided herein, the terms set forth here will be used, except when specifically stated. This is not meant to exclude or distinguish from equivalent accepted terminology or terminology which may come into use in the future which describe equivalent concepts.

A module controller MC 10 (which may be a stand alone module controller or memory controller, or may be an interface or circuitry within some other device such as a central processing unit (CPU), digital signal processor (DSP), microprocessor, graphics co-processor, bridge chip, or any such device as might need to be connected with an interconnect system, but which is not shown in the figure), whose function may reside in one component or may be spread across more than one device, is connected to a group of modules M#, 20 (or other computer system components such as an interface, another processor, memory, or the like) by point-to-point links. In the description the term "module" or "memory module" may be used to represent other computer system components as well, including interfaces and processors.

There may be as well one or more multi drop busses for control and signaling lines; there may also be one or more global clocks, and both the signaling lines and the data lines may be uni-directional or bi-directional. The links between the module controller MC 10 and the modules (M0, M1, M2, M3), and from one module to the next, may contain both data and control/signaling lines. The links may be configured in many different ways, and some possible configurations are shown in FIG. 1.

Groups of Lines or Lanes Shown where:

L0 depicts separate data 30 and control lines 40, where each set of lines has separate northbound and southbound unidirectional lines of equal width;

L1 depicts separate northbound and southbound unidirectional data lines 30A, B of unequal width, northbound control lines 40*a* from M1 to M0 and southbound control lines 40*b* from MC to M1 and northbound data lines 30*c* from M1 to MC;

L2 depicts north- and southbound bi-directional data 30*d* and control lines 40*c* between M1 and M2 as well as separate bi-directional control lines 40*d* between M1 and M2, also southbound uni-directional control lines 40*e* from M1 to M3; and L3 depicts combined northbound uni-directional data 30*e* and control lines 40*f* from M3 to M2, bi-directional southbound control lines 40*g* between MC and M3 and uni-directional southbound and northbound data lines 30*f, g* from M2 to M3.

Control lines skipping adjacent modules such as the control lines from MC to M1 (40*b*), M1 to M3 (40*e*) may be used to send control signals with lower latency than if sent through each hop, similarly with data lines such as from M1 to MC (30*c*). Lines labeled "data", or "control", may be only "mostly" data or control lines, and they may also be used to carry signals of the other types. That is, control signals may be carried on the data lines and data signals carried on the control lines. As such, data and control lines may be logical or physical, depending on the context.

Clock signals may be distributed to the various components and modules directly from a clock generation circuit, using a single-ended clock line or a differential clock connected between two or more modules. A high-speed clock may also be combined with data or control signals.

Figure 2:
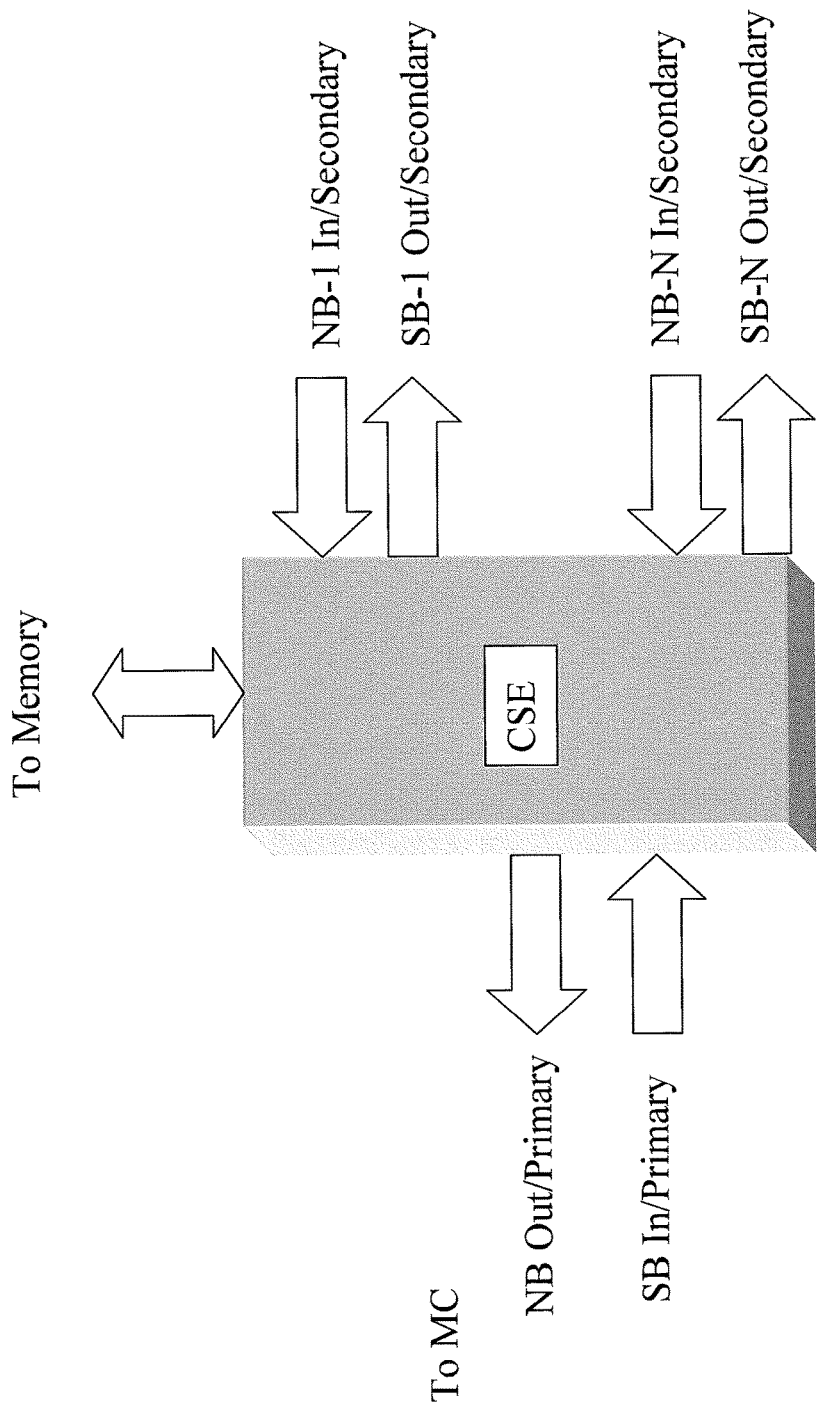
FIG. 2 is a diagram showing interfaces to a Configurable Switching Element (CSE)

FIG. 2 shows an example of a Configurable Switching Element 15 (CSE), which may have more than one secondary, or downstream, port. The CSE may be used to communicate with memory or other devices; the memory or other devices may be located on the same physical module as the CSE or may be located on a separate module from the CSE, on the mother board, or at another location. Two arrows associated with a link indicate a bi-directional data path, which may be separate uni-directional links, or bi-directional links, or may be logically bi-directional connections made by running uni-directional links in a ring-like fashion. Links may have a serial or parallel configuration, or be a combination of series and parallel configurations and be either single ended or differential.

The CSE may have the capability to connect any input port to any output port, without limitation. For convenience in logical description, the ports may be considered northbound or southbound in the present description, however such a description does not serve to limit the capability of the ports of a CSE to communicate to each other. For, example a northbound port may communicate with a southbound port within a CSE, or a southbound port may operate as a northbound port in a multi-rooted tree connection. Of course, not all of these capabilities may be configured in a particular arrangement.

Figure 3:
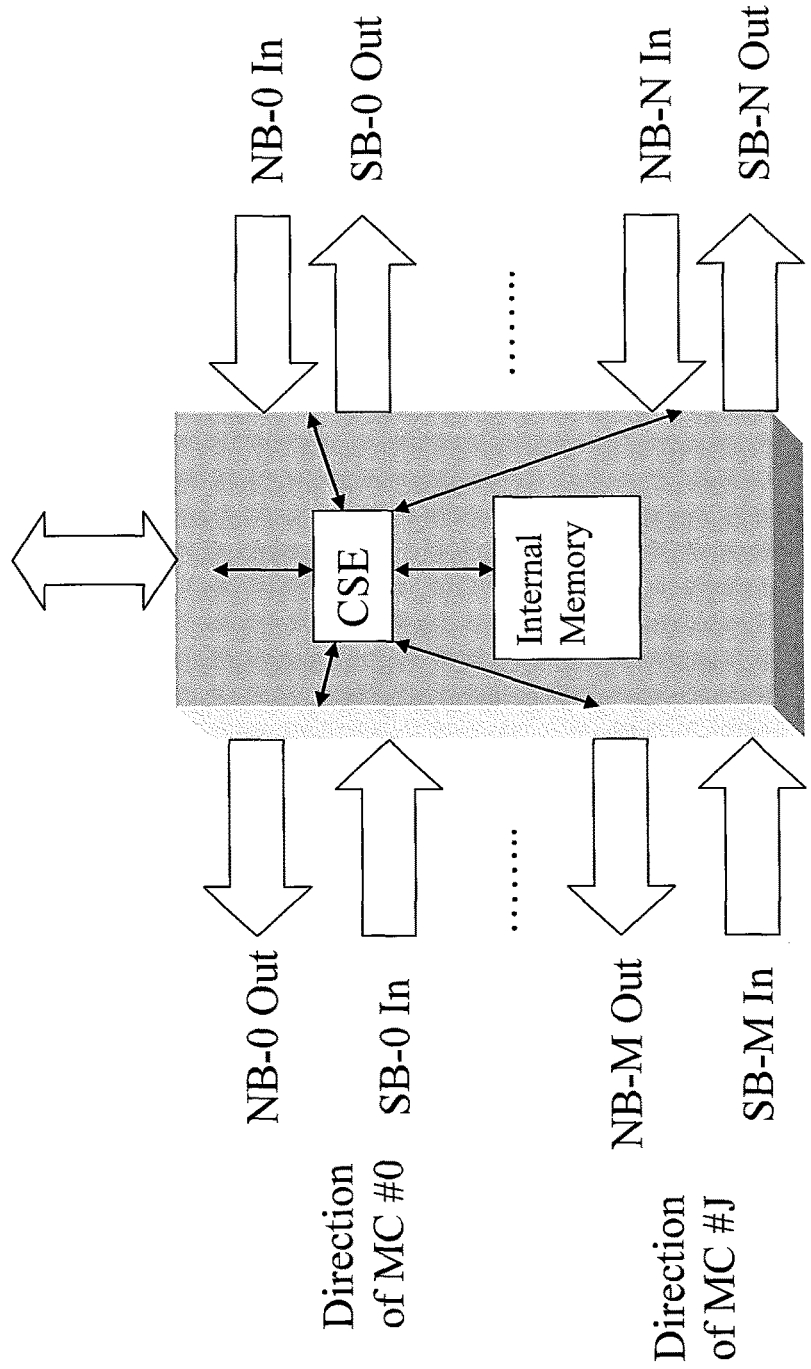
FIG. 3 shows a configuration of a CSE which may have more than one secondary port.

FIG. 3 shows another configuration of a CSE 15 which may have more than one secondary, or downstream, port and may also have more than one upstream, or primary, port. In addition, the CSE may have one or more internal memories in addition to or in place of external memory and the external connections may be with devices other than memory modules or systems, such as I/O devices, co-processors and the like. The CSE may have multiple secondary ports, as shown, so that the CSE may be used as to split the signal into more than one path. Where a single set of northbound and southbound ports is provided, the CSE may act as a repeater. The terms "internal" and "external", when used to refer to memory should be understood to be convenient for descriptive purposes, but not limiting. Memory circuits are increasingly being incorporated into microprocessors or special purpose hardware, and the use of terms such as internal and external may be used to assist the reader in understanding a particular example. A person skilled in the art will understand that the combination or separation of circuits and capabilities into differing physical components, such as being integrated in the same package or on the same substrate, and the like, is governed by specific applications and the state of the associated technology.

Figure 4:
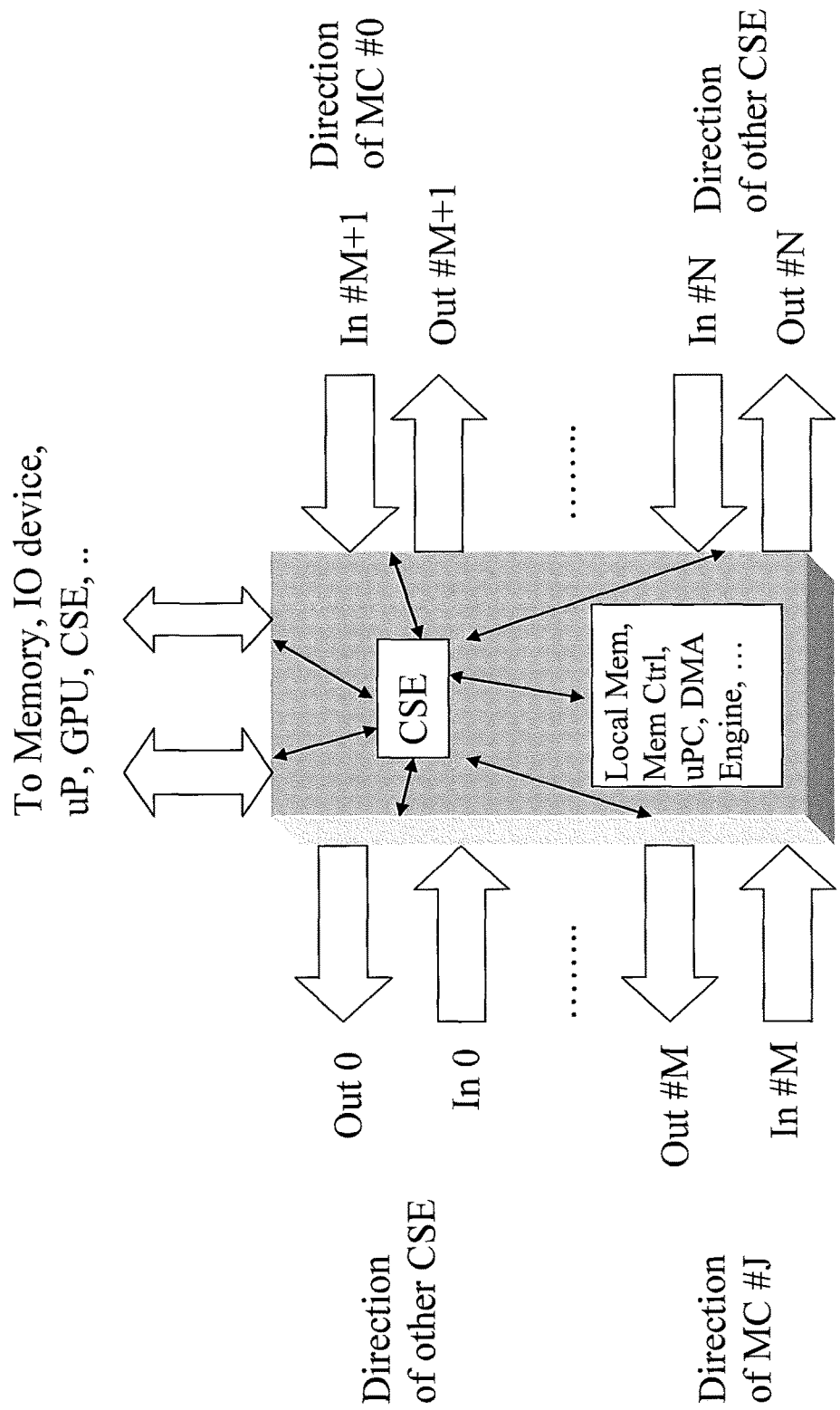
FIG. 4 shows a configuration of a CSE connected in a network with more than one module controller.

FIG. 4 shows another example of a Configurable Switching Element (CSE), which may be connected in a system with more than one module controller and may not have an "upstream" or a "downstream" direction of data or control flow. The CSE may have various internal processing functions (or be incorporated inside or operate in conjunction with devices having various processing functions) such as, microprocessors, direct-memory access (DMA) engines, the CSE itself being a module controller for controlling other CSEs, and the CSE may be externally connected to devices other than memory systems such as input/output (I/O) devices, microprocessors, graphics processors, co-processors, other CSEs, etc. The use of the terms "primary" and "secondary" are thus seen to be used for convenience in description. In the situation where a CSE contains a microprocessor (or is contained within, or coupled to, a microprocessor), the CSE may act as a processing unit as well as a switch.

Figure 5:
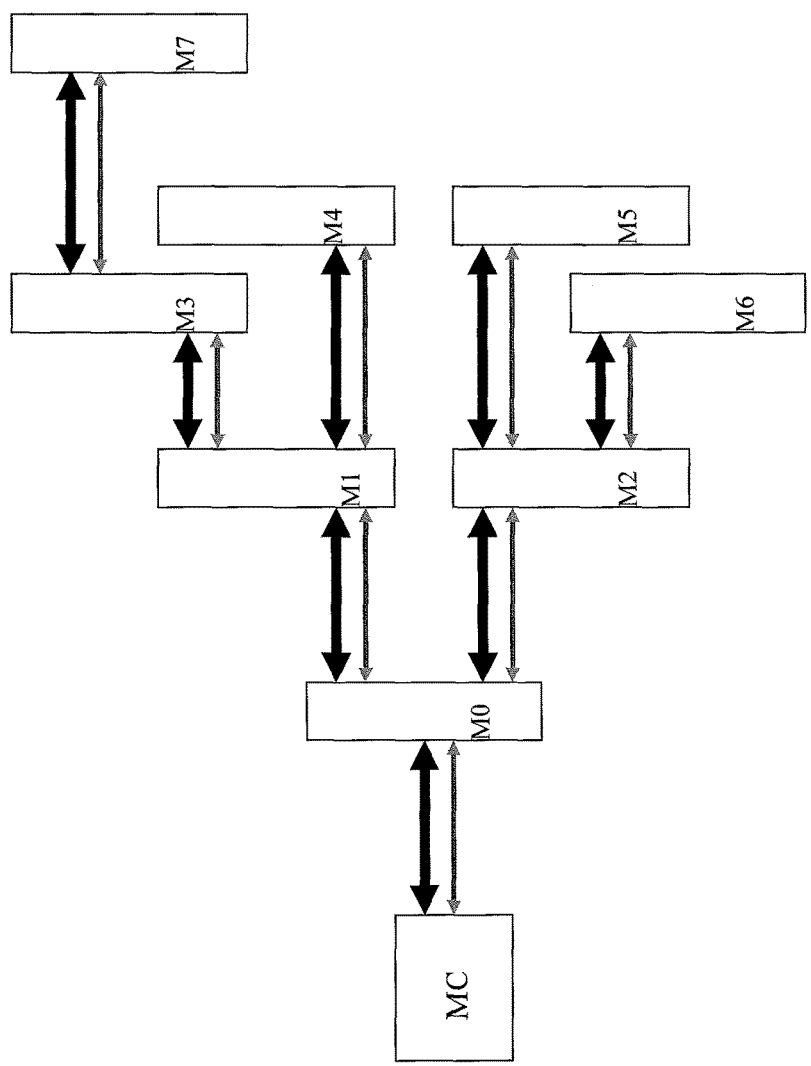
FIG. 5 shows 8 memory modules containing CSEs disposed in a tree configuration.

FIG. 5 shows 6 memory modules containing CSEs having associated memory, disposed in a tree configuration with a memory controller MC at a root thereof. For convenience, the CSE is not shown and the CSE that is contained in memory module M# may be described as CSE#. A memory module may contain both memory and a CSE; however, some memory modules may only contain a CSE. In the present configuration, memory module M0 is connected to memory modules M1 and M2 and, for example, memory module M1 is connected to M3 and subsequently to M7. In such a configuration the number of hops to the furthest module is 4 (M0→M1→M3→M7) when compared with 8 hops if the 8 memory modules were arranged in a linear or daisy-chain fashion. A hop is considered to be the link or lane connecting two successive nodes in a network. Hops may be used as a descriptor when time delay or differences in time delay of the propagation of signals between nodes of a network are being discussed.

Figure 6:
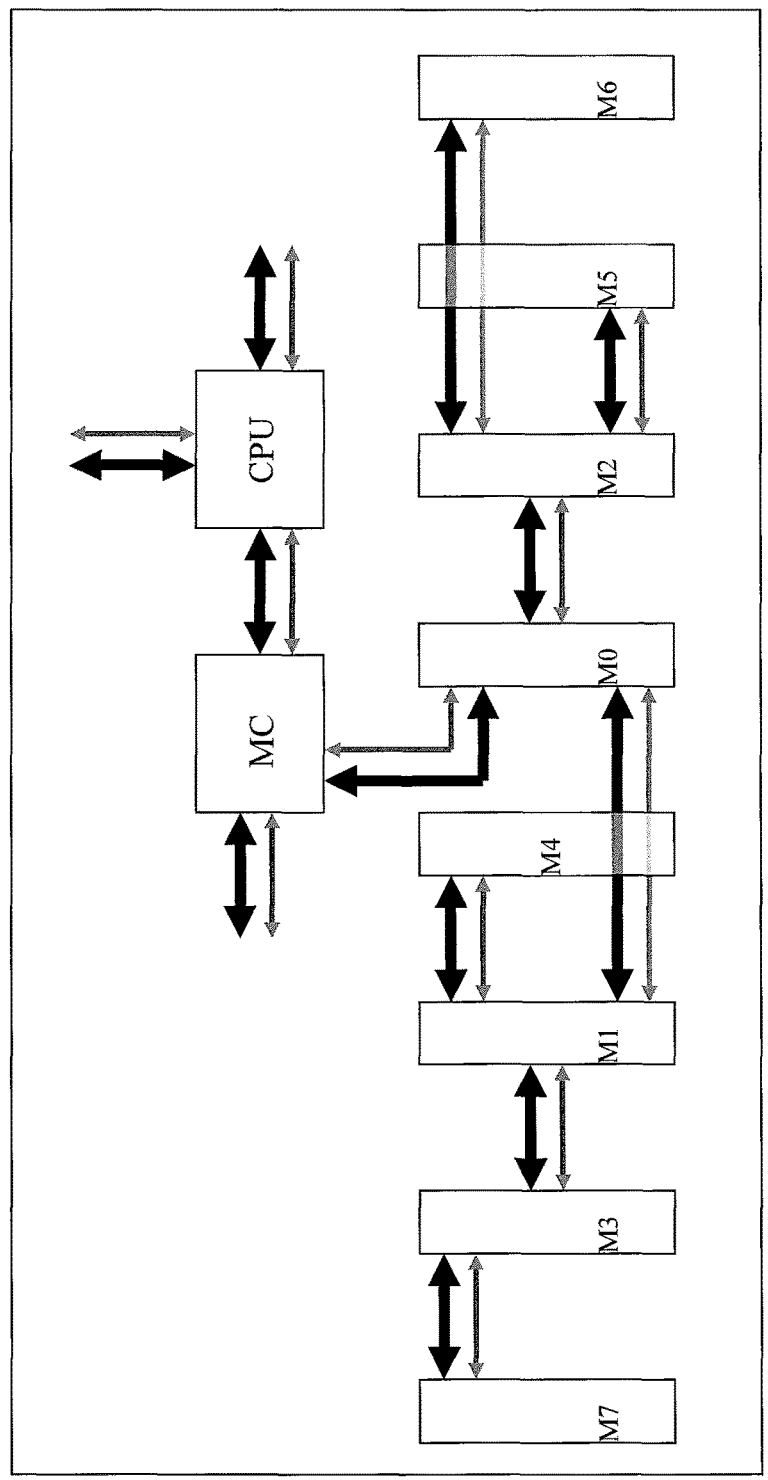
FIG. 6 shows 8 memory modules connected in a binary tree configuration.

FIG. 6 depicts 8 memory modules connected in a binary tree configuration such as may be disposed on a PC board in a physically linear arrangement of modules. Note that some of the links such as between M0 and M1 and M2 and M6 pass by intervening modules M4 and M5 without necessarily connecting thereto. This aspect is illustrated by shading the link where it bypasses a module. The arrangement of FIG. 6 shows that a large number of tree elements such as memory or other modules may be arranged on a circuit board, or as plug-in modules to a mother board in an organized fashion, such as a linear physical arrangement. Such an arrangement may facilitate the layout of a mother board or in cooling the modules. Combinations of linear and non-linear arrangements may also be used effectively dispose modules on a board or mother board whose dimensions are constrained for other reasons, such as the dimensions of the rack or equipment in which the board is to be mounted.

Mother boards may be used to facilitate the repair of a memory system by replacing failed memory modules. Whether a mother board is desirable may depend on failure rate and mean-time-to-repair (MTTR) analysis and the probability of irretrievable data loss, among other factors.

Many of the examples discuss the arrangement of elements as being a tree, however this is not meant to limit the topology of the connections. Examples are shown where there is more than one entry point or "root" and commands and data may flow along non-"tree" paths, such as in a circular fashion. The tree examples often permit a clearer description of the situation, and may simplify description of such aspects as reverse path scheduling. However, this is not meant to preclude the use of contention resolution, queuing and store and forward techniques, as examples. That is, the arrangement may be generalized to other network configurations. In addition, more than one independent memory controller may be employed or controllers may operate in a coordinated fashion.

It should be understood that while a specific number of memory modules is shown in the figures, and specific numbers of modules are discussed, this is not meant to limit the number of memory modules or other devices which may be connected in such a manner, and is merely for convenience in presenting drawings to facilitate description of examples.

Figure 7:
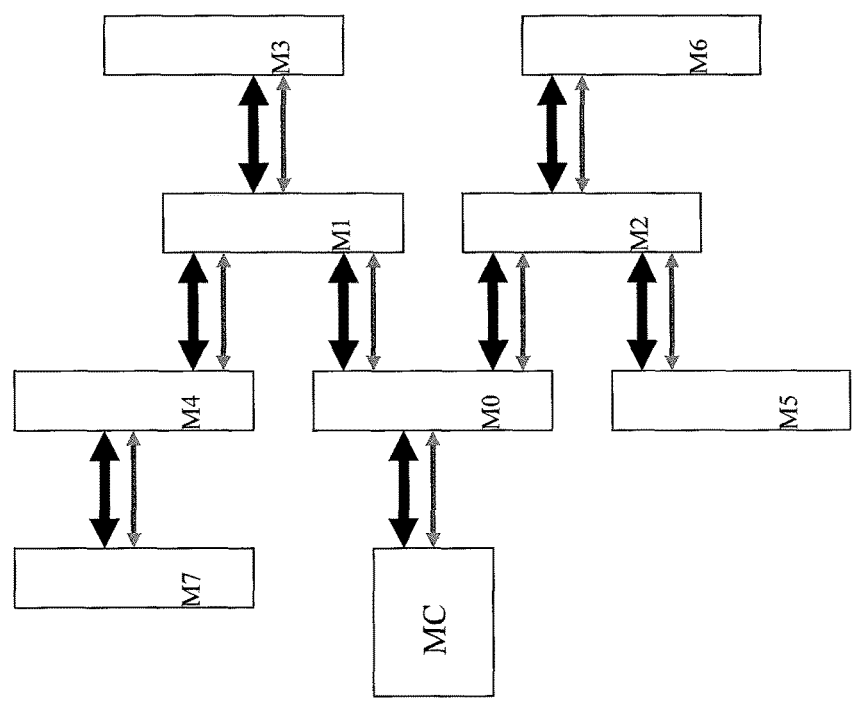
FIG. 7 shows another example of 8 memory modules connected in a binary tree configuration.

FIG. 7 depicts 6 memory modules connected in a binary tree configuration such as may be disposed on a PC board in a non-linear arrangement. Such an arrangement may be convenient based on the physical requirements of a specific design.

Figure 8:
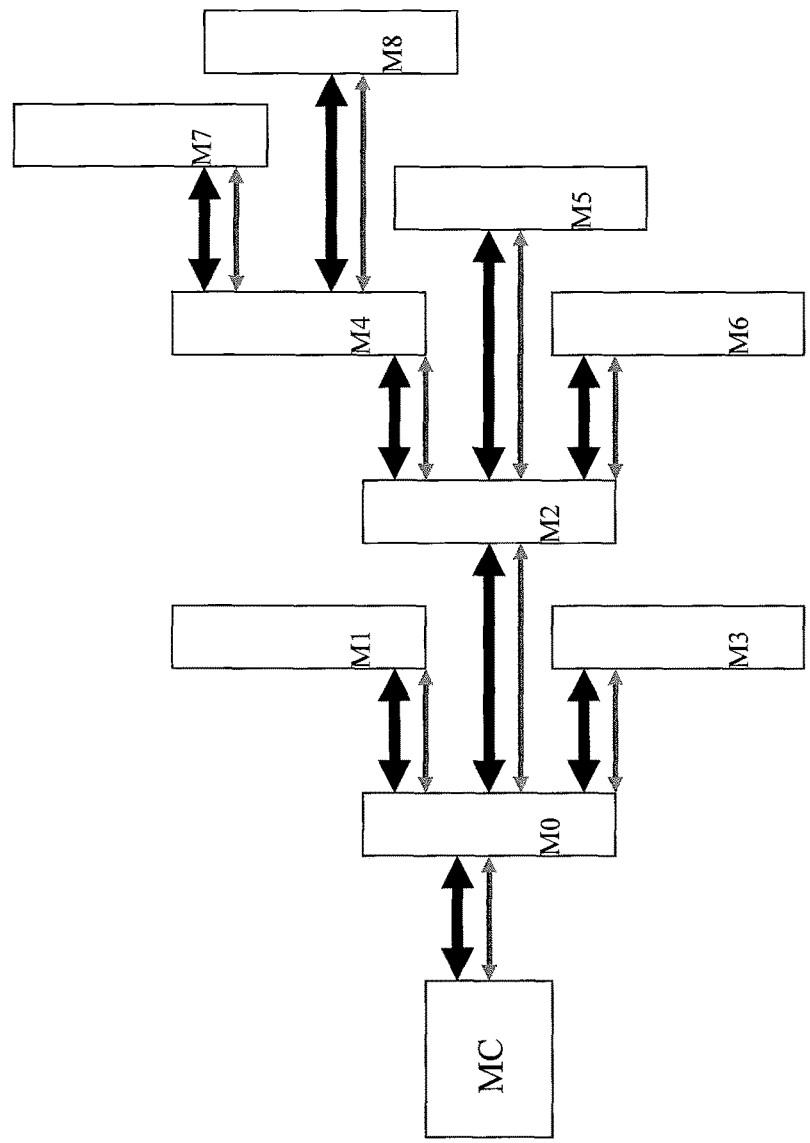
FIG. 8 shows 9 memory modules connected in a ternary tree configuration.

FIG. 8 depicts 7 memory modules connected in a ternary tree configuration such as may be disposed on a PC board in a non-linear arrangement. This illustrates the use of a CSE with more than two secondary ports to configure a system having a ternary architecture, as well as where not all of the possible nodes of a tree are populated with devices.

For simplicity, the examples presented will generally limited to binary tree structures, however the arrangement of FIG. 8 illustrates that ternerary, quaternery and higher order trees may be constructed. The term "tree" is meant to encompass trees of arbitrary order. A linear or daisy-chain arrangement of some or all of the modules is not excluded when the term tree is used without qualification, and the use of the term binary tree means a tree of binary or higher order. As mentioned previously, the use of a tree as an example is not meant to limit the use of the apparatus or method to the examples, but such apparatus and methods may be applied to networks generally.

Figure 9:
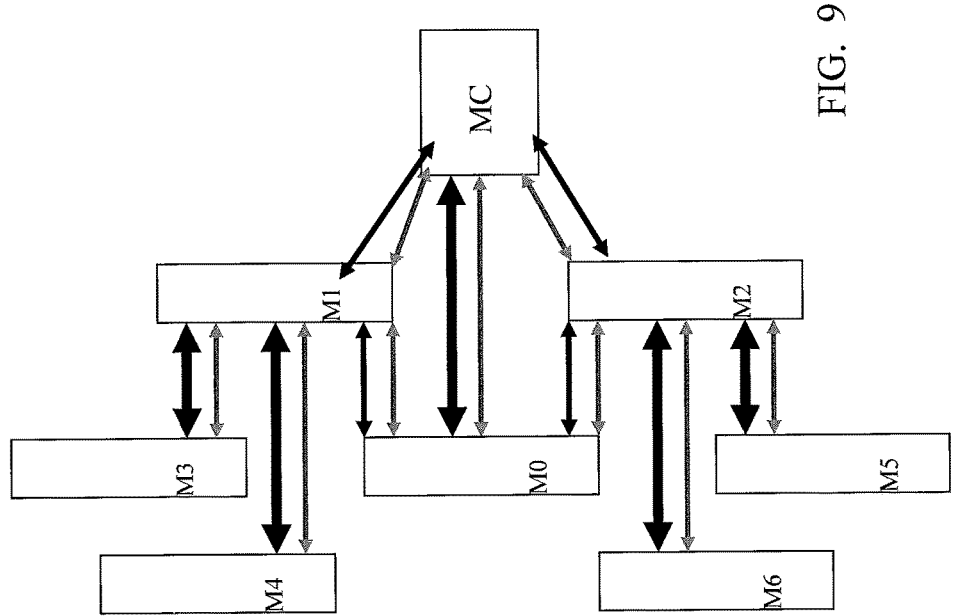
FIG. 9 shows yet another example of 8 memory modules connected in a binary tree configuration; (where the child modules of M0 are connected both to M0 and to the MC)

FIG. 9 depicts 8 memory modules, connected in what is essentially a binary tree configuration, which may be disposed on a PC board in a non-linear arrangement, where the memory controller MC is also connected to the modules in the second level of the tree (M1 and M2). This configuration may be used to reduce the latency of communications between the MC and the memory modules as well as to reduce the power consumption of M0 by diverting some signals from passing through M0. Such a configuration may also serve to facilitate increased throughput by issuing commands, and receiving replies as well as sending or receiving data over connection links or lanes from MC to the second level of the tree (M1 and M2) as well as through the connections to the first level (M0).

Figure 10:
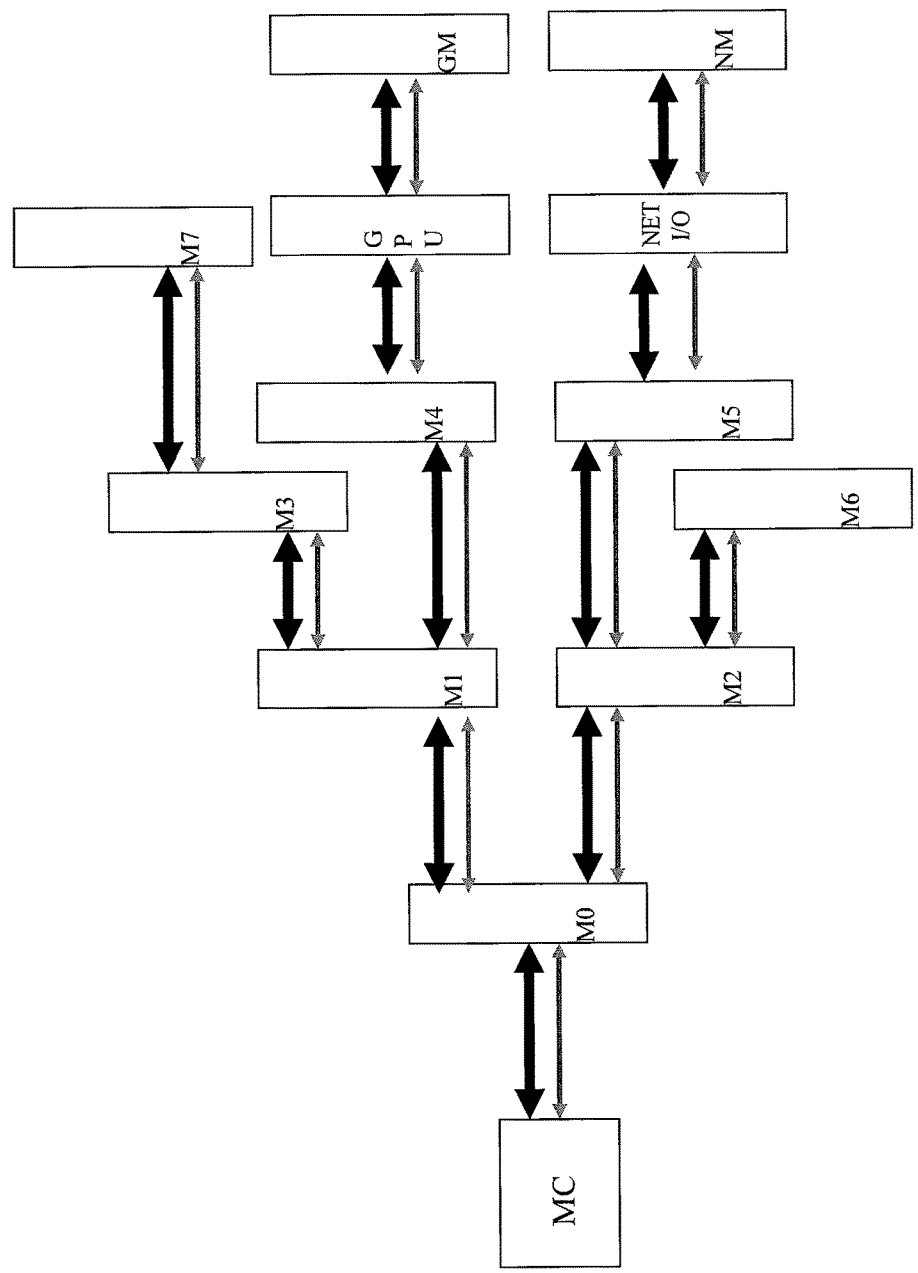
FIG. 10 shows 8 memory modules connected in a binary tree configuration and additional devices, such as a graphics processor.

FIG. 10 depicts 8 memory modules connected in a binary tree configuration which may be disposed on a PC board in a non-linear physical arrangement with other devices or modules such as a graphics processor (GPU) device connected to M4 and a network I/O device connected to M5. Each of the other devices or modules may have associated internal or external memories, GM and NM, respectively, which can be accessed directly and which the MC can also access through the CSE on each such module. Providing direct access to a memory module GM from a GPU may further improve the overall throughput by permitting multiple access operations to occur without conflict.

For comparison purposes, a baseline configuration is shown in FIGS. 11A-F, intended to represent aspects of a memory system believed to be similar to that being developed by INTEL, which is known as a fully-buffered DIMM (FB-DIMM). The description herein is based on an interpretation of documents made available publicly be INTEL; but, as detailed descriptions and specifications do not appear to have been made generally available, no representation is made that the devices shown in FIG. 11, as produced by INTEL, actually operate as described herein in an INTEL configured memory system. Rather, where a comparison with a baseline architecture is convenient, the arrangement described in FIG. 11 is meant. Included in each memory module m (200) is a device having the interface characteristics as have been disclosed by INTEL for the INTEL advanced memory buffer (AMB).

The signaling convention for a read command and response utilized herein differs from that which appears to be used by INTEL in order to simplify the functional description. For example, in the INTEL AMB, a "read" command takes several messages, which have been compressed for discussion herein into one message. Additionally, the AMB appears to have a capability of sending a single "frame" containing commands for more than one AMB so, for example, for some commands one can not assert that a "frame" is meant to be received by a particular module in various stages of passage between a memory controller mc (300) and a memory module mk, each of the memory modules having an advanced memory buffer AMB.

In FIG. 11A, the read command is issued by the memory controller (300) as an address Ai and a read command R and transmitted over the downstream path as a "packet". In the example given, the data address location is in memory module mi. FIG. 11B shows the packet arriving at memory module mi (200*i*). However in a FB-DIMM system, the packet is repeated promptly from one module to another down the linear chain. Thus, even though the read command was addressed to memory module mi, as shown in FIG. 11C, the packet is further forwarded to memory module mk (200*k*). Therefore, each of the packets containing the read command traverses the full length of a chain of memory modules 200. The response from memory module mi (200*i*) represents the data read from address Ai and includes data bits, or data packets, d0-d3 in this example is shown in FIG. 11D, traversing the upstream path. The number of data bits shown is limited for convenience in presentation and may be more or less, or may be variable. FIGS. 11E and 11F show the data passing through memory module m0 and being received by the memory controller mc. The packet of read data is forwarded by all modules by a process of repeating without being de-skewed, de-serialized, or decoded.

In an example, FIGS. 12A-12F show a series of memory modules M#, organized in a linear fashion for comparison with the baseline shown in FIG. 11; however the memory modules of FIG. 12 incorporate CSEs which "snoop" or read the address contained in the command packet even when the packet is not intended for the specific CSE or its associated memory. Each CSE may be in a state where the upstream paths are in a "reduced" power setting, shown as a dashed line. Reduced power may include but is not limited to, de-powering the I/O drivers, gating the clock of the I/O logic (and any other associated logic that can be stopped), reducing the clock rate of the I/O logic, reducing the voltage of the I/O logic, loading preset inputs to the I/O logic that are designed to reduce the leakage current of the I/O logic, or any other method of for reducing the power consumed by any portion of the chip which may be undone quickly enough to enable the handling of the returned data. In the example shown in FIGS. 12D-12F, the upstream links power up in advance of the returning data and then return to a reduced power state after the data passes.

In this example, the control signals travel as a packet over the data lines where the downstream path is powered up. In an aspect, where the packets are transmitted in a "framed" or "slotted" timing system, the downstream path may be powered up at the beginning of each "frame" or "slot" time and if there is a packet to be sent the transmit side may remain powered up and the packet sent; otherwise the transmit side may be powered down until the beginning of the next slot time, and the receive side will be powered up until a determination is made as to whether a packet to be received; if there is no packet, the receive side may power down until the start of the next slot time.

Specifically, FIG. 12A illustrates the situation where a MC (10) issues a read command R for an address Ak. In FIG. 12B, the read command R data packet arrives at memory module M1 (20*i*), for which it is not intended, and passes through to memory module Mk (FIG. 12C). As a result of the data read command R, a packet of data D0-D3 is transmitted upstream (FIG. 12D), passing through memory module M1 (FIG. 12E) and being received by the memory controller MC (FIG. 12F). In the sequence of FIGS. 12C-F, the powering up of each successive upstream link prior to transmitting the read data over the link is illustrated, as well as the powering down of each link after the passage of the read data D0-D3. In the present arrangement, the downstream links are all powered up, as the control signals as well as data travel in data lines of the downstream path.

As the data read command R packet passes along the downstream path from M0 to Mi and to Mk, each of the memory modules M observes or "snoops" the data read packet and ascertains both the destination module and the specific nature of the command: in this example, to read data from an address in Mk. Such read data traffic is expected to flow upstream from Mk to the MC. Consequently, each of the links in the upstream path between the module from which the data will be read and the MC may be powered on at an appropriate future time (shown as a transition from a dashed line to a solid line) to transmit the read data, and may be returned to a low power state or turned off when the read data has been transmitted over the link. Further, in the event that the read data command R is addressed to a memory module other than the last one in a chain, only the upstream links for the path between the addressed memory module (e.g. Mi) and the MC need be powered on at appropriate future times, resulting in a reduction of power consumption.

FIG. 13A-F depicts a configuration of memory modules M employing CSEs having separate command and data lines between modules. The signal and command lines may be merely a subset of the data lines rather than dedicated signal lines as shown. In the configuration shown, some portion of the downstream links and their associated logic may be put into a reduced power state. As the command control signal passes each module the signal is decoded and, if appropriate, other downstream links may be powered up to transmit the data or command which follows in a data packet. In the aspect shown, a read command R is issued for an address Ai in memory module M1, where read command R and the address data Ai are sent on separate lines. The address data Ai indicates that the desired address or address range is in memory module M1. As the address data packet Ai is transmitted earlier than the read command R, the address data packet Ai at each of the memory modules M# earlier than the read command R, as may be seen in FIG. 13A-B, and the address data may be used to power up the link between the receiving module Mi+1 and the transmitting module M1 so as to accommodate the transmission and processing of an expected command. Similarly to the situation described in respect to FIG. 12, the downstream command path may be powered down again after the command has been received, the upstream links may be timely activated for the transmission of the data read as a result of the command.

Thus, the power status of one line or lane may be said to be alterable at a future time, based on the control or command signal, address or data signal being received by a CSE. The time value of a future time status change may be determined by a characteristic of the received command, the address of the destination, the corresponding position of the receiving CSE in the network, or similar or derived information, or may be intended to occur promptly for some or all of the lines or lanes of a CSE.

Figure 13A:
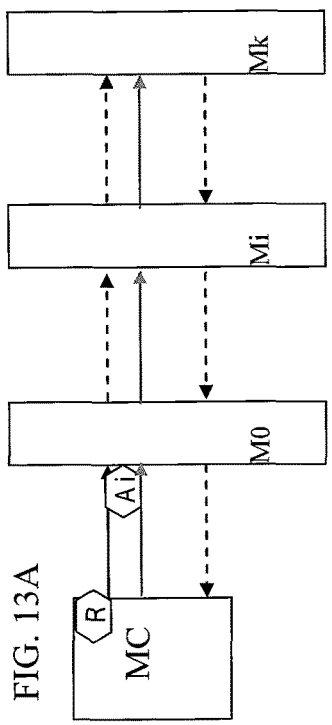
FIG. 13A-F show an arrangement of memory modules having separate command and data lines between modules.
Figure 13B:
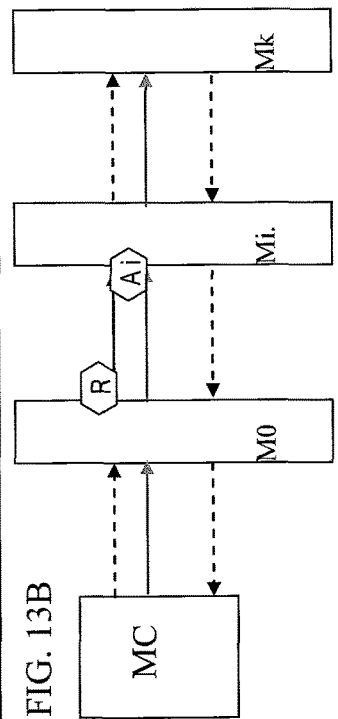
Figure 13C:
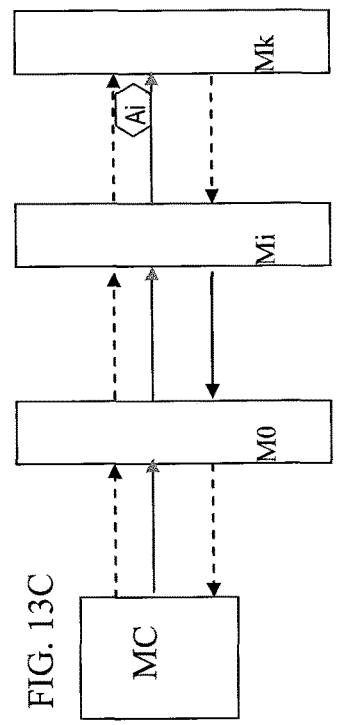
Figure 13D:
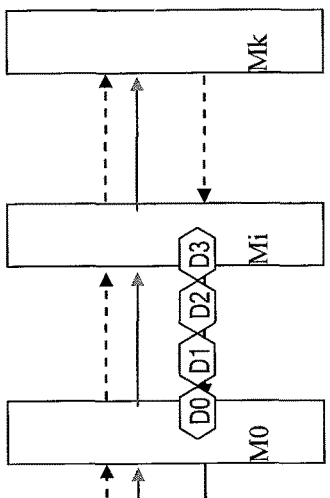
Figure 13E:
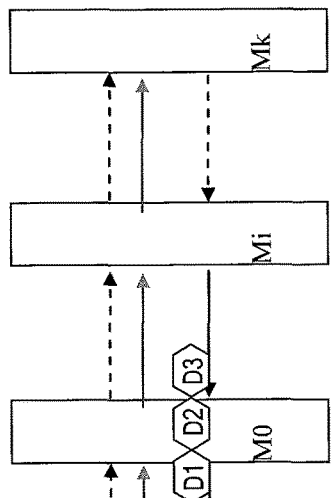
Figure 13F:
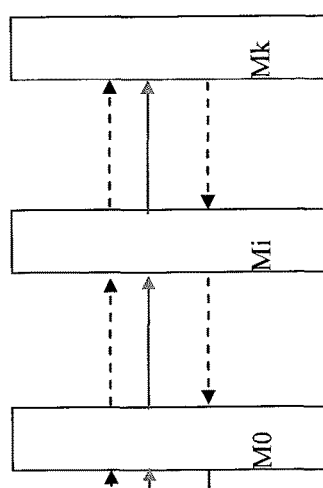

In another aspect, shown by a comparison of FIG. 13B and FIG. 13C, the command signal may be altered by the module (in this example Mi) that is the target of the command so that a no operation ("no op") command may be sent on the downstream lines to indicate to the modules that are further downstream that no command will be sent to them in the next "frame," "cycle" or whatever the time period that may be used as an interval between commands. As an example, the read command is absent in FIG. 13C, however the address data Ai is received by Mk, which is further down the chain that the addressed module. This may not result in activation of the downstream command link between Mi and Mk. The sequence of data return shown in FIG. 13D-F follows that of FIG. 12D-F and will not be described in detail.

Each of address data packets may be decoded as it passes through a memory module (actually the CSE 15 of the memory module 20), whereas the command packet may merely be passed along, and the additional delay in the address data packet results in a decrease in the time interval between the arrival of the address data packet and the command packet as the signals progress further downstream. In an aspect where the address packet and the command packet are transmitted sequentially on the same data lines, a time interval is left between the trailing end of the first packet and the leading end of the second data packet in order to accommodate the additional processing delays encountered by the first packet. This may be desirable in some situations, but does represent a loss of bandwidth with respect to the illustrated example.

In a further aspect, the address data may be simultaneously decoded at a memory module and also transmitted downstream, so that the decoding latency may not be experienced. In some instances this may result in a command being sent one link further than actually needed, but depending on the configuration, the aspect of the CSE relating to receiving the command at the extra link end may not be activated.

In another aspect, FIG. 14A-F illustrates arrangements similar to those of FIGS. 12 and 13. But, in the previous examples, a capability was provided for each module to determine whether the module being addressed was upstream or downstream of the present module. This determination may require the comparison of the received address against a large number of module addresses and, depending on the complexity of the logic being used, several clock cycles to complete. This processing time may result in an increase of the separation required in the time between the transmission of the address and the command by the MC. This additional separation may be mitigated by modifying the address Ai, received by the destination module M1, prior to transmitting the address data to the next downstream module Mk, so that a new address AX is a flag to indicate that the address and the command has already been interpreted by the appropriate module M. AX may be a reserved address or some similar indication.

As a result, each module may only have to compare the address Ai received against the address or range of addresses of the module M1 itself, or the reserved address, rather than against all of the module addresses in the system. In other respects, the example of FIG. 14 is similar to that of FIGS. 12 and 13 and a detailed repetition of the description is omitted.

High-speed data links may use a clock recovery mechanism to maintain synchronization. If a sufficient number of bit transitions per unit time are not received, the clock time synchronization of the link may be lost, and the recovery of synchronization may take some time, which may reduce throughput, or cause data loss which may result in retransmissions. In order to maintain synchronization, systems such as FB-DIMM may periodically transmit synchronization ("sync") frames which contain such transitions, and are sent to all of the modules.

However, in configuration having a large number of memory modules, such sync frames would be sent to each of the modules, and therefore traverse all of the links in the system, or multiple sync frames could be sent to the various leaves of the tree. If a tree of modules is sufficiently large, this process for maintaining time synchronization may consume a significant portion of the bandwidth of the system, and the need for synchronization of clocks may tend to limit the size and complexity of the system arrangement unless clocks are refreshed, or the clock synchronization is maintained by other means.

An alternative approach is to provide each of the modules with a timer, to keep track of the time interval elapsed since there have been a sufficient number of transitions and to initiate clock resynchronization on a local basis. An example of this is a counter or a watch-dog timer.

FIG. 15 illustrates the transmission of a read command from the MC to module M0. The read command R is forwarded to all of the modules, so that the command lanes are not de-powered. Under the condition that a predetermined time interval has elapsed, and the lane is not being used for transmitting data, the module initiates the transmission of data, which may be a "no op" data packet to continue to maintain the synchronization of the link. FIG. 15D shows an example where module M0 has determined that no packet will be using the M0→Mi link in a frame and uses the opportunity to transmit transitioning signals on the lanes of the link for the purpose of maintaining the receiver synchronization in module M1. Likewise Mk has determined that the Mk→Mi link will not be used in that frame and transmits transitioning signals to Mi.

Figure 15A:
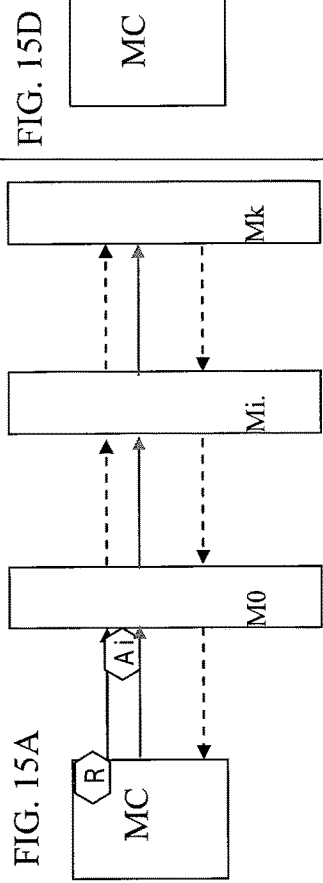
FIG. 15A-F show the transmission of a read command from a memory controller (MC) to module Mi.
Figure 15B:
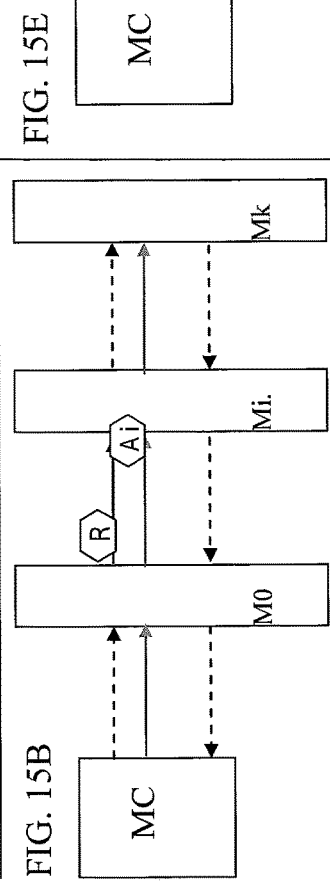
Figure 15C:
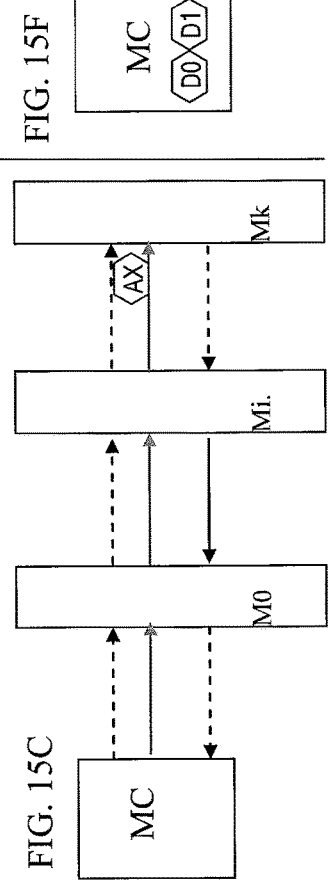
Figure 15D:
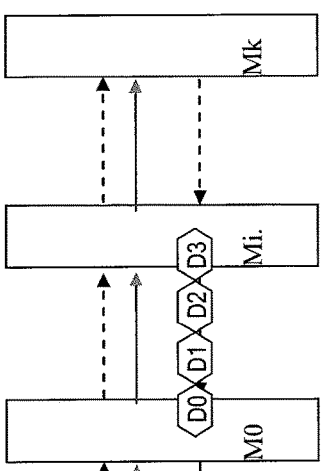
Figure 15E:
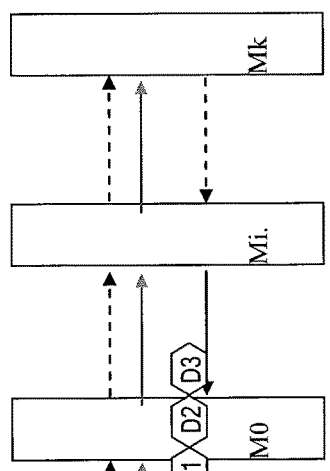
Figure 15F:
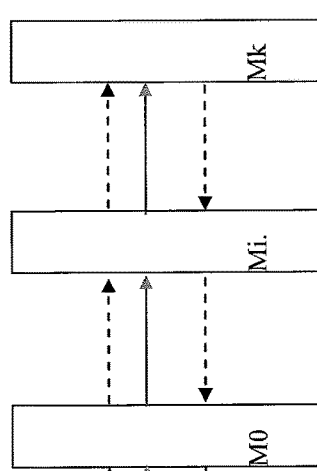

Further, if the link is half-duplex, or full duplex, the link or lanes or lines thereof may be turned around so that the transmission is on the path between the modules not having a high traffic density. Such an approach may depend on the reception of command information so that the module can determine that no data is expected from the other direction and turning around of all or a portion of the half-duplex link may be performed. This is shown in FIGS. 15E-F where modules M1 and Mk reverse the Mk→Mi link in FIG. 15E and then, in FIG. 15F, Mi sends transitioning signals to maintain the receiver sync in Mk. It is worthwhile reiterating that the arrow headed lines represent links, where the arrow head indicates the current direction of data flow, that a link may be one or more signal lines (lanes) for data, command and address data, and that direction of a link may be capable of being reversed from that shown in a particular figure, as is the situation where a link between Mi and Mk has been reversed in FIG. 15F from the situation in FIG. 15G. In this discussion, the capability of being reversed in transmission direction may be presumed to be possible but not necessary, as actual implementation may be application dependent.

FIG. 16 *a-d* illustrates a module controller MC and modules M0, . . . , M6 arranged in a tree architecture, having point-to-point links. Such a tree may be operated where data packets containing an address are forwarded and each switch (such as a CSE) or module (such as a memory module or other module incorporating a CSE) decodes the address and determines where the corresponding data or command should be directed. However such processing takes time at each step: to receive the data, to compare it with destination addresses, and to determine the action to be taken. When the address is sent at a time in advance of the command or data, and a serial link is used, the time interval between the address and the following data will decrease at each hop due to the data processing required for the address evaluation. Such action takes longer than merely forwarding the data without processing. Performing the data processing functions in parallel may require additional complexity, including forwarding data to links which are not desired. Whether parallel processing is performed depends on the overall network bandwidth desired.

An additional consideration is the time dispersal of the data bits in each data packet. In many links, the bits of the data may be sent on parallel signal lines or lanes. It should be understood that this may a simplification of the situation, as the data may be sent over parallel lines with more than one bit transmitted on each line in a serial fashion, as an example. Due to differential delays of the data on the lines the differential delays associated with, amongst other factors, line length and impedance, the data bits may not arrive with sufficient simultaneity for immediate processing and it may be necessary to wait for one or more clock cycles until all of the bits have been received by a module in order to proceed with decoding or other data processing. This delay further increases the time necessary at each node before the address or other information can be acted upon. In such a circumstance, and where it is desired to turn on the lanes or lines of links only as they are required for data transmission, the address information may have to be sent a significant period of time in advance of the command or the data. This has the effect of reducing the system transfer capacity or bandwidth.

Figure 16A:
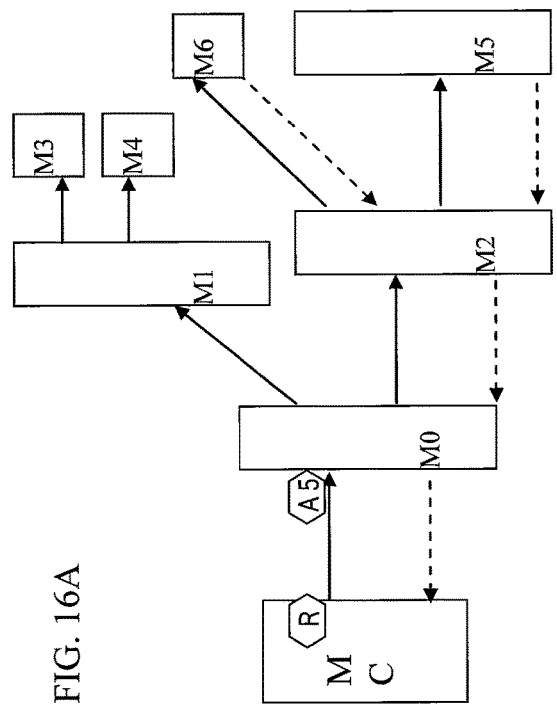
FIG. 16A-D shows a module controller and modules arranged in a tree with point-to-point links.
Figure 16B:
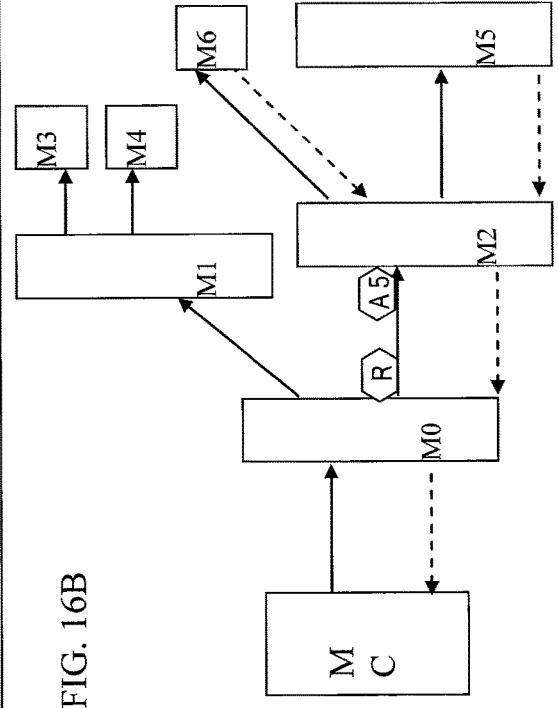
Figure 16C:
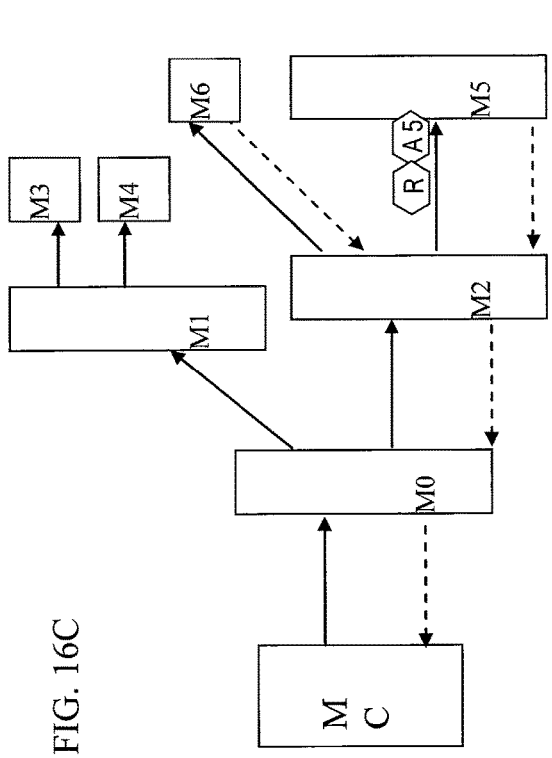
Figure 16D:
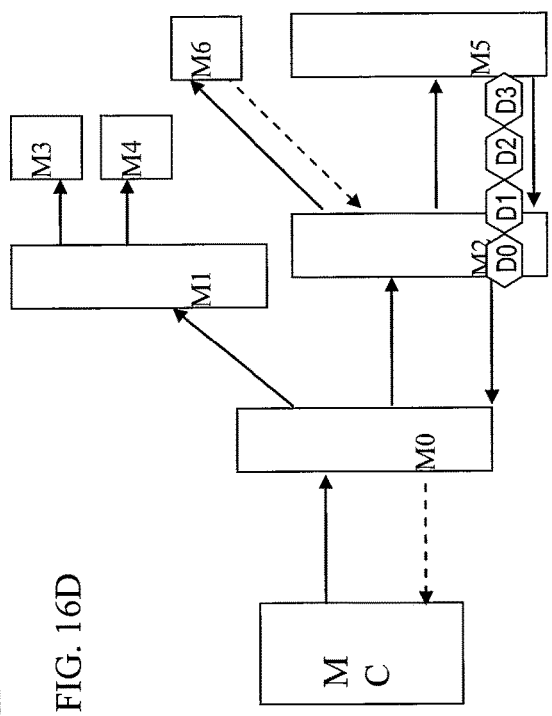
Figure 17A:
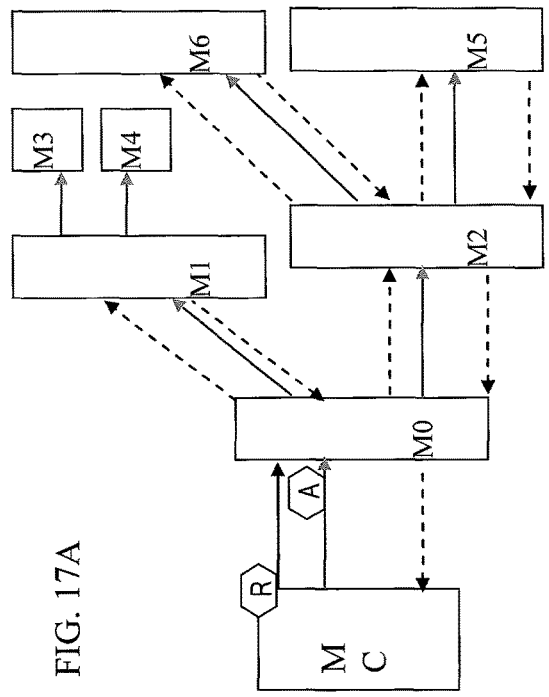
FIG. 17A-D show a configuration similar to the configuration of FIG. 16, with separate signaling links used for commands.
Figure 17B:
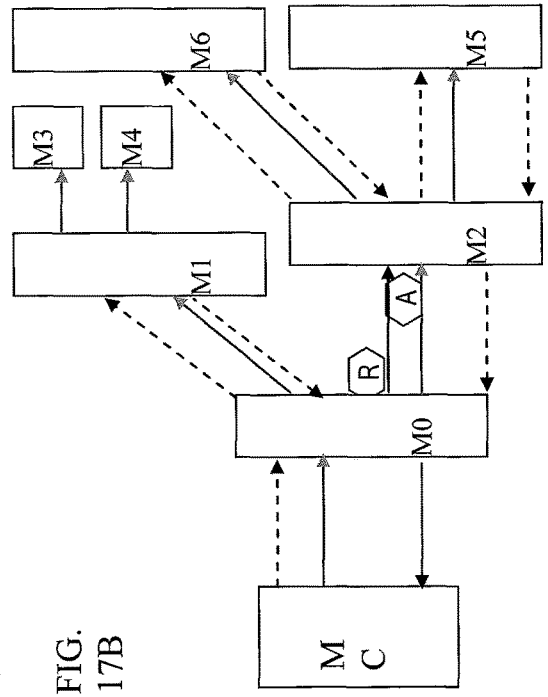
Figure 17C:
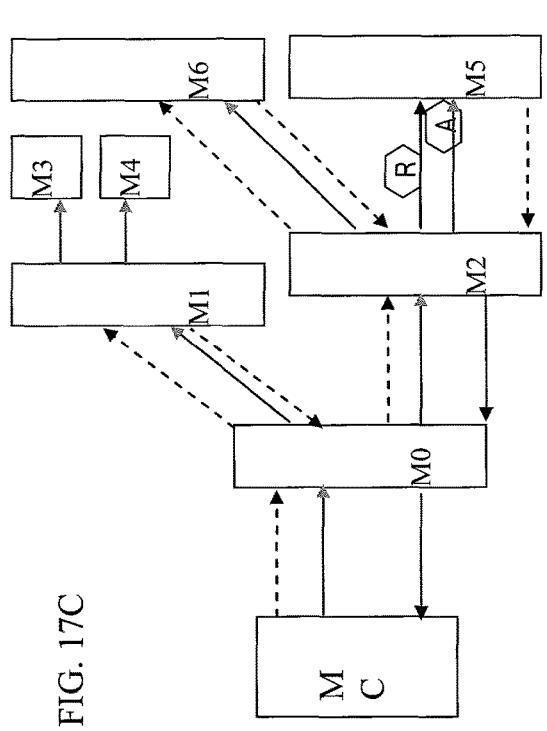
Figure 17D:
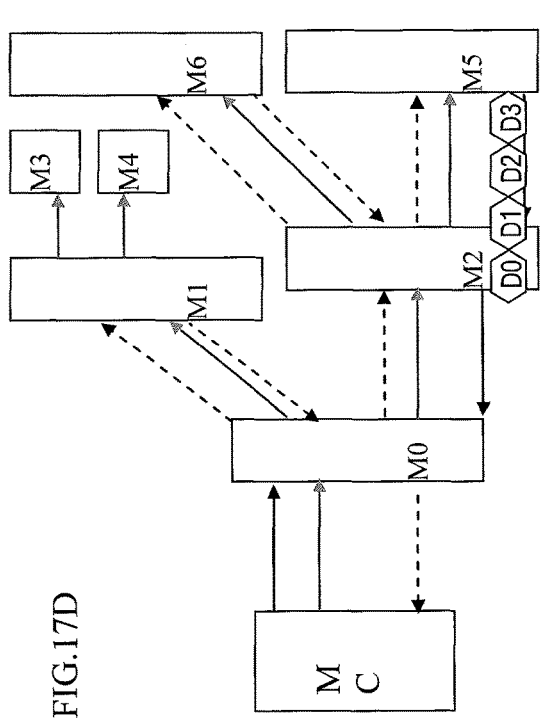

FIG. 16A has similarities to FIG. 12, but the modules are arranged in a tree and only the relevant paths are shown. The MC issues a read command R for an address in module M5 (FIG. 16A). At M1, the address and data are routed to M2 while the paths to M1 and modules associated therewith are not used (but "no op" commands may be sent as will be later described) (FIG. 16B). At M2, another decision is made by the local CSE and the address A5 and read command R are forwarded to M5 (FIG. 16C). Comparison of the spacing between the address packet A5 and the read command R, as shown in FIGS. 16A-C shows in a qualitative manner the progressive reduction in time interval between the two packets, such that in FIG. 16C where the address and command data packets are being received at M5, the time interval between them may be minimal. This would correspond to a situation where the interval between the issuance of the two packets at the MC was set such that substantially all of the interval would be eroded by the decoding delays at intervening modules. The response of module M5 to the read command R (FIG. 16D) follows that previously described and is thus not described in detail here.

FIGS. 17A-D illustrate a configuration that is similar to that shown in FIG. 16, but separate signaling lanes are used for the commands, in addition to the previously described address or data lanes. As there may be separate lanes for the commands and the address or data, it may be possible to more efficiently utilize the bandwidth of the address and data links. The propagation delay of the address may be presumed, for simplicity of description in this example, to be the same between each of the modules, so that the transmission of the read command can be adjusted to result in a desired interval between the address and data arrival time at the destination module (in this example M5). This may be advantageous where a series of read commands R are issued in succession.

As with the previous examples, the address link and the command link may be powered up at an appropriate future time in advance of the use, and powered down after the information packets have traversed the link. It will be appreciated by persons skilled in the art that some efficiency may result from permitting each of the links to remain powered up for a period of time after use to accommodate closely spaced packets of information. Such a period of time may be characterized in terms of a multiple of clock cycles.

FIG. 18 *a-c* illustrates one example of a command which may be used to effect the routing using an address indicator. The topology of this figure is the same as that of FIG. 17, although, for clarity, only the command lines are shown, and the possibility that the links are turned on and off as needed has been suppressed. In this example, the address command is structured as a self-routing packet rather than a destination address, and contains three two-bit words followed by a local command to be executed at the destination module. The address words are shown as enclosed in thin hexagons and the local command is shown as being enclosed in bold hexagons. Further, each of the words may be characterized as having a least significant bit (LSB) and a most significant bit (MSB) for ease of description. The four two-bit words transmitted to S0 are shown as if they were transmitted on two parallel lines. Alternatively, the information may be transmitted on a path over a signal line in bit serial order.

The interpretation of the bits in each word is shown in the table accompanying FIG. 18. Note that, for generality, each of the modules is shown as S0-Sn, to suggest that each of the nodes may be a switch only, or in addition to other electronics being addressed at the switch location. A switch may be a CSE or other device capable of interpreting and responding to the commands.

Each of the switch modules Sn, in this example, has an input port, and two output ports, the output ports being designated as "0" and "1". The address command is interpreted in accordance with the destination select table, where the value of the two-bit word determines the output port to be used. Although only two output ports are shown, this is not meant to limit the number of output ports of the switch element, or the number of bits in the each address command word. Further, each of the input and output ports and the upstream and downstream directions are used for convenience in discussion and a connection between any logical or physical input port and any output port is not precluded.

Figure 18A:
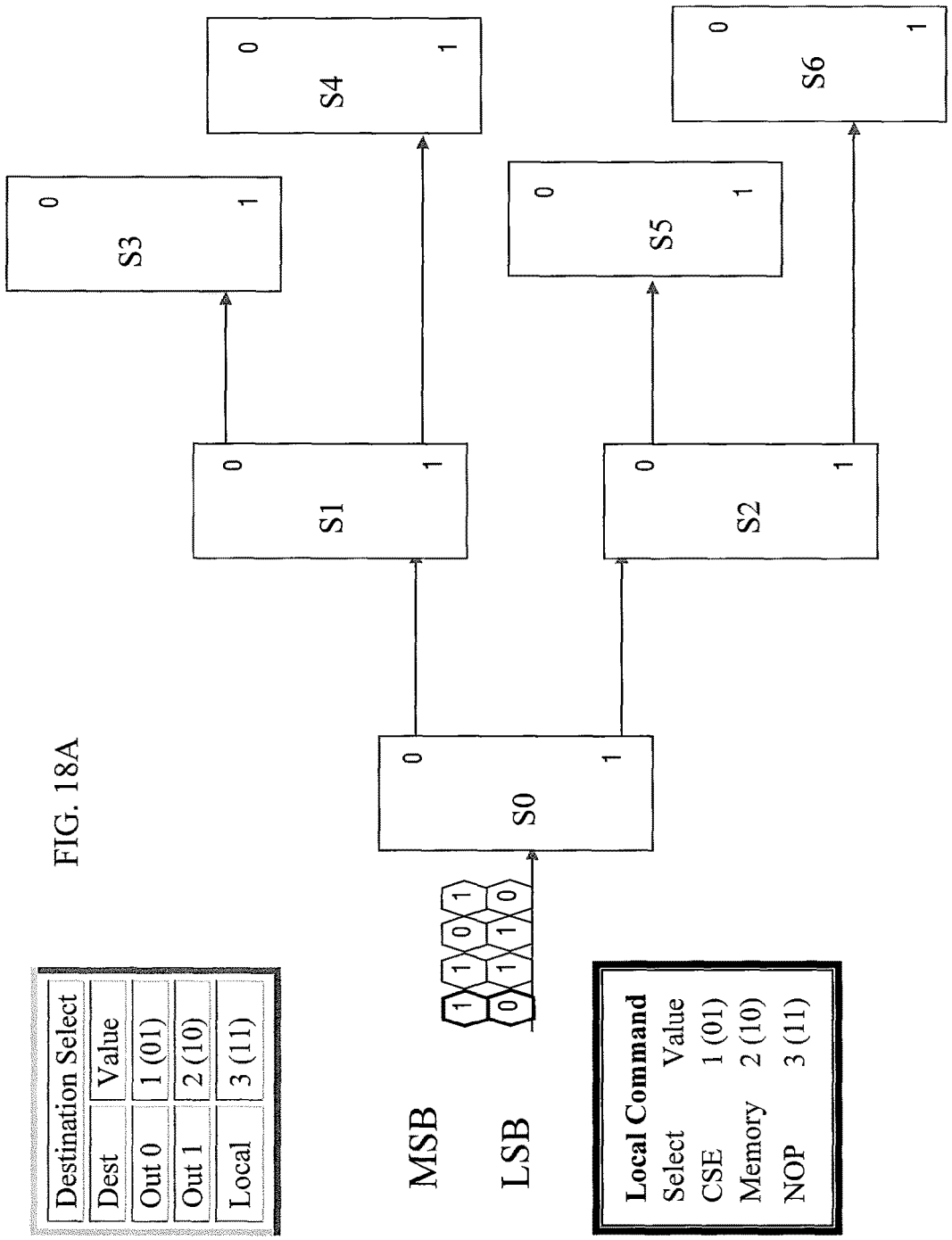
FIG. 18A-C shows an example of a command which may be used to effect the routing using an address indicator.
Figure 18B:
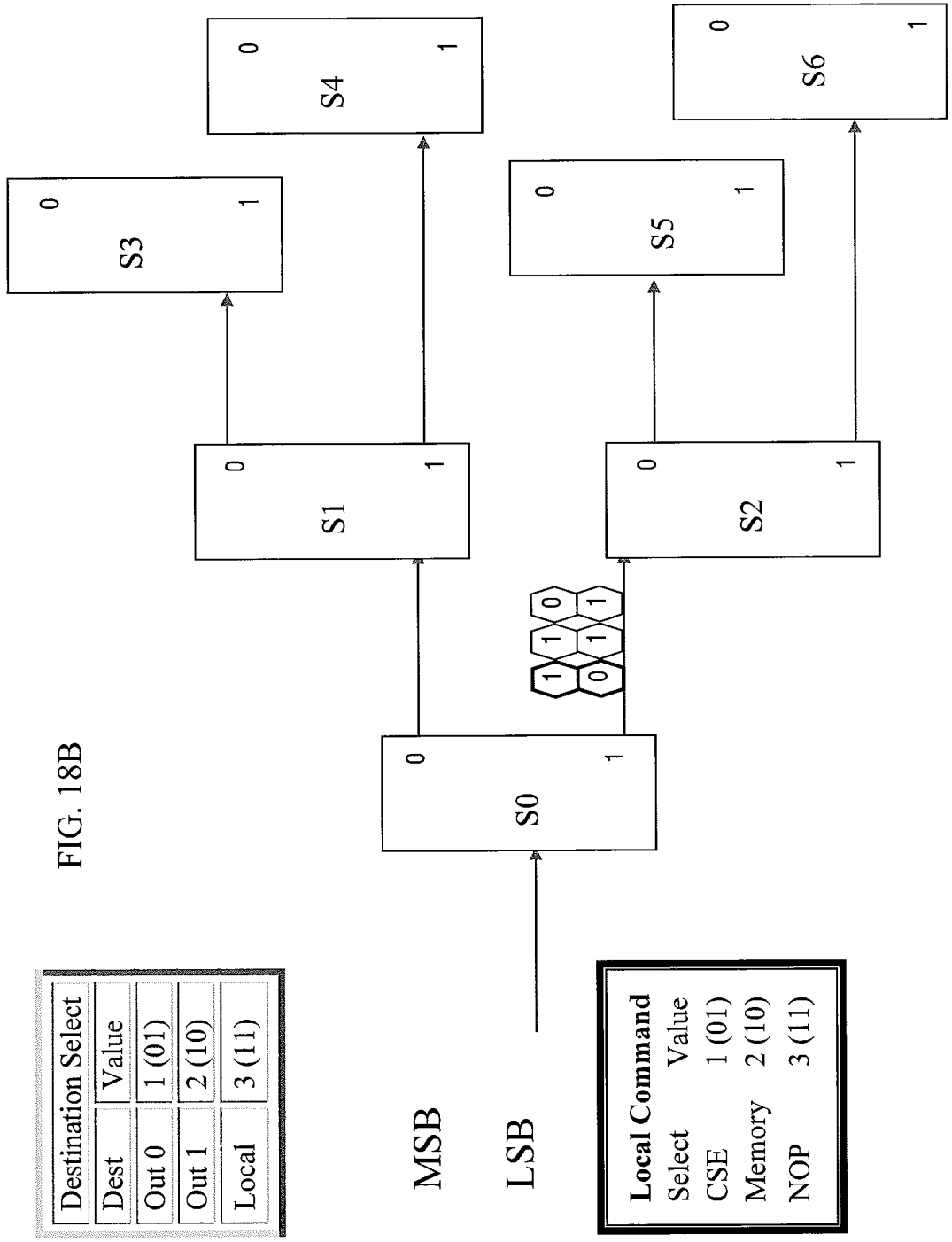

The final word in the address packet contains a local command. That is, an operation to be executed at the destination switch. Examples of commands are given in the local command table. For example, a value of 1 (binary 01) selects the CSE, a value of 2 (binary 10) selects the local memory, and a value of 3 (binary 11) is a no-operation command (NOP or "no op"). FIG. 18A shows the address command packet at the input to S0 for a command intended for S5. The leading bit pair (binary 10; MSB, LSB) results in the selection of output port 1 of S0. FIG. 18B shows the data at the output of S0, where it will be noted that the leading word 1 (binary 10) has been stripped form the address command, as it has already been acted upon at S0. In this manner, each switch S may determine a course of action based on the leading word in the packet as received. However, the position in the packet of the word that is to be interpreted by each switch S may be other than the leading word. In addition to simplifying the processing, the time to interpret the address command in this format is the same at each of the modules Sn, so that the incremental delay to perform this operation is independent of the depth of destination in the tree to which the address command is directed.

Figure 18C:
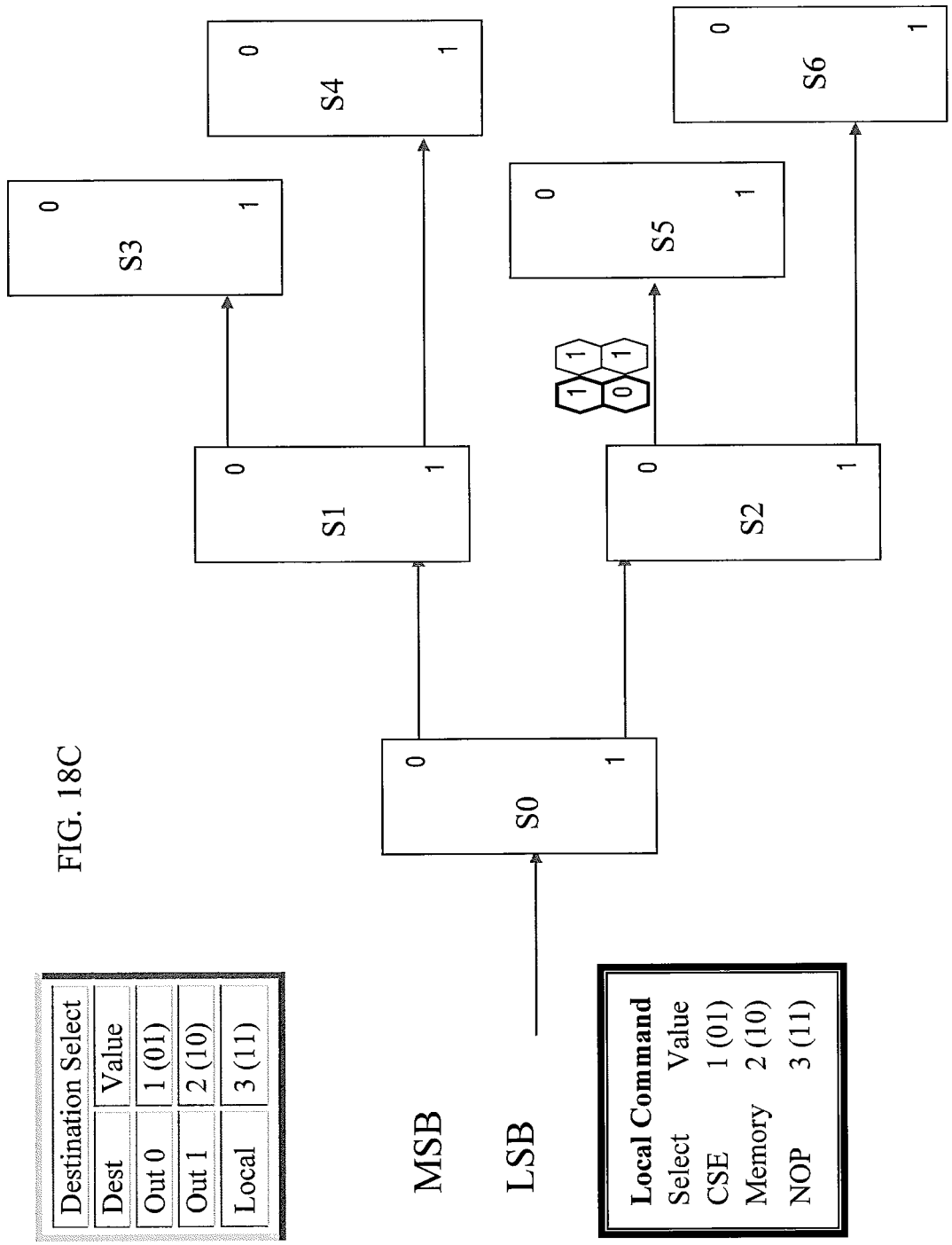

After passing through switch S2, and being routed to port 0, as the leading two-bit word is 1 (binary 01), the leading word is again stripped away. FIG. 18C shows the address command that will be received by S5. The leading word is now 3 (binary 11), local, indicating that the data following is intended for the local module. The next following word is interpreted as a command to be executed locally, in this case 3 (binary 11), a NOP. Any response from the addressed module is transmitted back upstream.

Figure 19A:
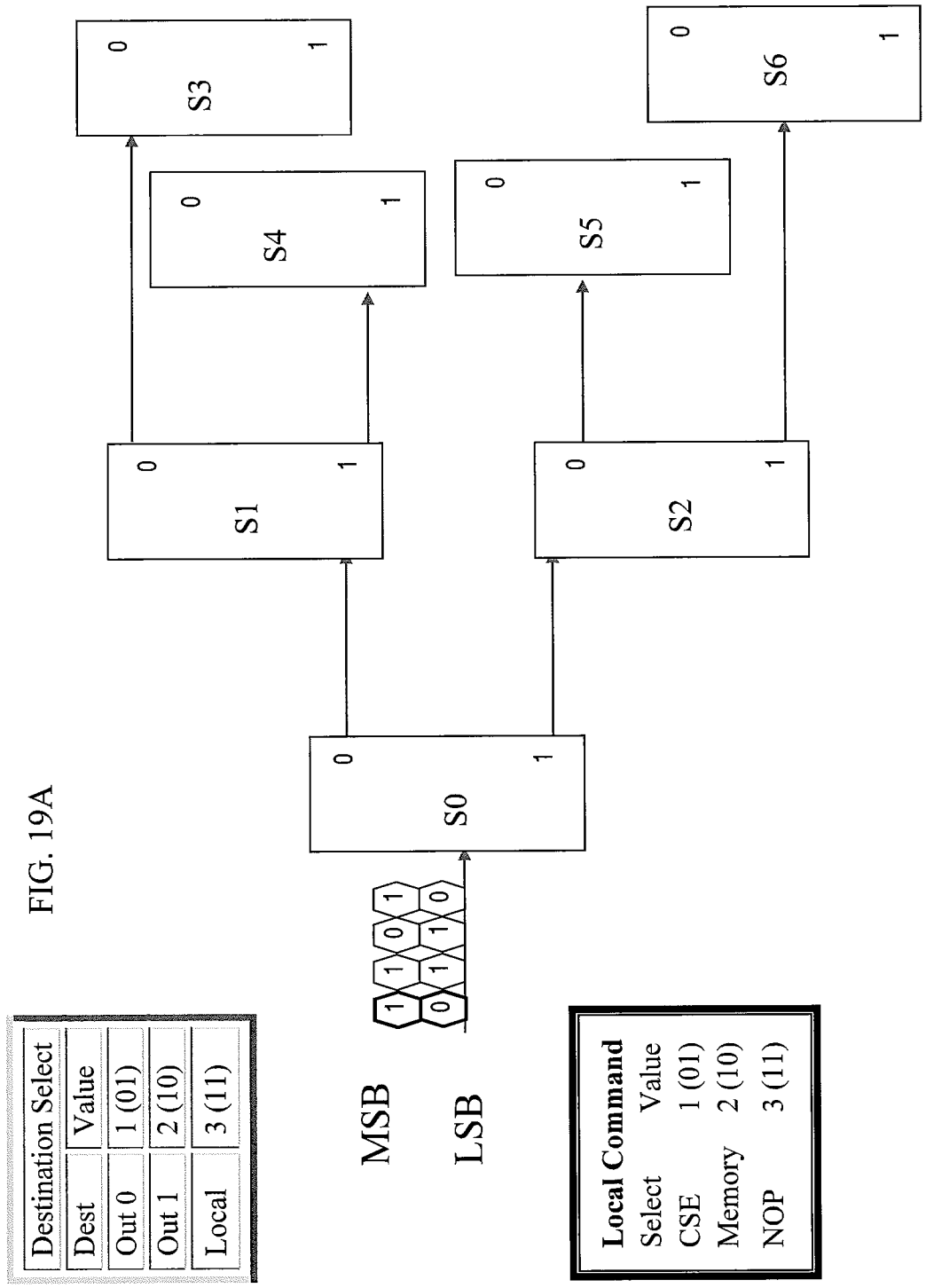
FIG. 19A-C shows the action of a switch S where a no-op (NOP) is transmitted from one or more output ports.
Figure 19B:
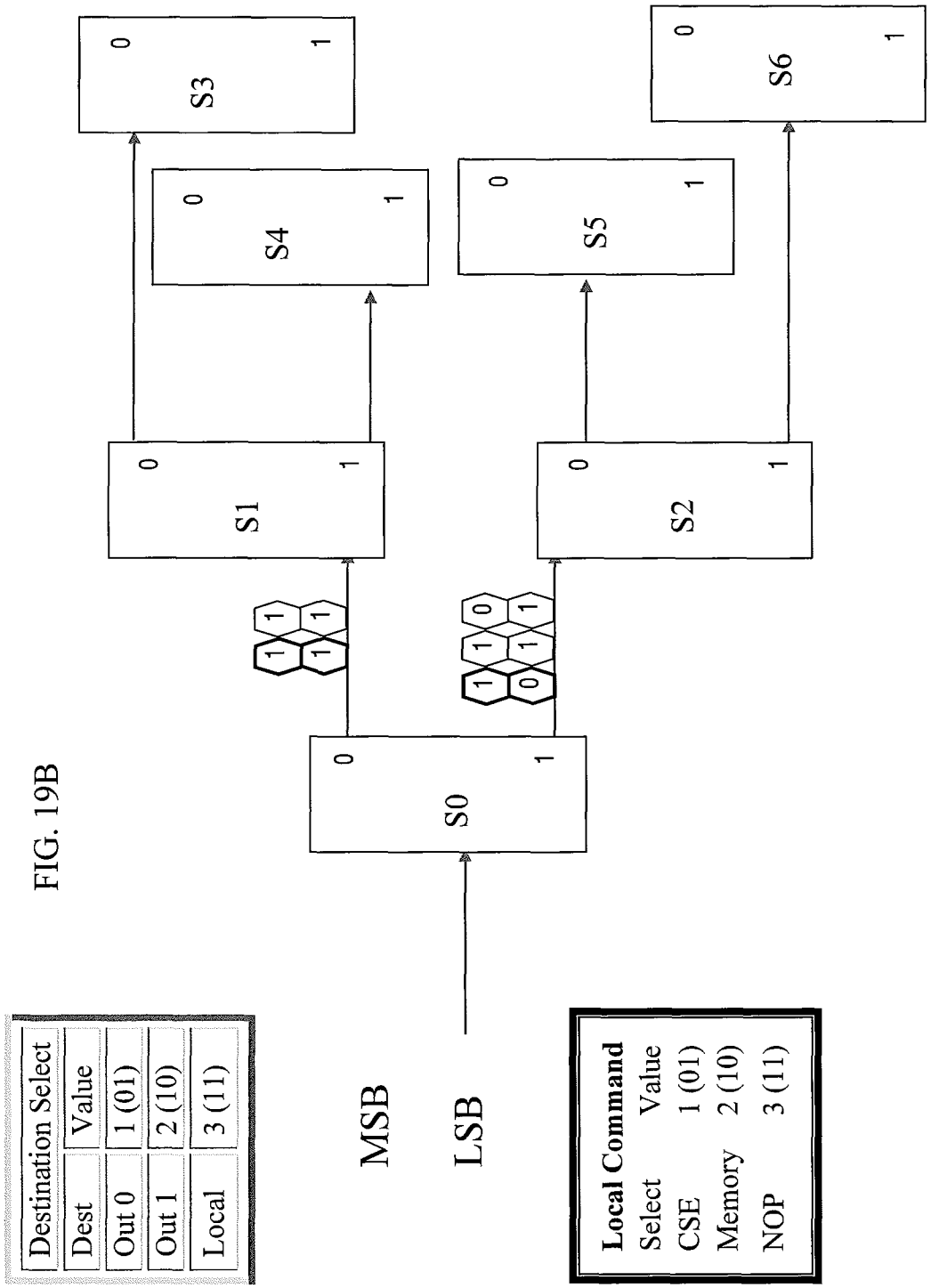
Figure 19C:
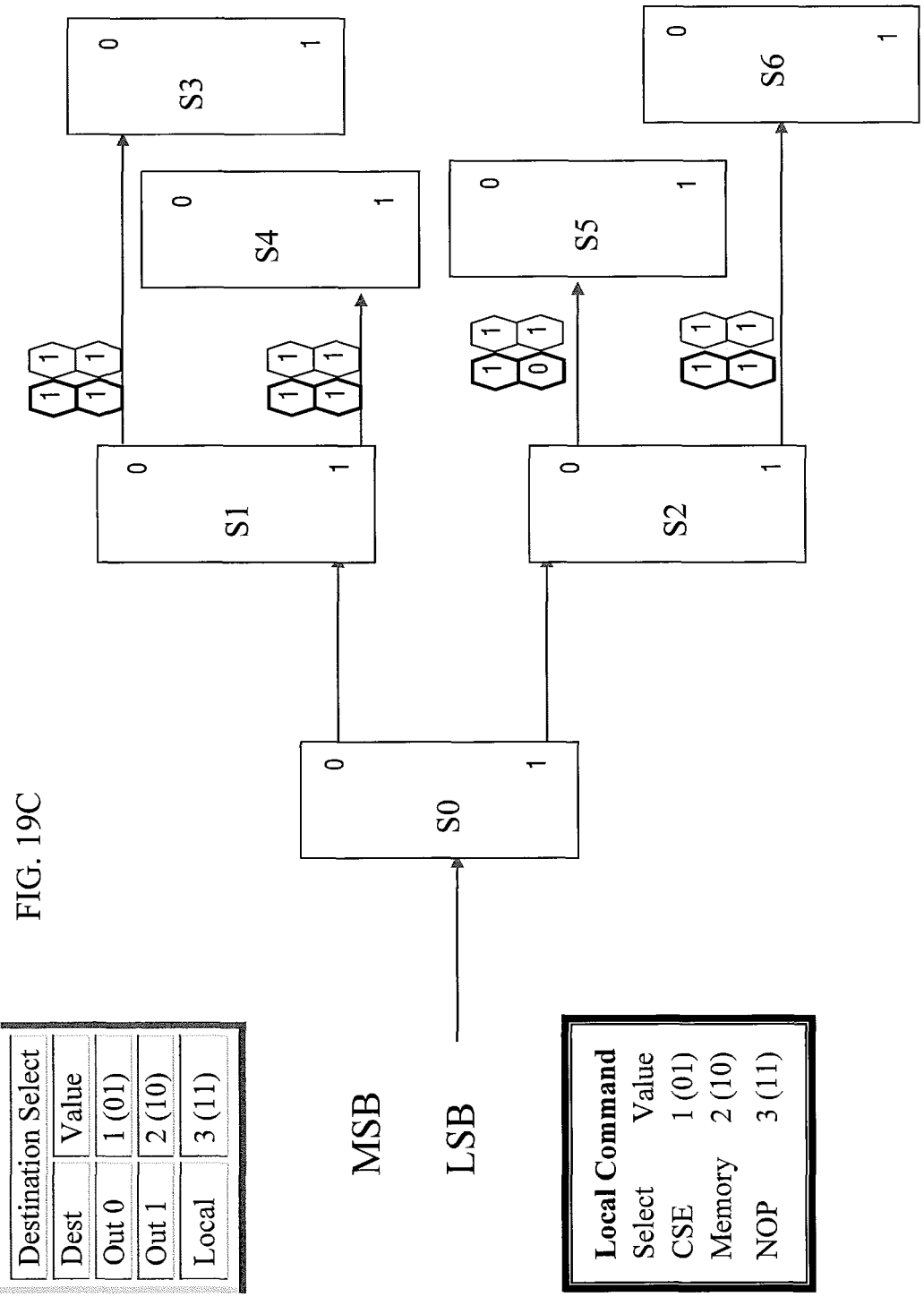

In another example, shown in FIG. 19a-c, the action of a switch S may be such that a NOP is transmitted from one or more of the output ports not selected by the address command. This may facilitate the propagation of clock pulses throughout the tree in an efficient manner to maintain synchronization. The address command at the input to S0 is again intended for S5 with a local memory command 2 (binary 01). As seen in FIG. 19B, when compared with the original command shown in FIG. 19A, the address command appears at port 1 of S0 with the leading word stripped away. As such, port 0 was not selected and therefore may issue a packet to the next switch connected to port 0 (that is, the port of S0 connected to S1) consisting of a local address, followed by a NOP. FIG. 18C depicts the action of S1 in response to the receipt of the NOP. Since neither of the ports of S1 was selected for data output, the action of S1 may be to issue packets at both port 0 and port 1 consisting of a local address, followed by a NOP, which propagate to S3 and S4. The action of S2 may be different, and the input address command as shown in FIG. 19C may result in the routing of the address command to port 0 (binary 01), stripping away the leading word, and transmitting the remainder of the command packet to S5. But, port 1 of S2 was not addressed in this situation, and a packet containing a local address and a NOP to S6 may be output. Each of the modules at the end of the tree ("leaves" or "leafs") (in this example S3, S4, S5, S6) may also issue a local command and a NOP at each of the output ports thereof, however, if no further paths are connected, the process terminates. Modules may also be configured to act as tree leaves and the downstream output ports thereof may either be inactive or omitted.

Figure 20:
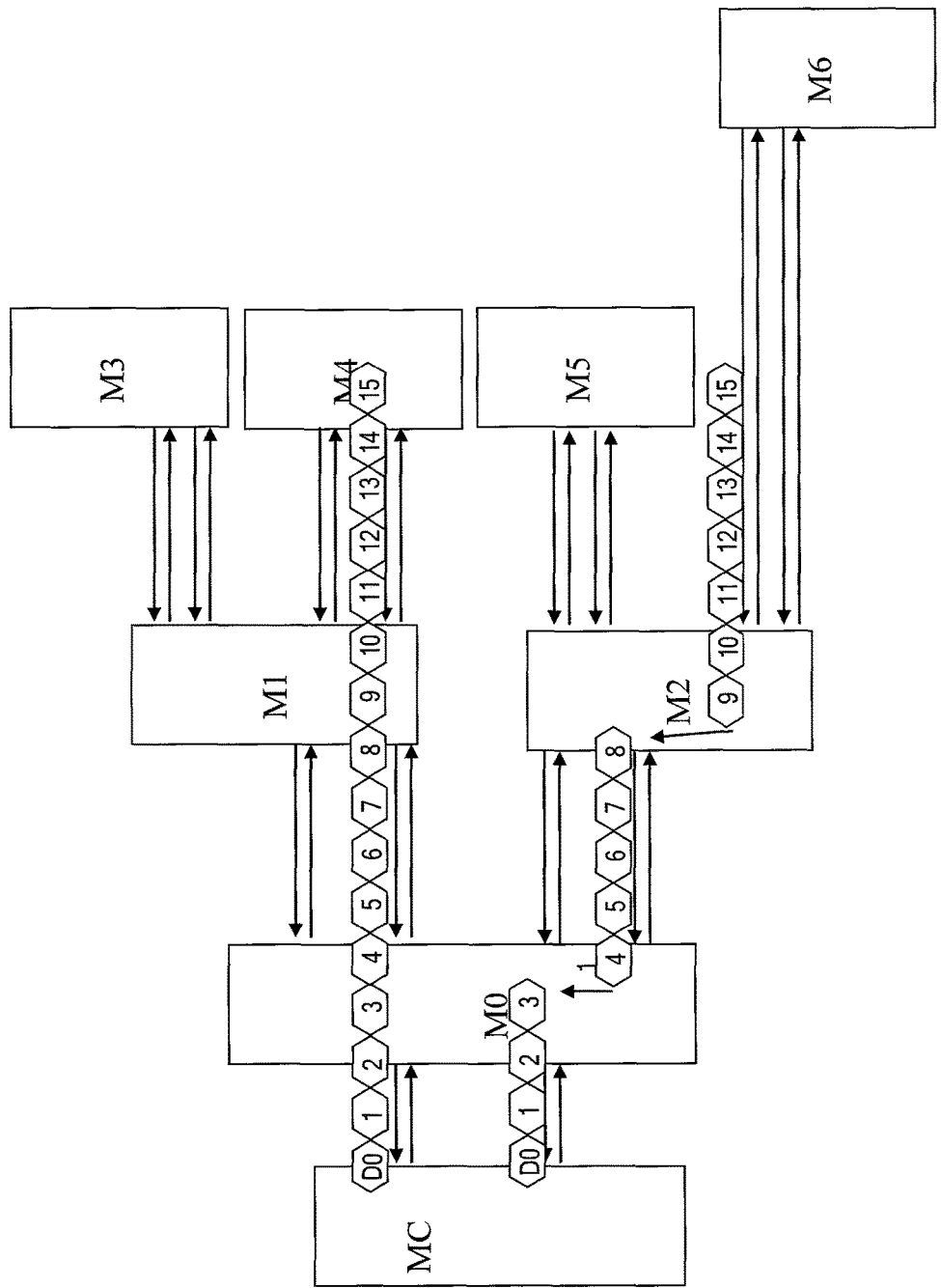
FIG. 20 shows a tree of modules where the links are channelized.

The tree of modules may be configured such that the links can be channelized as in FIG. 20, using a CSE 15 of the type shown in FIG. 3, and permitting the contemporaneous or simultaneous execution of two or more commands, depending on the degree of sub-division. In this example, two separate data packets are illustrated. A first packet which may result from an execution of a read command R is shown returning from module M4 to the MC via M1 and M0. At the same time a second packet, which may result from the execution of a read command R is shown returning from module M6, through M2 and M0 to the MC. The returning packets may use a number of lanes of the line, and the number of lanes may be less than the full number of lanes in the link between modules. It is not required that the division of lanes between the "channels" in a link be identical.

Figure 21:
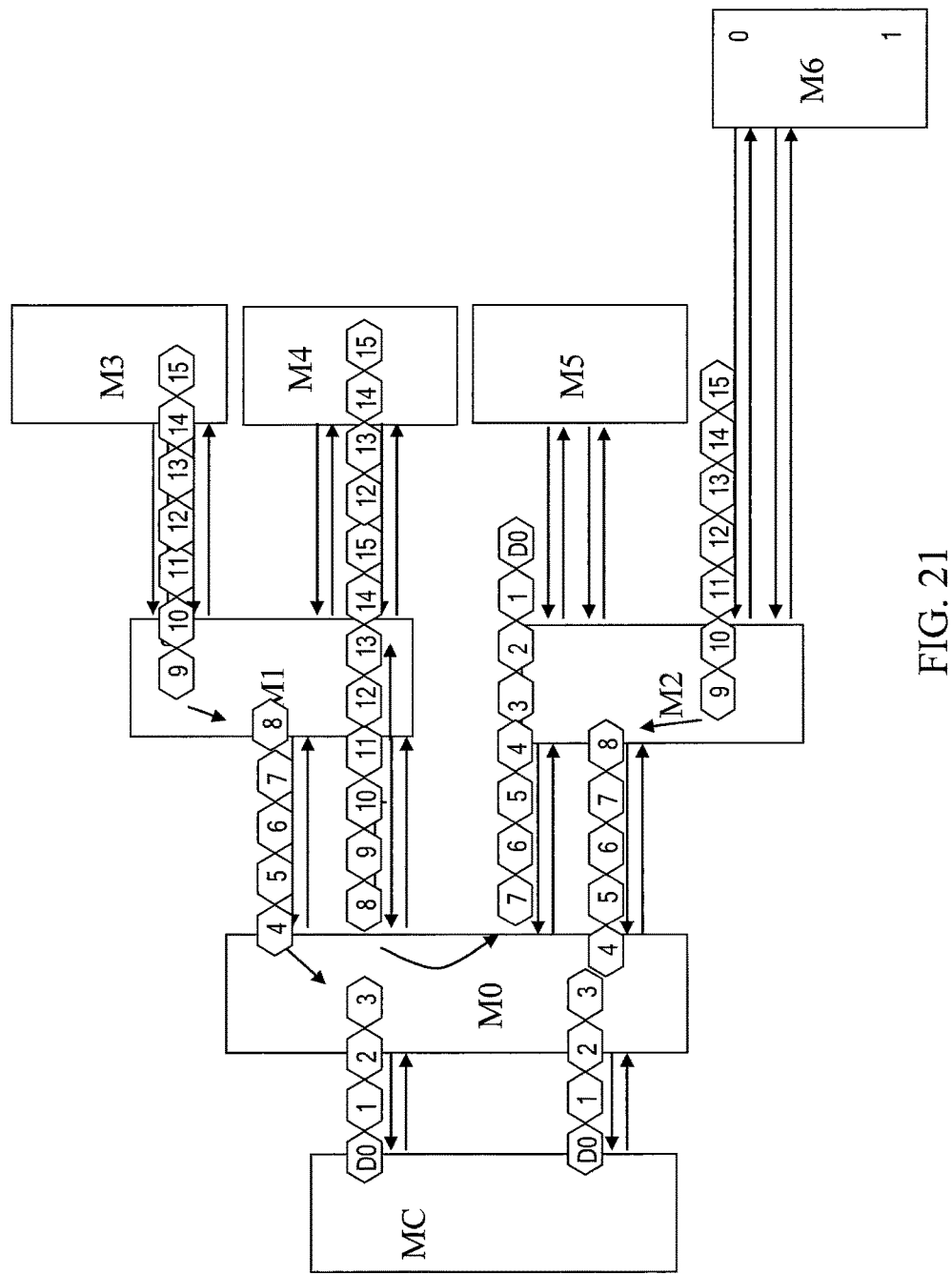
FIG. 21 is a further example of a tree of modules where the links are channelized.

A further channelization of the tree is shown in FIG. 21. Here, at the same time as a read command R is being processed from each of modules M3 and M6, a direct memory access (DMA) transfer may be conducted between modules M4 and M5 via M1, M0 and M2. The transmission of data from module M4 to M5 may occur at the same rate as, and without interruption of, the transfers in progress from M3 and M6. In such a configuration DMA transfers may be performed to or from any module not being accessed, or from any module capable of processing more than one data path at a time. In this way, direct memory access may be performed in the background without affecting the performance of other accesses occurring essentially simultaneously. With arbitration within the module, or where the module can support more than one operation/access at a time, such as where a module contains a multi-ported memory, or where the CSE can buffer some or all of a conflicting operation, it may be possible to perform operations sent from the module controller to modules which are simultaneously performing operations internal to the tree such as DMAs. DMA operation is also illustrative of the connection of a downstream port to an upstream port as an example of the possibility of connecting either logical or physical ports within a CSE to effect the data transfer.

Figure 22:
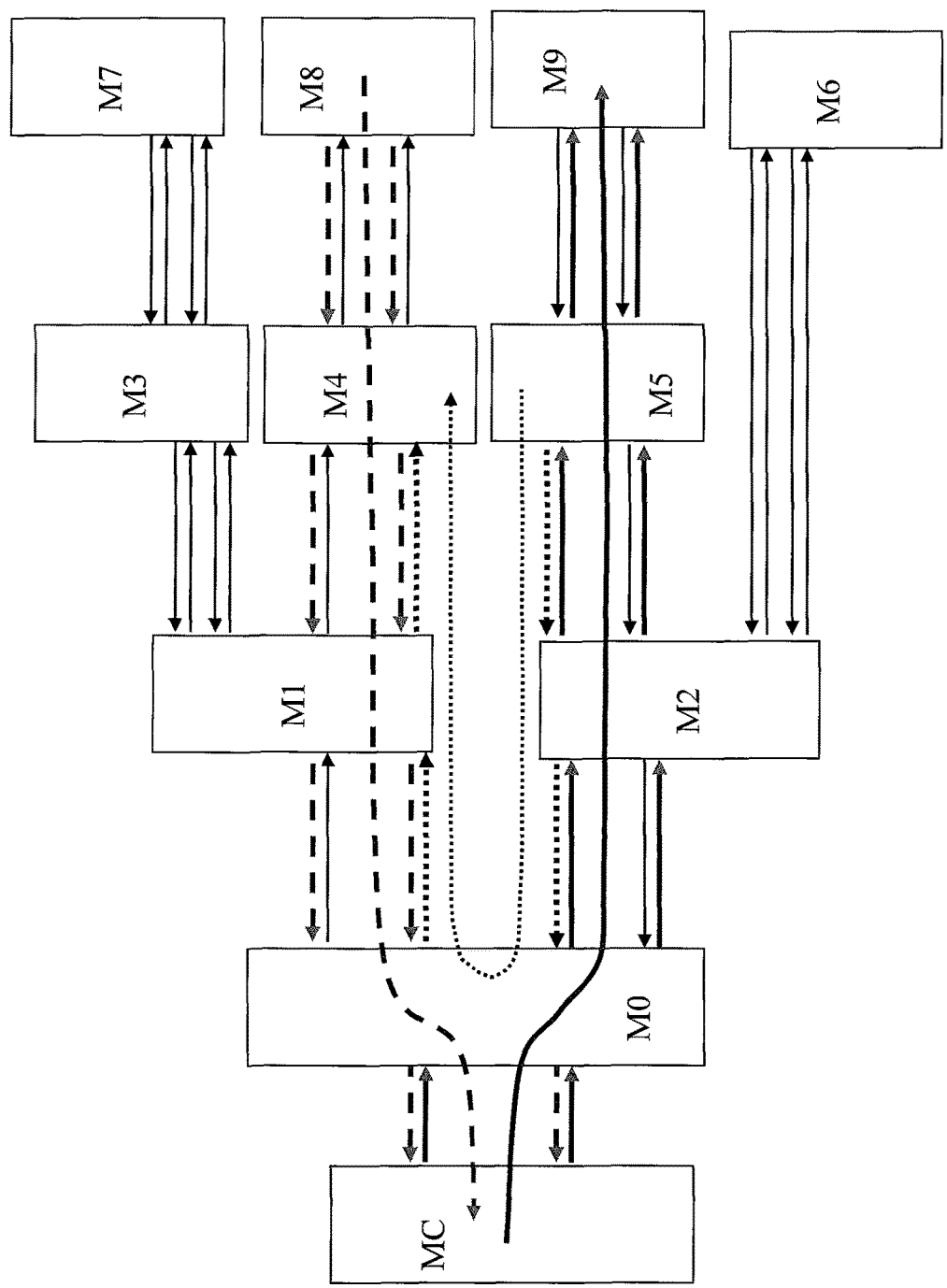
FIG. 22 shows a stylized representation of data transfers.
Figure 23A:
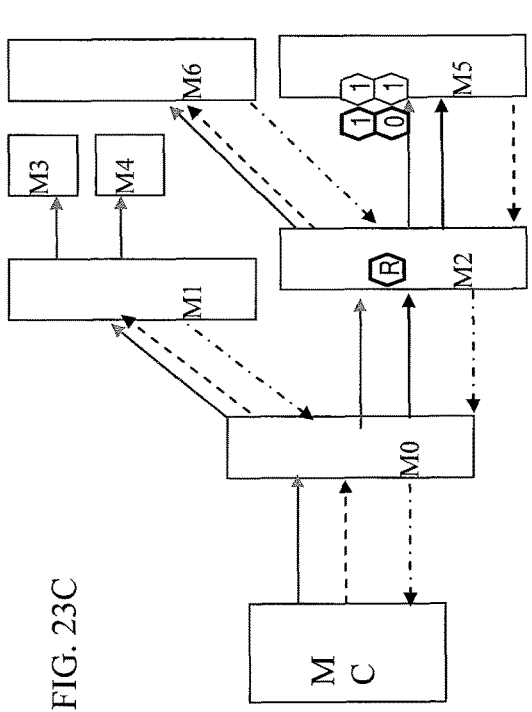
FIG. 23A-D show a configuration where many of the links are in a low power state.
Figure 23B:
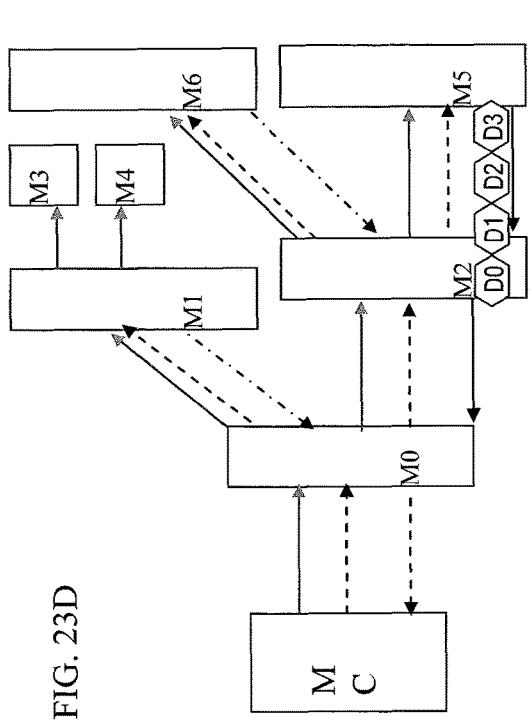
Figure 23C:
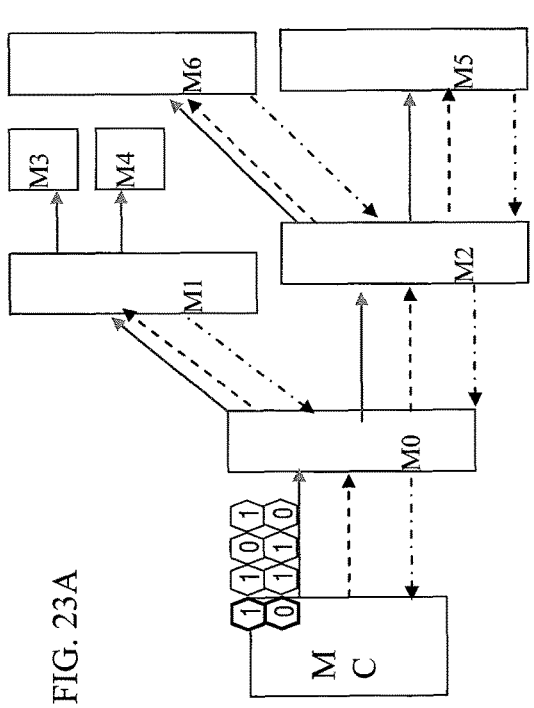
Figure 23D:
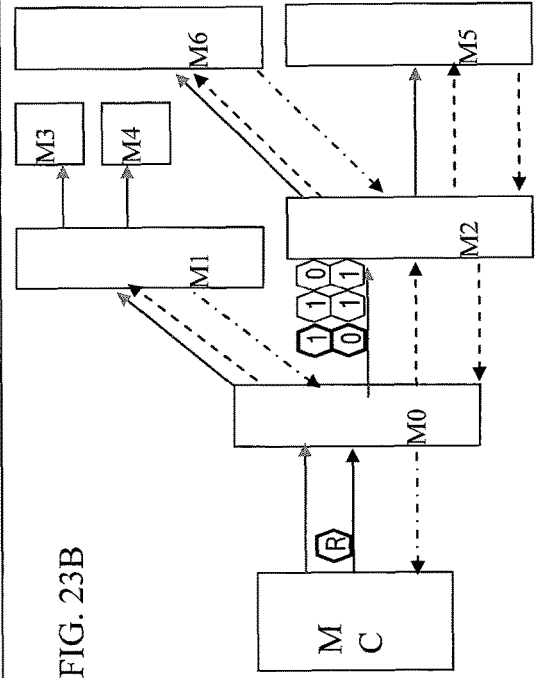

FIG. 22 is a stylized representation of data transfers occurring contemporaneously or simultaneously in, for example, a tree architecture. In this example a read operation from module M8 (shown as a dashed gray line between module M8 and the MC), passing through M4, M1 and M0, and a write operation from the MC to module M9 (shown as a solid gray line between the MC and module M9), passing through modules M0, M2 and M5. Data corresponding to a read command R is being transmitted from module M5 to M4 (shown as a dotted line) passing through modules M2, M0 and M1. Thus, it may also be possible, depending on the specific source and destination addresses, for accesses to be performed non-simultaneously from the MC while memory transfers are occurring within the tree of modules.

FIG. 23 depicts a configuration where many of the links are in a low power state (shown by dashed lines). When the reception of an address command indicates that data will be following in the downstream direction, in this case a read command R, those downstream paths over which the read command R will travel are powered up so that the command may be transmitted. This is shown in FIG. 23B by the change of the MC to M0 link to a solid line. FIG. 23C shows the powering down of the MC to M0 link and the powering up of the M0 to M2 and M2 to M5 links. FIG. 23D shows the subsequent powering up, at an appropriate time, of the M5 to M2 and M2 to M0 links to transmit the data being returned in response to the read command R.

FIG. 24 depicts a configuration similar to that of FIG. 23, except that the upstream paths may be placed in a lower power state. Generally a return to normal operation for a path is longer when the path circuitry is in a very low power consumption state. The upstream data paths are shown as a dash-dot line when in such a state. (The distinction may be made between, for example, a powered-on state, a standby state and a powered-off state, or the like. In making these distinctions, a difference in the overall power consumption and a difference in the time to transition to a full performance state is implied, but the amount of time or the amount of power will be specific to a particular design). As previously discussed, each of the modules on the path between the MC and the destination module, in this case M5, becomes aware (by "snooping") that a specific command type has passed through each module (in this case M0 and M2), and the depth in the tree to which the command was addressed. Therefore it may be possible to schedule the re-powering of each upstream link at a future time such that it may be in operational (powered up) status when the data is being transmitted over the link. FIG. 24A-C also illustrates the transmission of NOP commands N to branches of the tree that are not on the address path.

In a system where commands may be constrained as to when they may be transmitted, for example in a system with slotted transmission time, or where there may be a minimum interval between commands, or a restriction on when certain commands may be sent, further power savings may be achieved. FIGS. 24A-D show how, for example, in a system with slotted command timing, the link carrying the address command might be powered in time for the beginning of the slot, as shown by the half dashed lines. If there is no command to transmit, then the link may be powered down until the beginning of the next slot time. If there is a command to transmit, then the link remains powered up so the command may be transmitted. FIGS. 24B-D also show how in a system without fixed command start times, a NOP command N may be sent to the links not being taken by the command to permit the unused links to power down the associated command link until the time at which another command may need to be received, whereupon they are powered up again.

For certain physical lane transmission technologies, the powering up or down of a lane may require action by both the transmitter as well as the receiver ends of the lane.

Figure 25A:
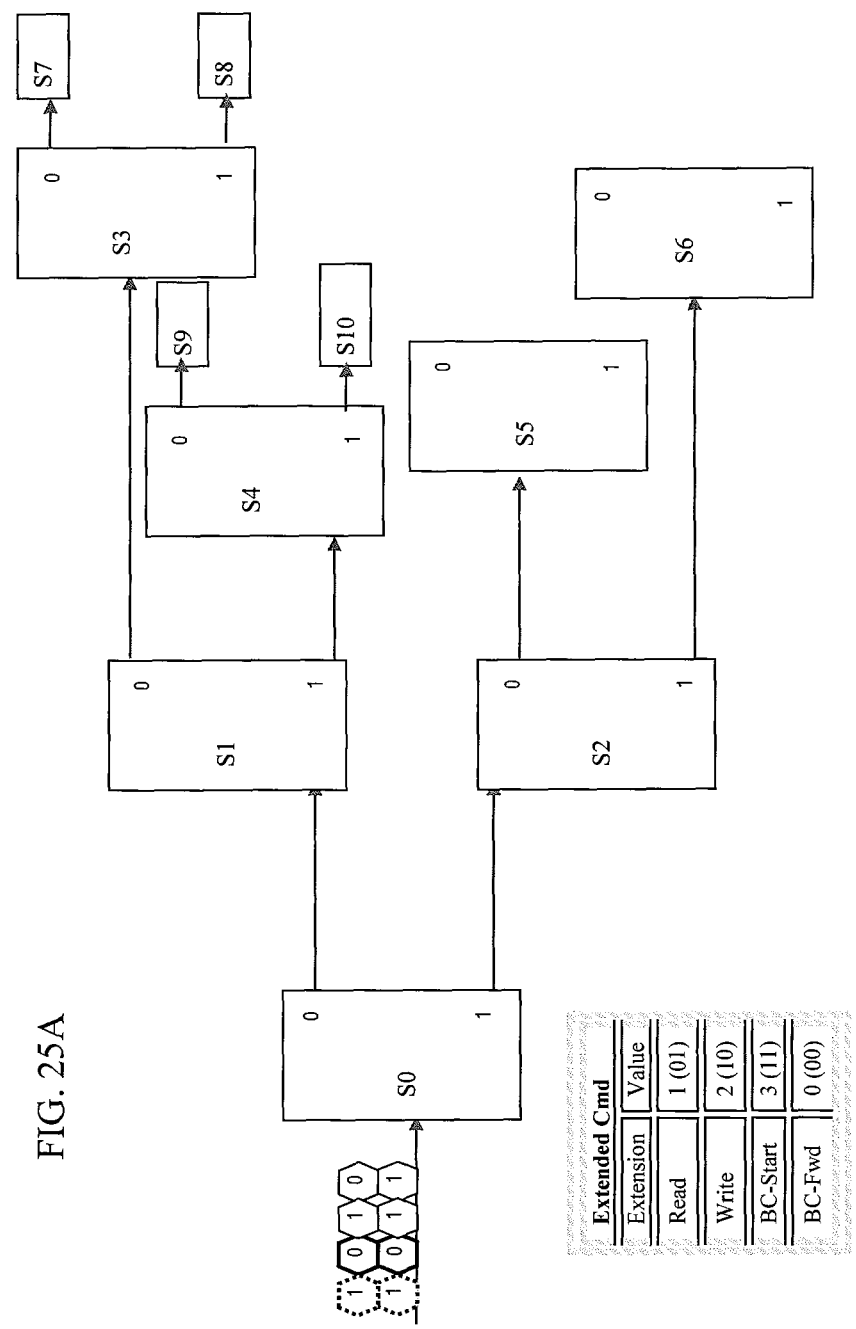
FIG. 25A-C shows a configuration having an extended table of local commands.
Figure 25B:
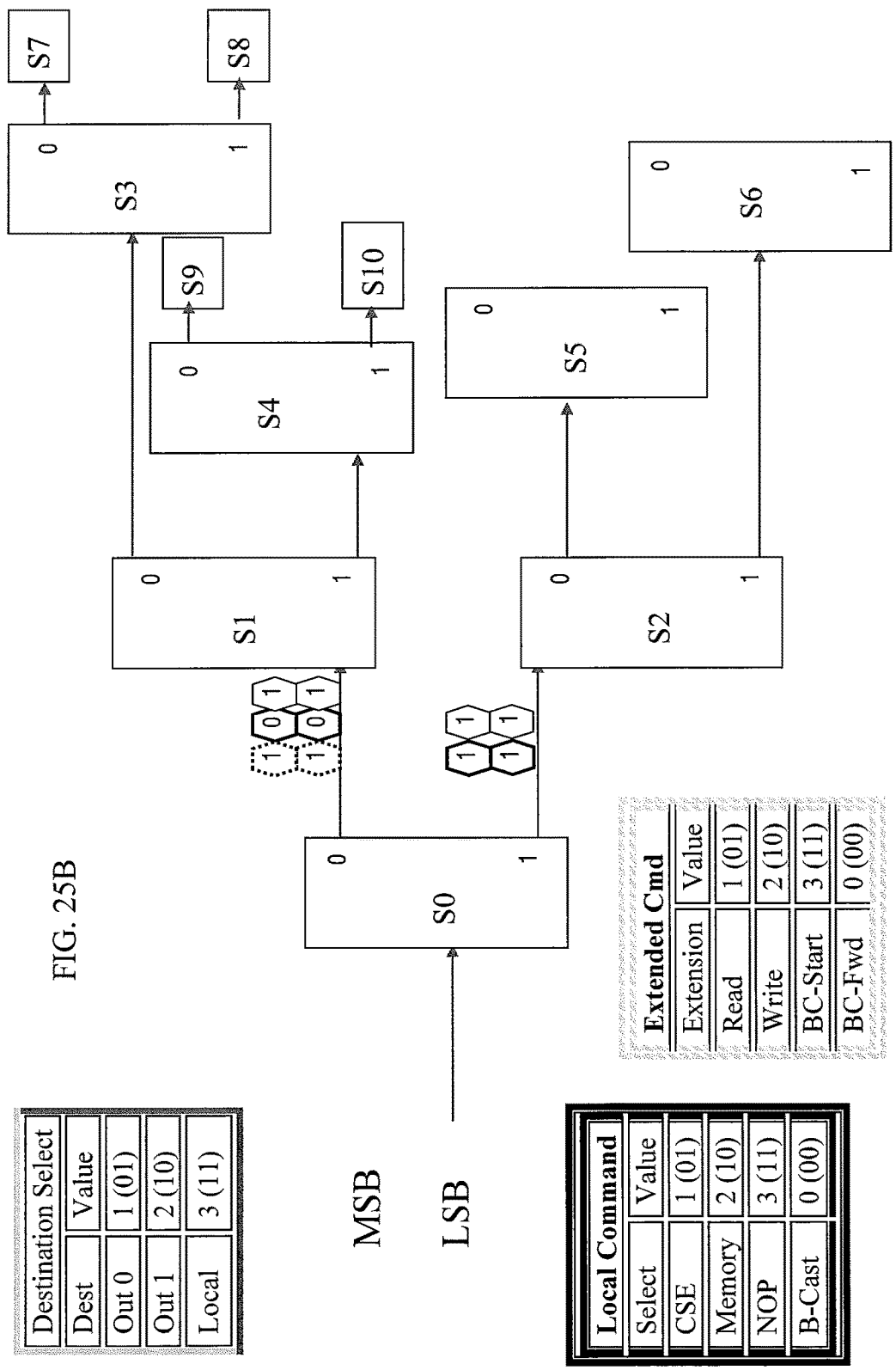
Figure 25C:
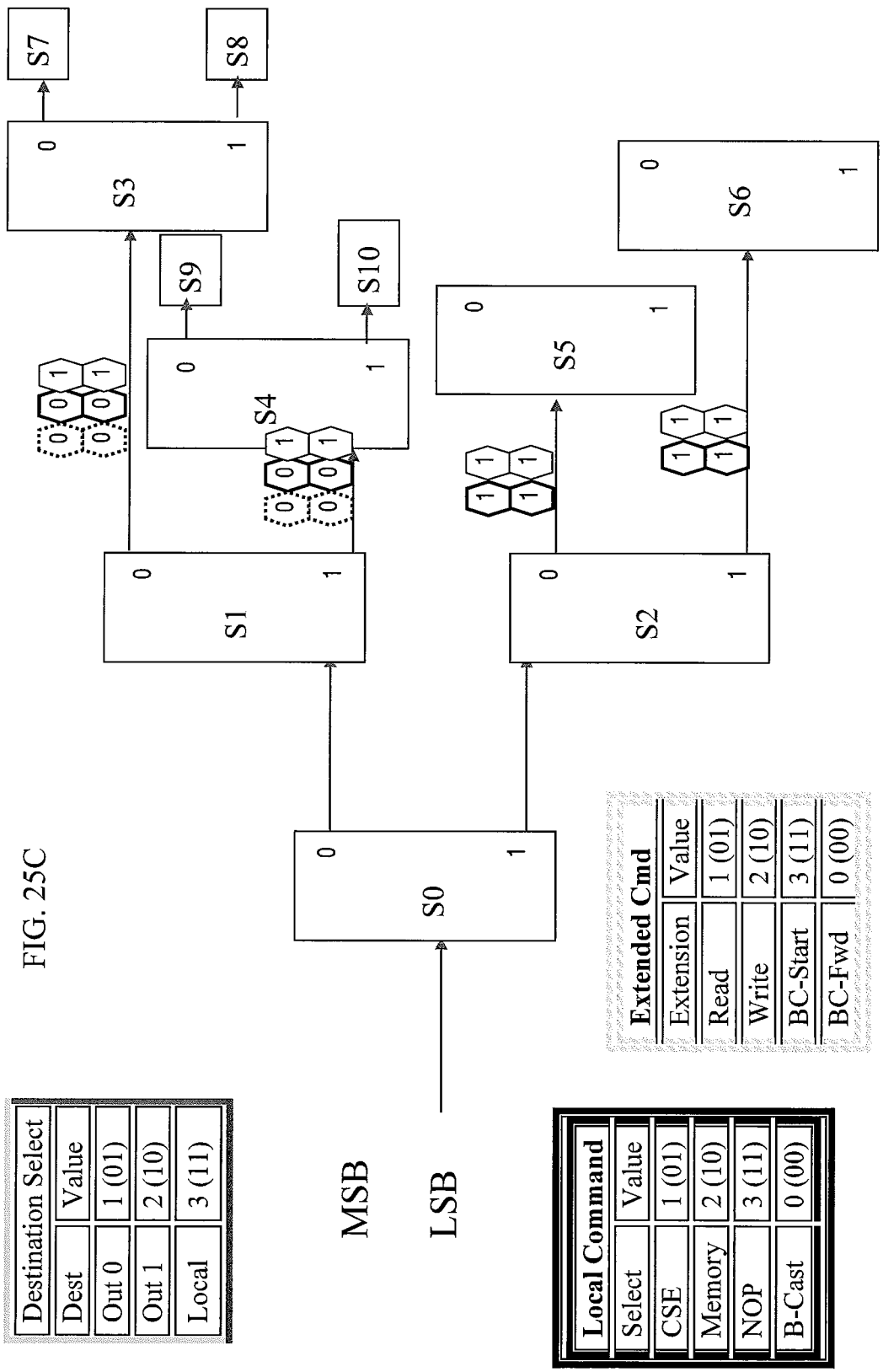

As a further example of an address command, an extension of the command may be made to facilitate broadcast or multi-cast distribution of commands. FIG. 25*a* has an expanded table of local commands, including a broadcast command having a value of 0 (binary 00), and a table of extended commands. The word associated with the extended command is shown in the hexagon formed of dotted lines. Although shown as the last word in an address packet, the position of the extended commands may be different. The extended commands include Read having a value of 1 (binary 01), Write having a value of 2 (binary 10), Broadcast-start having a value of 3 (binary 11) and Broadcast-forward having a value of 0 (binary 00). The extended command word may follow the local command word in the transmitted sequence. In this example, an address command is directed to S1, as the first word in the address selects port 0, which is connected to S1. A NOP is transmitted from S1, port 1, which is the non-selected port, and propagates ultimately to S5 and S6 as shown in FIG. 25B, C. With respect to the packet sent to S1 (FIG. 25B), the first word indicates that S1 is the destination of the command, and that the local command has a value of 0 (binary 00), corresponding to a broadcast command. Switch S1 may create new messages in response to the broadcast command. A broadcast command may be issued from each of port 0 and port 1 of switch S1, being addressed to S3 and S4, which are the next switches in the tree, connected to port 0 and port 1, respectively. The broadcast command has an extended command of broadcast-forward, having a value of 0 (binary 00) as the extended command. As such, S3 and S4 may generate similar commands which propagate down the tree.

Figure 26A:
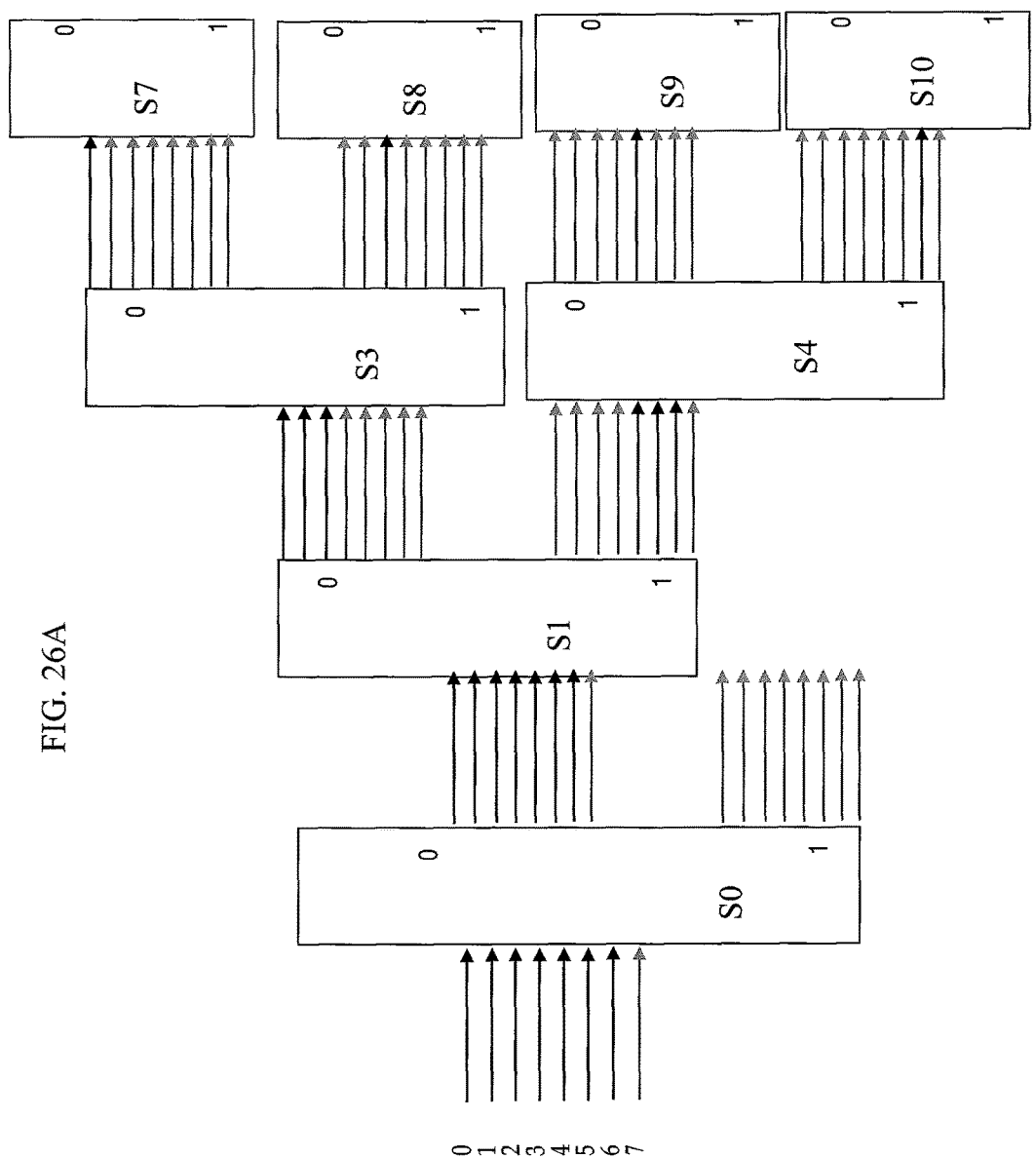
FIG. 26A-B show the follow of control from the input of S1 to leafs of a tree.

FIG. 26A, B shows a detail of the flow of control from the input of S1 to the leafs of the tree. Such a configuration may be used for simultaneously sending and/or receiving small individual status/control messages to/from many modules.

Figure 27A:
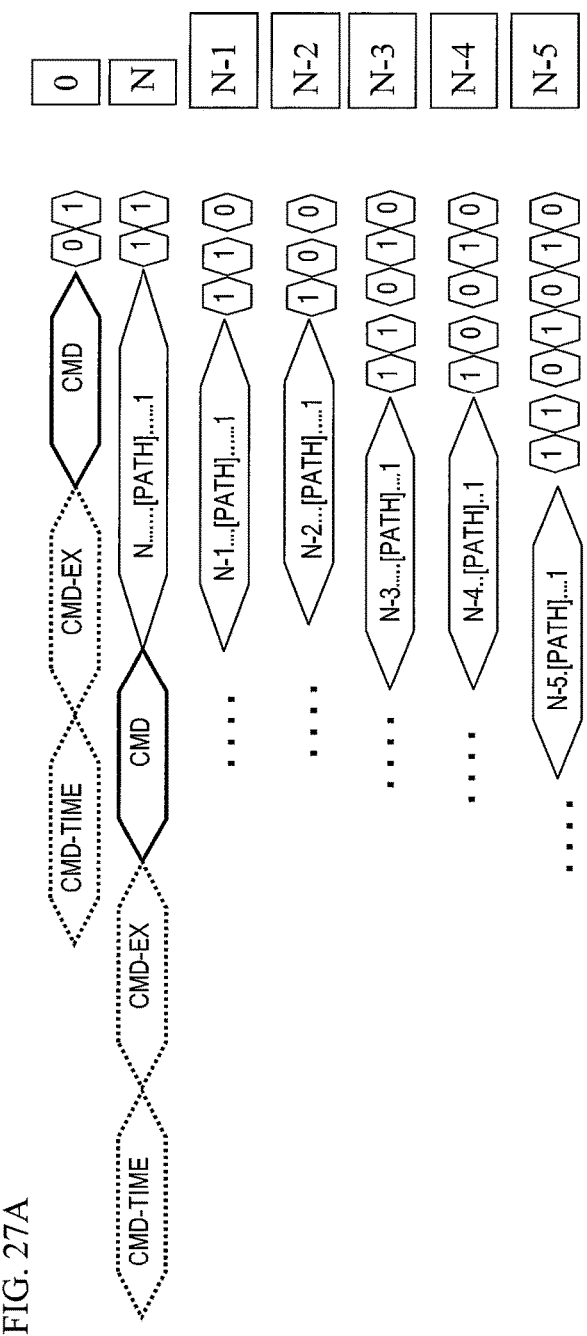
FIG. 27A-B show alternate configurations of a self-routing message.

FIG. 27A illustrates some alternate configurations of a self-routing message. In an aspect where very high speeds may be desired, the skew from lane-to-lane may be such that only messages transmitted on a single lane may be interpreted without the significant delay which may be experienced in waiting for the other portions of the message which were transmitted over a second or greater number of lanes. Here, a number of bit-serial formats are described that demonstrate various properties which may be useful.

Figure 26B:
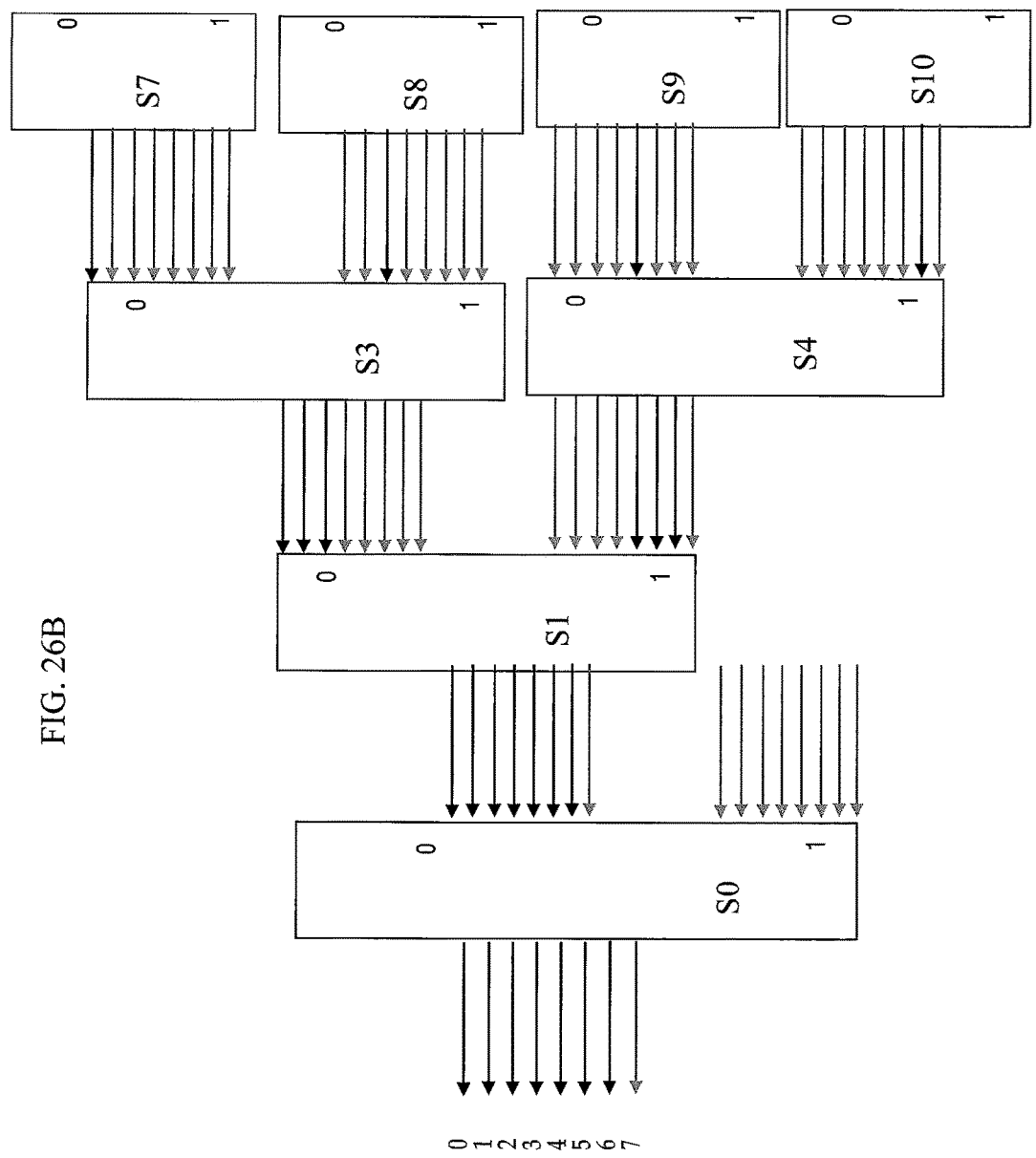
Figure 27B:
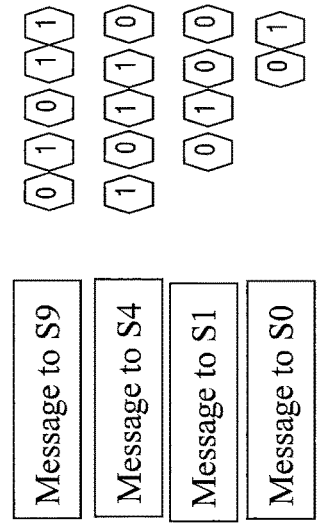

It may be desirable that the first switch route the message with minimal time delay. As an example, there is the special case of a message destined for the first module in the root of the tree. Here, the first two bits in the message (reading from right to left) are binary 01, and the command CMD (which may be a read R, write W, or other command) follows. In an example where the message may be directed to the lowest level N (for example a leaf), the first two bits have the values binary 11. This is the followed by the path indication [PATH], which may be N bits of path information, where the bit pattern is, for example, 0 or 1, depending on the port to be used at the output of each successive branch or node in the path to the destination. This path indication is followed by the command CMD being addressed to the specific module. A message which is destined for the first from the bottom level has the leading bits 011 and then a path indicator of length N−1. The next highest level has a leading bit pattern 001 and a path indicator of length N−2. For the N−3 level, the leading bits are 010, indicating that further information as to the depth of the message follows. Then the pattern binary 11 marks the beginning of the path indicator. In this manner the length of the leading bit pattern grows by approximately one bit for reach level in the tree, but the path indicator [PATH] decreases in length by one bit for every level, and thus the total number of bits in the preamble and the path indicator may be constant to within nominally one bit. As such, the message length has little variation in length associated with the depth of the module to be addressed. FIG. 27B illustrates preambles for messages to be sent to S9, S4, S1 and S0 of the arrangement of modules shown in FIG. 26.

Also shown in FIG. 27A are additional commands CMD-TIME and CMD-EX which contain information about when the command should be executed and/or data returned. The time may be absolute time or relative time from the receipt of the command, or may have an interpretation based on the nature of the command itself.

Figure 28A:
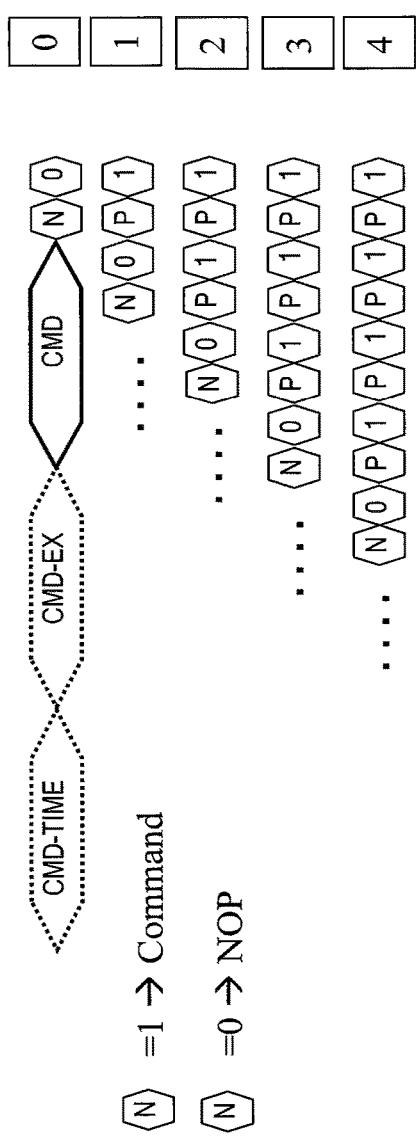
FIG. 28A-B show a message format which may be suitable for stripping a leading bit.

FIG. 28A shows a message format which may be suitable for stripping the leading bit at each node. The format for an address to module 0 would be a leading 0 and then a bit that indicates whether a command follows or a NOP. A message addressed to level 1 is a leading 1, followed by a port selector bit P, indicating that the port 0 or port 1. The pattern ON, again indicates whether a command for the module follows (1), or a NOP (0) is desired (0). For addresses of modules further down the path, a pair of bits is added for each level, indicating the added depth and routing on the path. At each level, the first two bits of the messages may be interpreted to determine if the message had been addressed to the local switch or is to be forwarded. If the message is for further downstream in the tree, the first two bits of the message are stripped off and the message is forwarded via the appropriate port. The numbers in the rectangular boxes at the right hand side of the figure represent the depth or rank in the tree.

Figure 28B:
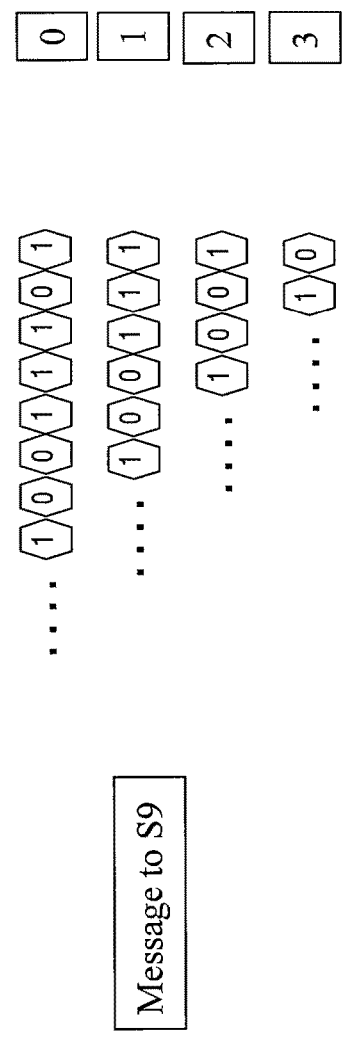

FIG. 28B illustrates the progress of a message being transmitted to S9 at various stages down the tree, where the leading bit pairs are stripped off after they have served their function of routing the message.

As bus (link) speeds increase, the problems associated with synchronizing the data with the clock or commands in a synchronous bus architecture may increase. One of the problems is that separate end points of a link, lane or line may have different clocks. Also, if parallel data transmission techniques are used, the effective physical lengths of the individual lines in the links may generally be different, and there may be a time difference in the arrival of bits sent on different transmission lanes or lines. This may be termed data "skew". One method of addressing the problem of data skew is to perform de-skew at each hop such that the header of the packet may be interpreted and the packet transmitted on the next hop. However, this may add significant latency time to the re-transmission as the de-skew process requires at least as much time as the longest differential delay between lines between each node. Other approaches attempt to avoid this additional delay by not performing de-skew at each node in the tree, but perform de-skew at the receiver of the addressed module or node, while allowing the skew to build up along the path. But the cumulative delay can also add significant total delay, as the differential delay accumulated from the source (e.g., a memory controller) to the destination node must be accommodated, even though part of the data packet may have arrived significantly earlier.

In the FB-DIMM technology as being developed by INTEL, devices are believed to be required to be able to correct for a skew of up to six UI per hop. The term "UI" or "Unit Interval", which is the average time interval between transitions of a signal, may be used at high clock rates in place of a clock period, as the clock period may not be completely stable or free of jitter. If six UI of skew per hop is expected, and a memory system has 8 hops, the total skew is 48 UI.

In the case of a link running at a clock speed of nominally 2 GHz with a data rate of 4 Gbps, 1 UI=250 ps so a delay skew of 48 UI is the equivalent of 12 nanoseconds (ns) of skew. That is, it is assumed that 12 ns is needed between the first arriving bit on one lane and the last arriving bit on one of the other lanes. The first arriving bits may need to be stored in memories, latches or shift registers until such time as the later arriving bits arrive, and then the bits are presented to the device which is to de-skew and read the data.

Figure 29A:
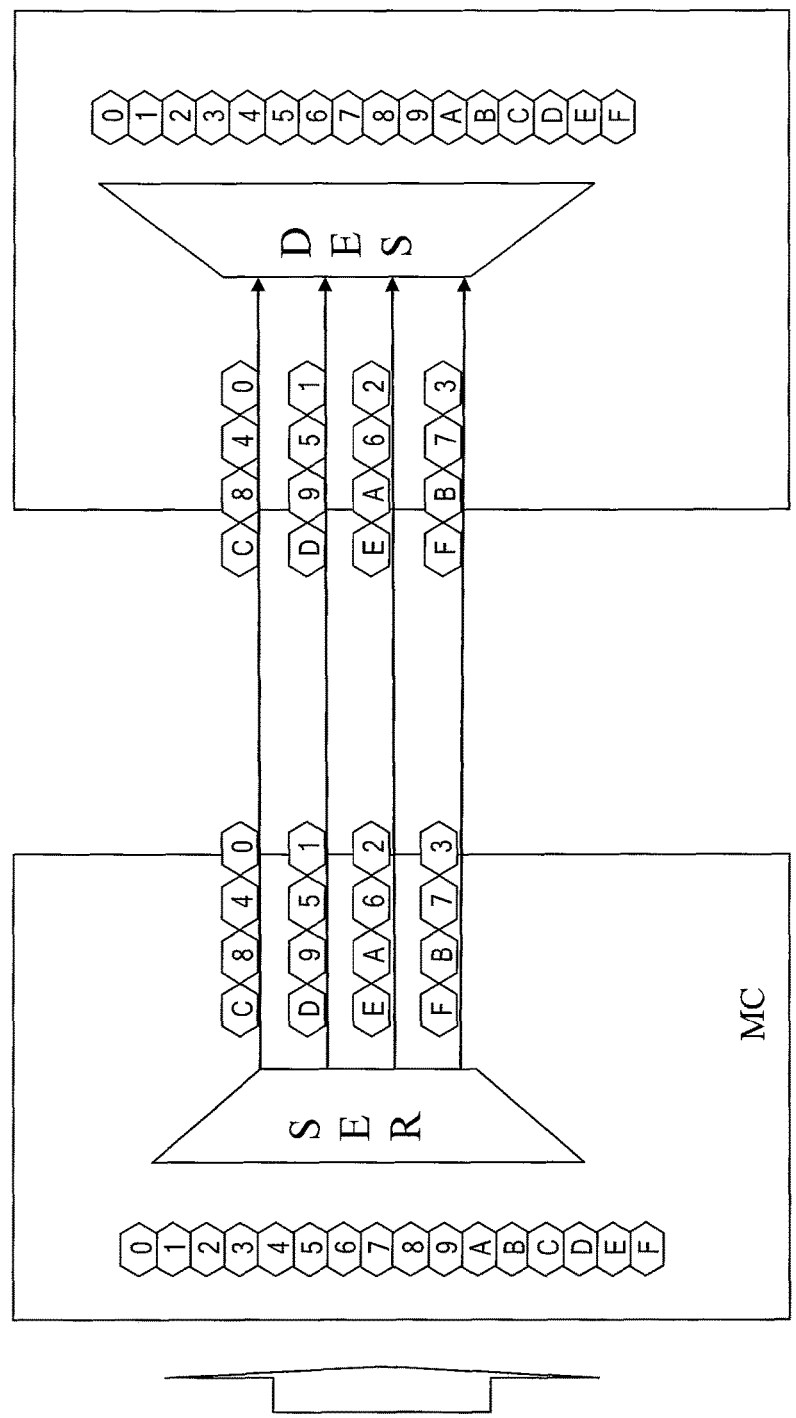
FIG. 29A-B show a simplified example of transmitting data from a device such as a module controller to another device.

In an aspect, the interconnection system described herein may provide a method and apparatus for operating in such askew environment even where the delay from device-to-device along a link is not fixed, in such a manner as to mitigate the need for delay equalization, delay scheduling, buffering or the like. FIG. 29A illustrates a simplified example of transmitting data from a device such as a module controller MC to another device, which may be a switch S, a memory module M, an interface, another processor, or the like. In this example a wide word, for example 16 bits, is converted by a serializer SER (300) into four 4-bit words. That is, the 16-bit word 310 is spread across four separate lanes and transmitted at four sequential high speed clock times. The data is received at the other end of the link, de-serialized by the de-serializer DES 320 and reformatted as the originally input word.

Figure 29B:
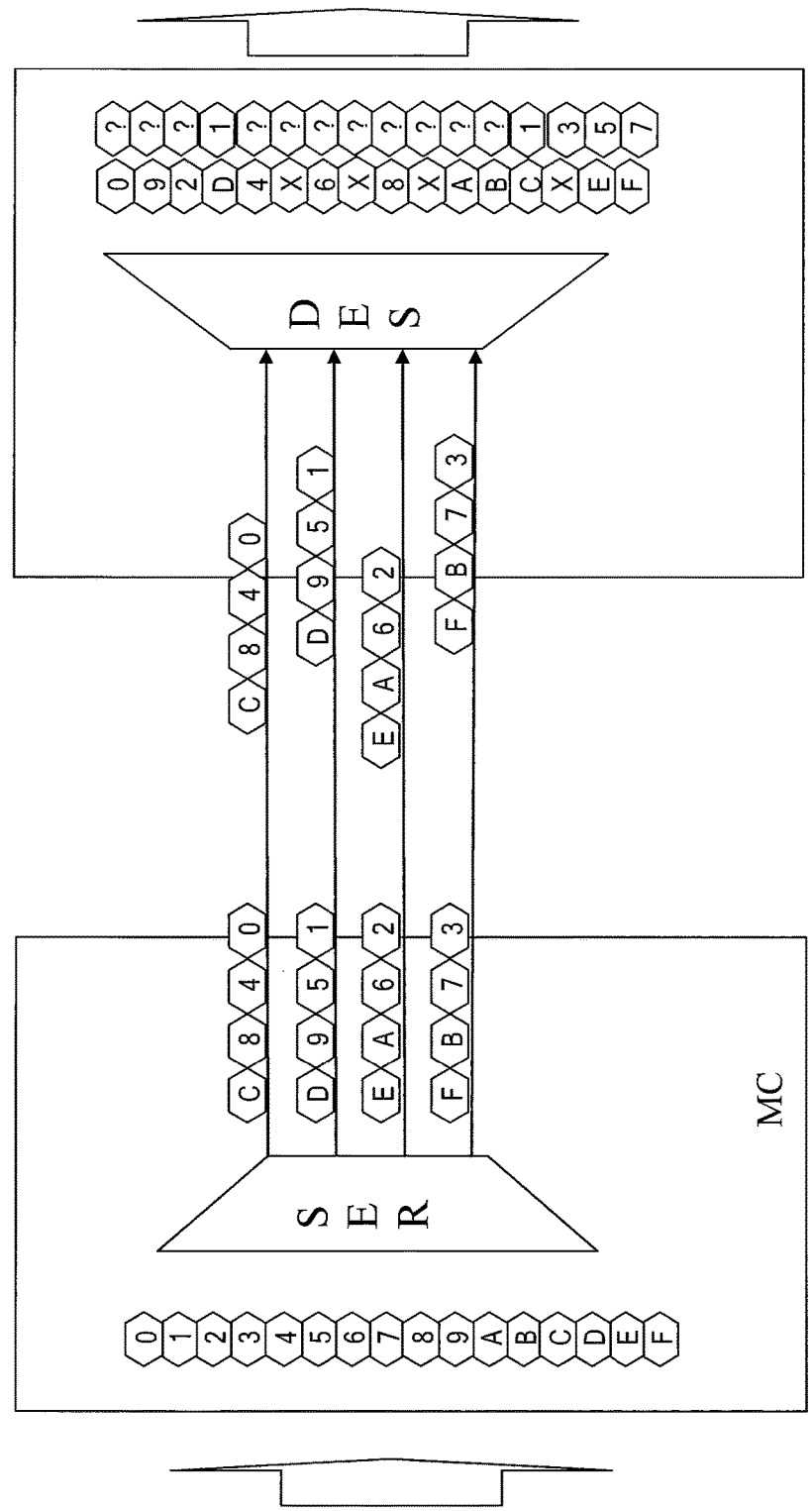

FIG. 29B shows the same operation, but in a situation where the bits do not all travel along the links at the same speed and arrive more than one clock cycle out of step with each other. The cause of this differential delay may be, for example, differing line lengths between the modules. As shown, bits 1, 3, 5 and 7 arrive earlier than the remaining bits and, unless time delay skew is accounted for, the bits may be interpreted as being part of the preceding transmitted word. The remaining bits would be interpreted as being in the next word, and the data would be corrupted.

Figure 30:
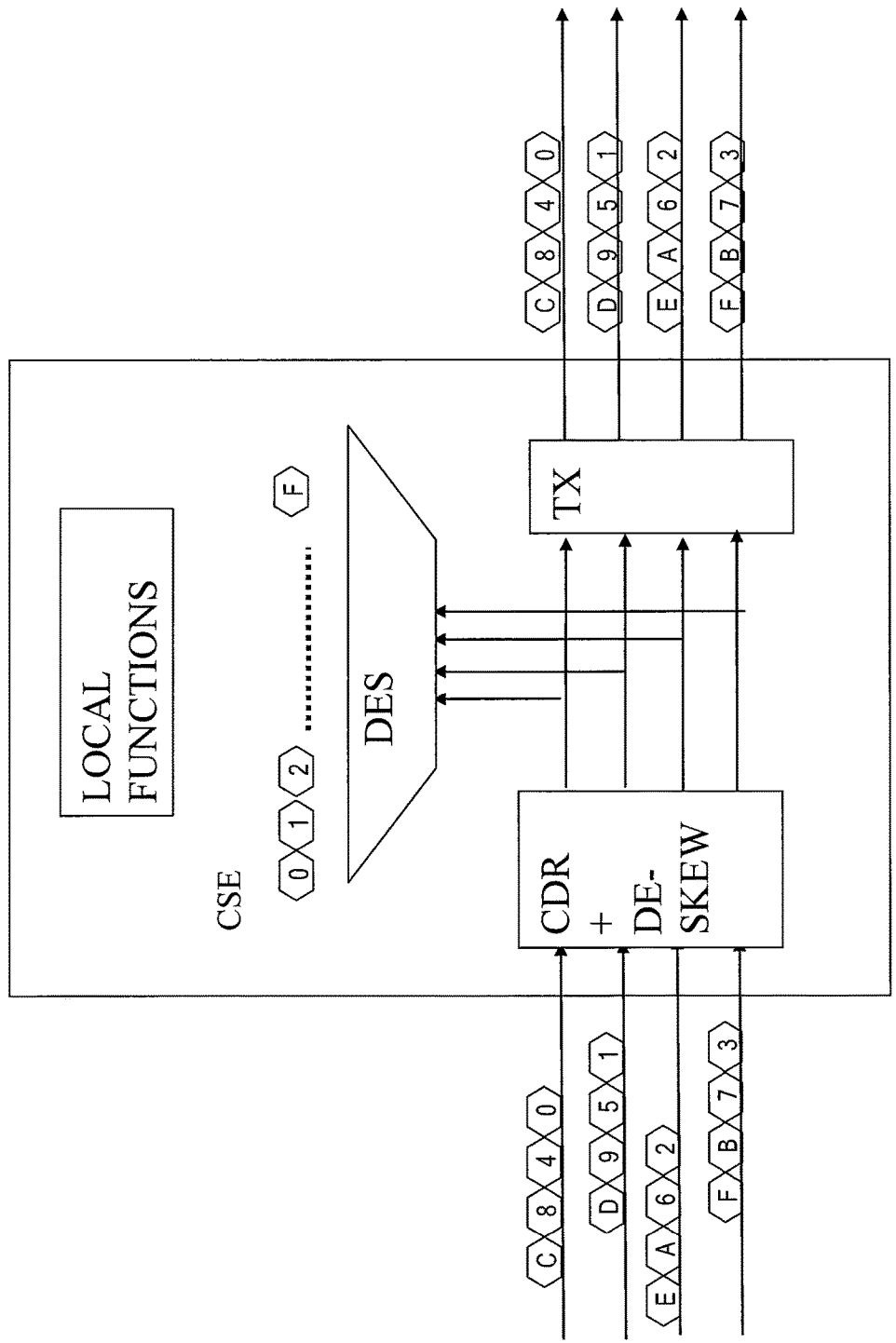
FIG. 30 shows a method and apparatus for overcoming skew.
Figure 31:
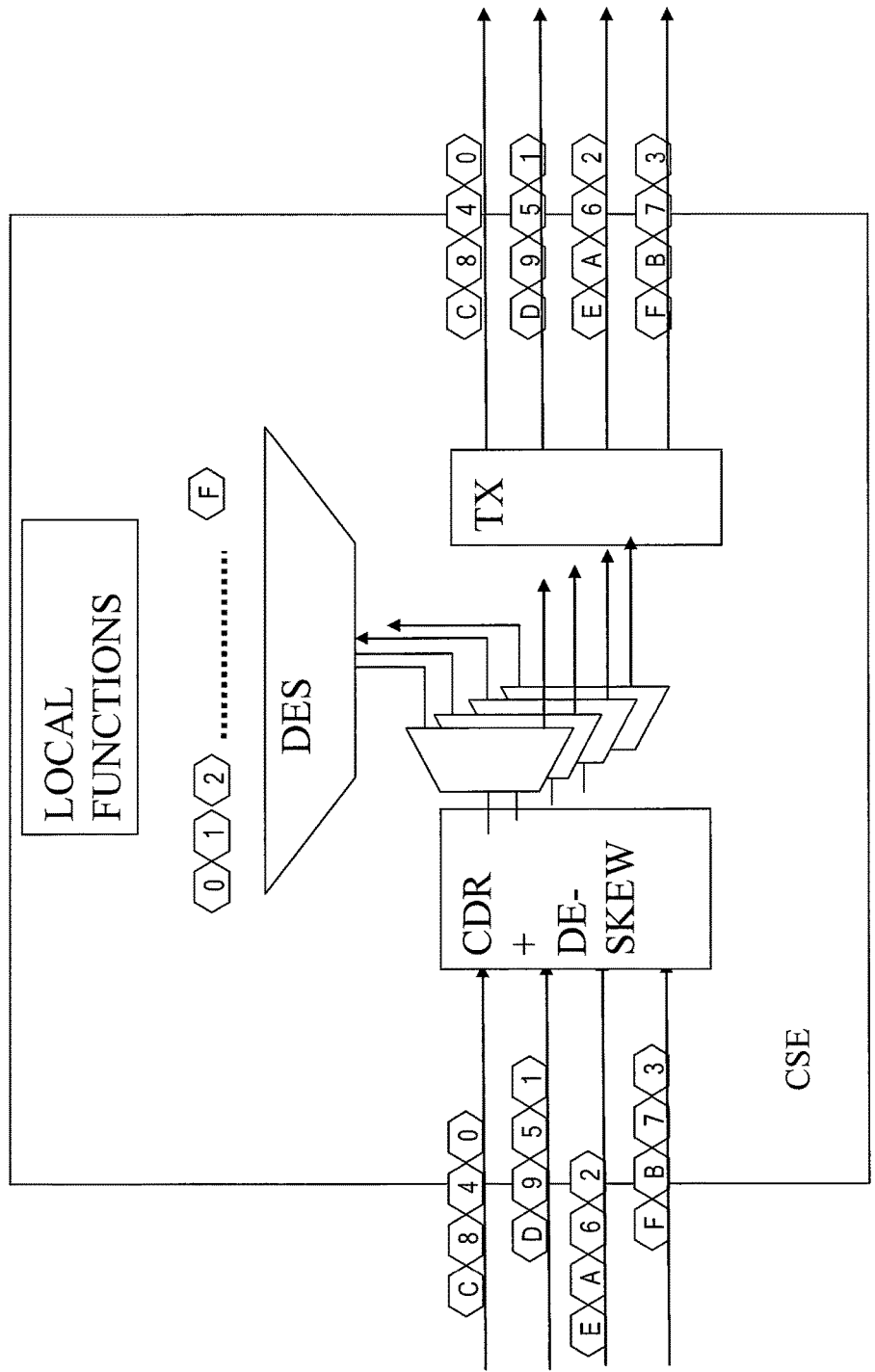
FIG. 31 shows a de-multiplexer inserted after the de-skew.

In an aspect, FIG. 30 illustrates a method and apparatus for overcoming the skew. A switching element with clock data recovery (CDR) receives the skewed data. Alternatively, the CDR may not be used. De-skew consists of delaying each lane by a time such that the delays in all lanes are equalized. The de-skewed data is then applied to a de-serializer (DES) and the originally transmitted word is recovered, and used by the CSE or other local function. Although the individual functions are shown separately, some or all of the functions described may be performed in the same electronic device, or may be integrated in a module. Nor is it necessary for de-skew and the CDR to be performed in the same circuit. Further, as shown in FIG. 31, de-multiplexers 330 may be inserted between the output of the CDR and de-skew 340, and the DES and transmitter TX (350) such that the data input may be sent to the DES (320) or TX (350), or both. Such a configuration permits acting on a determination as to where the message should sent such that the data nay be sent to the DES or the TX as appropriate, rather than being processed by all of the circuits.

Figure 32:
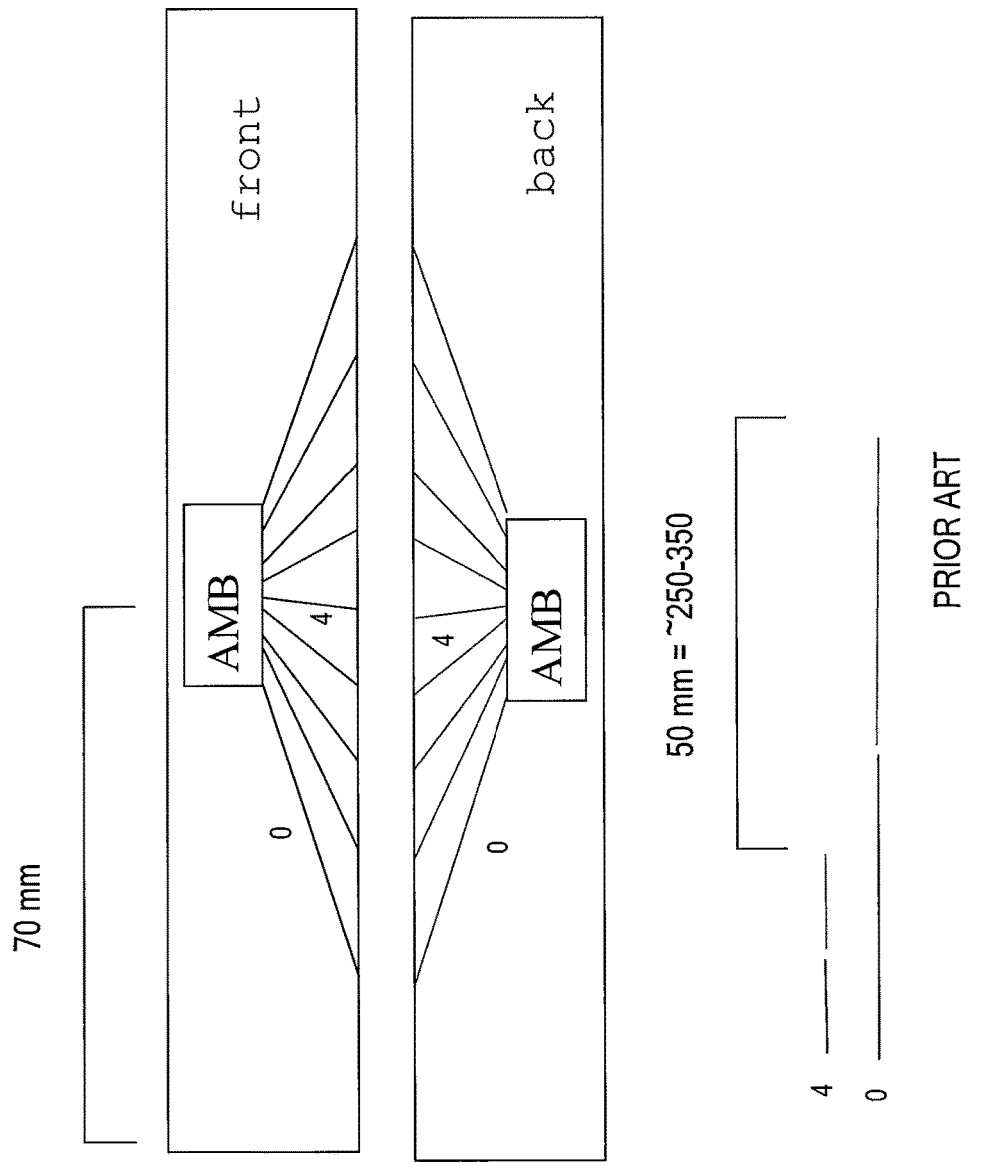
FIG. 32 shows one source of data skew in an INTEL Advanced Memory Buffer (AMB)

Among the causes of skew is the situation shown in FIG. 32 where an INTEL Advanced Memory Buffer (AMB), or the like, is in a module which is disposed on an extender board that may be inserted into a connector. Such arrangements are used for FB-DIMM, registered DIMM, and the like. The message on the upstream path is shown coming from a downstream module, having a number of lanes, where lane 0 is on the left, lane 4 is in the middle, and so on. The upstream path interfaces with a front side of the connector and, after passing through the AMB, connects to a similar arrangement of lanes on the back side of the connector. Note that while the AMB is shown on a front side and back side of the plug in board, separate AMB elements are not required to perform this function. Additionally while the lanes are shown only to the edge of the AMB they may connect underneath the AMB if the AMB is in a ball grid array (BGA) package or other package which allows connections not only at the edge thereof. The lanes emerge from the AMB to a connector on the back side of the board. The lanes on the back side of the board are also disposed such that lane 0 is on the left and lane 4 is in the center, and so on. The lines or lanes shown may be considered to represent traces on the board for connecting between the AMB and the board interface connector (not shown). The lanes are disposed as shown so that more than one module can be connected by a motherboard with traces connecting the mating module interface connectors without a need for crossing traces. In this aspect, the time for signals to propagate between the pins of successive connectors on a mother board may be approximately the same for each lane. However, this is not the situation on the module board. Lane 4 has a short distance to travel from the connector to the AMB, whereas, for example, lane 0 has a larger distance.

For illustrative purposes, a standard size DIMM module is used as a reference. Such modules are about 140 mm in width, and therefore, the distance to lane 0 from the center, where the switch is located, is about 70 mm. Attributing a length of 20 mm to the length of lane 4 between the AMB and a corresponding pin on the connector, the maximum differential length, in this example, between the shortest and longest traces is about 50 mm, which corresponds to an approximate difference in propagation time of about 250-350 ps. This represents the estimated situation with an existing DIMM. Where the data rate is nominally 4 GB/s, this may result in one or two clock periods of skew from this effect alone.

While several standardized DIMM or memory modules exist, the term DIMM or memory module as used herein should be understood to refer to any of the memory types which may be used as mounted to a circuit board having a connector interface for connection to other modules circuits and the like. The number of pins or traces, the dimensions of the circuit board, and the capacity and type or types of memory on the DIMM or memory are not restricted to such pin counts interconnect counts, dimensions, types and capacities as are now being used.

Figure 33A:
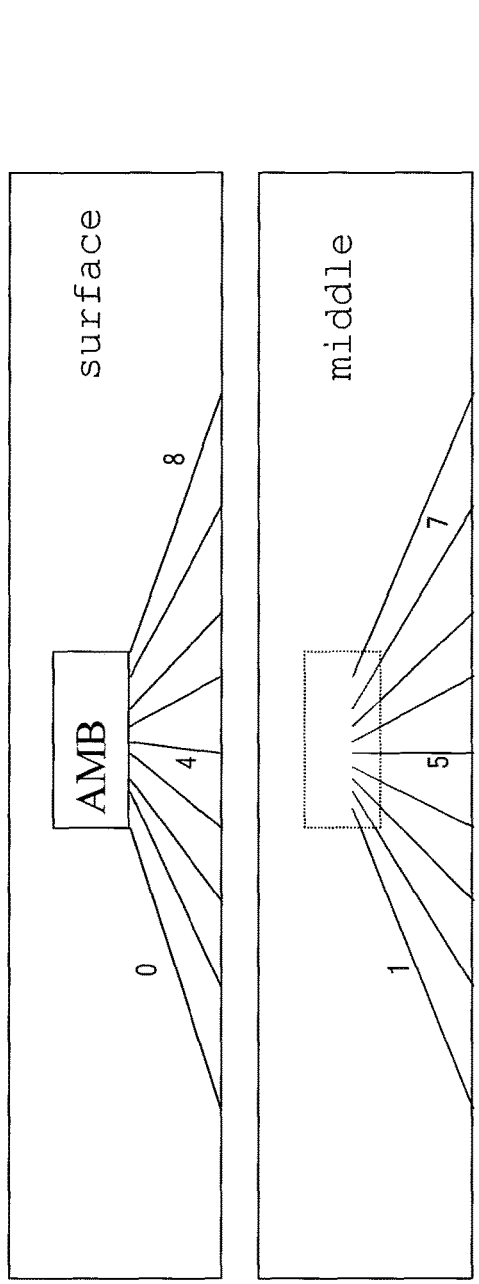
FIG. 33A-B show signal routing to mitigate data skew.
Figure 33B:
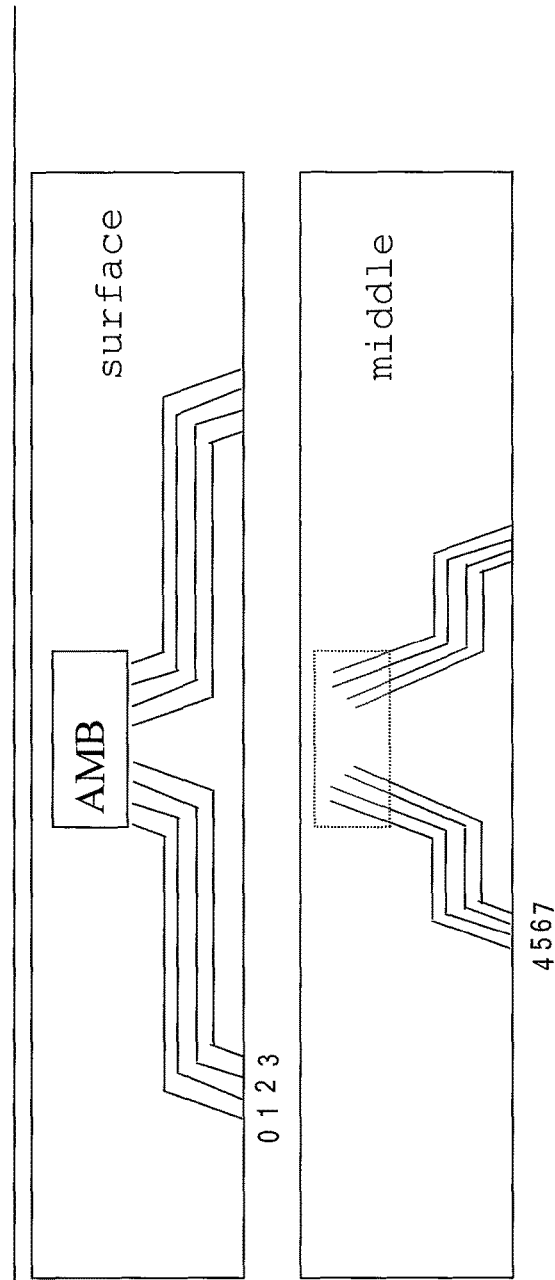

FIG. 33A, B show how different approaches to signal routing may be used to mitigate the differential propagation time problem. FIG. 33A shows a situation where the traces are fanned out directly from the CSE to the connector. FIG. 33B shows a situation where the signal lines with longer traces are routed on the top of the board and then another set of signal lines are routed from the middle. In such a circumstance, the propagation distances for some traces are greater than in FIG. 33A, however the difference in trace length between groups of signals, such as between 0, 1, 2 and 3, or between 4, 5, 6 and 7 can be reduced. While there may still be a difference between in length between groups of traces, the process of delay management and signal de-skew may be simplified by reducing the delay variation from, N different delays for N signals to 2 different delays in the example of FIG. 33B.

Figure 34:
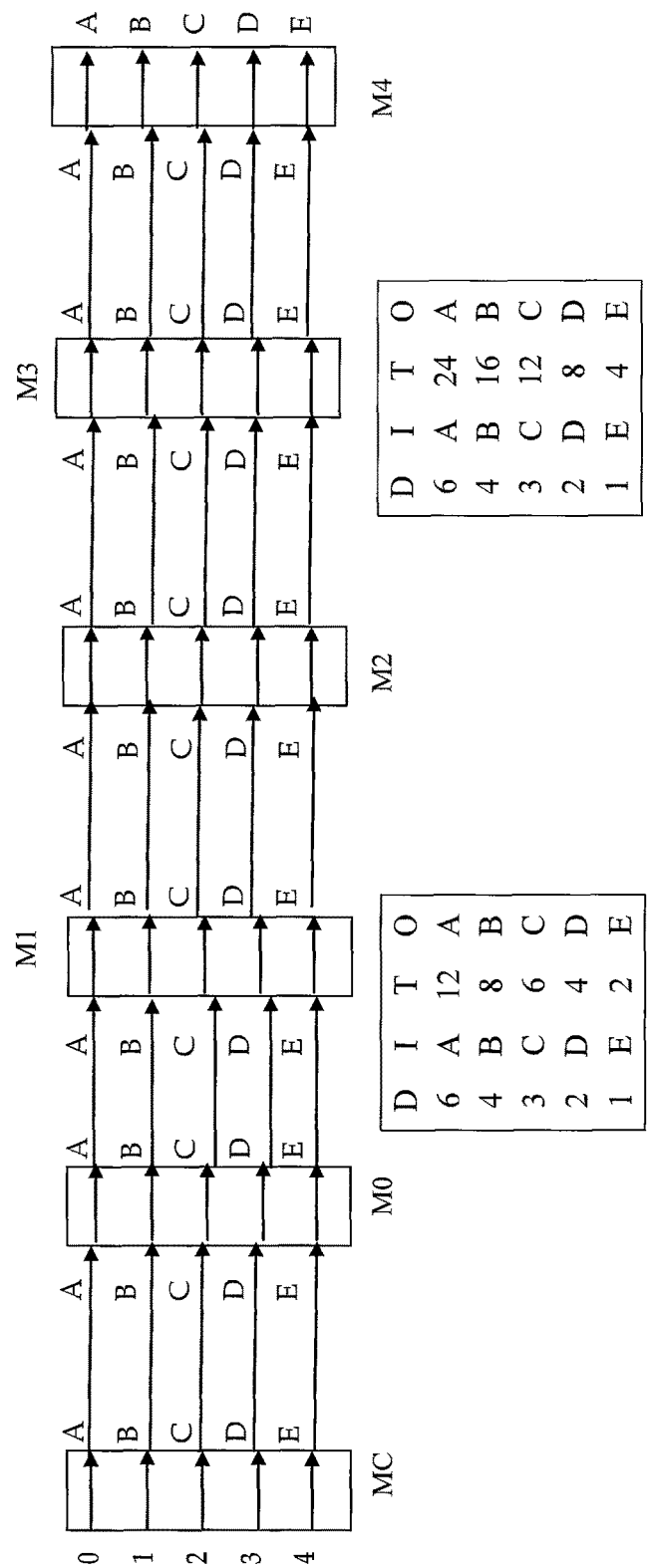
FIG. 34 shows data skew resulting from transmission through 5 modules.

FIG. 34 shows an example of transmission from a module controller MC, shown at the left had side of the figure through five modules, for lanes 0-4. The data being transmitted from the MC has been designated as A, B, C, D, and E corresponding to the lanes. At each of the downstream modules a table shows the logical name of the input "I", the delay "D" experienced by the data on that lane, the total delay "T" from the MC to the present position along the data transmission path and the logical name of the output data "O". The rows of the table correspond to the order of the lanes; thus the upper row shows lane 0 and the bottom row shows lane 4. In this example, a delay is associated with each lane, and the delay may be different for each lane. The delay may be interpreted as a differential delay with respect to a notional lane with no excess delay or of the delay from the transmitter on the previous module, or the MC, to the receiver on the receiving module.

For this example, where the delay between modules is presumed to range from 1-6 (arbitrary units) for illustrative purposes, and the input and the output lanes from each module has the same data assigned at the output of a given lane number as that which arrived on the input, the output data pattern associated with each module is the same as the input data pattern: A, B, C, D, and E associated with lanes 0-4 respectively. By following the progression of the tables from module-to-module in the downstream direction, the total delay for each lane is the sum of the delays for that lane between the MC and the module for which is associated with the table. For example, the total delay experienced between the MC and the 5th module (M4) is 30 units for lane 0, but only 5 units for lane 4. The other lanes, in this example, experience intermediate amounts of time delay. If the delay units were associated with clock cycles, then the data on lane 0 would arrive 25 clock cycles behind that for lane 4. The delays are given in integer values and which are the same in a given lane between each of the modules are for illustrative purposes only. The delays need not be integer valued nor must they be the same at each hop between modules for a given lane. In this example, if the total length of the command, or packet, or frame, being sent was, for example, 10 clock cycles, then about 2.5 commands would be in the process of being received at any time by module M4. Thus the last module may need to buffer more than two complete commands at any time before it could process the first command, as all of the bits of the first command will take this long to be received as a complete group. In this example, the second command and part of the third command will have begun to have been received at module M4 before all of the bits of the first command will have been received.

Figure 35:
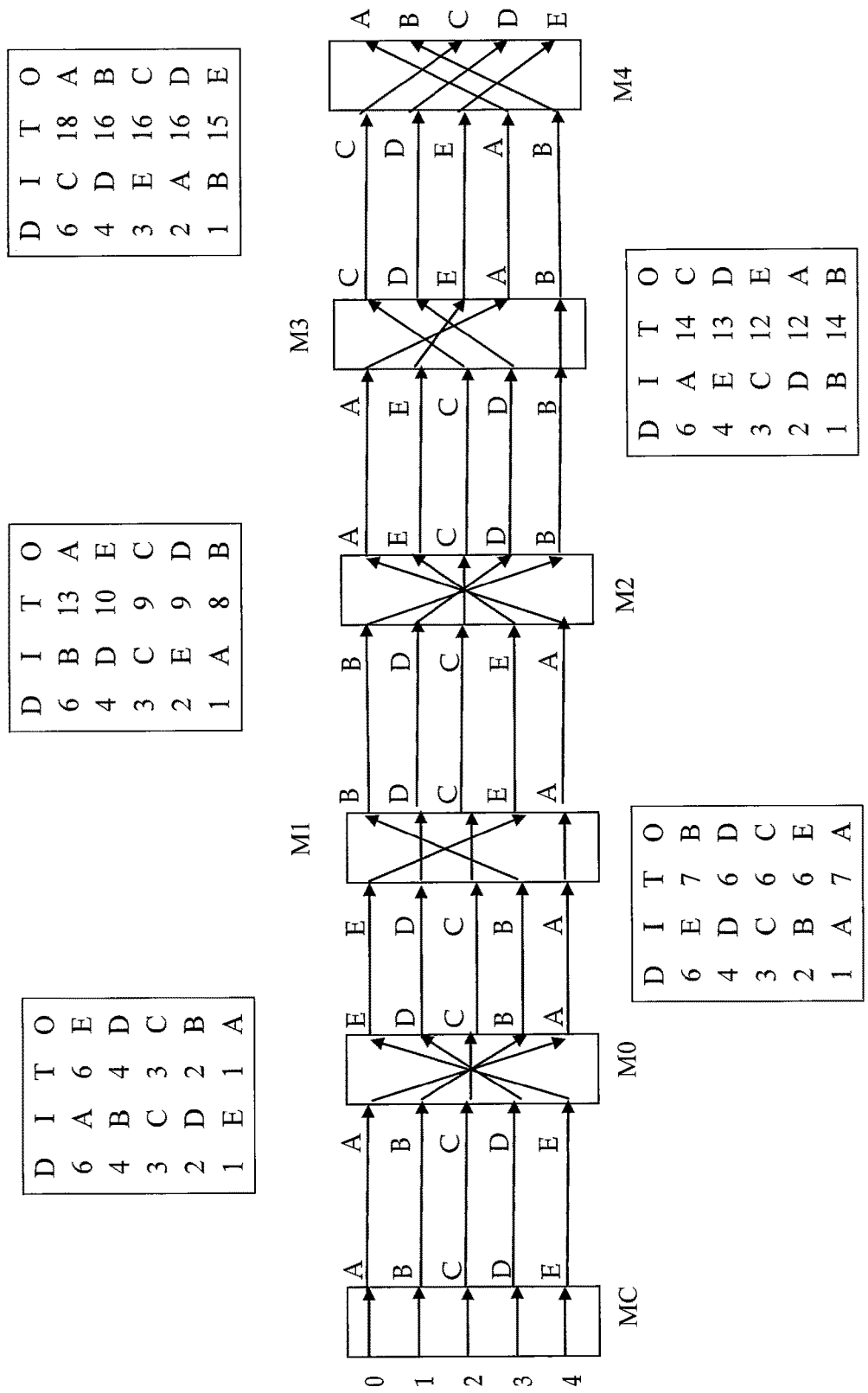
FIG. 35 shows a device and method for reducing differential time delay between lanes.

FIG. 35 illustrates a device and method for reducing the differential delay between the lanes, so that the accumulation of skew in a system may be mitigated, and the number of commands that may need to be contemporaneously processed at each node or hop may be reduced. In this device, the input data to each module may be output to a different data line from the input data line, with respect to the layout on the plug-in module or the circuit board or substrate. The actual physical arrangement of the lanes is the same as in FIG. 34 for purposes of the example of FIG. 35. However it should be understood that using AMB or a CSE may result in differing numbers and types of links and signal lines. The example is meant to illustrate the differences between performance of the existing AMB, as previously described, in a data skew sense, and the method and apparatus of the present application. In some instances, the input and output data lines have the same logical assignment as previously, so that only some of the data may exit on a different lane.

For example, at the first module (M0), the data A that came in on lane 0 is output on lane 4; the data B that came in on lane 1 is output on lane 3; the data D that came in on lane 3 is output on lane 1; the data E that came in on lane 4 is output on lane 0; and, the data C that came in on lane 2 is output on lane 2. At the output of module M1, the differential delay situation is the same as shown for module M1 in FIG. 34. However, when considering the table for module M2, the situation has changed. As an example, the data A, which is now on lane 4 for the transit between modules M1 and M2, has only accumulated the delay associated with lane 4, which is 1 unit; and, the data E, which is now on lane 0, accumulated the delay associated with lane 0. At the second module M2, it is seen that the delay for the data E is 7 units and the delay for the data A is also 7 units. Delays for the other data B, C, D are not exactly the same, but are close in value, and the re-assignment of logical and physical data lines has reduced the spread in delays.

Following the reassignment or exchanging of the data A-E to lanes 0-4 at each module, the difference in delay between the various logical data assignments A-E is seen to accumulate monotonically, as in the previous example. The data may continue to be exchanged at each module. At the last module (in this example M4), the associated table shows that the range of delays associated with the various logical data elements ranges from 15 units to 18 units, for a total delay spread of 3. This may be compared with the example of FIG. 34, where the delay spread was 25. Interchanging the correspondence between the logical data assignments and the physical lanes thus may reduce the amount of data which may need to be buffered before all of the data for a given clock period at the transmitter has been received at a module by about a factor of 8. In this example, the bits are reordered in module M4 into the same logical order as were transmitted.

The bit assignment strategy used in the example was to select the data which had experienced the highest delay and assign it as an output to the lane having the lowest delay. Similarly, the data with the lowest delay is assigned to the lane with the highest accumulated delay.

In the description, the delays are given integers values for simplicity of presentation; however non-integer values are also possible as the delay is stated in arbitrary units representing some factor multiple of the clock rate. Alternatively, the delay and differential delay may be expressed in integer and fractional clock durations.

FIG. 36 illustrates an example where the delays between module pairs are substantially unequal. Only two lanes are shown, however this arrangement may be generalized to any number of lanes. The two lanes shown may represent lanes on which commands are transmitted. FIG. 36A illustrates a situation similar to that shown in FIG. 35, where the lanes are swapped such that the difference in delay is minimized at every hop along the path. A swap is made at the first and third modules, and no swap is made at the second and fourth module. The lanes would have been reordered, if it had been necessary, at the fifth module. But, the delay in lane 0 between the fourth and fifth module is 10 units, whereas the delay in lane 0 is 1 unit. As the differential delay had been minimized along the path, the large difference in delay at the last hop becomes evident in the total differential delay at the fifth module, where the total delay for lane 0 is 18 and the total delay for lane 1 is 9 units, and the difference between then is 9 units. FIG. 36B shows an alternate situation, where the differential delays are permitted to accumulate along the path until the last but one module, and then the lanes are interchanged, and the interchange reversed at the last module. At the last module the differential delay is zero; however, it should be observed that as the differential delay between the fourth and the fifth module is substantial, a significant differential delay has been allowed to build up prior to module where the interchange is performed so that the differential delay after the interchange is performed is reduced.

The delays are shown as having been previously determined, as the basis for the setting of the lane swapping switches. Such a determination may be made at the time of system design or prototyping, the time of manufacture, the time of assembly of the modules into a system, system start up, each system start up, or by measurements made during the operation of the system. The selection of the time or times to perform this determination may be associated with the desired performance and the complexity of the system, and may take into account manufacturing variability and temperature effects as well as active or passive component failure or degradation.

The function of interchanging exchanging or "swapping" lanes may be performed by a switch, however the use of the term "switch" does not serve to limit the specific implementation of the function to a discrete device; any mechanism that achieves the interchanging, exchanging, re-assignment or swapping of the lanes may be used. For convenience the term "switch" when applied to this aspect of the system or method is meant to encompass the range of techniques which are available to perform the function. Such techniques may use memory storage locations, operation of a state machine or a stored program computer, and dedicated electronic logic circuits and the like, either alone on in combination. Such switching may be performed on a static or a dynamic basis, depending on the design requirements of a specific product.

Figure 37:
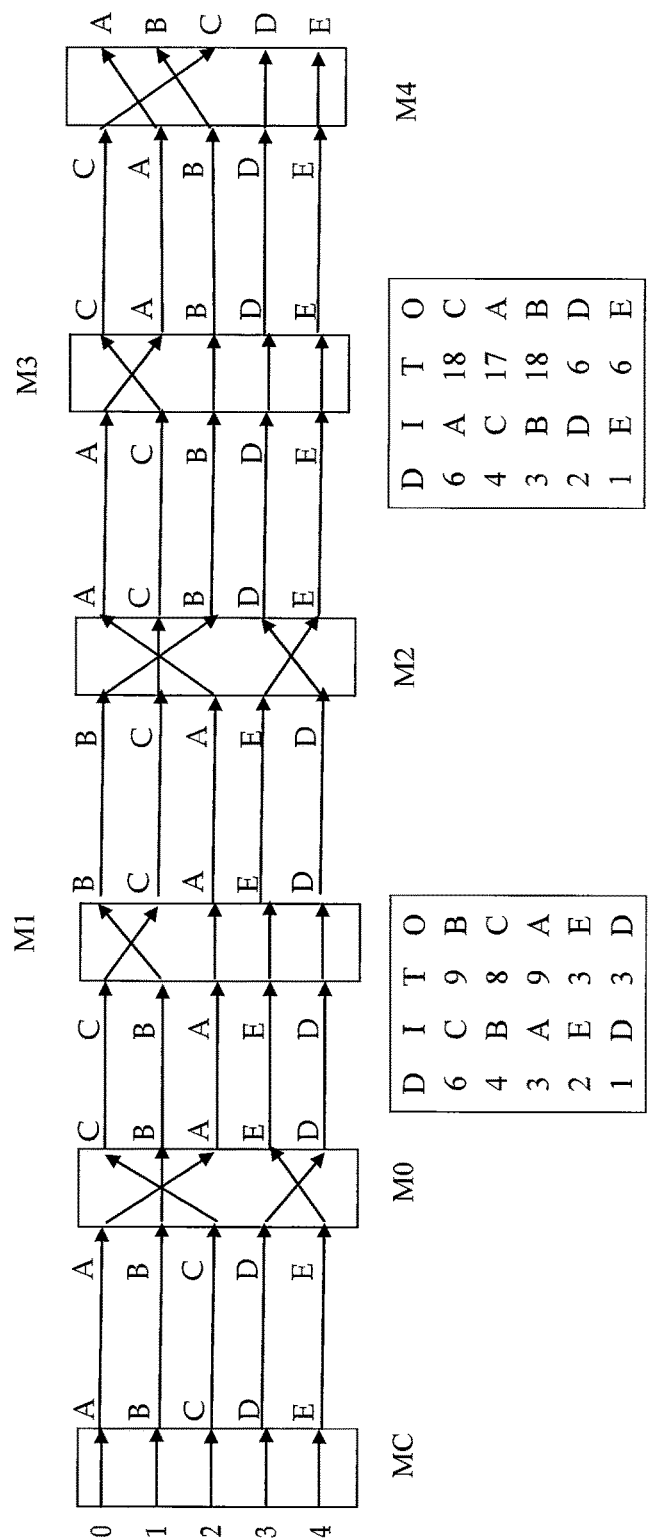
FIG. 37 shows an example where lanes 3 and 4 are used as signaling channels.

FIG. 37 shows an example where lanes 3 and 4 are used as signaling channels, and were chosen as the lanes having the lowest overall delay, whereas lanes 0-2 are allocated to data signals. The signaling channels are de-skewed by interchanging such that the propagation delay is shorter than that of the data channels so as to have the command arrive at the same time or earlier than the data. The data channels are de-skewed by one of the methods previously described. While this example confines the signaling lanes to lanes 3 and 4, the signal lanes may be swapped into any of the lanes such that the commands arrive at the same time as the data at the destination module. Moreover, some of the data may be routed over lanes having a shorter delay than being used for the signal on a particular hop, so long as the overall differential transmission time is such that the data and command signal are received in a timely manner. Doing this may result in minimizing the overall delay time for the data signal.

Figure 38A:
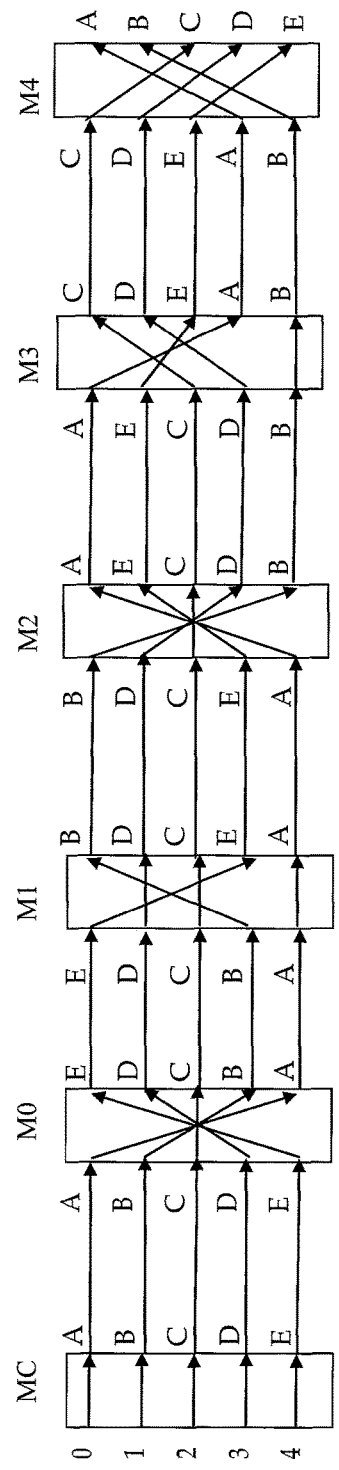
FIG. 38A-C show a pattern of exchanging data elements between lanes.
Figure 38C:
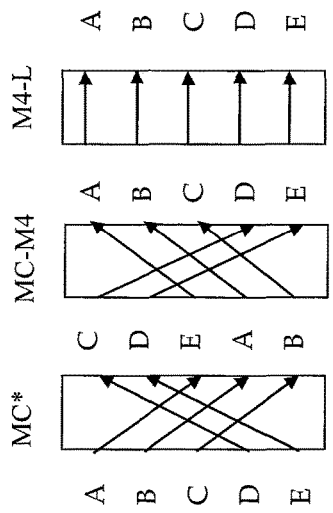
Figure 38B:
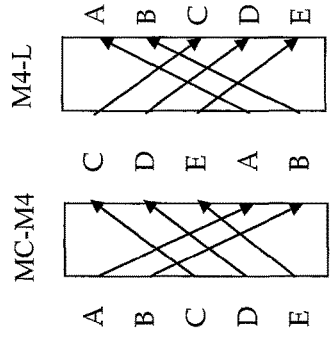
Figure 39A:
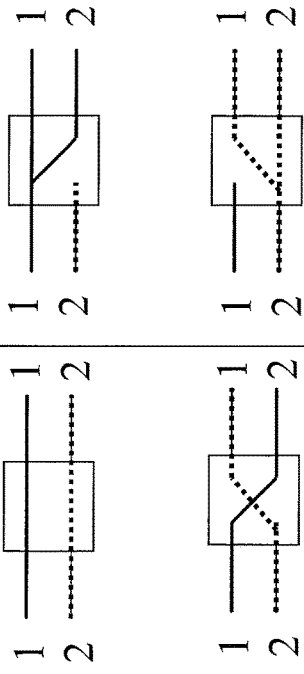
FIG. 39A-E shows an example of a Batcher network.
Figures 39B, 39C:
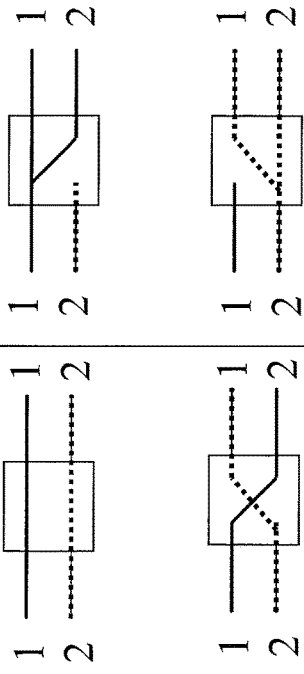
Figure 39D:
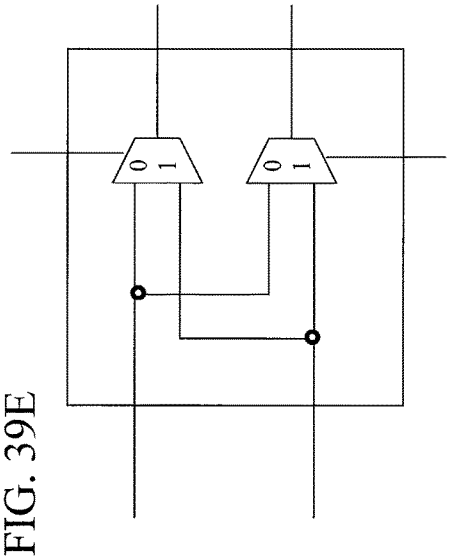
Figure 39E:
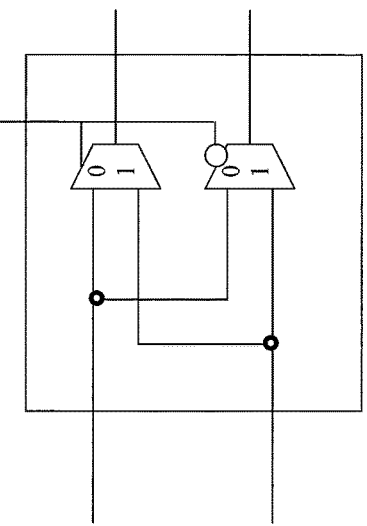

FIG. 38A shows a pattern of exchanging the data elements between the lanes in order to minimize the differential data delay at any module. The tables of delays are not shown, but are presumed to have led to the pattern of swapping that is shown. At M4, the data arrive in a swapped order C, D, E, A, B, whereas the expected order is A, B, C, D, E and this order is restored by swapping the data appropriately inside module M4 such that the data is presented to the remainder of the system in the expected order. FIG. 38B summarizes the overall effect of the swapping as seen from the output of MC to the input of M4 and within M4. That is, the intermediate hops, and the swapping that occurs at each hop may be logically replaced by a single swapping of lanes from MC to M4 and a swapping of lanes inside M4. This represents the end-to-end transformation that obtains. The configuration of the switches at each module is as shown in FIG. 38A, but the ordering of the data at the MC is such that the same result is achieved at the input to M4. In another aspect, shown in FIG. 38C, the switch arrangement remains unchanged but the order of the assignment of the data to the lanes is pre-permuted at the MC prior to transmission such that it is received at M4 in the expected sequence and no reordering is required in M4. Such an approach may minimize the delay in processing at each module, and when the process is performed in the MC, the pre-permutation may be done while the command and data are still in an output queue and the time to perform the operations may be subsumed in other system processes. Such pre-permutation may also to simplify the data path within the CSE by allowing incoming data to either be permuted for transmission to the next module or to be read without permutation for use by the local CSE. If the CSEs have been arranged in a branching configuration such as a tree, then a large fraction of the CSEs in the system may be leafs and have no other CSEs downstream from the leafs. This pre-permutation may be made in a static or dynamic manner.

The situations illustrated are directed to a MC to module transfer, but may be effectively used for other paths, such as DMA transfers between modules, and for different channels or branches of a tree. While the discussion has addressed the path from a MC, for example to a module, these operations may be equally performed in the reverse direction.

FIGS. 39-42 illustrate various examples of switches and switching methods which may reassign logical data to lanes. In FIG. 39A a Batcher network configuration is shown in having four switch elements for connecting lanes numbered 1-4 at the input to lanes 1-4 at the output. FIG. 39B, the configuration of a 2×2 switch in such a network is shown, where the switch configuration is capable of two positions: in one of the positions, the lanes are passed through so that the input lane and the output lane are connected to the same lane number; in the other position, the switch interchanges the lanes between the input and the output. FIG. 39C illustrates a switch which, in addition to the functionality shown in FIG. 39B, also includes a copy function, where the input of lane 1 may be duplicated to the output lanes, or the input of lane 2 duplicated to the output lanes. FIGS. 39C and D show the switches in electronic schematic form where the circuit element is a 2 to 1 multiplexer. In FIG. 39D, the configuration of FIG. 39B is realized and in FIG. 39E, that of FIG. 39C is realized. A difference between the two circuits is that in the case of the 2×2 switch without copy function, the multiplexer select lines are activated in common, with one of the multiplexers having a NOT input 420. In the 2×2 switch with copy function, the individual switches are separately controlled.

Figure 40B:
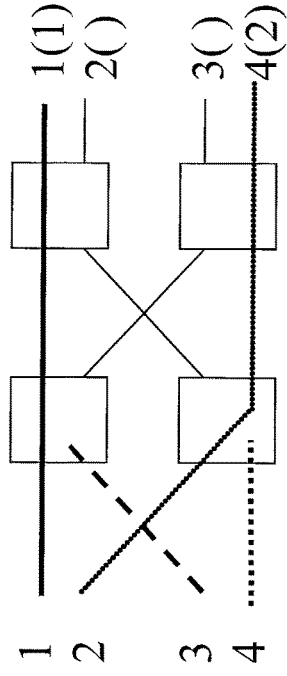
FIG. 40A-D shows another example of a Batcher network (A-C), and a Clos network (D)
Figure 40D:
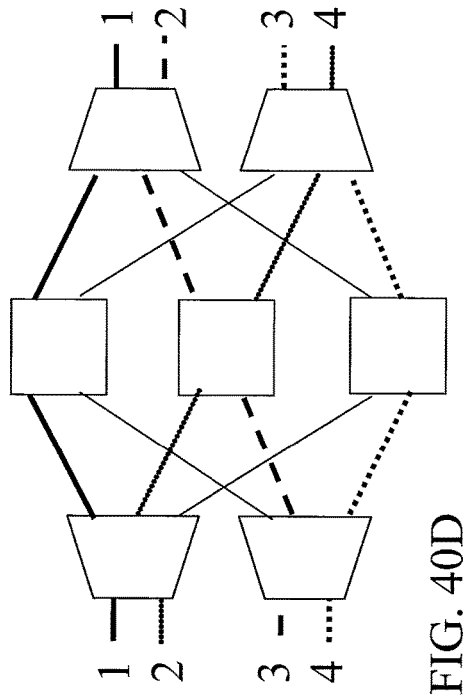
Figure 40A:
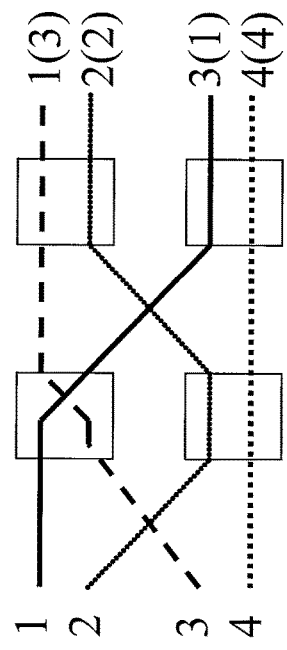

FIG. 40A illustrates a Batcher network being used to swap input lanes designated 1, 2, 3, 4 so that the ordering is 3, 2, 1, 4 (the output is shown with the output lane number first and the number in parenthesis shows which input lane is being transmitted over that output lane). However if an attempt to make an output assignment of 1, 3, 4, 2 was desired, FIG. 40B shows that a path would be blocked.

Figure 40C:
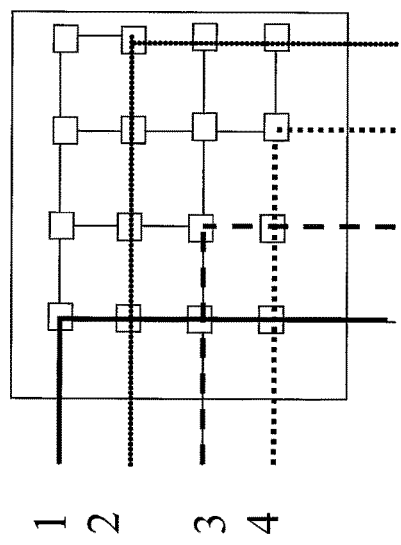

FIG. 40C shows a non-blocking crossbar-switch matrix. This type of switch may be used to perform any necessary swap. Another type of switch is a Clos network, shown in FIG. 40D, which is of a type known as strictly non-blocking, wherein it is possible to change the ordering between the input and output lanes, while only changing those lanes whose assignments are actually changed.

Figure 41A:
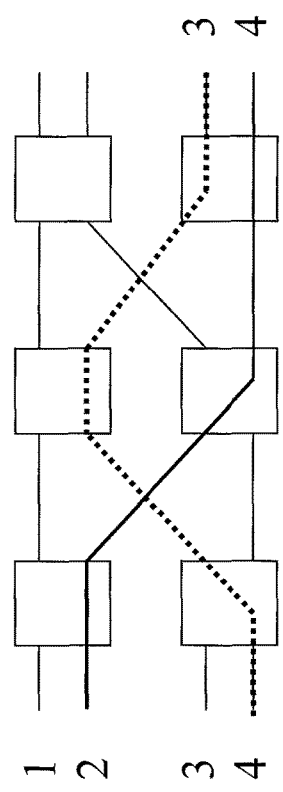
FIG. 41A-B shows an example of a Benes network and an 8 lane configuration.
Figure 41B:
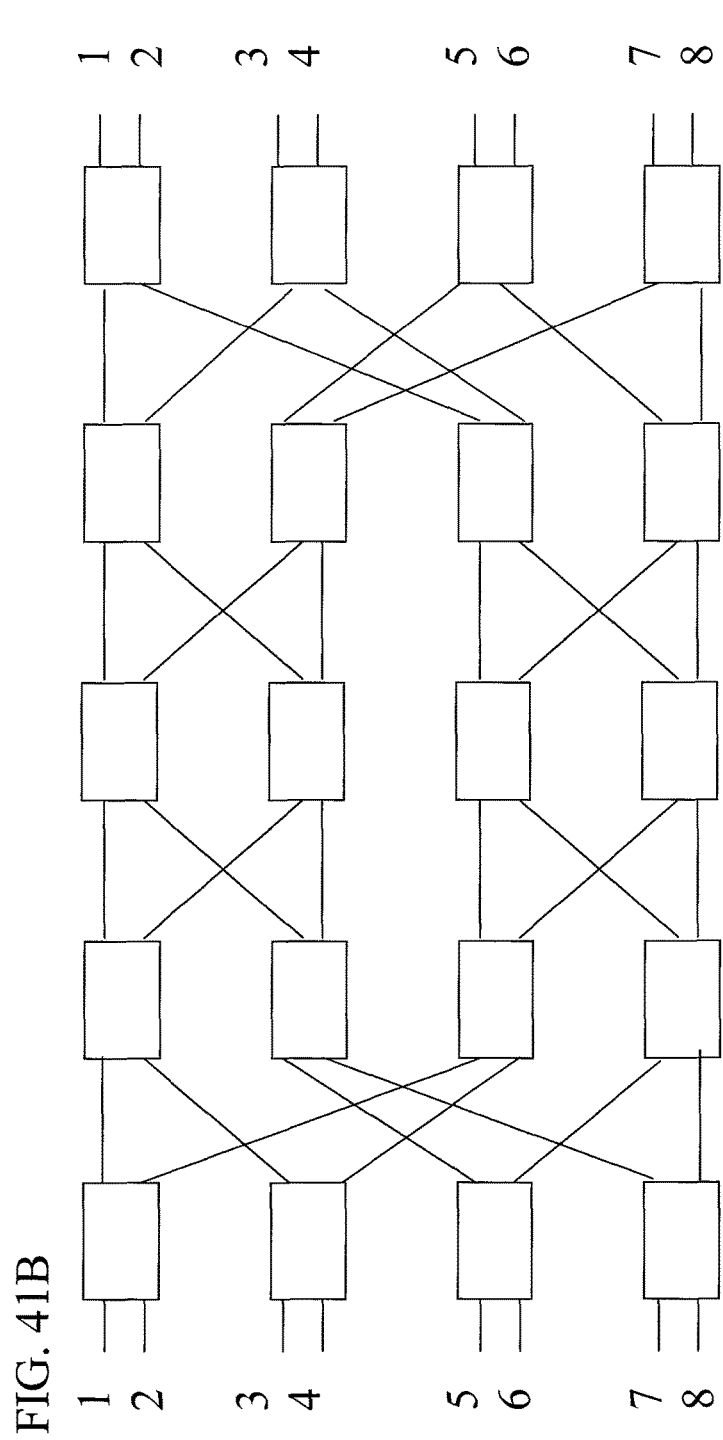

The capability of the Batcher network switch may extended by adding another stage as shown in FIG. 41A, and this is sometimes termed a Benes network. Now, the swapping that was desired in FIG. 40B is possible. However, the additional stage of switching may introduce additional delay. Nevertheless, this is a reconfigurable non-blocking switch. FIG. 41B shows the extension of such a switch to an 8 lane configuration. The breadth of the switch is not limited.

Figure 42:
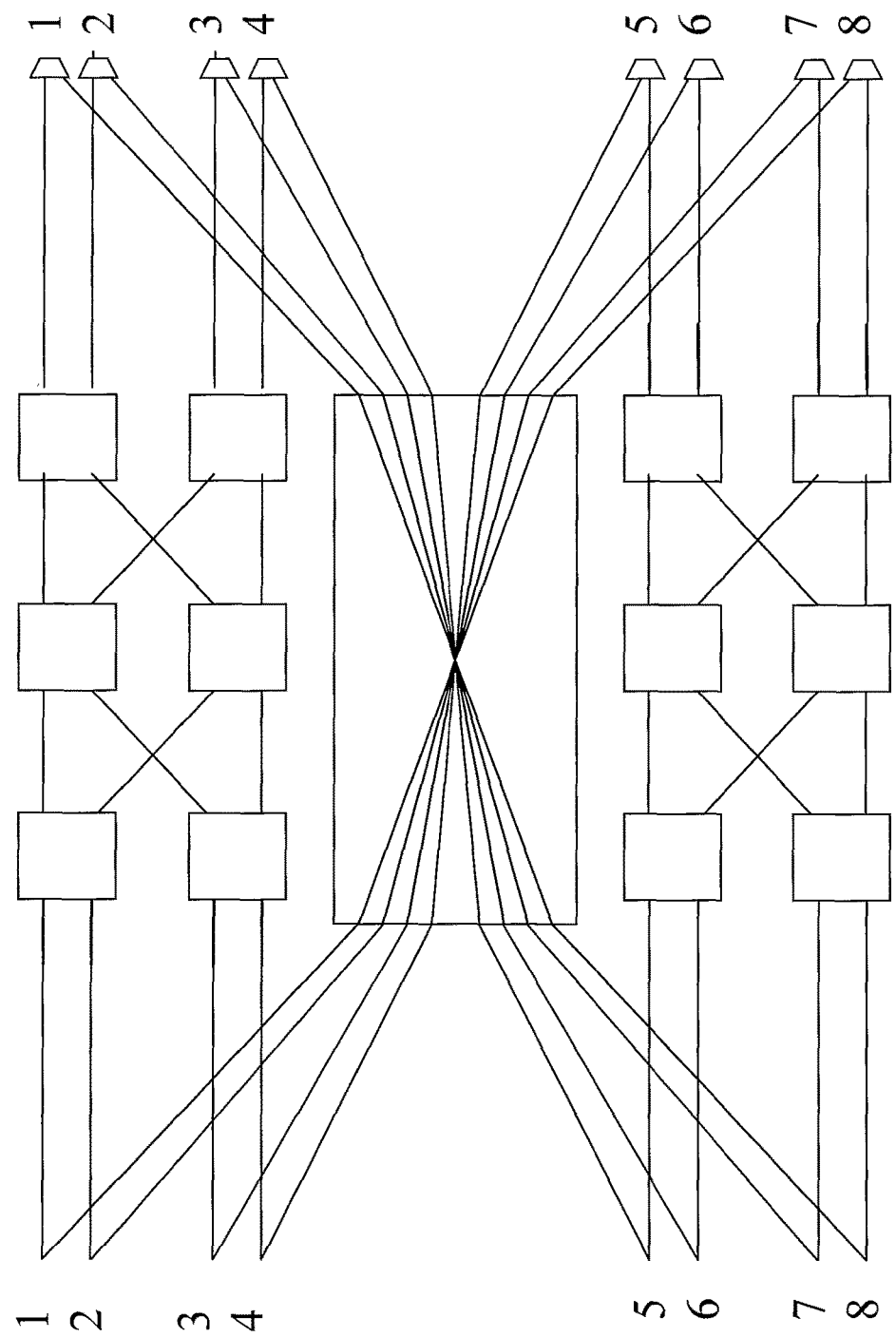
FIG. 42 shows an example of lane exchanging where a full swap is made for some lanes.

In some arrangements, it may be found that one or more patterns of lane interchange are frequently encountered. FIG. 42 illustrates a situation where a full swap is a common requirement for some lanes of a system, and is shown with a device a circuit element connecting between, for example input lane 1 and the multiplexer that outputs to output lane 8. The other inputs and outputs are connected similarly. Also shown are two Benes networks connecting the inputs and inputs to the output multiplexers such that other arrangements may also be configured. The permutations desired are then selected by the output multiplexers in combination with the fixed network and variable configuration switches. While only one fixed network is shown, more than one fixed network may be used with multiplexers having greater input capacity, such as a 3 to 1 multiplexer. As may be done for many of the circuits being described, the circuits not being used may be powered down or powered off, or have their clocks, if any, gated, or any other steps which might be desirably taken to minimize power consumption.

Systems may have variable delays in the timing on a path or in a circuit. The timing variations may result from thermal expansion or parameter variation, or other deterministic or non-deterministic effects. Whenever there are variable delays in a system, the signal propagation time from the root (such as a MC) of a tree to a module is not fixed at a determined value. Small-scale phase variations occur, even if the clocking is such that there may not be a need to correct for phase variations and the data can be latched from a global clock where the clock speed is sufficiently slow that the data is not skewed; but, there are nonetheless different propagation distances from device to device, or from any one device to the head end (root). These considerations still apply as the clocking becomes less perfectly synchronous, where there is skewing of the data or jitter in the global clock, or where there is a phase difference with respect to the global clock and the links are self timed.

Figure 43:
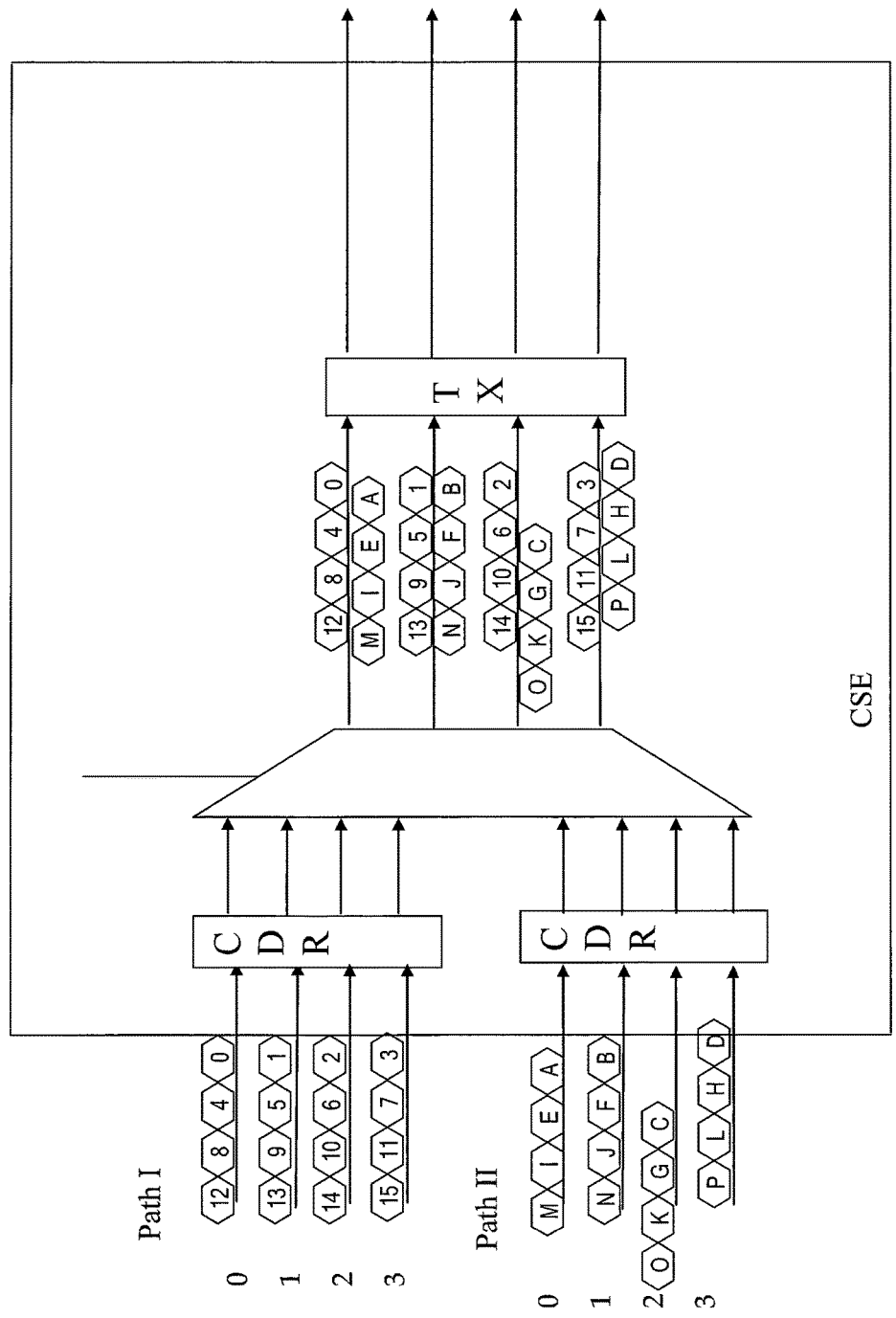
FIG. 43 shows the merging of two data paths at a module.

FIG. 43 illustrates the merging of two data paths, which may arrive at a module, for example, from two separate branches (links) of a tree. At this point the differential delay properties of each tree may be such that a differential delay exists between the branches at this node, and within each branch, between the lanes. The functions being described may be performed in a CSE, or in associated circuits, and the presentation of any of the functions is not intended to illustrate their physical allocation, but to illustrate the function performed in each element.

The data on the four lines of data path are shown as numbers, and the data on the four lines of data path II are shown as letters, for clarity in discussion only. With respect to data path I, the data are shown as being well aligned in time between the channels. The data enter a clock data recovery unit (CDR). A separate CDR may be used for each lane, or for groups of lanes. The data of path II is shown as having a time skew between the lanes. The output of each CDR is input to a multiplexer 500, which is configured to select one of the two groups of input data and output the data to the transmitter TX (510) or other circuit. The four lines connecting between the multiplexer and the TX show both the path I and the path II data, although the effect of the multiplexer is to select only one of the paths. The two lanes are shown after the multiplexer only so that the timing differences may be easily appreciated; however only one of the paths is selected and actually present at the location between the multiplexer and the transmitter TX for a particular multiplexer selection. A comparison of the data presented shows is that there would be a misalignment between the data of path I and path II with respect to a clock, even if a separate clock is used for each data line. For clarity of discussion, a single clock is presumed for each of the two data paths, although a separate clock may be used to each of the lanes of each of the paths.

When the data of either path I or path II has been selected, and transmitted, the effect on the next CSE in a string of CSEs, or any data receiver needs to be considered. For discussion purposes, the next CSE in a string is termed the upstream CSE. At the upstream CSE, which may be configured to be the same as the CSE shown in FIG. 43, the received data will now represent a single data path, on which either the numbered or alpha data has been placed by the multiplexer and transmitted by the transmitter TX. This may be the path I input to the upstream CSE, while another branch of the tree may be the path II input. The following description applies to either the path I or path II inputs, but will be explained with respect to the path I input, whose data came from the CSE shown in FIG. 43.

The CDR may have aligned the recovered clock with that of the path I (numeric) data. When the multiplexer switches to path II (alpha), the clock rate associated with this data may be different, and so the sampling of the data by the clock rate at the upstream CSE may result in errors.

Figure 44:
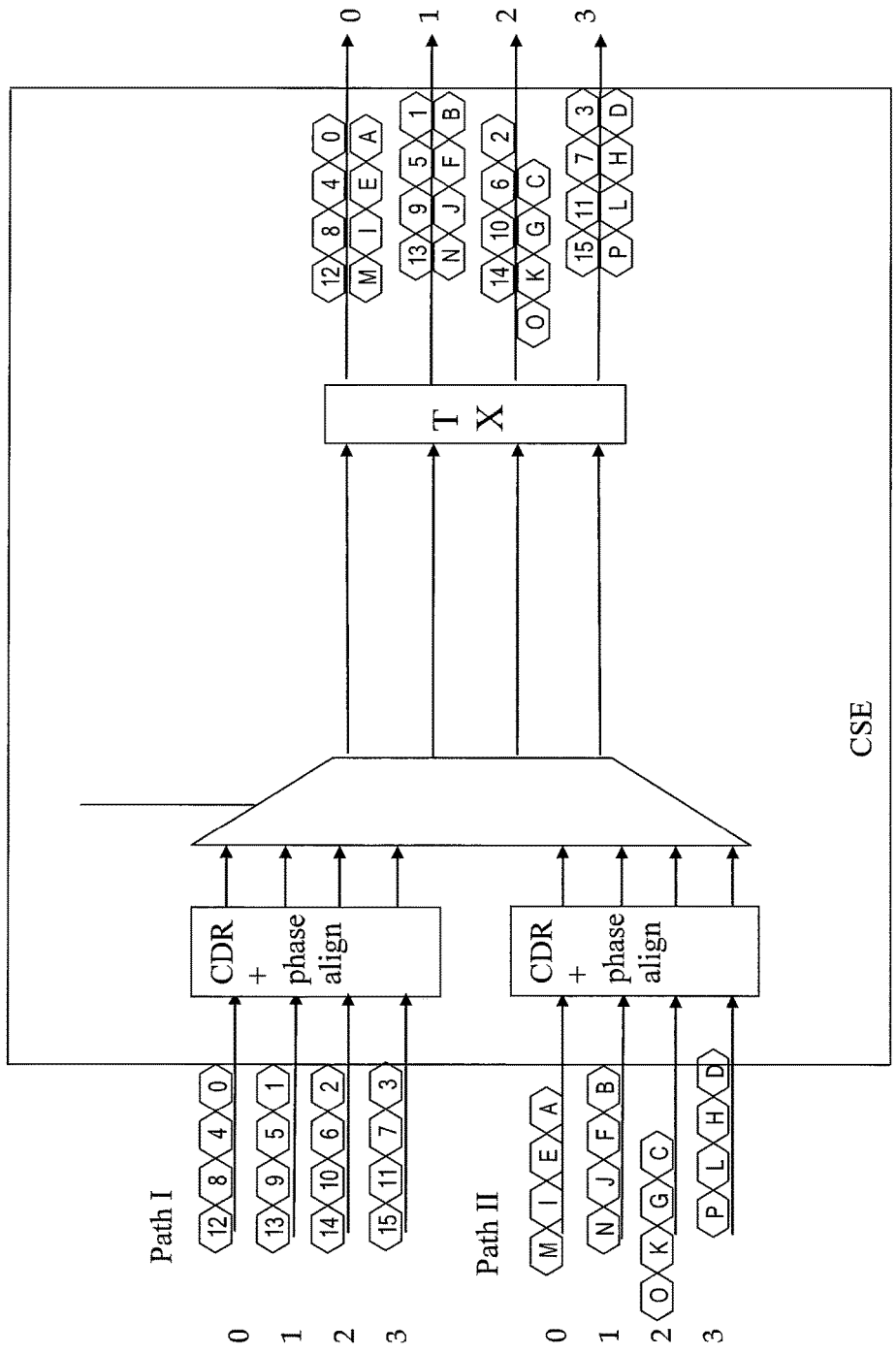
FIG. 44 shows a clock data recovery (CDR) circuit with phase alignment.

FIG. 44 illustrates a circuit which may mitigate the situation, at least in part. The CDR has a phase alignment circuit which adjusts the time delay of the data such that data from data path I and data path II are aligned with a clock edge. This may be seen by comparison of the input data on paths I and II and that of the multiplexed data at the output of the transmitter TX. Recall that only one of the two paths will actually appear at the output of the transmitter TX at any time, but the two sets of data are shown to illustrate the relationship of the two data sets to a common clock. While this alignment may overcome some of the differential delay between merging paths, the data on line 2 shows that the data of the two paths is offset by a full clock period, in this example. In fact, this offset may be more than one clock period; and, the skew still remains.

Figure 45:
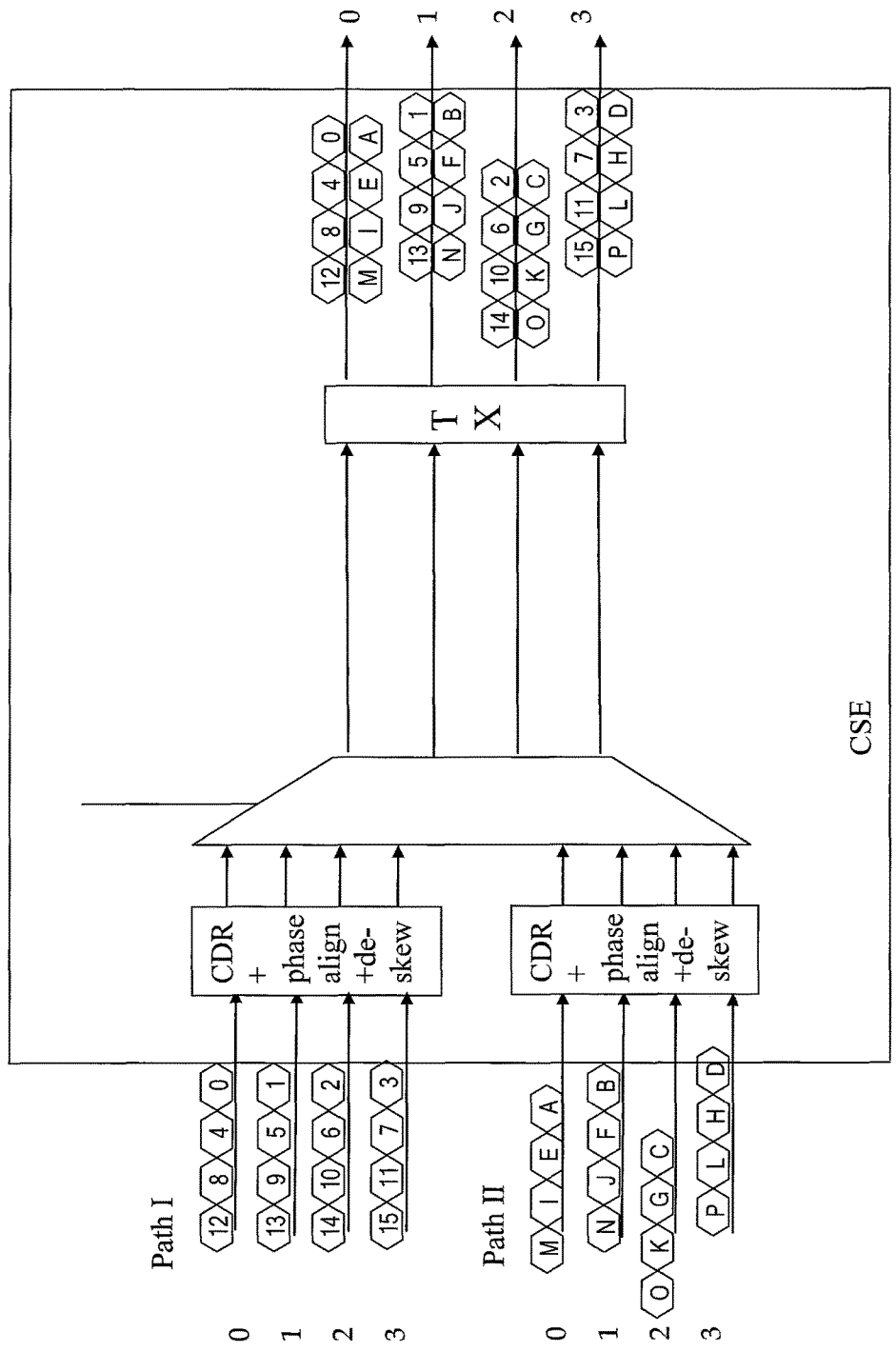
FIG. 45 shows the example of FIG. 44 with de-skew in each of two data paths.

FIG. 45 illustrates the situation in FIG. 44 with the addition of a de-skew process in each of path I and path II. The de-skew be achieved by adding the equivalent of one clock cycle delay in the data of lane 2 of path II, and the result is that the data of path I and path II for lane 2 can be selected without a change in the apparent skew of the data as received by an upstream CSE.

FIG. 46A illustrates the concept of FIG. 45 on a higher level in an architecture. A memory controller MC and modules M0-M7 are connected in a tree. The time delay of each data path is represented by the length of the line connecting modules M1, and the time delay within each module is represented by the length of each module. From FIG. 46A, it may be seen that the path MC-M7 is the longest path. Only one of the lanes between each circuit element is shown of the K possible lanes, but the description is equally applicable to the other lines or lanes. In FIG. 46B, the tree is redrawn so that the horizontal axis represents time delay for a lane connecting each of the circuit elements, including the delay in each circuit element. For each data bit, the lane between circuit elements being used may be a different physical lane, but the logical data bit is correct at the circuit element where the data or command is interpreted. That is, the set of lines shown which eventually leads to lane 0 at the MC are those lanes which carry the data which will arrive on lane 0 even if those physical lanes are of a different lane number between other parts of the tree, for example as a result of the of lane as exchanges shown in FIGS. 39-42

Figure 47A:
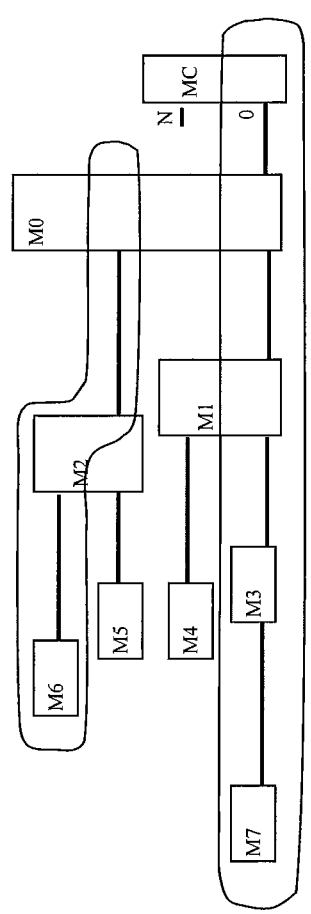
FIG. 47A-B shows an aspect of a network having a non-critical data path.

FIG. 47A identifies two of the sub-trees of the network: M0, M2, M6 and M0, M1, M3, M7. As shown, the path M7-MC is the longest path. At each circuit element, two input paths and one output path are shown. One of the input paths is non-critical in the sense that the non-critical path has a shorter overall delay between the origin and the destination than the other path. For example, at module M1, the path from M4 is non-critical with respect to the path traversing M7-M3-M1. In this circumstance, an additional delay may be introduced into the M4-M1-M0 path with respect to the M7-M3-M1-M0 path without introducing additional overall delay. When an additional delay is introduced, this is shown symbolically by showing a tab 550 extending from the module where the module connects to a data path.

Figure 47B:
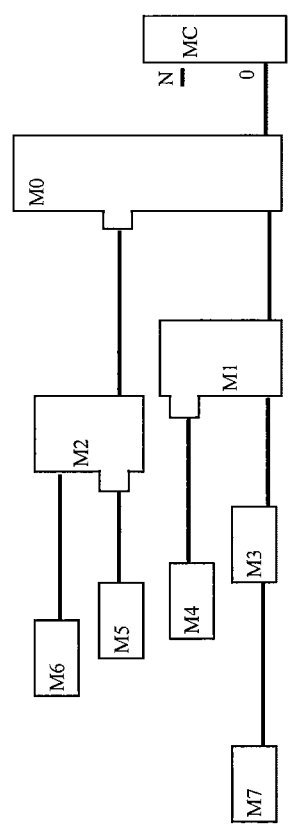
Figure 48:
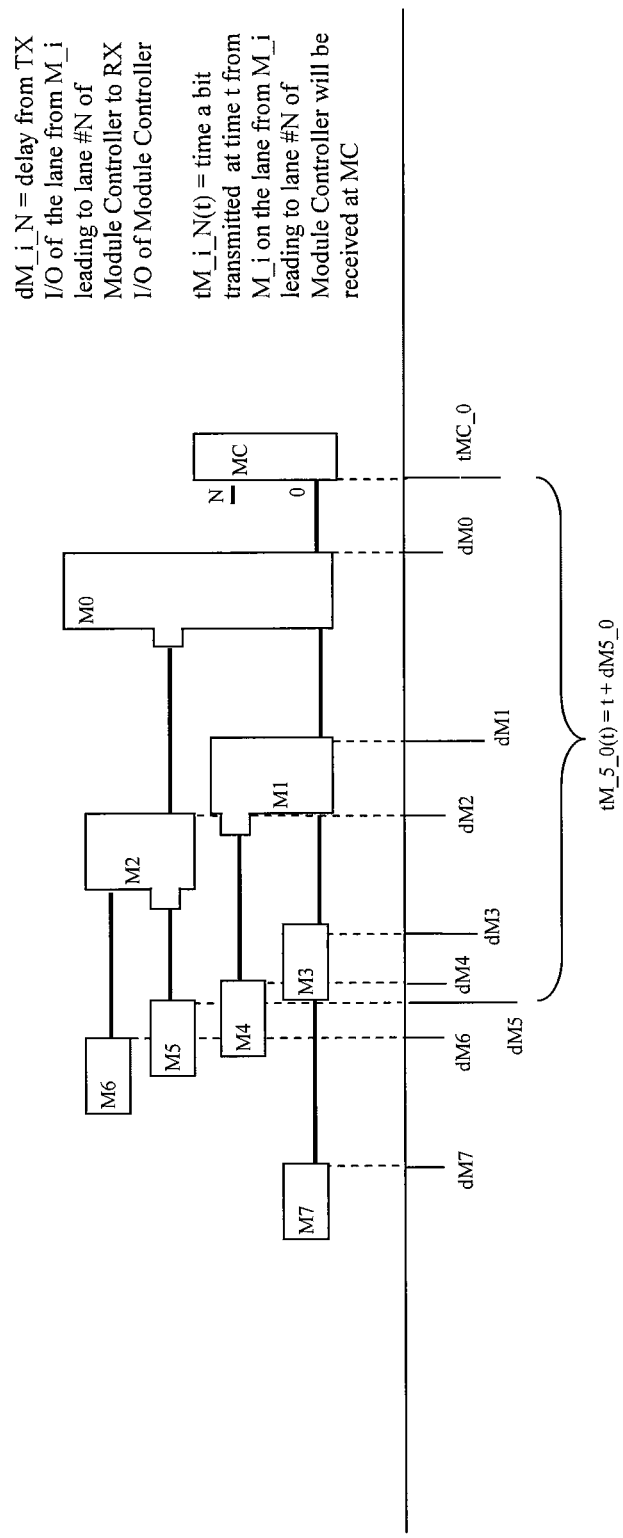
FIG. 48 shows the lanes carrying logical bit 0 in network of 8 modules connected in a tree.

Using the symbology introduced in FIG. 47 a-b, FIG. 48 shows a network of 8 modules Mi, connected in a tree to a module controller MC, for the logical bit 0 path. The time delay for the transit of the bit from the module Mi to the MC for bit 0 is represented as dM_i_N, where i is the module number and N is the logical bit number. The delay is measured from the output of the module Mi to the input of the MC. That is, delays in the originating module Mi and the receiving circuit MC are not shown for simplicity. It should again be mentioned that the additional delays in a module, and shown by the tab on a module, may occur anywhere in the module. When considering the timing in the network, the time tM_i_N represents the time at which a command or data for logical bit 0, transmitted from the MC will be received at module i. FIG. 48 shows the situation for module 5 and bit 0, so that the time of receipt tM_5_0=t+dM_5_0, where t=0 is the time when the data was transmitted by the memory controller MC.

Figure 49A:
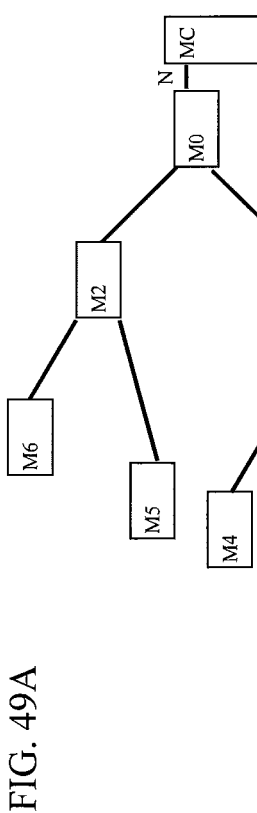
FIG. 49A-B shows the lanes carrying logical bit N in a network of 8 modules connected in the tree of FIG. 48.

A similar analysis may be performed for any bit N, and FIG. 49A, B show the same arrangement of modules as in FIG. 46A, B, except that the delays are appropriate for another bit, bit N. As shown, in FIG. 50A, B, there may exist a different grouping of sub-trees having maximum path time for bit N and thus at each module combining paths there may be a different set of sub-trees having non-critical paths. Here, the sub-trees with the maximum time delay are M5, M2, M0, and M7, M3, M1, M0, MC. The first sub tree is different when compared with the bit 0 situation previously described, but the second sub-tree has not changed. Thus, for bit N, the delay may be added at the port interconnecting M2 and M6, whereas in the case of bit 0, the additional delay may be added at the port connecting M2 and M5 (as shown in FIG. 47). FIG. 50 identifies critical and non-critical paths in the arrangement of FIG. 49.

Figure 51:
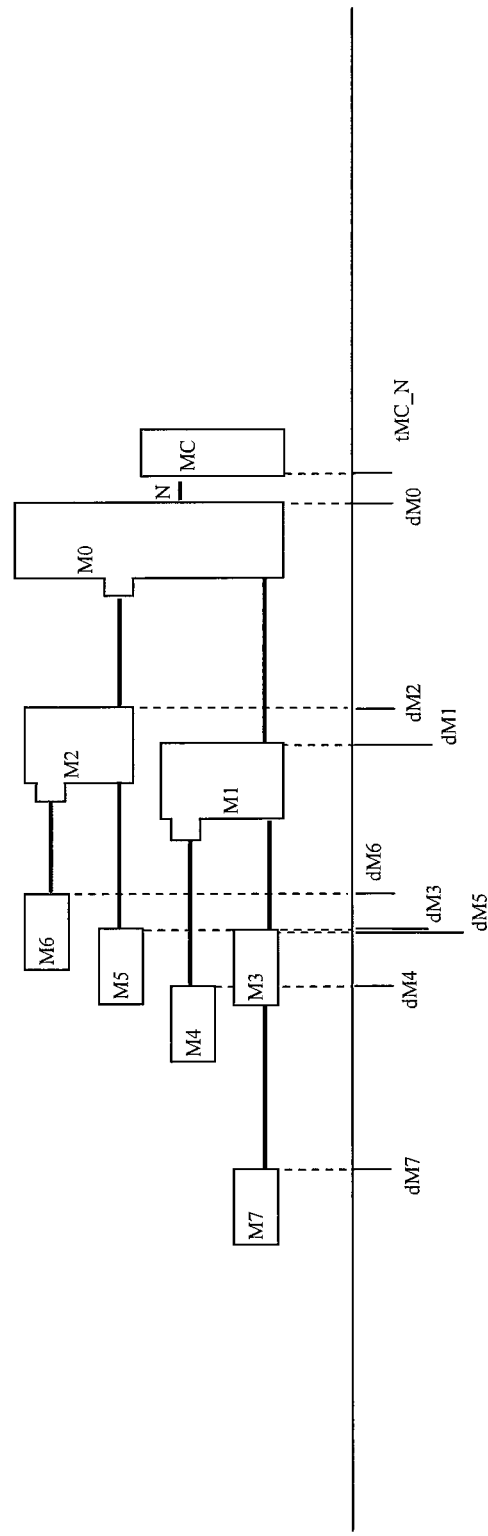
FIG. 51 illustrates the delays in FIG. 49.
Figure 52:
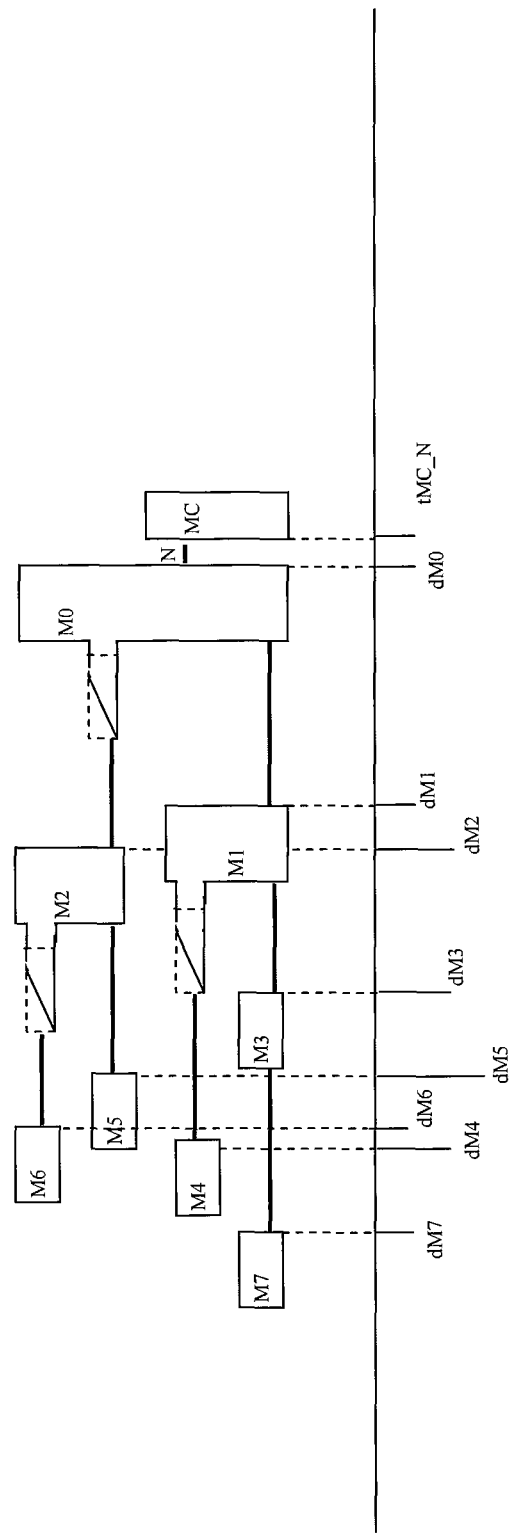
FIG. 52 shows the addition of variable delays.
Figure 53:
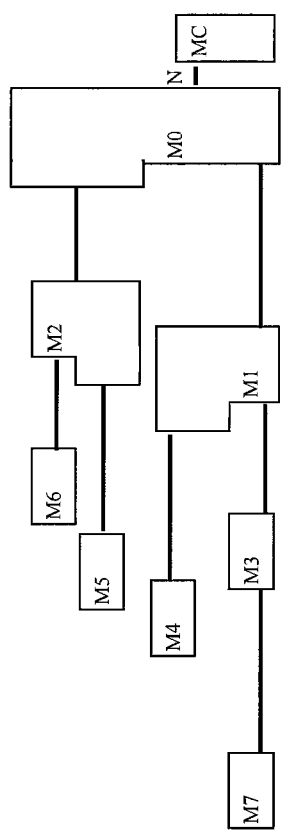
FIG. 53 shows the addition of delays in a link.

FIG. 51 shows the resultant delays represented in the notation previously introduced. Thermal and other slowly time varying effects may require adjustment of the delays to maintain the phase and bit synchronization of data which is being selected by a multiplexer in a module and sampled by a common clock. The trapezoidal extensions 560 of the delays shown on modules M0, M1 and M1 in FIG. 52 indicate such varying additive delays, where the total length 565 of the extension indicates the maximum total additive delay, and the dashed transverse line 570 indicates the minimum additive delay. In another aspect, due to a number of factors, which may include internal construction of a module, processing delays, and the like, the delay within a module may not be the same for each lane. When different lanes are chosen for a logical bit transmission between modules, the module delay may thus depend on the lane chosen. This is represented by a box with a broad tab 575 as shown in FIG. 53. Again this is a symbolic representation and does imply that the delay is necessarily introduced at the input or the output of the module.

Figure 54A:
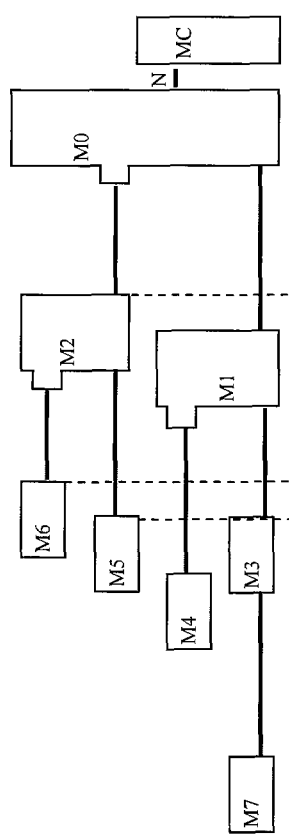
FIG. 54A-B show equivalent ways of adding delays in a network.
Figure 54B:
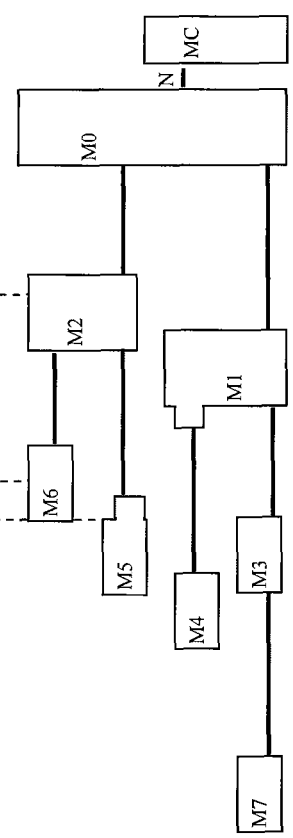

Depending on the method of time delay control chosen, it may be possible to introduce the delays for skew correction at a module prior to that at which de-skew is needed. FIG. 54A, B show examples of two means of introducing the delay. As previously shown, in FIG. 54 a delay is shown being added to M2 in the connection to M6, where the path M5 to M2 is non-critical. Alternatively, a delay may be added in M5 and the delay eliminated in both M2 and M0 as shown in FIG. 54B. This may be seen to have reduced the overall delay between M6 and M2 and the MC, without degrading the delay between M5 and the NC.

Figure 49B:
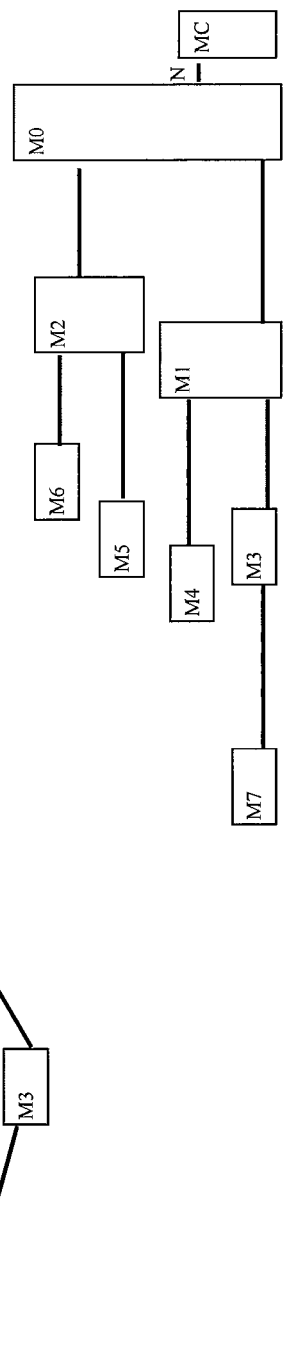
Figures 50A, 50B:
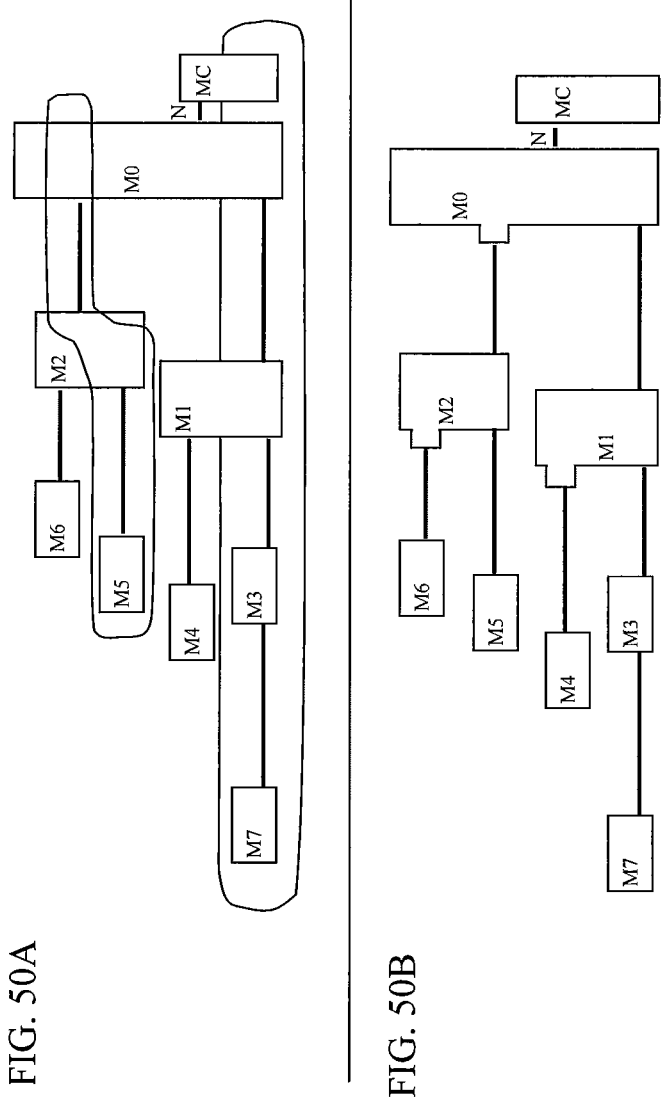
FIG. 50A-B identifies critical and non critical paths in the arrangement shown in FIG. 49.
Figures 55A, 55B:
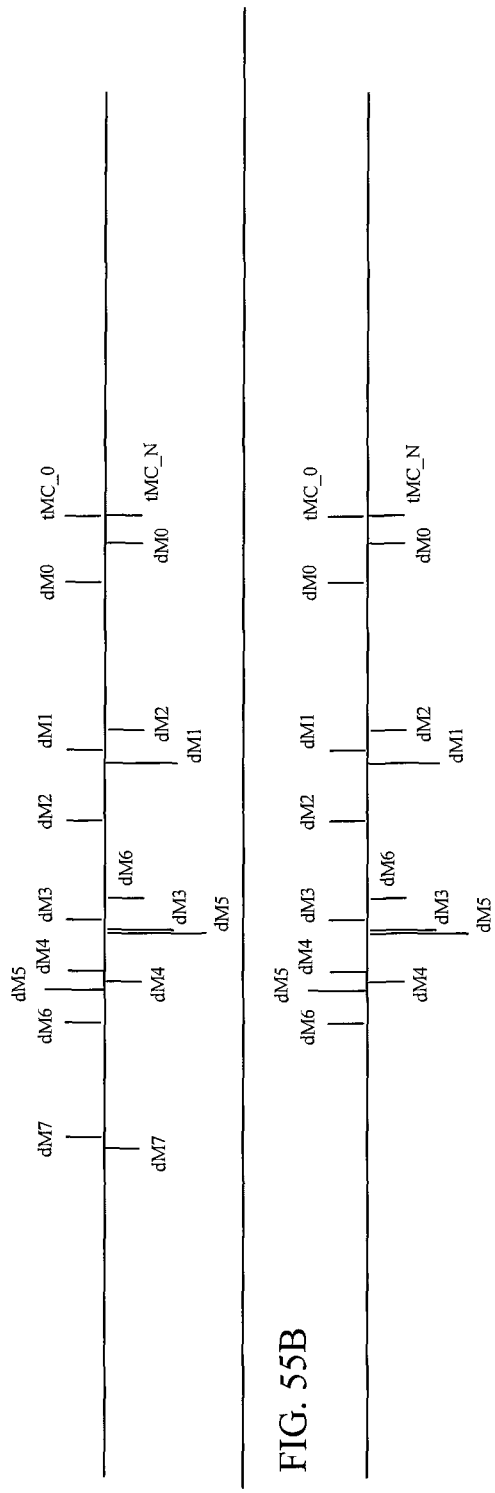
FIG. 55A-B is a time line showing the delays in the trees shown in FIGS. 46 and 49.

FIG. 55B shows the delays for the trees described in FIGS. 46 and 49, where each of the delays is shown for the bits designated 0 and N. FIG. 55B shows the same trees, but with module M7 deleted. A long delay was removed from the configuration, to show that, as represented in FIG. 55B, there is no "longest delay module". A longest delay for bit 0 is seen to occur on the path to module M6, whereas a longest delay for bit N is seen to occur on the path to M4.

FIGS. 46-55 show examples of the time delay, for example, on a return path between a module M and a module controller MC. The transmission of commands and data between the MC and the modules M, and the return of an acknowledgement or data also involves time delays; however, the situation may differ from the return path in an aspect that the return path requires multiplexing of data from more than one path, whereas the transmission of a command or data from the MC may be performed in a manner where the data fans out downstream in the tree by branching. While phase correction may be needed for synchronization, skew correction by the addition of time delay may not be required. So, the time delays on a path from the MC to a module M and the time delay on a return path for the module M may not be the same, even for the same bit. In FIG. 56, while there may be delays introduced at a module, for simplicity of presentation, all of the delay between modules, including any skew of phase synchronization delay is shown as part of the length of the line collecting the modules. FIG. 56A shows a tree where a command has been transmitted from the MC, and the total delay in inter-module transmission is shown as a dotted line. In accordance with the discussion on path management, the command, if not a broadcast command, will not actually traverse each of the connections between modules, but may traverse only a subset of the links depending on the destination address. But to the extent that it traverses a particular path, the delay in doing so is shown.

Figure 56B:
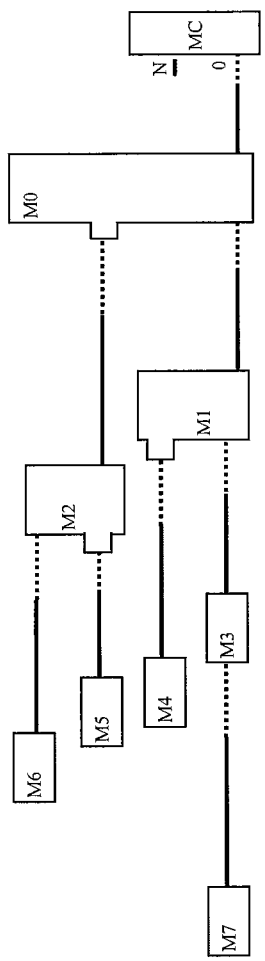
FIG. 56A-B shows another aspect of delays introduced in a network.
Figure 56A:
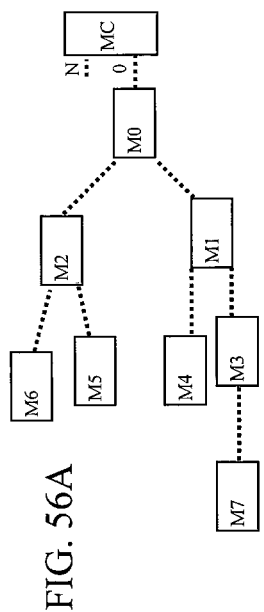

FIG. 56B shows a tree such as has been previously shown in FIG. 48. The lines between the modules are the sum of the lines shown in FIG. 48 and the lines in FIG. 56A. The dotted lines 580 represent the time delay encountered by bit 0 transiting from the MC to each of the modules, and the solid lines and the tabs represent the delay in a return signal from the module to the MC for bit 0. For purposes of presentation, the time to prepare and transmit signal from the MC, the time to decode and act upon the signal at the addressed module and to transmit a response signal, and the time to decode and act upon the signal at the MC are omitted.

FIG. 56B therefore shows the total transit time of a command from the MC for bit 0 as sent to any one or more of the modules M1, and the response of Mi to the command as it is received by the MC.

Figure 57:
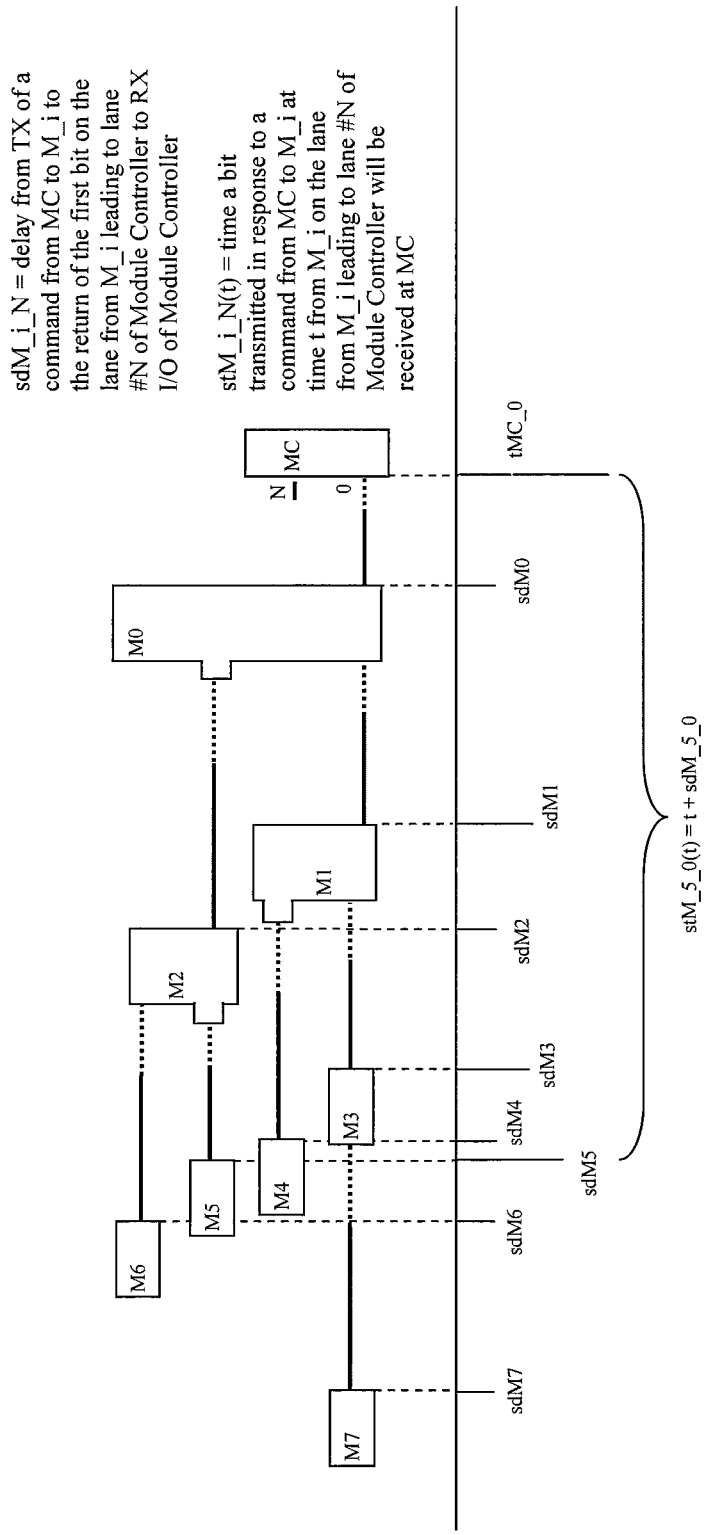
FIG. 57 shows the overall times for sending a command and receiving a response over a tree.

FIG. 57 shows the situation of FIG. 56B in greater detail, introducing notation to represent the overall transit time of a command and a response over the tree. sdM_i_N represents the delay between the transmission of a command (or data) from MC to Mi to the return of the first bit on lane N from the module M1 to the input of the MC. stM_i_N(t) is the time from when a bit N is transmitted at time to the time that a response is received at the transmitting circuit. This is shown for module M5 where stM_5_0($t$)=t+sdM_5_0 for the situation where a command has been sent from the MC as bit 0, to module M5 and a response has been received at the MC.

Figure 58:
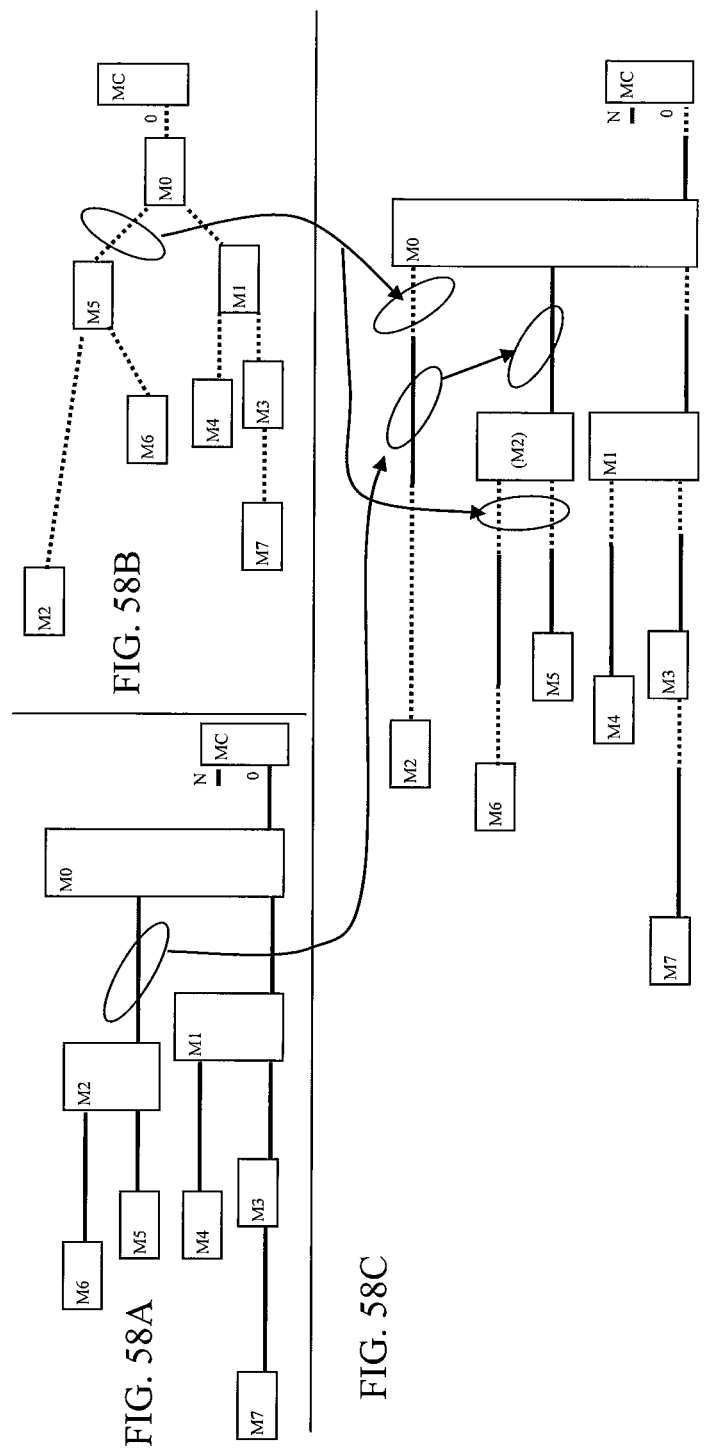
FIG. 58A-C shows a situation were the same module may have a different routing for transmissions from and to the memory controller.
Figure 59:
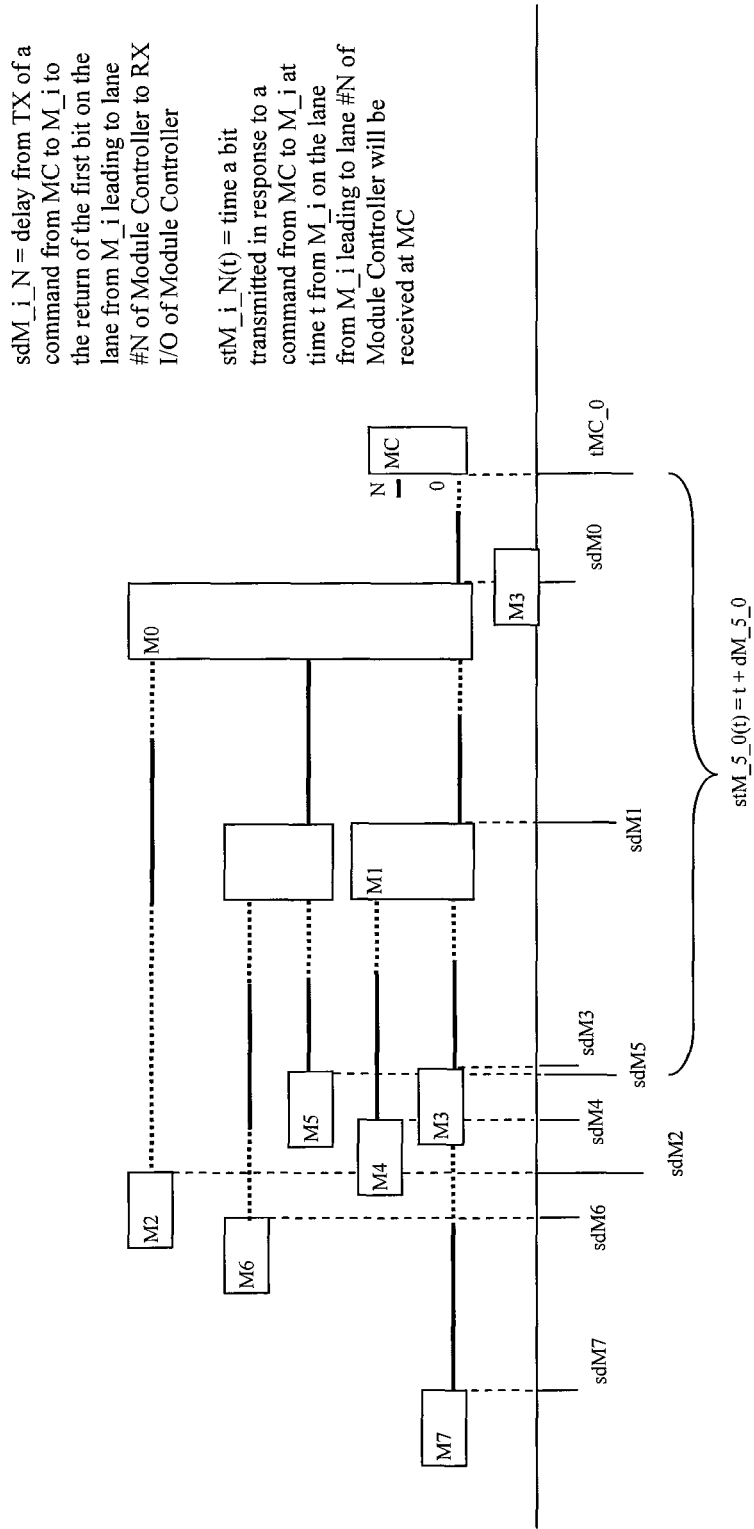
FIG. 59 shows the tree of FIG. 48 including outbound and return paths.

The previous examples have shown situations where the topologies of the trees for the outbound and return paths have the same configuration. However such configurations are not required. FIGS. 58A and B illustrate a situation where the same modules have different routings for the transmissions from and to the MC. This may be seen by comparing FIG. 58A, which is a return path configuration and FIG. 58B, where the outbound paths are shown. The overall round-trip times are illustrated in FIG. 58C, where the appropriate lengths of dashed and solid lines are used to represent the directions as in the previous examples. In the configuration shown, some paths are shown in more than one place, and the placement of these delay representations is indicated by ellipses enclosing the line and a line indicating the source of the delay. FIG. 59 is the equivalent of FIG. 49 which showed only return paths, but FIG. 59 includes a specific tree of outbound paths.

FIG. 60A, B illustrates multiple signaling paths, where the signaling paths may be disjoint from the data paths. In FIG. 60A the module M4 may be reached by a path from M0 to M2 to M5 and then M4. This path is shown as terminated with an arrow to distinguish it from the path M0 to M1 to M4, which has previously been discussed. Similarly, module M7 can be reached by two different paths form M3. The situation where there are two different paths from M3 to M7 may represent, for example, an aspect in which there is channelization of a link and each channel has an associated signal component. Representing the signaling paths in this manner may account for the situation where the different channels have different signaling delays as they may, for example, use different lanes having different delays. The additional path to M4 may represent additional connections which exist for communications purposes. Such uses will be seen as examples, when modules are connected in a grid mesh. In an aspect where more than one module controller is in communication with a module where there are differing path lengths, the alternative paths may be used to avoid signaling conflicts, as more than one route may be used to send the control signals.

FIG. 60B representationally shows the timing as all being associated with the path between a module controller MC and each of the modules M1, where the signaling path is shown as a dotted line and the return data as a solid line. The additional delay component of delay from module M4 is shown twice, and a elliptical symbol indicates the specific instances thereof. One of the paths is where the signaling was on a path that ran from M0 to M1 to M4 and the other path ran from M1 to M2 to M5 to M4.

In the following discussion of detailed scheduling of data or commands returning from modules in response to commands, we assume for simplicity that the commands are transmitted from the MC to all modules with no time delay, and that the addressed module acts on and responds to the commands with no time delay. This assists in presenting the notation to be used. Further, a slotted time model will first be discussed, and this restriction later shown to be removable. The timing examples in FIGS. 61-71 show how the data arrives at the MC.

The time slots are shown on a time line, such that the right hand side represents the time of arrival at the module controller MC, and time running to the left represents commands or data which will arrive at the MC at a later time. The notation tCi represents the time at which the first bit of packet Ci will arrive at the MC. This discussion pertains to lane 0, for example, and so it should be appreciated that the same type of scheduling may be performed for each individual lane. Further, the time line showing the delays dMi is shown linearly, however the delays originate in a tree and may also incorporate variable delay jitter buffers. Thus, the actual time that a module inserts bits onto a lane of the link is the delay time of transmission. The effects of variation in the time due to the jitter/thermal buffer are not shown as this would make the figure excessively complex. The result of this simplification is that if the timing of the bits was considered at a lower level of the configuration, the bits may appear to be shifted with respect to each other such that they would be out of the correct position on the time line; however as a result of the correction of the jitter/thermal buffers the timing will be correct when received at the MC.

The overall length of a time slot is shown by the large hexagonal blocks 900, and the time period of a bit by the small hexagonal boxes 910. In this example, a time-slotted system is used, and a module may be constrained to wait from the time data is ready to transmit until an appropriate slot time is reached. For example, when a read command is sent to M7 at t1, the response cannot begin prior to the slot tC_(i+5) as the slot tC_(i+4) has already begun at the module M7. FIG. 61B illustrates the situation after a full slot time has elapsed. At this time all of the slots have moved in time by one slot time and slot iC_(i+1) is beginning to arrive at the MC. Module M7 has begun inserting data such that 5 bits have been inserted in slot iC_(i+5). FIG. 61C illustrates the situation when iC-(i+2) has begun to arrive at the MC, and it may be seen that all of the bits from M7 have now been inserted to a time slot 920. After further time has elapsed, this time slot will be received at the MC. This occurs where the bits are inserted sequentially at each clock pulse such that the data is filled into a slot.

Figures 62A, 62B, 62C:
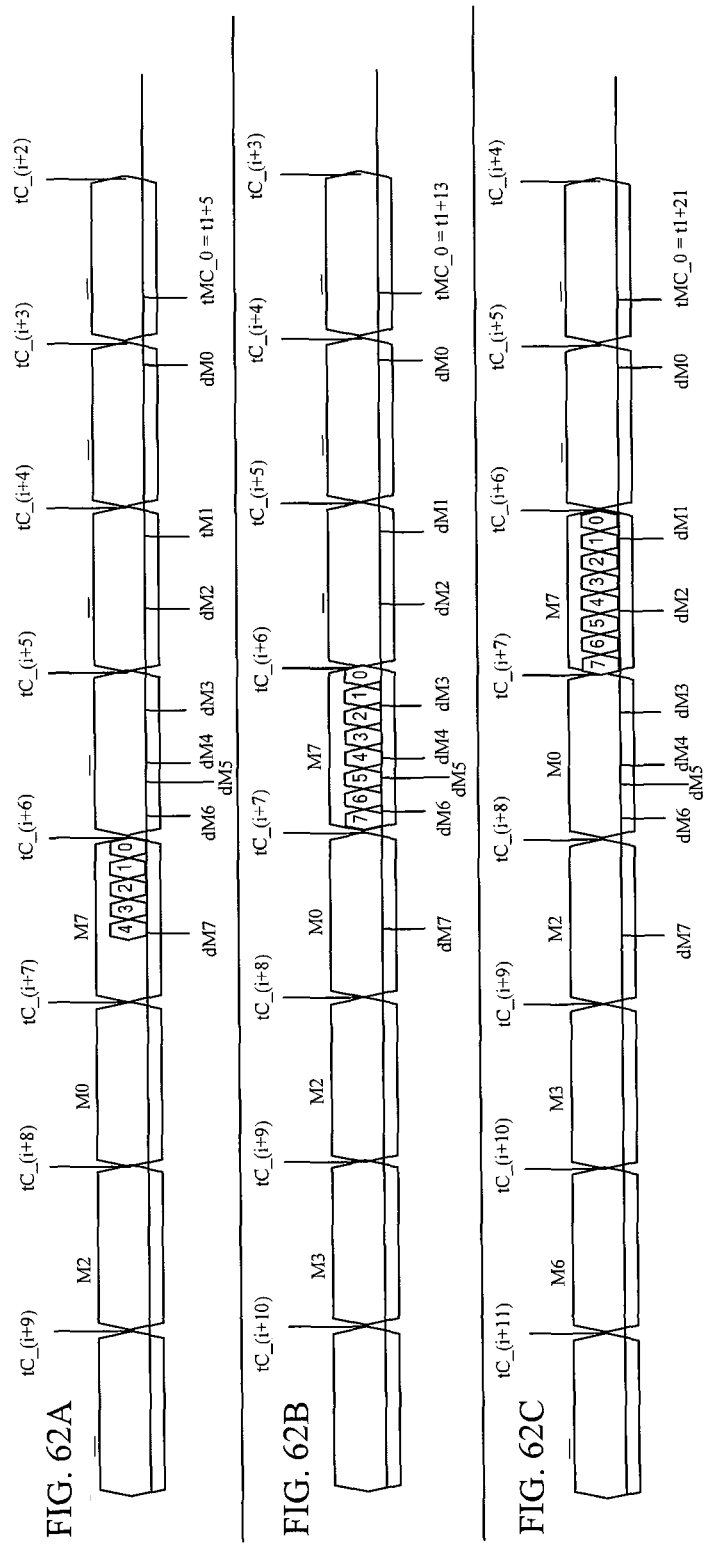
FIG. 62A-C shows a time line for data being transmitted from a module to a module controller using fixed time slots.

In an aspect, a fixed time slot may be assigned to each module as shown in FIG. 62A-C such that the data or commands returned from a module to the tree root, such as a memory controller MC, arrive in a predetermined order. Here, multiple commands have been transmitted by the MC. Again, for simplicity, the commands and the data are considered to be sent in a fixed delay system. In this example, the commands are considered to be acted upon as if they had the delay of the furthest module. In such an instance, even if the are modules with shorter delay, the return is delayed to fit into the predetermined slot.

FIG. 62A illustrates the situation where the slot tC(i+6) had arrived at M7 five clock cycles earlier, and 5 bits of data have already been inserted into the slot. Additionally, read commands have been sent to M0 and M2 and response slots for these commands are assigned to tC(i+6) and tC_(i+7), respectively. FIG. 63B shows the situation 8 clock cycles later, where M7 has filled the assigned slot and, additionally, read commands were sent to M3 and M6 and response slots tC_(i+9) and tC_(i+10) assigned, respectively. After 8 additional clock cycles, the slots have moved by a full slot period. However, it will be noted that none of the following slots have reached the device for which they were assigned to carry a response, as shown by comparing the position of the slots with the delay times dMi, and this no other module has inserted bits.

In FIG. 63A, 8 additional clocks have occurred, and the slots assigned for response from modules M0, M2 and M6 progress forward in time, but have not reached at time at which the respective modules may inert bits into the stream on the lane. Eight more clocks have occurred in FIG. 63B, and now the slots for modules M0, M2 and M6 have reached the appropriate module, as shown when comparing with the module delay dMi; at this time module M0 has inserted 1 bit, module M2 has inserted 5 bits and module M3 has placed 3 bits on the lane. Note that an indication in the slot arriving at the MC shows the total number of clock periods which have elapsed since the beginning of the sequence shown.

At tMC_0=t1+45 module M6 has inserted 7 bits, and the previous slots are already full. In four more slot times, at the end of slot tC_(i+10), all of the bits will have arrived at the MC.

Figures 65A, 65B, 65C:
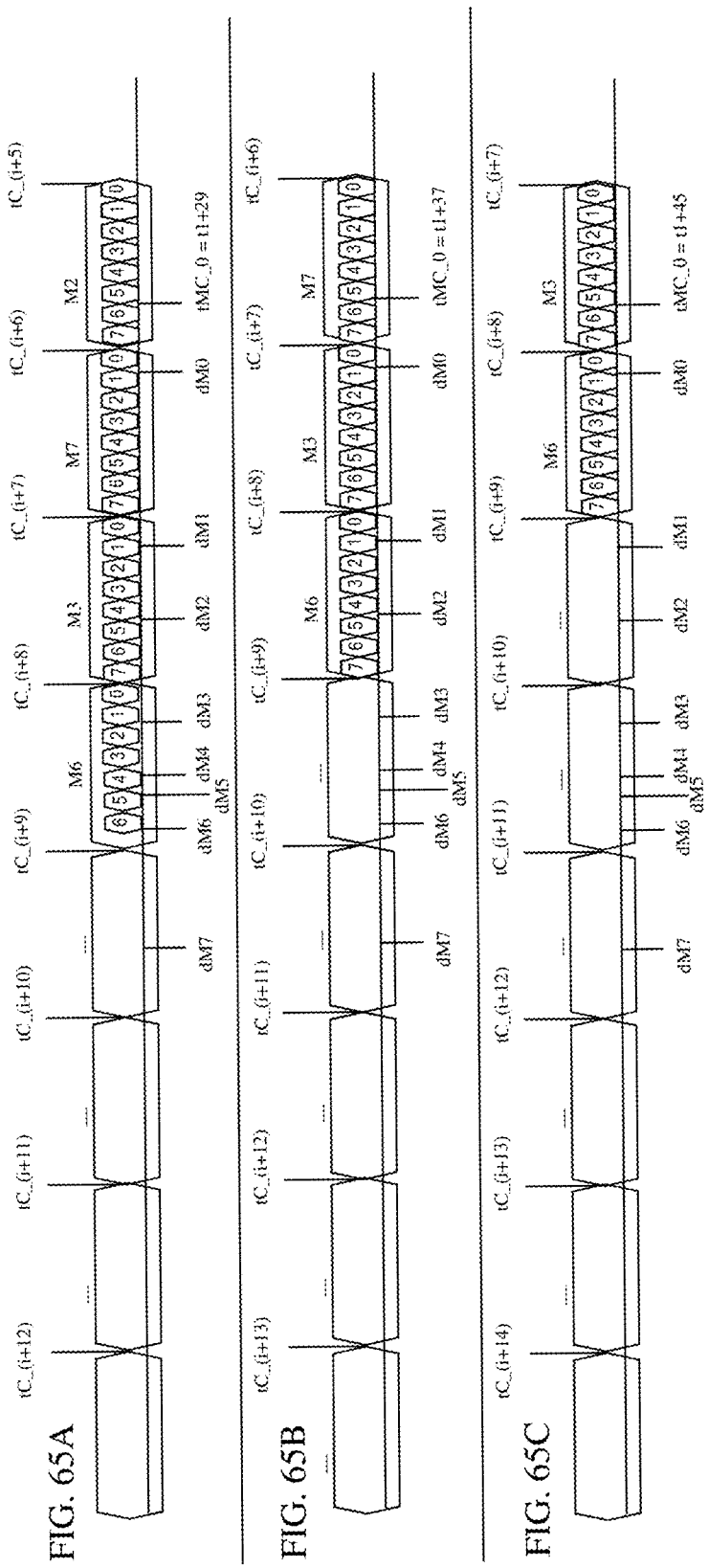
FIG. 65A-C shows an example of variable delay scheduling corresponding to FIG. 63.

The total time to perform the sequence illustrated was the time delay to the furthest module, which was M7 for this lane. For another lane, another module may have the greatest delay. Under such circumstances, the delay may be increased to the greatest delay. In another aspect, FIG. 64-*a* illustrates an example of variable delay scheduling. A slot system may still be used, but a command sent to a module may be assigned the first return time slot that has not yet been assigned and has not reached the delay associated with the module. For comparison, FIGS. 64 and 65 show the same time sequences as FIGS. 62 and 63. Here, however, when issuing commands to M0 and M2, the response slots are associated with slots tC_(i+4) and tC_(i+5), respectively, rather than slots tC_(i+7) and tC_(i+8). As shown in FIG. 64B, after 8 clock cycles have elapsed, commands are issued to modules M3 and M6, and instead of assigning the response slots as tC_(i+9) and tC_(i+10), the response slots are assigned to tC_(i+7) and tC_(i+8), respectively. FIG. 64A through FIG. 65C show the time progression of the assigned return slots and the insertion of data at the appropriate clock intervals. The last bit of the response to the command sent to module M6 arrives at the MC at tMC_0=t+ 55, whereas in the previous example using fixed delay scheduling and shown in FIGS. 62 and 63, the last bit of the response form M6 did not arrive at the MC until tMC_0=t+ 71. Thus, the delay in response from any module may be reduced by using variable delay scheduling.

FIGS. 66 and 67 illustrate a situation where the restriction of data to slotted transmission times has been removed. In FIG. 66A, a read command R was sent to M7 at t=1 (recall that the time delay for transmission and processing the command has been ignored in this discussion), and the situation is shown 4 clock cycles later, where 4 bits of data have already been put on the lane. If a command had been sent to M0 and M2, these modules would be able to insert data as well. FIG. 66B shows the situation 4 clock cycles later, where all of the bits for the M7 response have been inserted, and 4 bits each for the M0 and M2 responses have been inserted. At this time commands are sent to M3 and M6. FIG. 66C illustrates the situation 4 clock cycles later, when modules M2 and M0 have also completed inserting the response bits, but modules M3 and M6 have not commenced inserting bits. The response slots for M3 and M6 may not be assigned immediately, as were those for M0 and M2, as they would have overlapped with the response slot for M7, so they may be placed into the next possible clock cycle. FIG. 67A-C show the further time progression of the sequence. This situation may leave some spaces between slots. However, it may be possible to use the spaces for variable width data or commands, or by interleaving responses from different modules.

Figure 68:
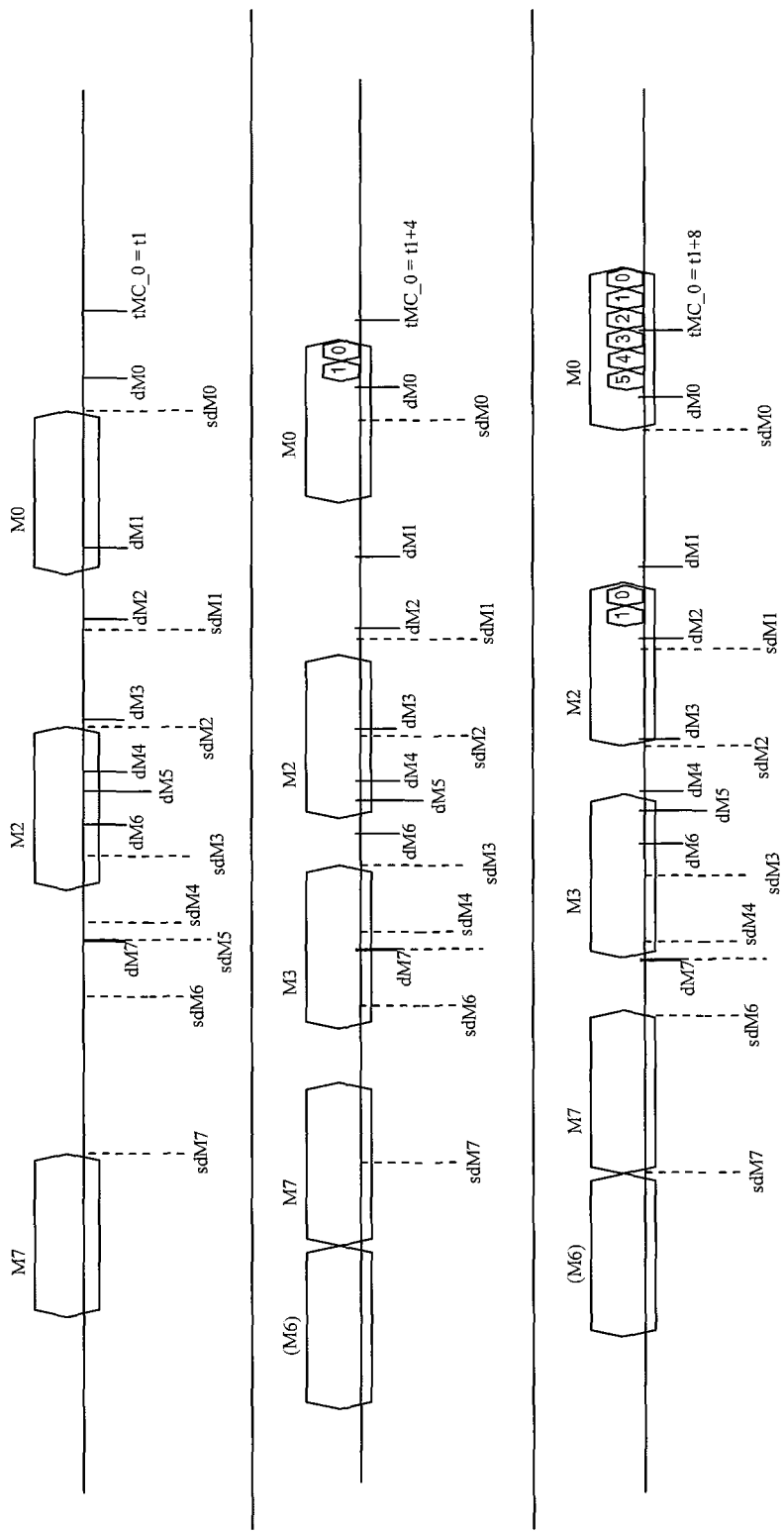
FIG. 68 shows the timing for a non-slotted example where the signaling delays are shown.
Figure 69:
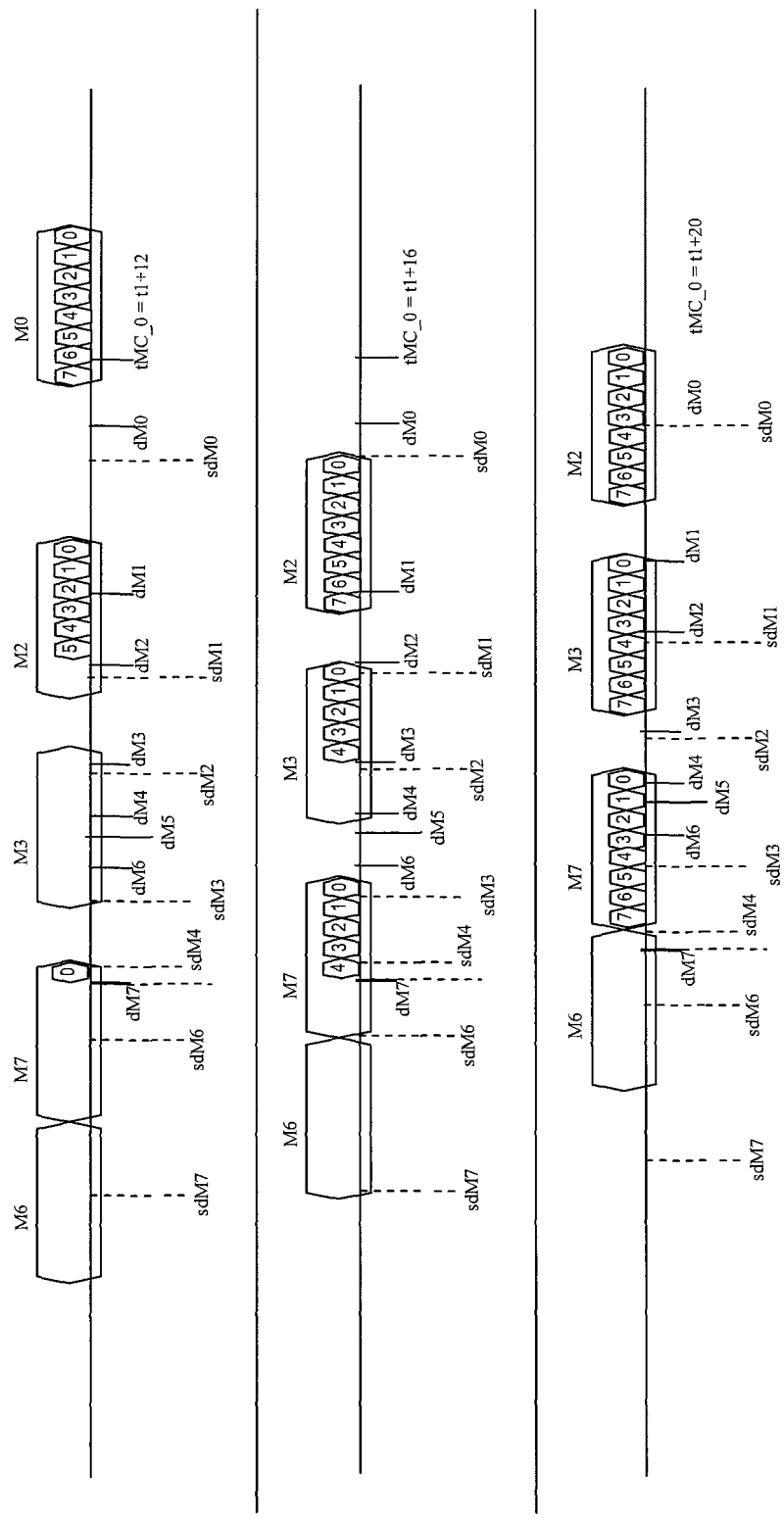
FIG. 69 shows the timing for another non-slotted example where the signaling delays are shown.

FIG. 68 *a-c* and 69 *a-c* illustrate a situation for non-slotted responses where the signaling delays are shown. The allocation of a time for response is governed by the signaling delay where the time for a command to reach the module is accounted for, and the placement of bits on the lane is delayed. This may represent a situation where a module may not be assigned a time to put a bit on the lane which will already have passed the module by the time the command has been received at that module. It is therefore not necessary for the system to have slotted times.

The module controller MC may be attached to a system or bus running at a slower clock speed than the module controller MC. There may be some period of time at which the MC will be receiving high-speed data, de-serializing the data, latching the data and sending it out on another interface, or using the data within the module controller MC. Data which arrives at the MC with insufficient time to be latched for the lower speed clock will become usable at the speed clock cycle of the lower-speed clock.

Transmissions for which the bits do not arrive in time to be used at the next lower-speed clock cycle may not have any advantage over transmissions for which the bits arrive at the last possible moment at which they may be used in the next lower speed clock cycle, and improvements to the system performance as well as reductions in logic complexity may result.

Figure 70A:
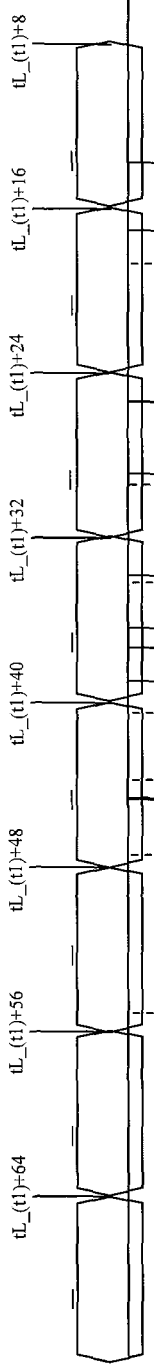
FIG. 70A-C shows the example of FIG. 68 with a different command time.
Figure 70B:
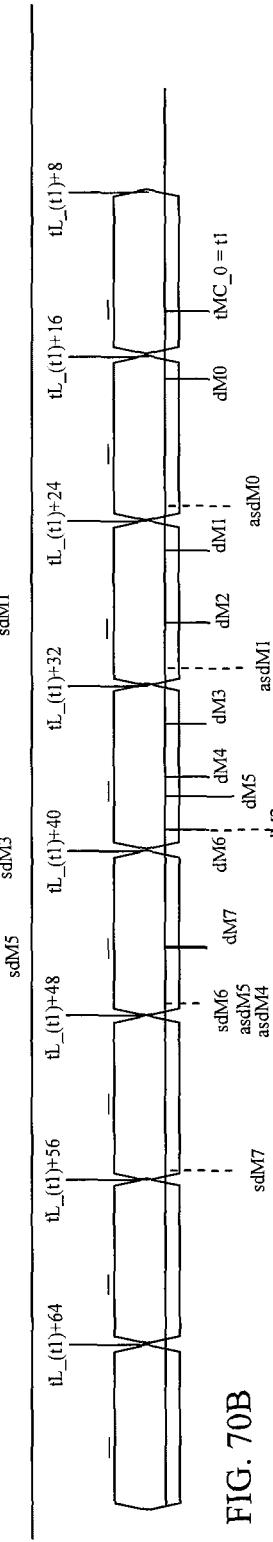

FIG. 70A shows a system with the same signaling delays as the system in FIG. 68A, in which it can be seen that while M3 has a lower signaling delay (sdM3) than M6 (sdM6), the response to a command sent at time t1 would be returned at the same time for both modules, at tL_(t1)+48. As a result, if the signaling delay of M3 were replaced with an adjusted signaling delay (asdM3) as shown in FIG. 70B, the response latency of M3 remains the same. In this case, the command return scheduler in the module controller MC may operate without making scheduling decisions based on high speed clock times, but on the slower slot times. The command scheduler may also be able to perform scheduling tasks for modules whose signaling delays fall within the same slot time, such as the case shown where sdM6, asdM5, asdM4 and asdM3 do so in FIG. 70B.

If such delay adjustment is beneficial to the implementation or operation of the module controller MC, such adjustment of a module signaling delay might be made merely as an "imaginary" adjustment. That is, the signal still arrives at module M1 at sdMi rather than at asdMi, but the module controller operates as if the signal was arriving at asdMi.

It is also possible the delay may be increased by performing the types of lane exchanges shown in FIGS. 35-38 so as to increase the signaling delay of one module in such a way as to decrease the signaling delay of another. The overall signaling delay is the combination of both the forward and backward delays. For example, in FIG. 70A if by increasing sdM2 by a small amount it were possible to decrease sdM3 so that sdM3<=dM6, then the command latency of M3 would be improved without increasing the command latency of M2.

An improvement in overall delay in one path may arise from adjusting the delay of more than one other module. Also the improvement in delay may involve increasing the command delay of another module. For example, in FIG. 70A increasing sdM1 such that sdM1=sdM2, may reduce sdM7 so that sdM7=sdM6. In this example, the command latency of M1 would increase by one slot time and the command latency of M7 would decrease by one slot time, However sdM1 would still be less than sdM7.1.

Figure 70C:
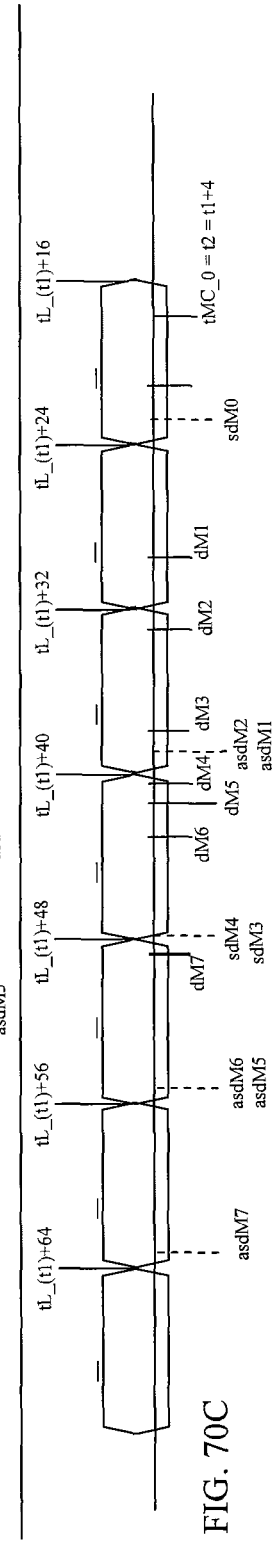

An adjustment of delays where the module(s) whose command delays were reduced may actually become less than the module(s) whose delays were increased, may also be useful FIG. 70C shows an example of the configuration as in FIG. 70A, where the timing at which the module controller MC is capable of transmitting commands, may not be fixed in relation to the slot times, if any, and/or the low speed clock. FIG. 70C shows the situation at t1+4, or 4 high speed clocks after the example in FIG. 70A, where the slots have moved 4 bits closer to the module controller MC, resulting in a different set of adjusted signaling delay values that may be used without effecting the command delays of the modules.

FIG. 71A shows the data delay and signaling delay for modules M0 and M2 as in the previous examples, the times the each of the modules would take to execute 3 different commands CMD#1, CMD#2 and CMD#3, as well as the time taken to execute CMD#3 in the case where the previous command was CMD#2, shown as CMD#3_(2). This notation may also account for more than one prior command or to account for different states of the module or system. In this example, the delay for each command is the same for both modules; however it is not necessary that the delay for a given command be identical for each module.

FIG. 71B shows the resulting command signaling delays, where the notation "sd[3]M2" is the signaling delay for command CMD#3 for module M2 and sd[3_(2)]M2 is the signaling delay for command CMD#3_(2) for module M2

There may be more than one possible adjusted signaling delay for a module. For example, the module controller may send the data returned from a module to more than one destination or perform more than one type of operation with the returned data such that there is more than one possible clock boundary to be crossed. The clock "boundary" may also be the start time of a slot in the serialization process leading to a device, function, process, etc. with a higher speed clock. There is no requirement that the clocks have a fixed phase or frequency relationship.

In the preceding examples "high-speed clock" was used, notionally, to mean "a bit time" on the high-speed link, although the high-speed clock may be different from the bit time if, for example, data is transmitted on both clock edges, multi valued signaling is used, or a differential clock, a multiphase clock, and/or more than one clock is used. It should be understood that, for purposes of clarity only, the examples have been given as if clock times and bit times were the same.

Also, for clarity, to the data has been said to have arrived by "the next low speed clock", but this should also be understood to represent the next opportunity at which the data can be used, which may not be the immediately following clock time.

Figure 72:
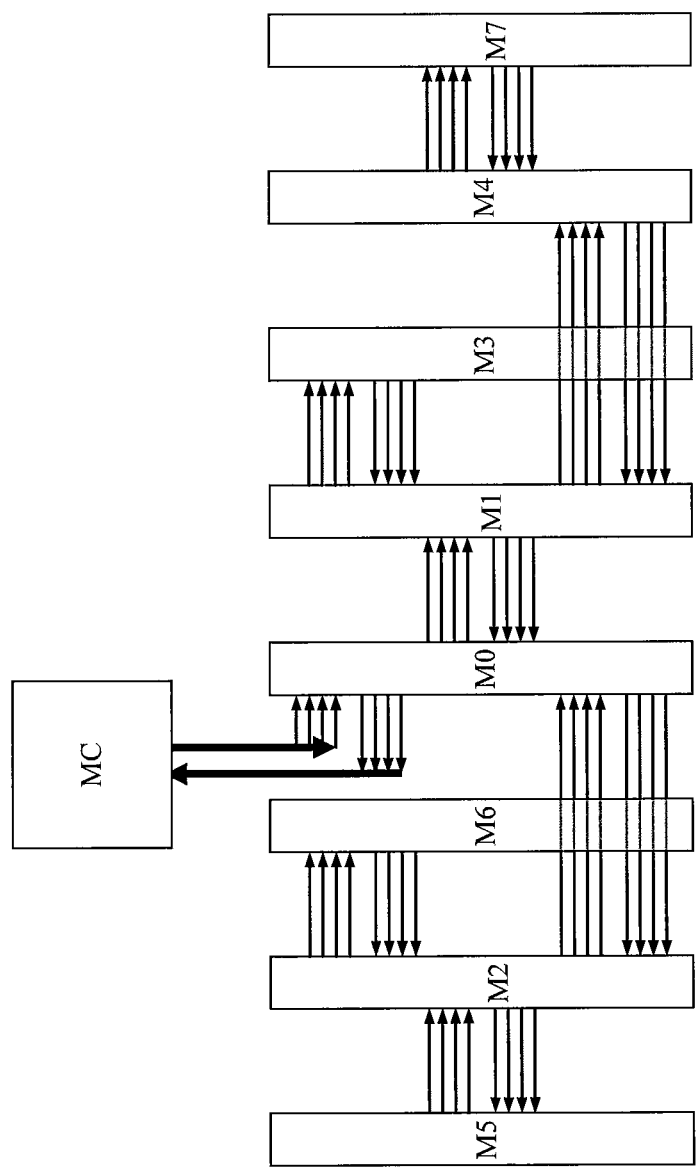
FIG. 72 shows a tree, similar to that of FIG. 5, laid out in a linear manner.

Examples of physical and logical layouts are given. Other layouts are possible and will evident to those skilled in the art. For example, FIG. 72 shows that a tree, similar to that previously shown in FIG. 5 may be laid out on a mother board or substrate such that modules M0 to M7 are disposed parallel to each other in a linear fashion. Such an arrangement may facilitate the flow of cooling air, or optimize the electrical layout of a mother board or main board. In FIG. 72, and following, the lines are represented such that the lines between modules terminate at an arrow, and originate at the boundary of a module to show connections between modules. Some of these connections pass by intervening module without any functional connection, and such an arrangement may be shown by making the line dotted, or shaded; but, lines originating at a module and passing through another module without being terminated by an arrow, are considered to have physically effectively bypassed the module. The physical aspects of a line passing by a module without functional interaction may depend on the detailed design, but in an aspect the dotted lines or the bypassing lines may represent lines passing on a back side of a printed circuit board, or in a layer of a printed circuit board or substrate.

Figure 73B:
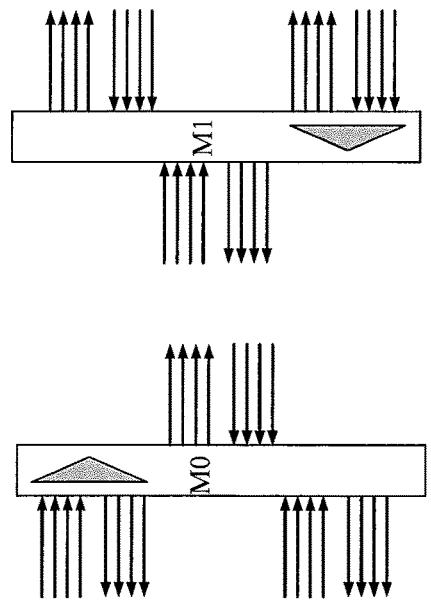
FIG. 73 shows the arrangement of FIG. 72 where the modules are designated as having a "front" and a "back" side.
Figure 73A:
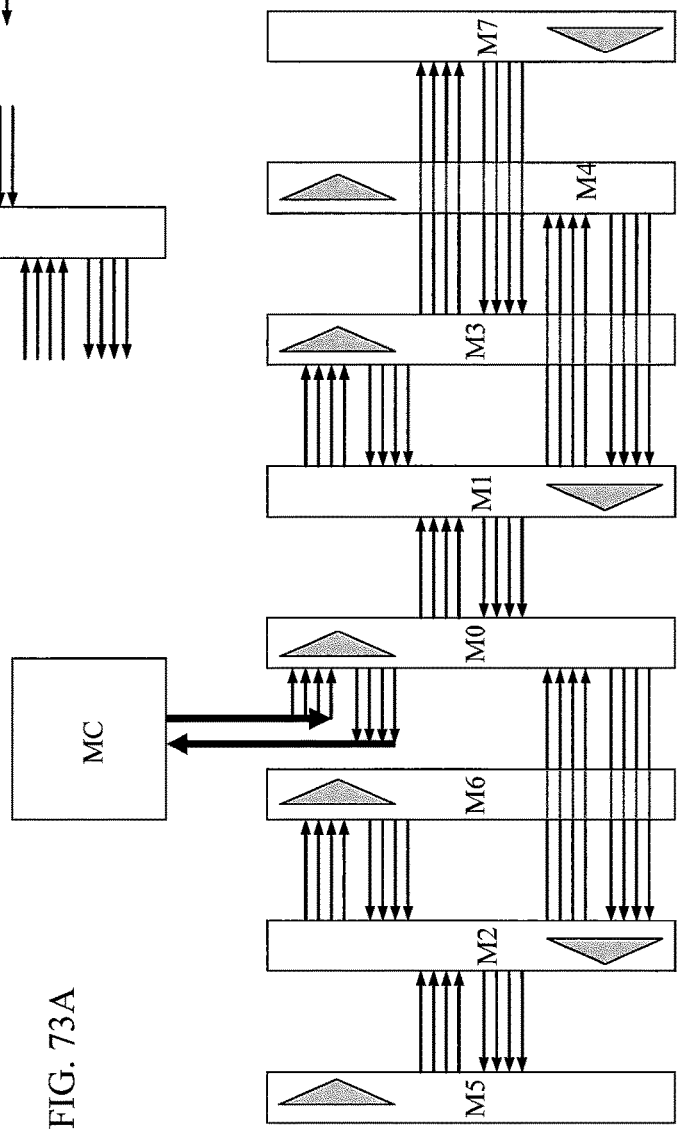

FIG. 73A shows the same arrangement as in FIG. 72, however each module is designated as having a "front" side and a "back" side, with the direction of the front side being shown by a broad arrow. Each module has one port on the front side and two ports on the back side, where a port is shown as two unidirectional groups of lines. In another aspect each port may be comprised of bi-directional lines. An interface between two modules such as M0 and M1 in this arrangement will result in the front sides facing each other as indicated in FIG. 73B. Overall, the orientation of modules to form the configuration of FIG. 72 is shown in FIG. 73A.

FIG. 74A-D shows examples of other arrangements of modules. In FIG. 746A, modules M0 and M1 are shown in plan view, where the lines therebetween are unidirectional. Alternatively, each of the lines may bidirectional or may be comprised of groups of lines, and the symbols R and T may be considered as reference designators rather than as receive or transmit connections. In this instance, the R connection is shown on the left hand side and the T connection is on the right hand side of each module. When connecting the T connection of module M1, for example to the R connection of M0, the connection passes beneath each of the modules, whereas the connection of the T connection of M0 to the R connection of M1 does not pass underneath the module.

Figure 74B:
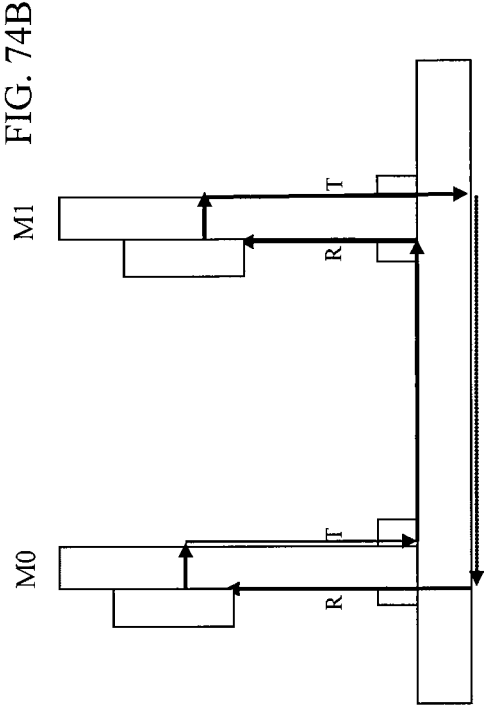
FIG. 74A-D shows an alternative arrangement of modules.
Figure 74D:
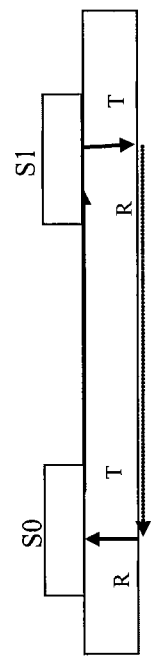
Figure 74A:
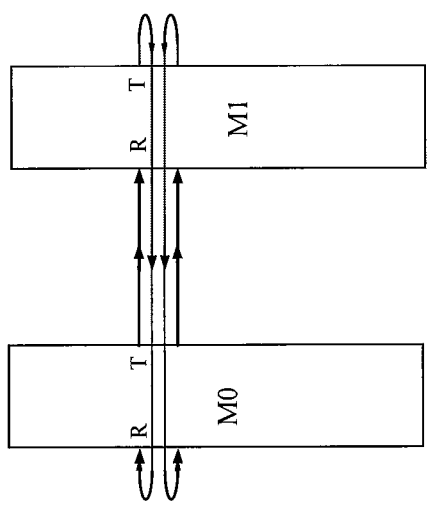
Figure 74C:
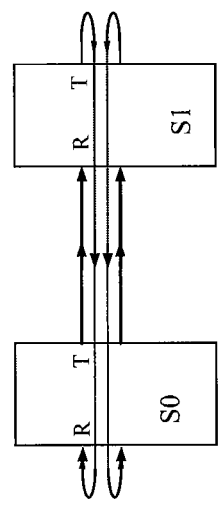

FIG. 74B shows the arrangement of FIG. 74A in a profile view where some of the lines are routed on one layer of the board 70S and some are routed on another layer 70B of the board. Each of the modules may be a circuit board on which various circuit components are disposed: components may include memory chips, a CSE, other interfaces, computing elements and the like. FIG. 74C shows another arrangement in plan view, and a corresponding profile view in FIG. 74D. In FIG. 74C, D, the module is designated as Si, which may represent a switch. A switch S may be a CSE or other device disposed on a circuit board. However, unless otherwise specifically restricted, the use of such designators as S, M, T, R are intended as general reference designators rather than restricting the function to a switch, a module, a transmit function, or a receive function. Lanes may be unidirectional or bidirectional, and be comprised of groups of lines having a combination of the characteristics described.

FIG. 75 illustrates an aspect where the interconnections between modules may not be on a motherboard or substrate. The connection between M0 and M1 is shown as being on a motherboard, as is the connection between M2 and another module (not shown, but disposed to the right of module M2) in the plan view of FIG. 75A. However the connections between M0 and M2 are shown as being by a board 980 connected between the tops of the modules M0, M2, which may be connectorized. Alternatively, this connection may be by a cable and connector or other means. This arrangement is shown in profile view in FIG. 75B.

Figure 76:
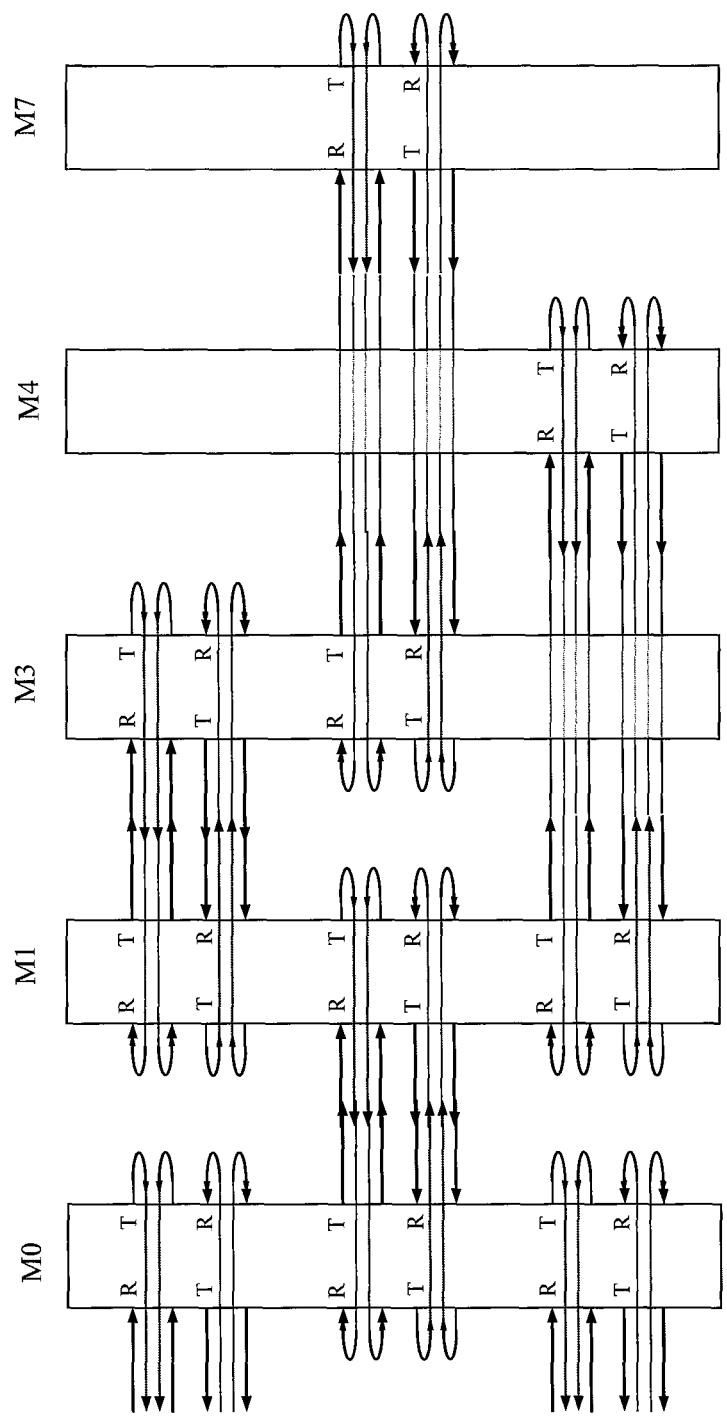
FIG. 76 shows a portion of the arrangement of FIG. 72 with alternative module connections.

In an aspect, FIG. 76 illustrates a portion of the arrangement of FIG. 72, where the connections to the modules are shown as alternating T and R connections on either side of the module for a port. As shown, there is a single alternation, where the receive connections R are on the right and the transmit connections T on the left, and then transmit connections T on the left and receive connections R on the right. It may be seen that three ports are shown on each of the modules. Any number of such alternations of connections may be present, and the number of lines associated with each alternation may range from zero upwards. The number of lines in each group may not be equal. Such a disposition of connections may eliminate the need to designate a front and a back side of the module as it may be seen that the modules may be connected as shown, for example in FIG. 73 without rotating the modules end-for-end to orient facing portions. Hence, symmetrical plug-in cards may be produced for some applications.

Figure 77:
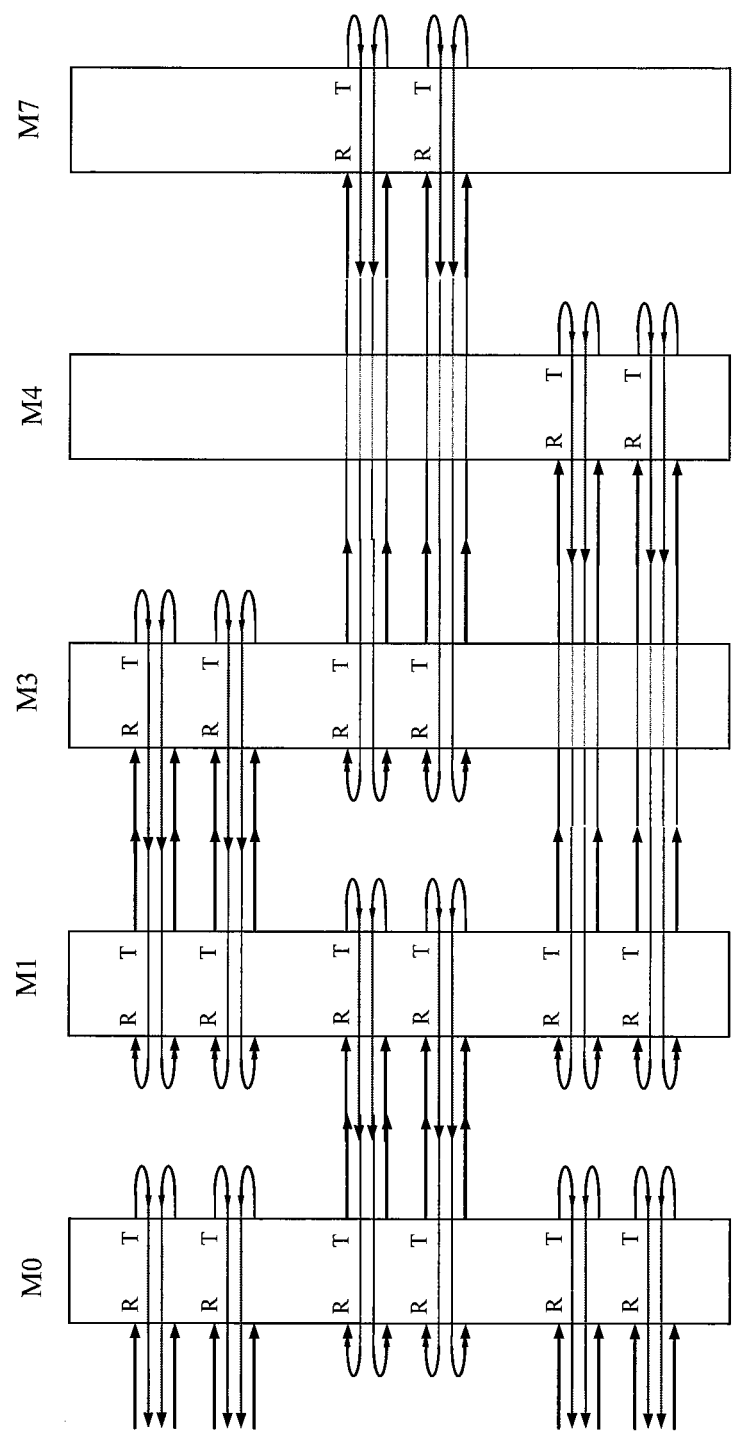
FIG. 77 shows a portion of the arrangement of FIG. 72 with yet another alternative module connection.

In another aspect, FIG. 77 shows the same arrangement of cards, where the T and R connections are not alternated. Here the R connection is on the left-hand side of the board and the T connection is on the right-hand side of the board. This illustrates that alternation of connections is not needed for certain arrangements of cards and connections.

Figure 78:
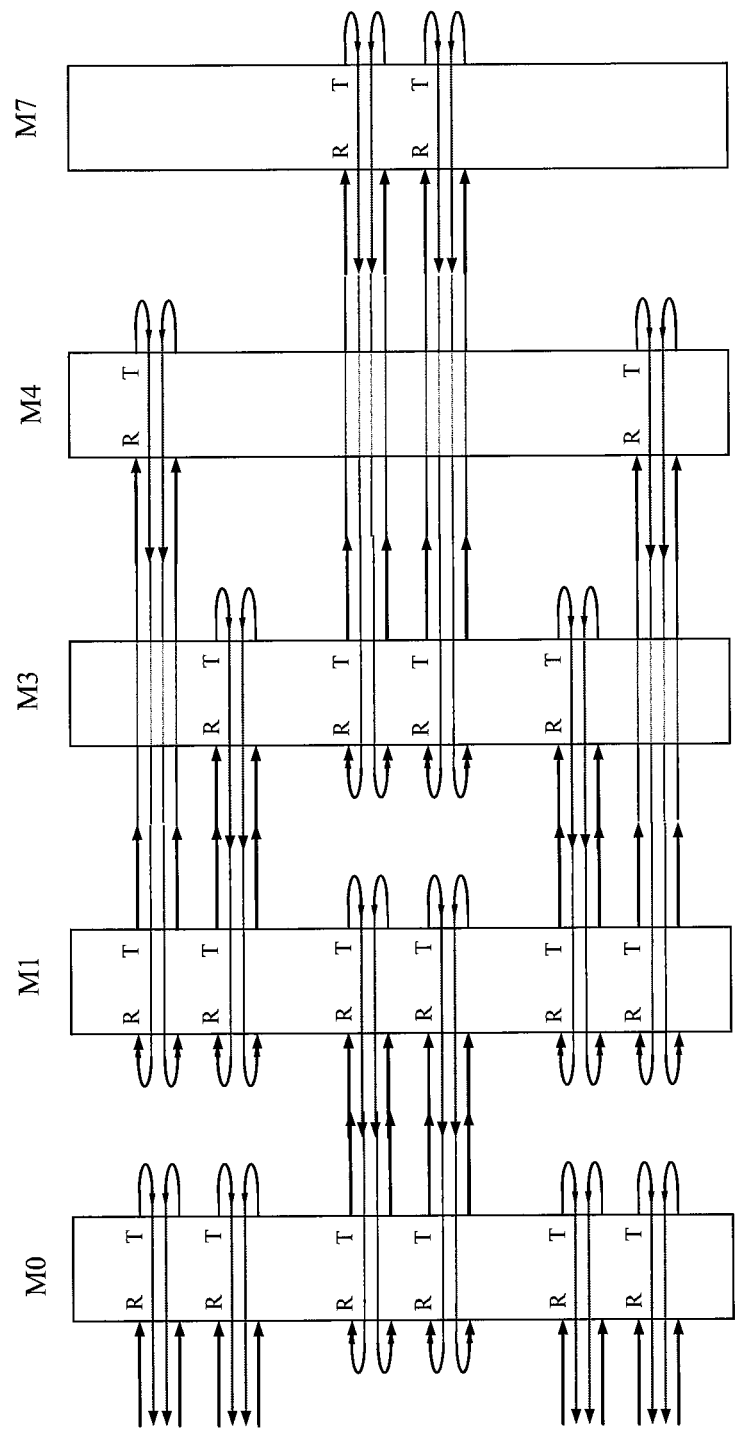
FIG. 78 shows yet another example of module connections for the configuration of FIG. 77.

FIG. 78 illustrates a aspect where the board connection configuration of FIG. 77 is used. The connection from M1 to M3, instead of being carried on the top two sets of transmission lines comprises the second group from the top. The lane between module M0 and M3 has been routed from the top of M0 to the switch (not shown) at the center of M0, crosses to the top of M1 and over to M3 as shown in FIG. 77. Thus, the longest signal path is half of the length of M0 to get to the switch and then cross to M1, up to the top of module M1. However, by arranging the lanes as shown in FIG. 78, the distance form M3 to the output of M0 the MC (not shown) is reduced. In this aspect only the lengths of the paths on the modules was considered. The distance between the modules is also part of the considerations of routing. In some situations, the distances traveled on the modules is greater than the distances between the modules. It may be seen that alternating the paths on the modules reduces the overall delay to modules further down the tree in a manner similar to exchanging the routes of data logically traversing the lanes.

Figure 79:
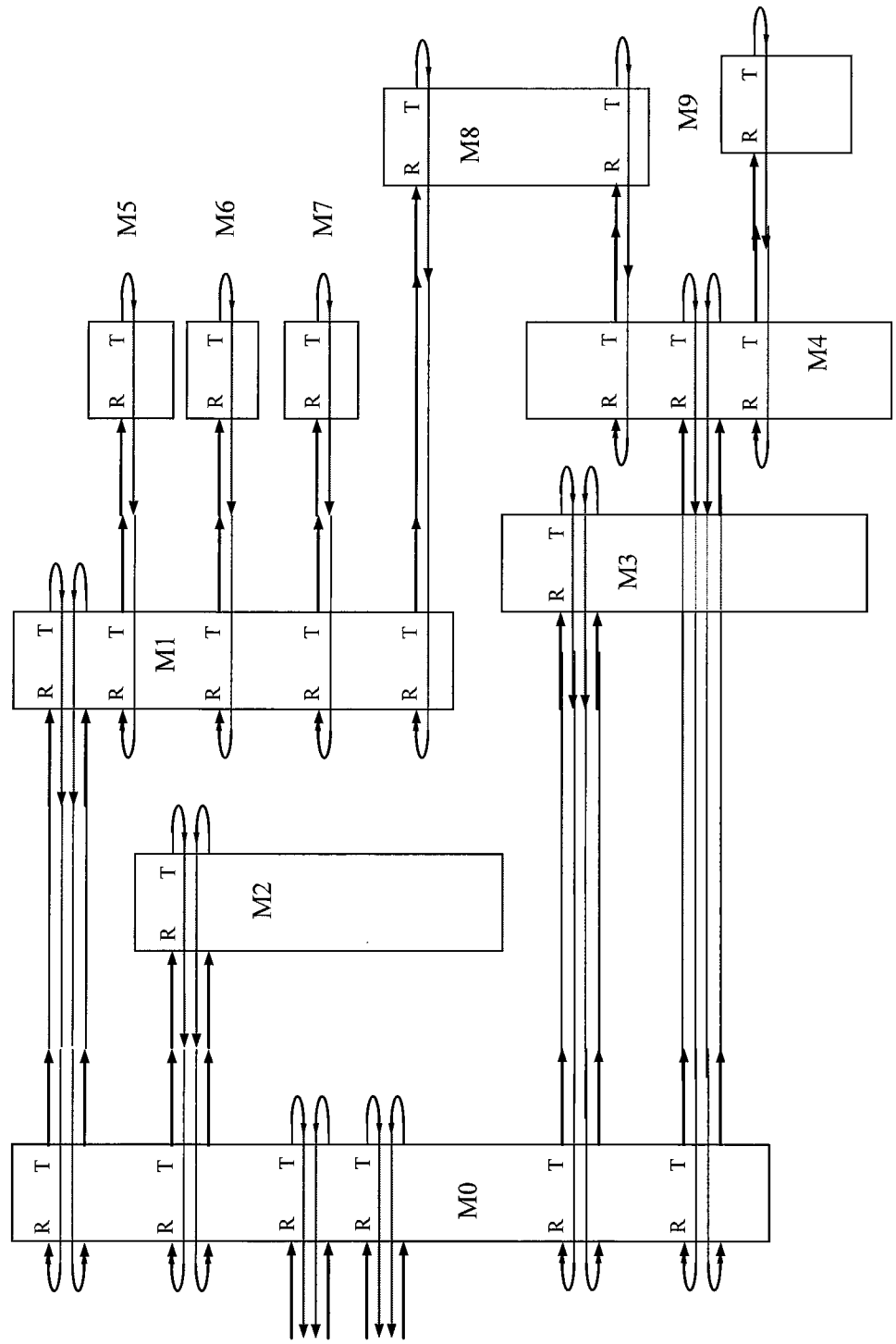
FIG. 79 shows an arrangement of modules having differing width links therebetween.

FIG. 79 illustrates an arrangement of modules having differing width links therebetween. Module M0 has two full lanes with two full ports of traffic to the module controller (not shown). However M0 has half as many lanes to each of modules M1, M2, M3 and M4. As each module may fill the lanes connecting it to M0, two modules may be simultaneously communicated at full speed. In the example of the connections to M5, M6, M7 and M8, having a connection to M1, all of the modules may be addressed at full speed simultaneously. Such an arrangement may be termed a "fat" tree. In such a tree, the width of the data path increases at it progresses to the root so that multiple modules may be accessed without congestion.

FIG. 80 illustrates a grouping of modules in the form of a grid. In FIG. 80A, four modules are connected in an elementary square, where the four module are mounted so that pairs of modules are parallel to each other, and pairs of modules are in-line with each other. When this configuration is applied to modules being mounted to a board by connectors, and rising vertically from the board, the alignment of the cards parallel to each other may facilitate the circulation of cooling air. The physical arrangement may thus be made regular, without regard to the logical interconnection arrangement. In the aspect shown, the modules have alternating transmit and receive connections. The U-shaped configuration of the lines connecting M0 and M2 may result in a skew reduction as the lane taking the longest route around the outside of the U is the layer which is closer to the center of the module and may be closer to a centrally located switch or CSE.

FIG. 80B shows a logical representation of the circuits in FIG. 80A, where each box now represents a module or the like, and a single line represents all of the interconnections between modules, such as links lines, and lanes. From this building block, FIG. 80C shows how the elemental configurations of 4 modules may be expanded into a grid of modules. The grid need not be perfectly regular in any dimension, and may have gaps in the interior thereof.

Figure 81B:
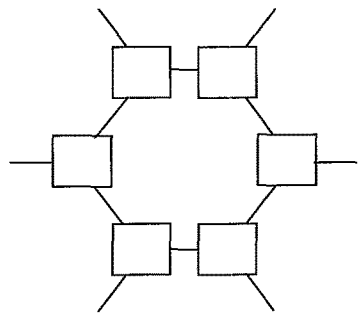
FIG. 81A-B shows a grouping of modules in the form of a hexagon.
Figure 81A:
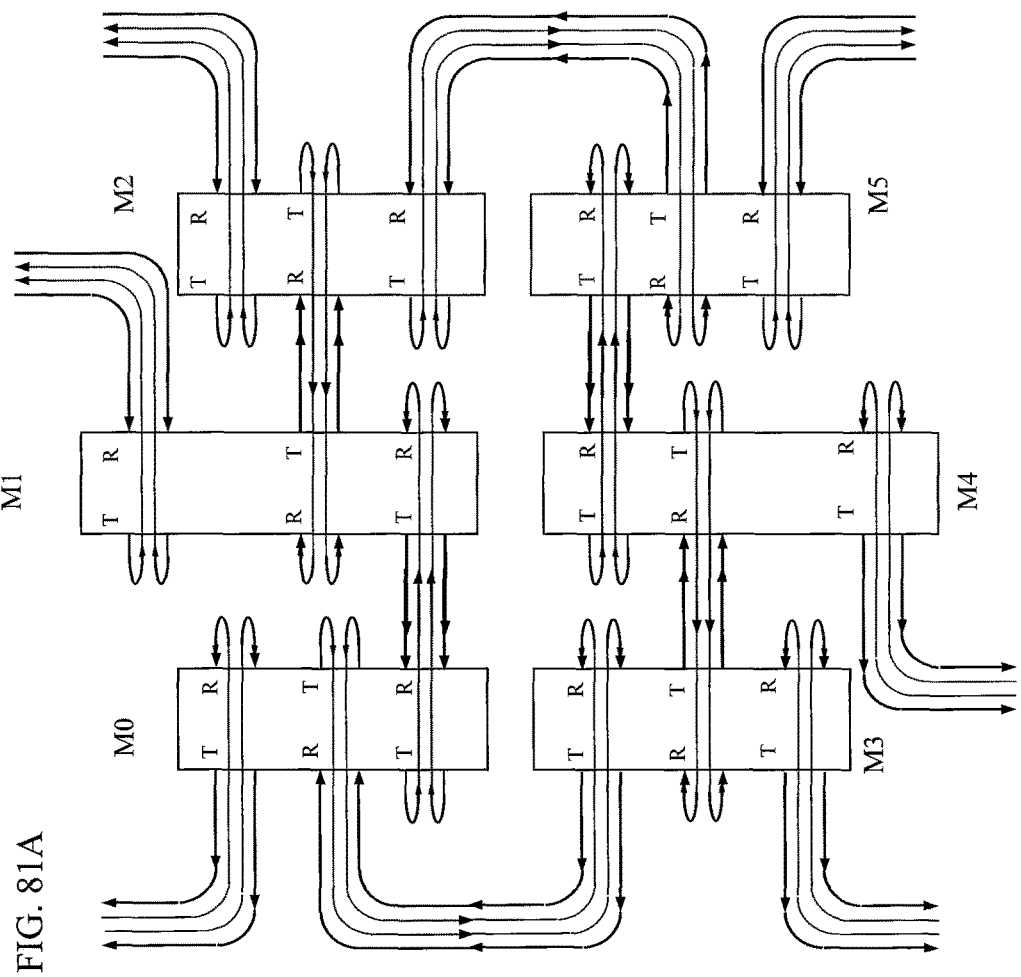
Figure 82:
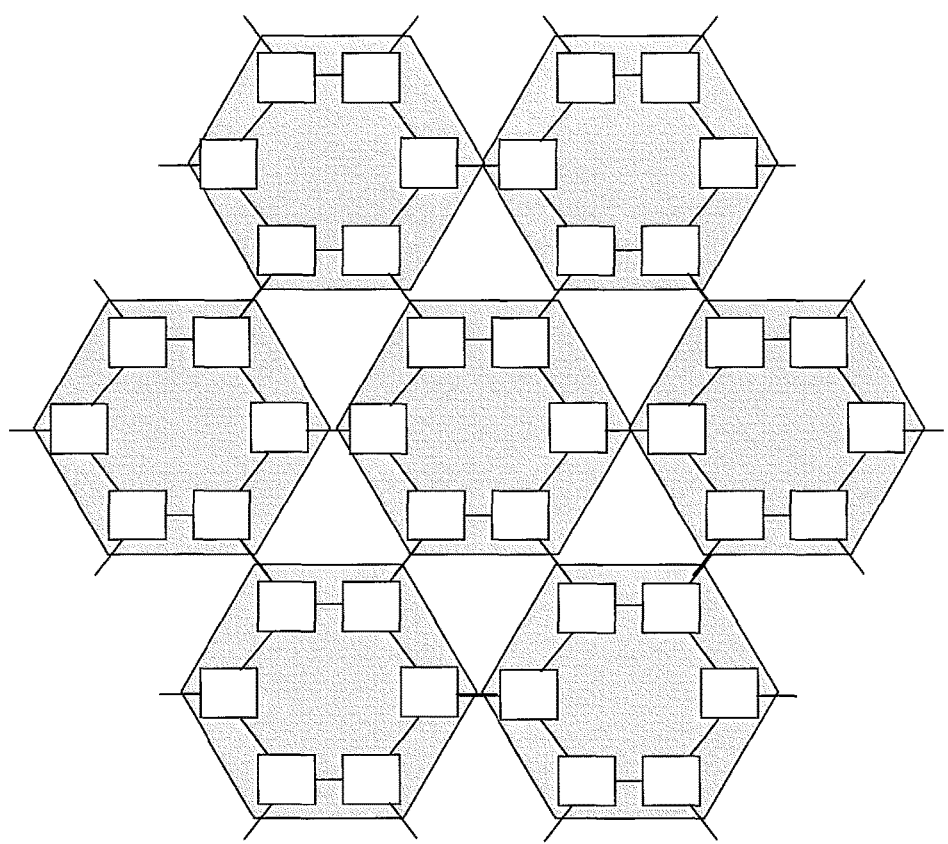
FIG. 82 shows a grid comprised of hexagonal structures.

A variety of geometrical configurations may be formed, such as the group of 6 shown in FIG. 81A. (Note that there is no requirement for the modules to be of dissimilar physical size as shown in the figure; the use of differing size blocks is for convenience in illustration). The logical arrangement of the 6 modules, similarly to the arrangement of the 4, is shown in FIG. 81B and is in the shape of a hexagon. FIG. 82 illustrates a grid made up of hexagonal structures. In terms of connectivity, as contrasted to FIG. 80 where the path leading from M0 goes straight up and connects to the path leading to the bottom of M2, and the transmission lines on the top of the board lead to receive lines on the top of the board on M2, in FIG. 81A, M0 appears connected to M3 and the T line appear to be connected. However M0 is in fact communicating with M5, and M3 is communicating with M2, and the proper terminals are associated due to the 6 module groups being offset from each other as shown in FIG. 82C In yet another aspect, shown in FIG. 83a-b, an arrangement of modules in a grid configuration and connected to a processor unit (CPU), a memory controller or module controller, or other device, which is configured so as to interface to modules. In this instance a memory may be shared with 4 central processor units (CPU 1, . . . , 4).

Figure 84B:
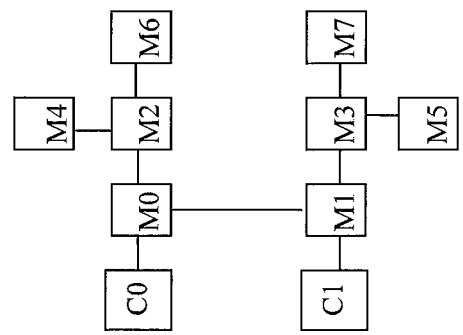
FIG. 84A-B shows a configuration where the processors are connected in a two-rooted tree.
Figure 84A:
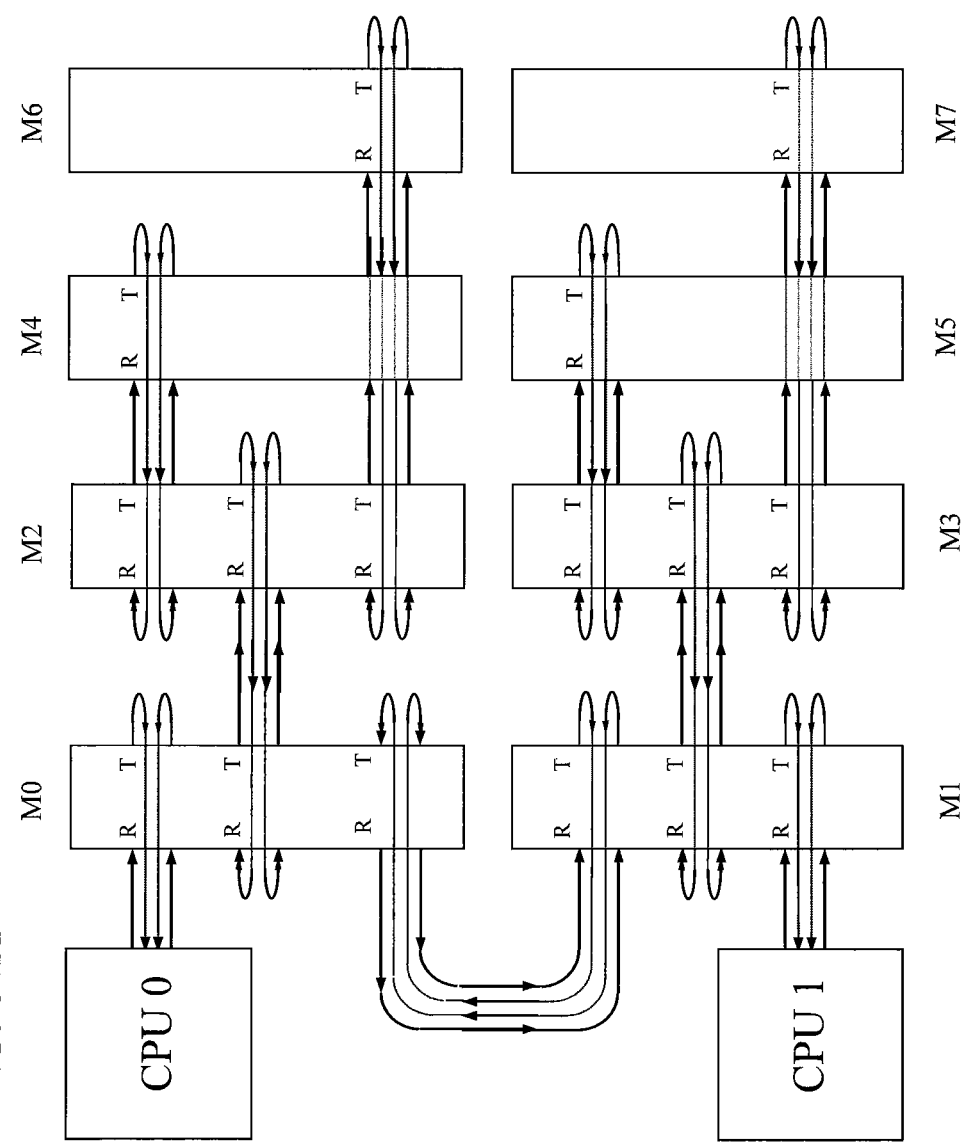

FIG. 84a-b, illustrates yet another configuration where 2 CPU devices are connected to what may be termed a 2-tree, which may be termed a two-rooted tree. In an aspect, CPU C0 may be operated as the root of a tree which is connected to modules M0, M2, M4 and M6, with CPU C1 being the root of modules M1, M3, M5 and M7. Access to each of the trees by the associated root CPU may be performed without regard to the operation of the other tree. However when access to the other tree is desired, then a protocol to arbitrate potential conflict may be provided either in the tree systems or between the CPUs. Such dual-port memories may permit two or more CPUs to communicate by storing messages in the same module, providing that an access path to the common module exists. In particular, the connection from module M0 to module M1 can be channelized such that, for example, half of the lines may be under the control of one CPU and half the lines may be under the control of the other CPU such that the CPUs may transmit messages to each other, or otherwise communicate.

Figure 85B:
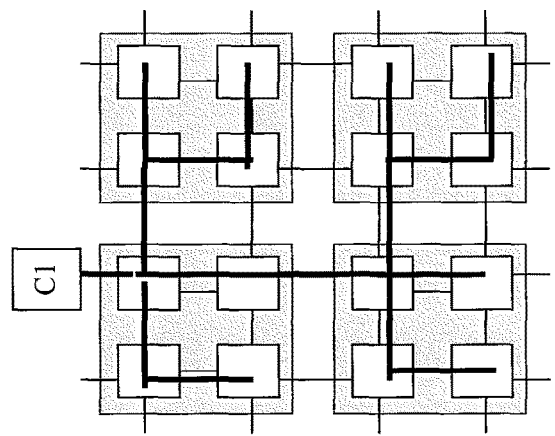
FIG. 85A-B shows additional examples of modules connected to multiple processors.
Figure 85A:
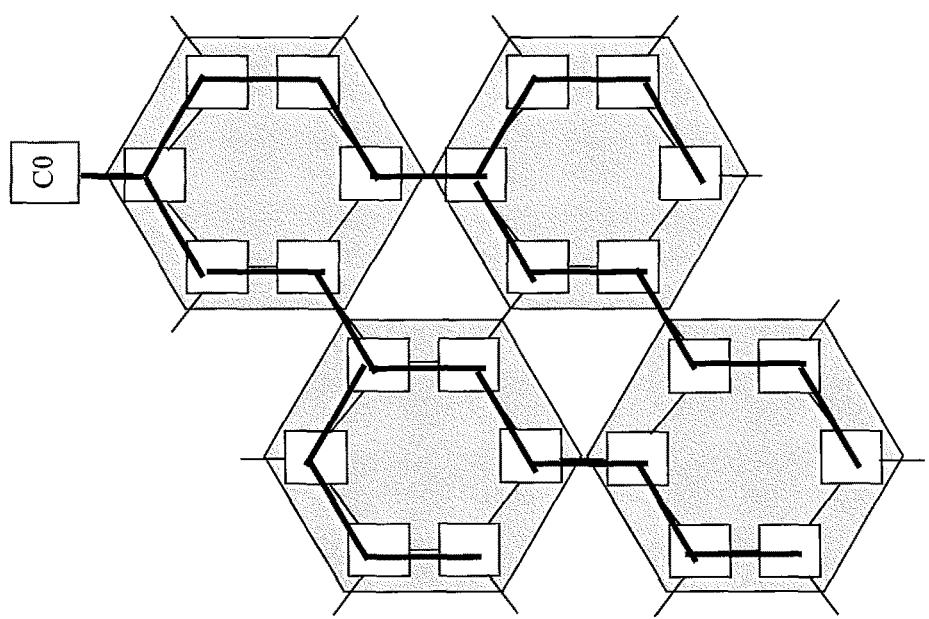

FIG. 85A, B shows two different arrangements of modules connected to a CPU in which a logical tree connects each of the modules to the CPU. In such a circumstance, links not on the logical path may not be powered up; however there is nothing to preclude powering the links. It is also possible for different logical trees to be used for control and return paths. In such tree arrangements, the data and control flow may be allocated to distribute the load based on usage of individual modules, or the connections may be logically rearranged so as to permit access to I/O devices.

Figure 86B:
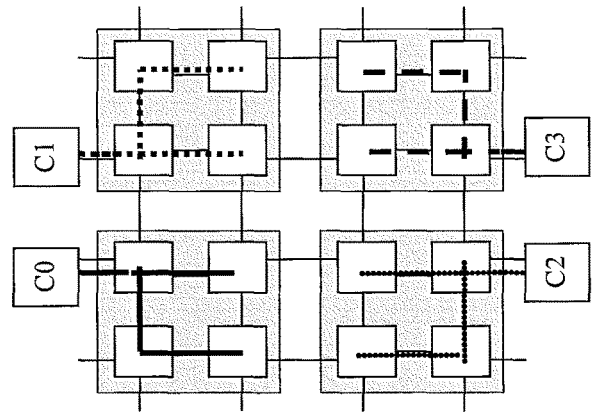
FIG. 86A-B shows yet other examples of modules connected to processors.
Figure 86A:
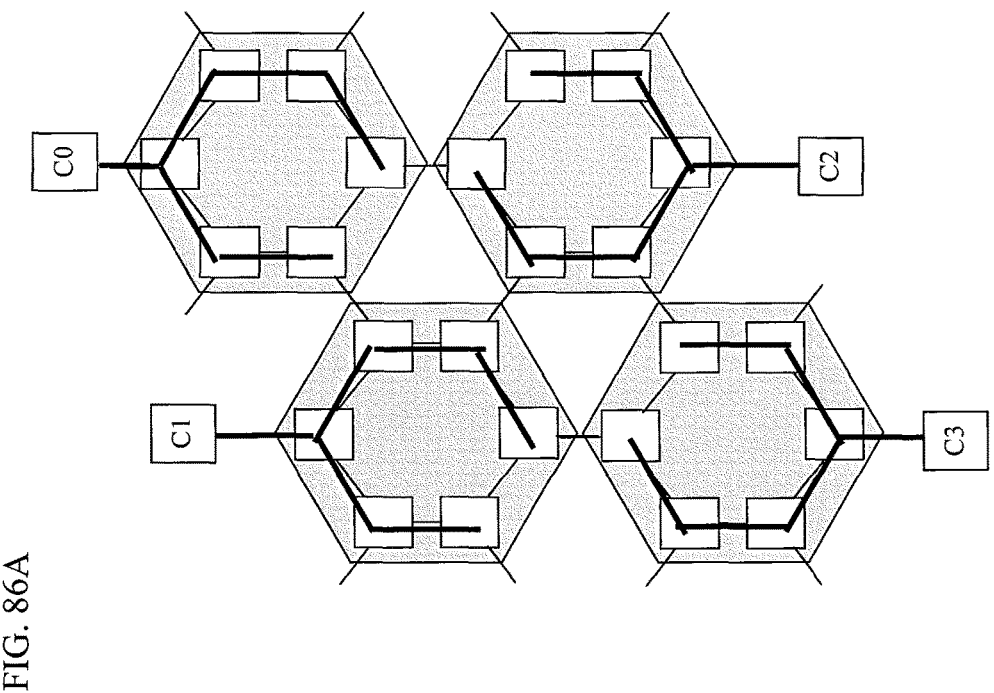
Figure 87B:
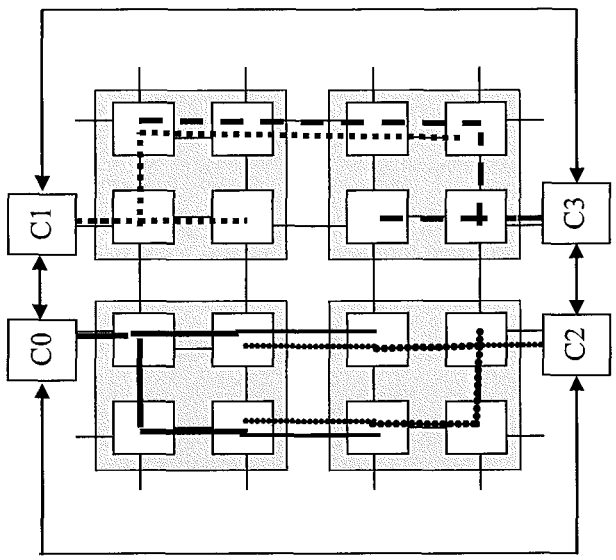
FIG. 87A-B shows the extension of control and data busses into shared memory areas.
Figure 87A:
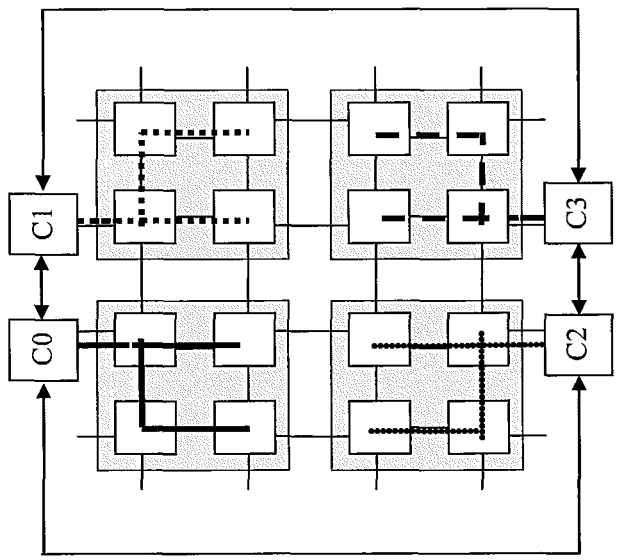

FIG. 86A shows an array of hexagonal modules, each hexagon having a separate CPU (CPU 1, . . . , 4), where the control paths are shown as a heavy connecting line. FIG. 86B shows a grid arrangement of square modules with separate CPUs, and for clarity, the logical control path from each CPU is shown with a separate symbology (various solid, dashed and dotted lines). In these figures, the CPUs are shown only accessing an associated group of memory elements, but not sharing access with another computer. However, FIG. 87B illustrates the extension of the control and return busses such that they extend into shared memory areas. The arbitration of memory access to shared memory may be performed in the trees, or by communication between the CPUs on a separate communications path, or by some other means. In the case of CPUs C1 and C2, some of the lanes have been shown as half the width previously shown and, as discussed previously, such a configuration may be accessed simultaneously by the two processors. The processors may also be configured to access the shared memory alternately.

Figure 88:
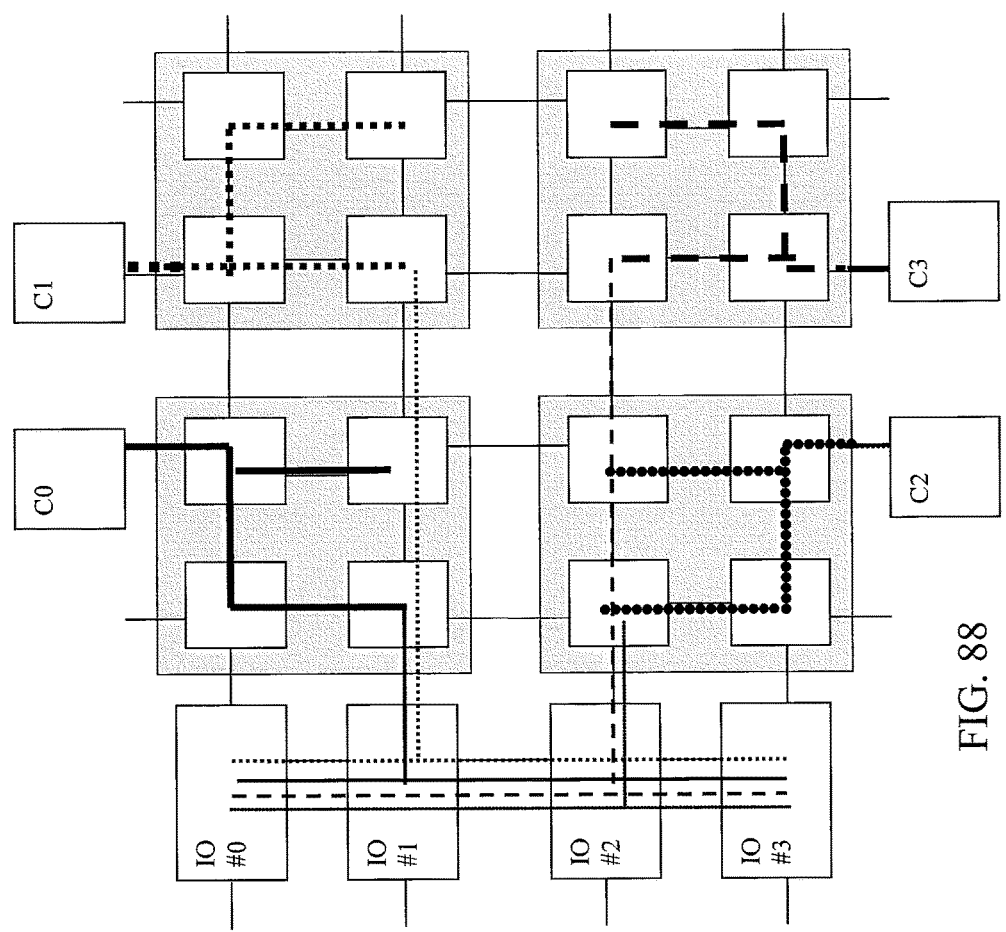
FIG. 88 shows a configuration of 4 processors and a grid of modules configured as input/output devices.

FIG. 88 illustrates a configuration of 4 CPUs and a grid of modules, which may be memory modules, as well as 4 modules configured as input/output (I/O) devices (I/O#0 through I/O#4). In this instance, it may be seen that each of the CPUs may simultaneously access any of the I/O modules without the need for arbitration.

Figure 89:
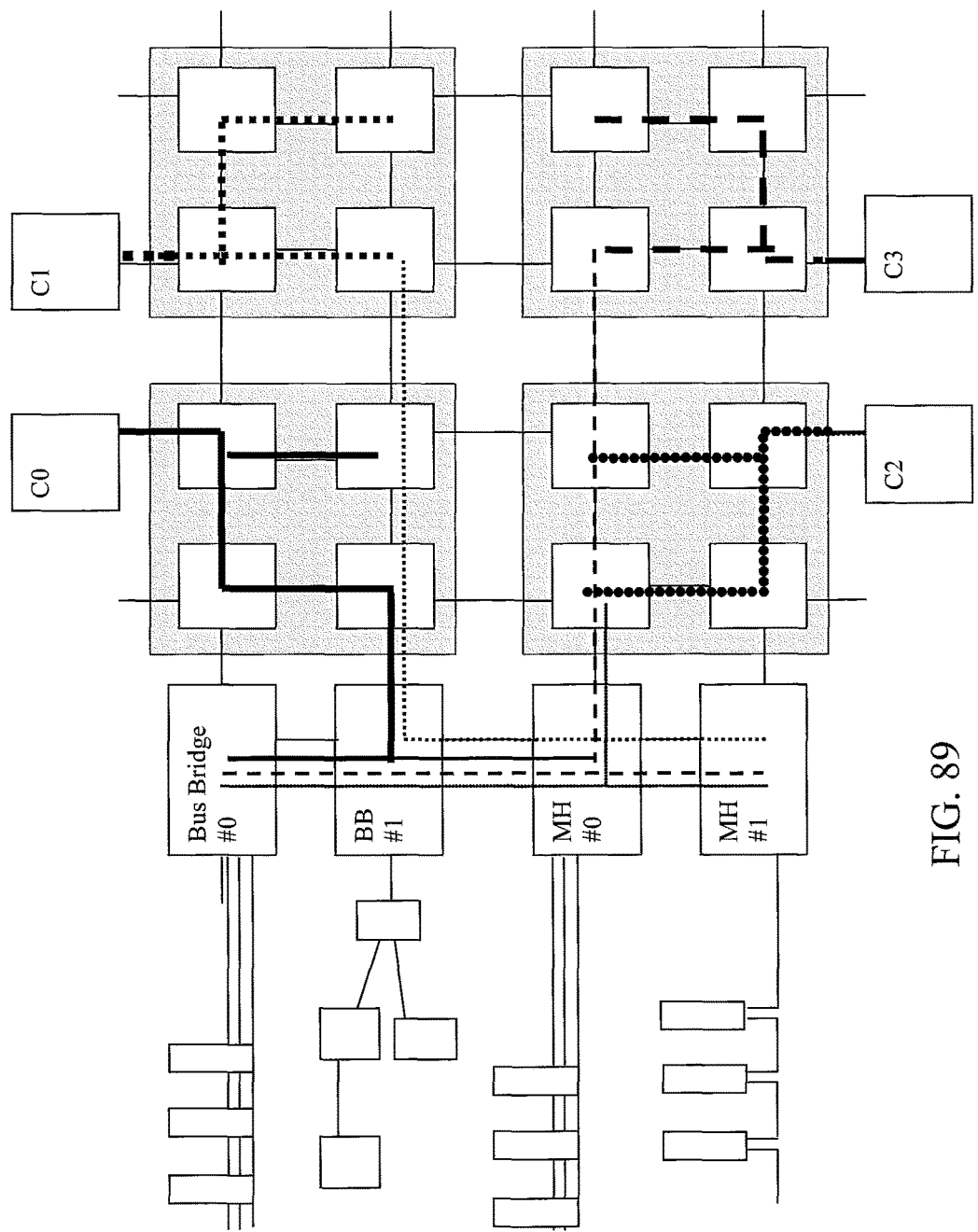
FIG. 89 shows the configuration of FIG. 88 where the I/O modules are replaced by other computing system elements.

FIG. 89 illustrates a configuration were the I/O modules are replaced by other computing system elements such as bus bridges (BB) for connecting to a multi-drop bus, which may be a PCI bus, a point-to-point bus such as a PCI Express, a memory hub MH #0 interfacing to a multi-drop memory bus and a memory hub MH #1 connecting to a point-to-point memory bus. The width of the lines are shown of unequal width so as to schematically indicate that not all paths need be of equal width, nor need the paths be symmetrical.

Figure 90:
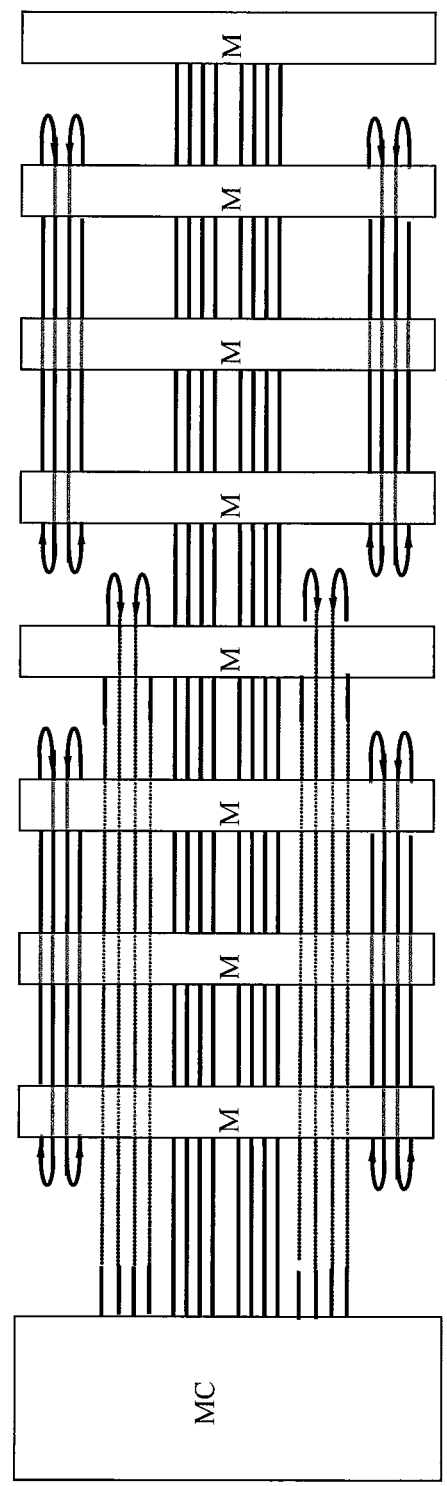
FIG. 90 shows an arrangement of modules and links capable of supporting both a linear and/or a tree topology.

FIG. 90 shows an arrangement of modules and links capable of supporting both a linear and/or a tree topology, depending on which sets of traces are used.

Figure 91:
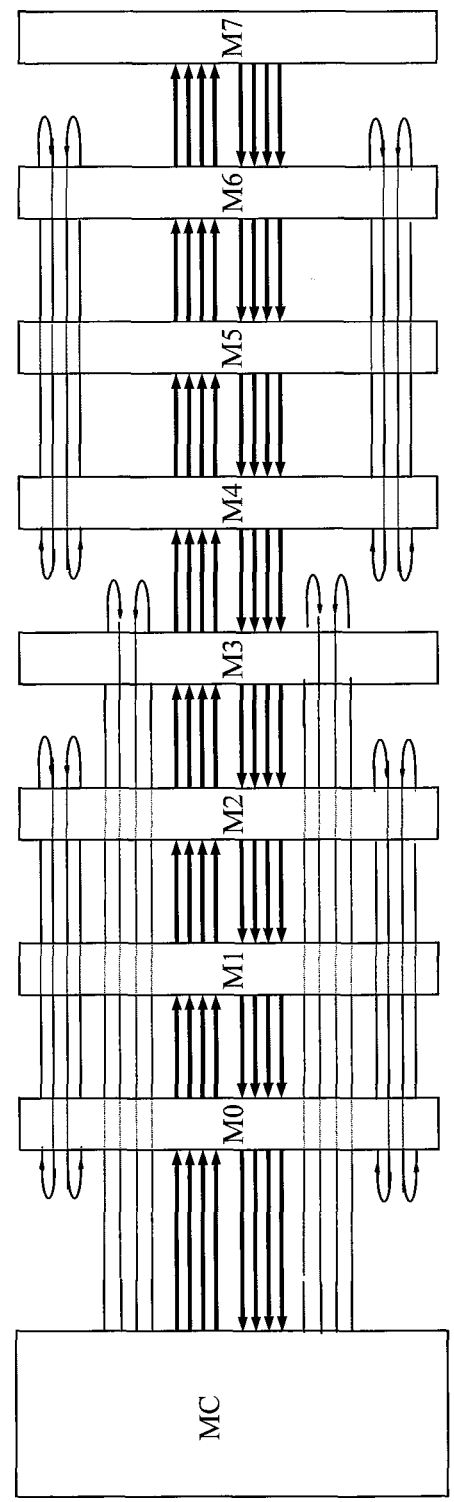
FIG. 91 shows the configuration of FIG. 90 used in a linear topology.

FIG. 91 shows the configuration of FIG. 90 used in a linear topology using the center traces.

Figure 92:
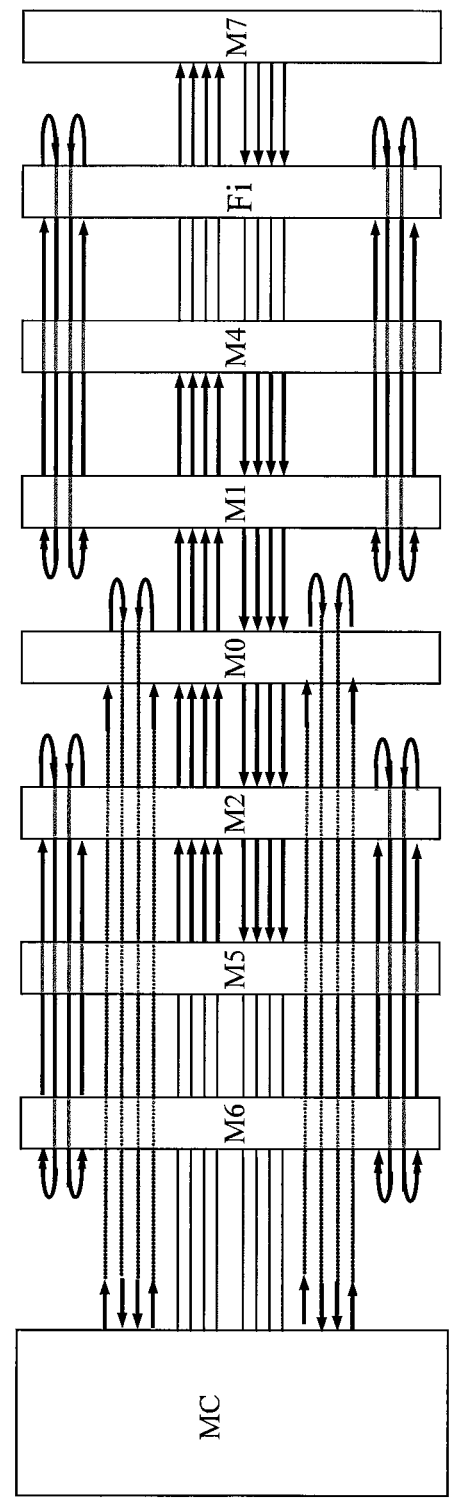
FIG. 92 shows the configuration of FIG. 90 used in a tree topology.

FIG. 92 shows the configuration of FIG. 90 used in a tree topology using the outer traces as well as some of the center traces.

Figure 93A:
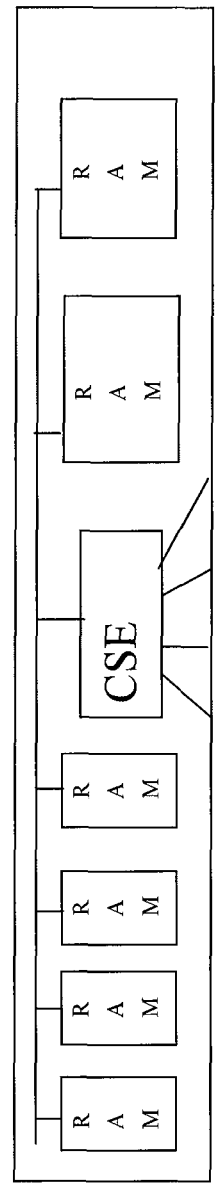
FIG. 93A-B shows a CSE disposed on a module with RAM.

FIG. 93A shows a CSE disposed on a module M with a number of RAM chips, which may be located on both sides of the module, to provide a connection from the module controller to the RAM chips. RAM is used as an example of a memory type, and should not be interpreted to restrict the types of memory technologies which may be used.

Figure 93B:
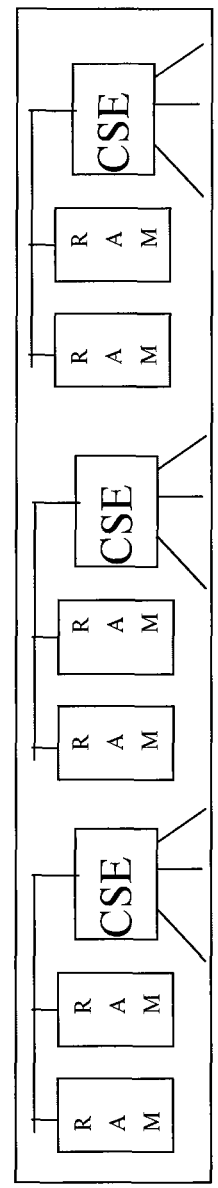

FIG. 93B shows 3 CSE's providing the functionality of FIG. 93B in a 'bit slice' manner.

Figure 94A:
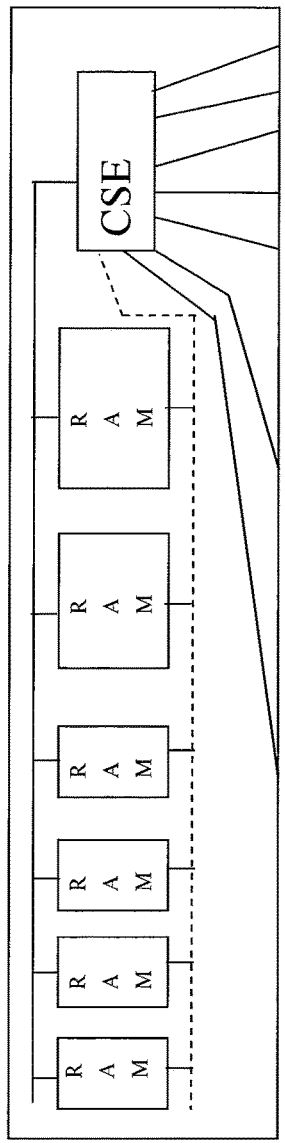
FIG. 94A-B shows a CSE with RAM chips having separate data and control lines.

FIG. 94A shows a CSE on a module with a number of RAM chips as in FIG. 93A with the data lines to the RAMs shown as a solid line and the address/command lines shown as a dashed line. The size and location of modules on the board may not be critical in many applications.

Figure 94B:
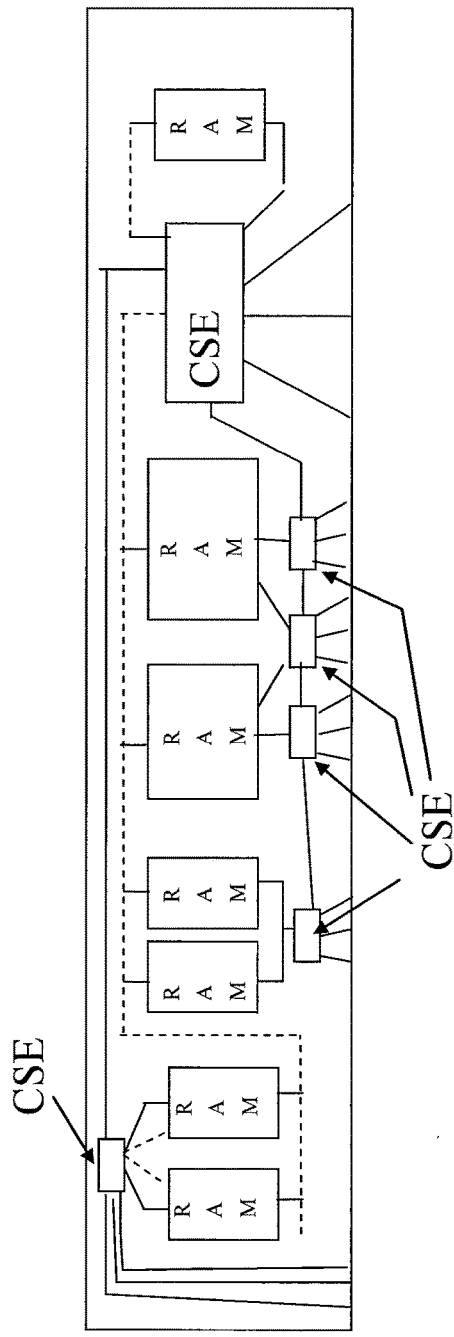

FIG. 94B shows several CSEs on a module where the data lines from the RAMs have been bit sliced across a number of smaller CSEs. The right-most CSE on the module controls the address/command lines to the RAMs, although the bit slice CSEs may also control address/command lines, and the right-most CSE may also carry data from some RAM chips as well.

Figure 95:
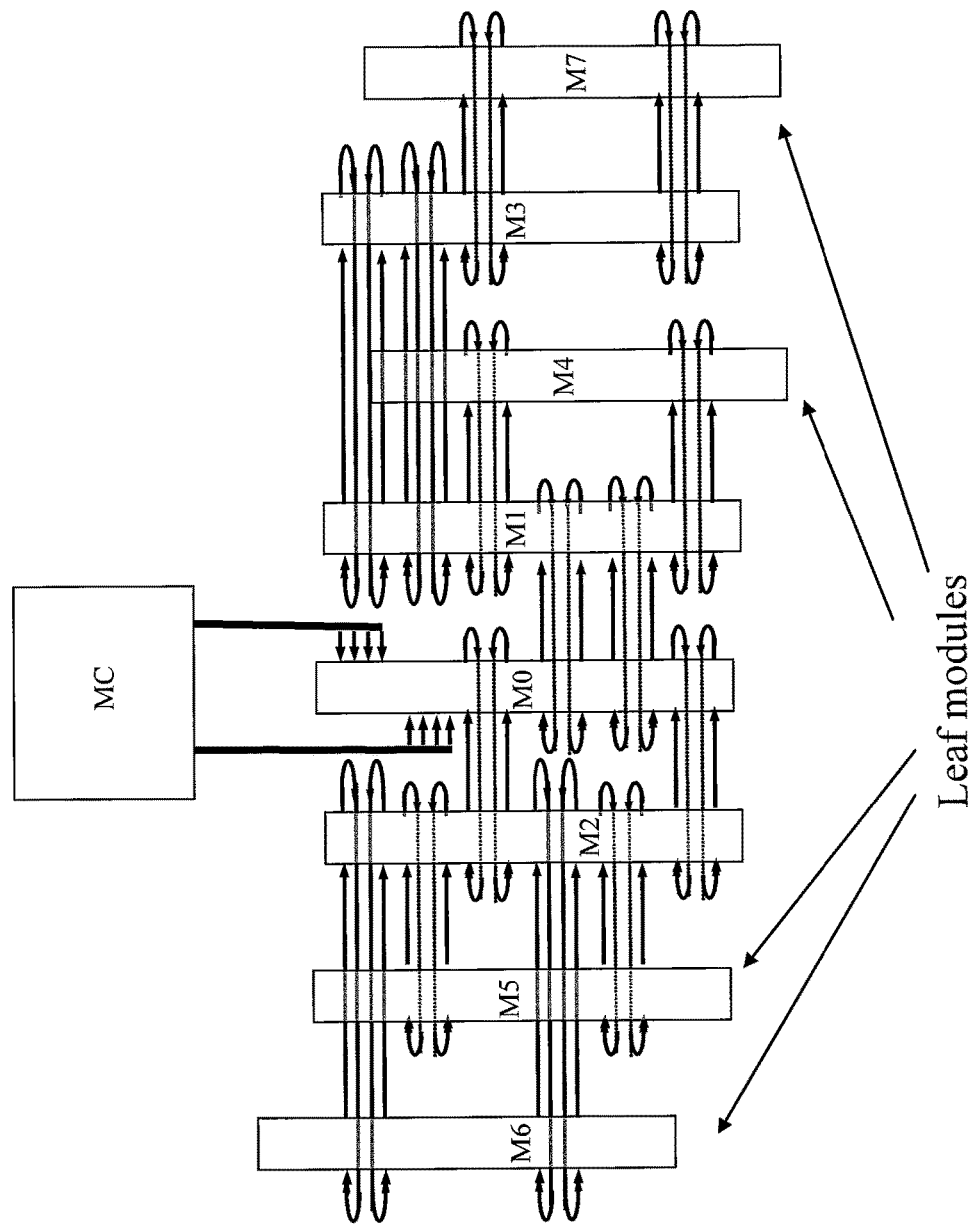
FIG. 95 shows a physical configuration of leaf modules with respect to the remainder of the tree.

FIG. 95 shows a configuration where the relative physical position of the signal links on the modules of the leaf modules (M6 and M7) at the bottom of the tree is the same, which may permit various optimizations to be performed such as building leaf modules with CSEs that may only have pins for one set of links and/or connectors which may only have traces to connect to one connect one set of links as well as other benefits that may be derived from having a module with reduced capability.

Figure 96:
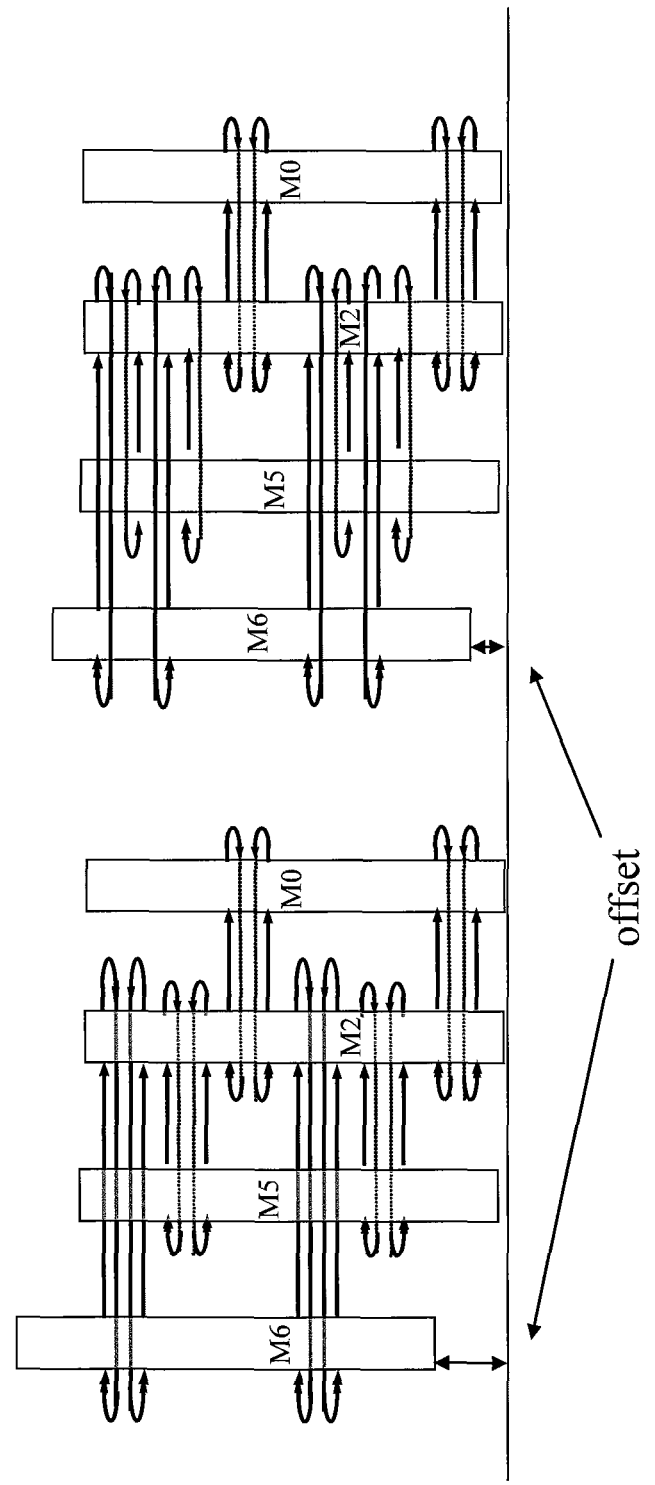
FIG. 96 shows an alternative physical configuration of leaf modules.

The left side of FIG. 96 repeats the left half of the group of modules shown in FIG. 95, and illustrates the offset of module M6 from the other modules with respect to a linear alignment of parallel modules. The right side of FIG. 96 shows the same modules where the arrangement of the traces has been altered so as to reduce the size of the offset of module M6.

Figure 97:
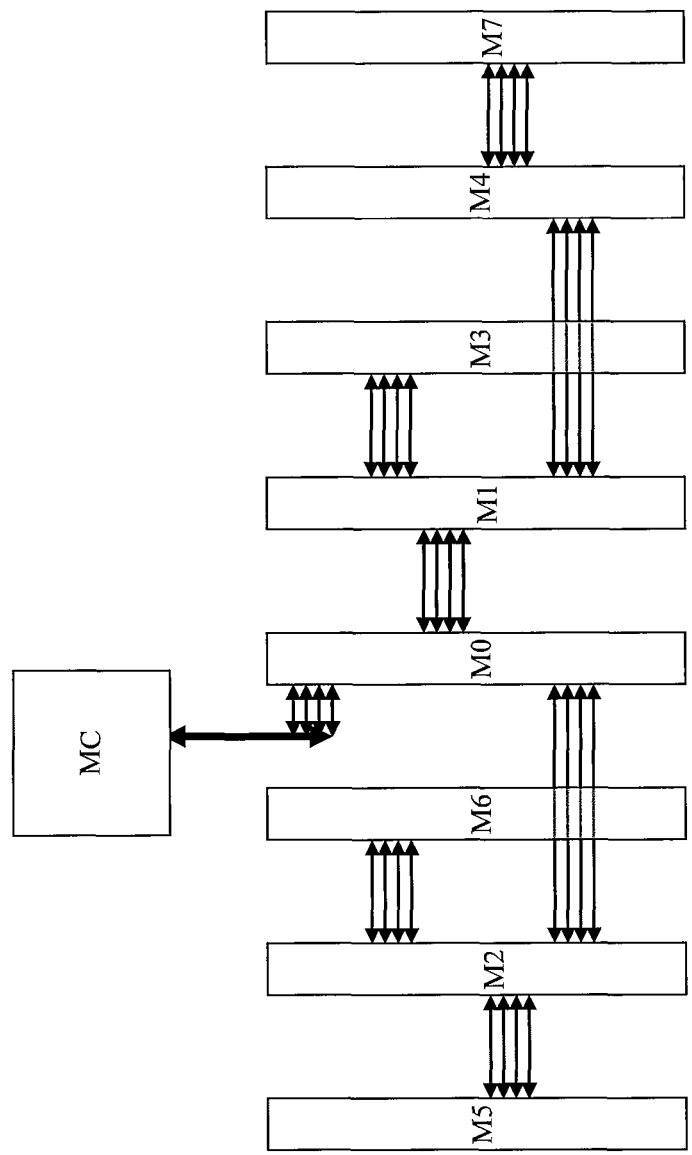
FIG. 97 shows an arrangement of modules having bi-directional links.

FIG. 97 shows an arrangement of modules using bi-directional links.

The term module is used to encompass a CSE and its related functions and/or components even though the 'module' may reside on the same board as another 'module' rather than having to be connected to the module controller and/or other modules through a plugable connector. The connections between CSE have been shown as board traces, but this should not be taken to preclude interconnect via wires, cables, optical interconnect, substrate trace patterns, and the like"

Figure 98:
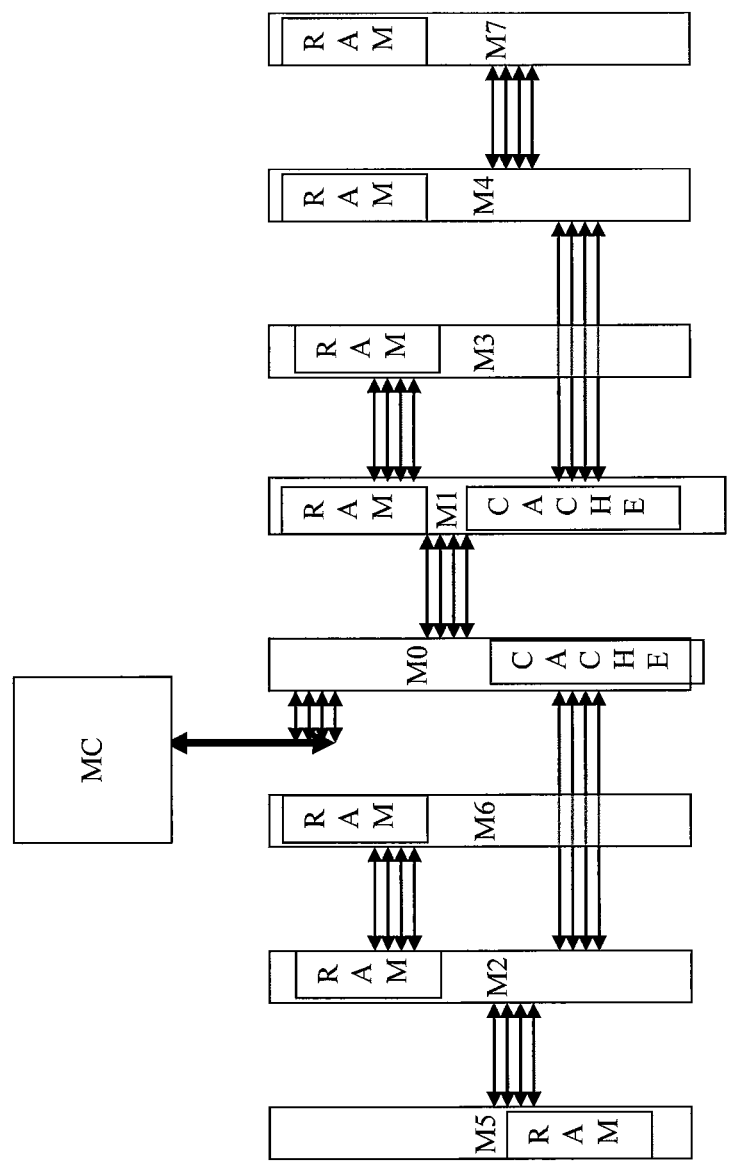
FIG. 98 shows a module with cache memory.

FIG. 98 shows modules as previously described, with the addition of cache memory, which may be RAM or other memory technology. The caches may be a part of the CSE or the overall module and serve to cache or buffer data passing through the module on the way to or from the module controller or any other module. The use of cache may facilitate flexibility in the timing of data flow, and if suitable data is stored, the reconfiguration of the data flows to deal with, for example, module failures.

Figure 99A:
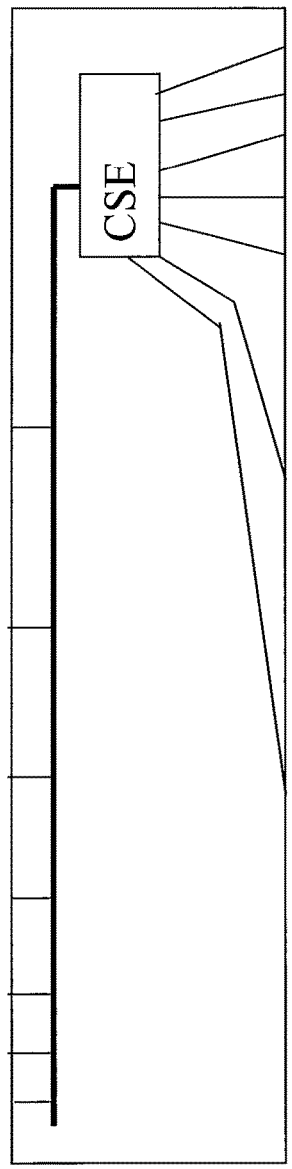
FIG. 99A-B shows a CSE bridging interconnection systems.
Figure 99B:
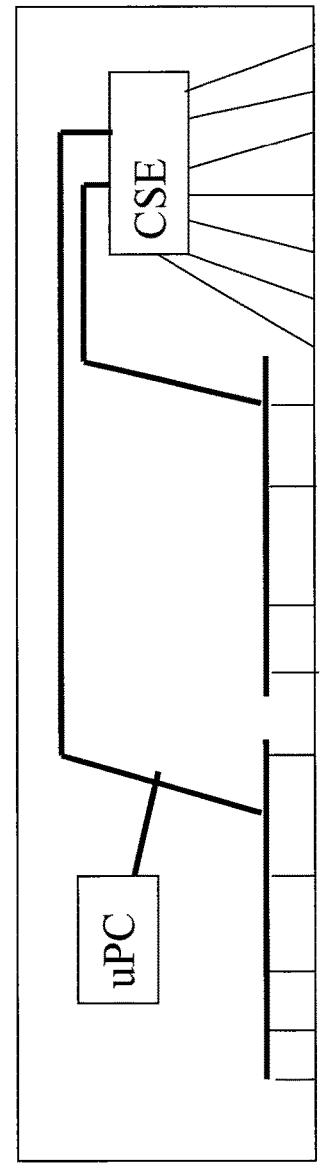

FIG. 99 shows a CSE bridging between multiple, possibly differing interconnect systems. FIG. 99a shows the CSE connecting to an interconnect that would be connected to the top edge of the module. FIG. 99b shows a CSE connecting to 2 interconnects that would connect to the bottom edge of the module.

In another aspect, the reliability of systems of communications, computation and memory may be of concern. To the extent that data or functionality will be lost due to a failure of one or more components, both the reliability of the individual devices and components, and the architecture of the system may be considered to be relevant. Single point failures, such as a computer processor, a memory controller, a node, a memory module, or the like may be considered undesirable. Configurations providing for the correction of data errors and the restoration of corrupted data using redundancy techniques such as check-sum, CRC, error correcting codes, and RAID. The term "RAID" is literally an acronym for "Redundant Array of Inexpensive Disks", but now has a meaning in the art as any scheme for redundancy involving the striping of data and check bits over a number of data storage devices, and RAID is used in that sense herein. In particular, a communications, computer or memory architecture as described herein may be configured so as to provide both for the use of data correction techniques and redundant links such that more than one failure may be experienced before the overall system is substantially compromised. Such failures can be detected and components or devices identified and replaced prior to, for example, data loss. In an aspect, the configuration of devices may be such that a device, component or module may be replaced while the power remains applied and the apparatus is remains functional throughout the repair. Such a repair is known in the art as "hot swapping".

Figure 100:
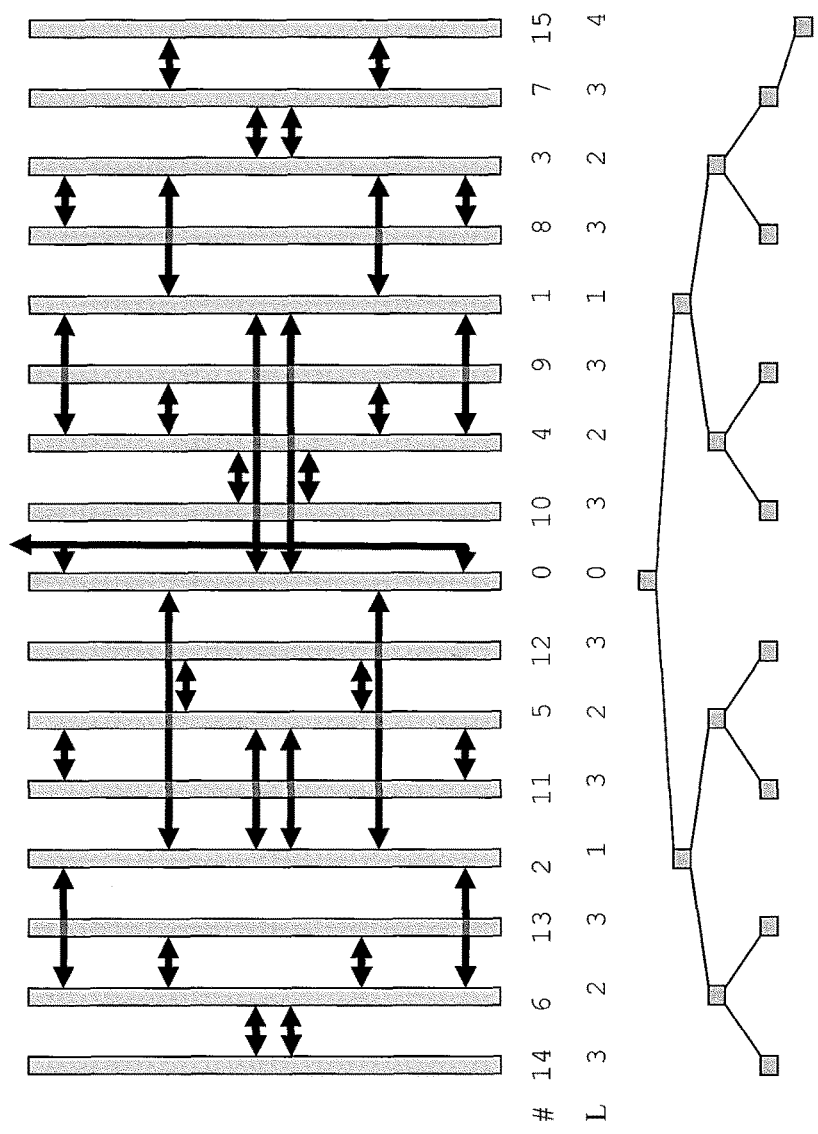
FIG. 100 shows a binary tree of modules disposed in a linear physical arrangement.

FIG. 100 illustrates a binary tree of modules, where the modules are disposed in a linear fashion. The communications lanes or link or bus between modules is schematically shown by lines terminated by arrows one each end. Where the bus passes under a module but does not connect, the bus may be shown in gray; however, there are no connections to any module by any bus except where an arrow on a bus or link touches a module. In this example, each port is partitioned into two channels and the channels are shown as one bus on a first side of the module and two busses on the second side of the module.

In describing a tree arrangement of modules, it is convenient to talk about both "levels" in the tree and of individual modules by numeric designation. At the lower portion of FIG. 100, the logical links connecting between modules in a binary tree having 5 levels are shown. The root of the tree is a single module at level 0, designated as module 0 (M0). The root module may connect to a memory controller MC (not shown) through one port and to two other modules at level 1, M1 and M2, through the other two ports. A module intended for use in a binary tree may have three or more ports and, as discussed previously, the ports may be divided into one or more channels. In this instance, the ports are shown divided into two channels. It should also be noted that where the hardware and software is configured to support communications between any two channels on a module, without regard to port assignment, the motherboard signal line connections may be made to different locations on each of the module connectors. In this example, two channels are used to communicate between modules directly connecting to each other.

Underneath each of the modules in the linear arrangement at the top of FIG. 100, a first series of numbers M# indicates the numerical designation of module, and the second series of numbers L indicates the level of the module in the tree. In this configuration, the root module 0 at level 0 is disposed at the center of the group of modules and the bus exiting at the top of the figure connects, for example, to a memory controller MC or a CPU or similar device. On either side of module 0 are modules 10 and 12, at level three. The modules at level 1 are disposed approximately equidistant between the root module and the two ends of the linear physical arrangement of modules. In the situation shown, where modules of equal rank are not disposed opposite each other, the cooling of the memory array may be improved as hot spots may be minimized.

In the tree configuration of the present example, all of the data eventually flows through module 0 as it is the only module directly connected to the MC. This means that the lanes will be energized more often than any other module, and the module 0 will have the highest power dissipation. For convenience in discussion of power dissipation, it is assumed that all of the modules are present, and that reading and writing is evenly allocated to each of the modules. Modules at level 1 therefore may have to transmit and receive half of the data handled by the root module. The means that the lanes will be energized half as often, on average, as the root module, resulting in lower power dissipation in each of the modules; in a simplistic way, half of the power dissipation of the root module. Similarly, level 2 modules will each dissipate one quarter of the power of the root module, and level 3 modules will each dissipate one eighth of power. Thus, except for the root module, which dissipates the most power, the other modules each dissipate considerably less power, and in the arrangement of FIG. 100, the root module is faced on either side by modules at level 3, which each dissipate only one eighth of the power of the root module. Special arrangements may be made for cooling the root module, and the other modules will be less difficult to cool with few or no hot spots developing. Later, a means of distributing the throughput load using a multi-rooted tree will be discussed, and it should be evident to a person skilled in the art that the power distribution of the each root will be reduced by a factor of two.

Figure 101A:
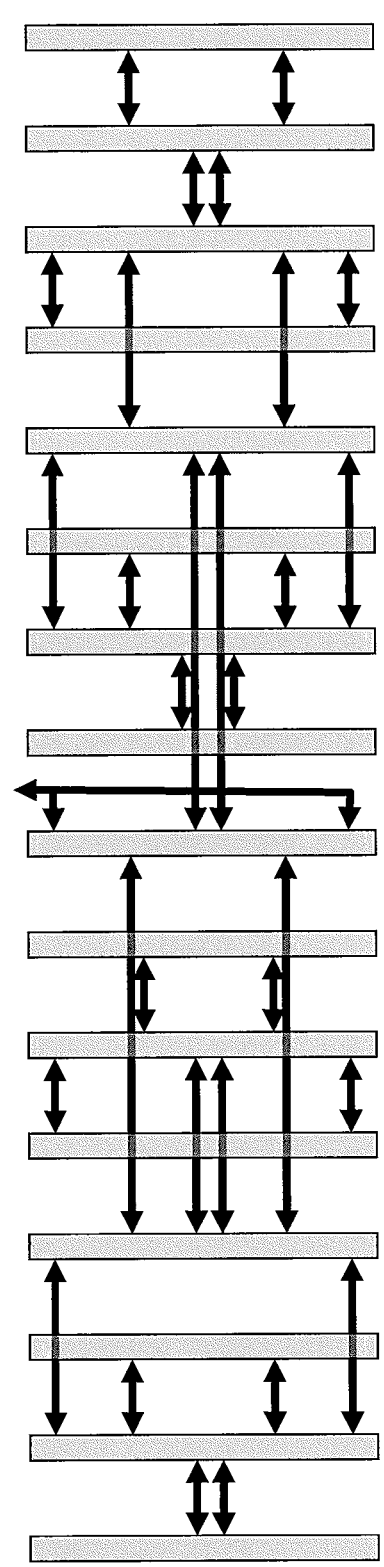
FIG. 101A-B shows an alternative connection arrangement for the tree of FIG. 100.
Figure 101B:
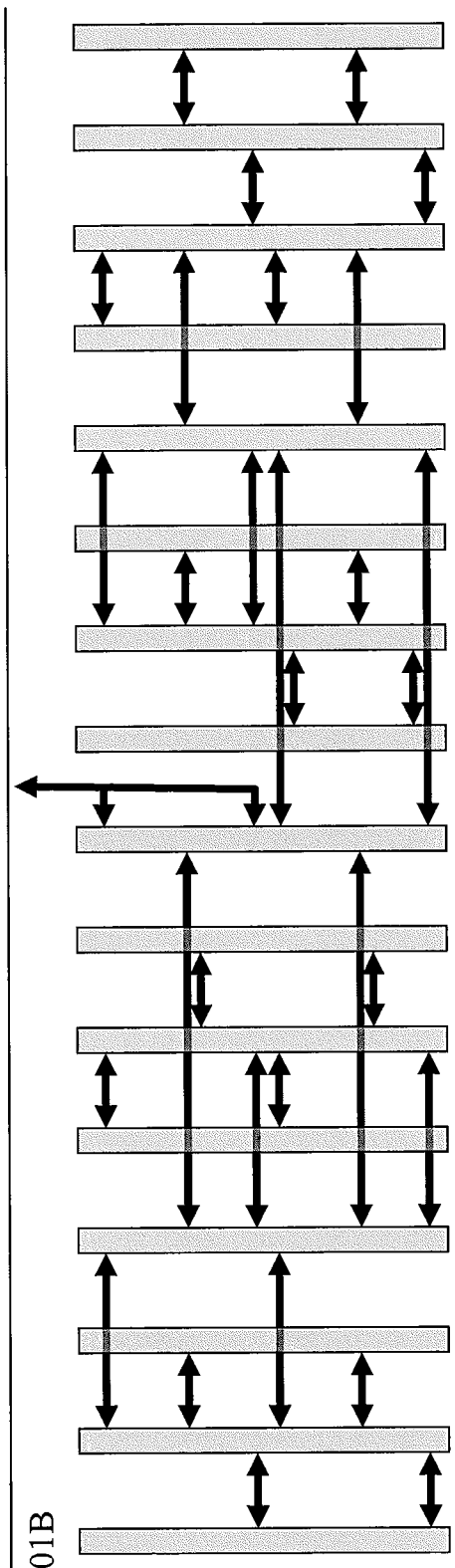

FIG. 101 shows that there are a number of alternative connection strategies that may be pursued in a binary tree where there are three ports and each of the ports is divided into two channels. In FIG. 101A, the channel pairs are configured so as to be disposed symmetrically with respect to a center line drawn along the length of the linear arrangement of modules. Alternatively, as shown in FIG. 101B, the same number of channels and ports may be configured so that the two channels connecting two modules are spaced apart so that at least one channel going to another module is interleaved.

Figure 102:
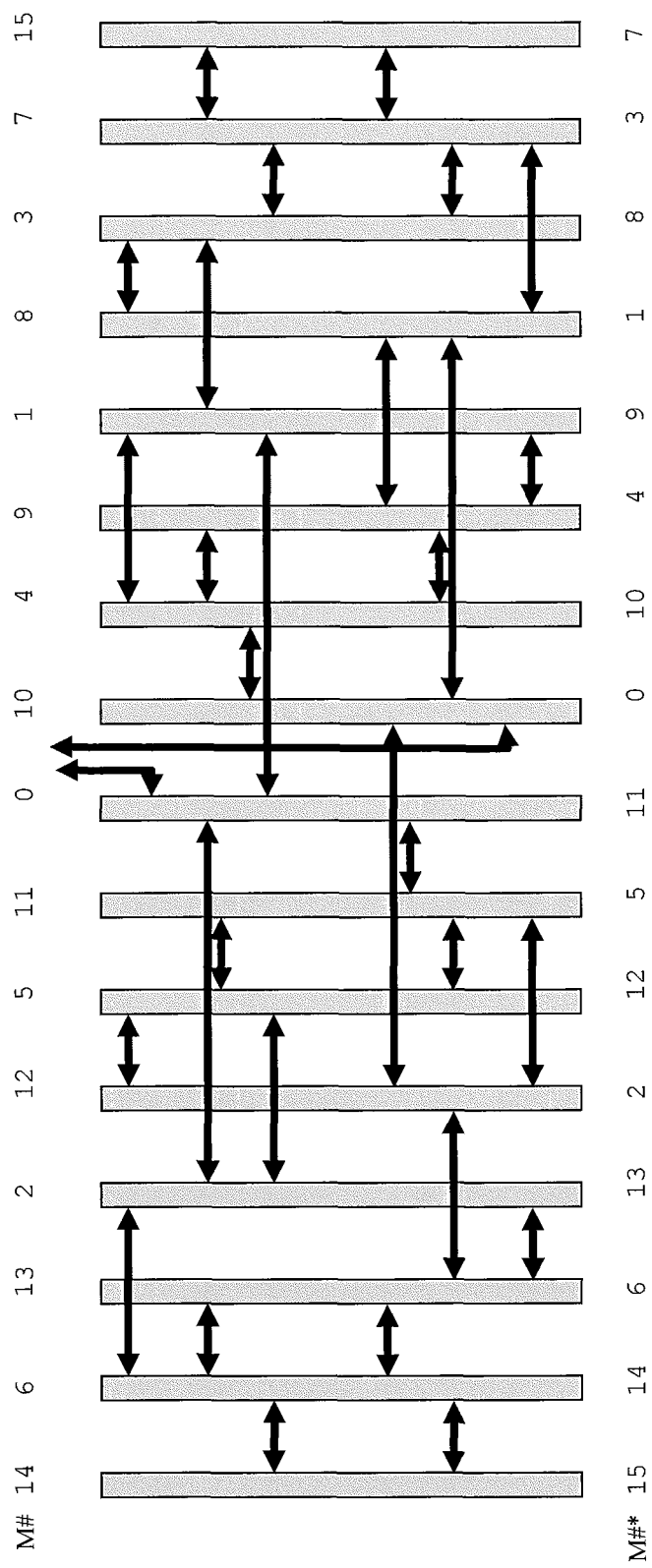
FIG. 102 shows a multi-rooted tree arrangement.

A tree may be multi-rooted, and thus have more than one module which may be considered at level 0. In this circumstance, the individual modules have different module numbers in each tree. FIG. 102 shows a first root, where the module numbers M# are listed at the top of the figure, and a second root, where the module numbers M#* are listed at the bottom of the figure. As an example, a module may be number 0 or 11, depending on whether the module is acting as a root, or as a node in a tree.

Figure 103:
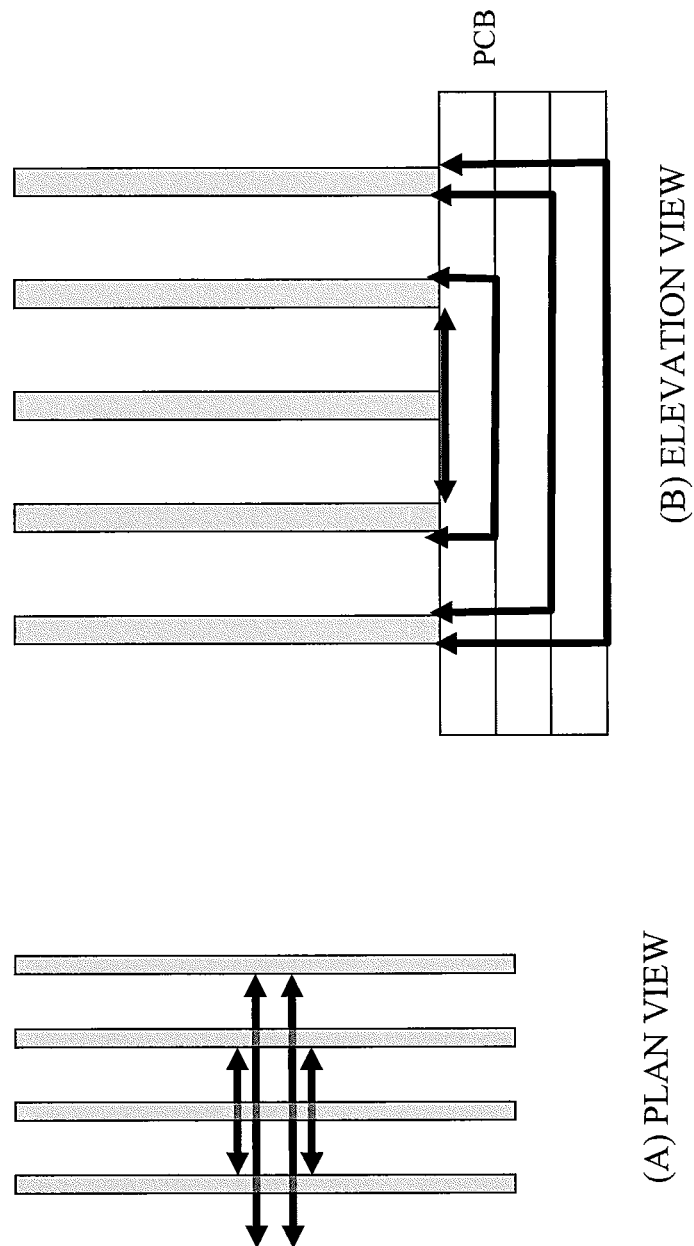
FIG. 103 shows the connection between modules in plan (A) and elevation (B) views.

Connection of lanes or busses between modules is often constrained by pin densities, by trace, line or lane densities, by cross-talk and the like. Greater separation between transmit and receive functions and between lines is helpful in mitigating these problems. FIG. 103A illustrates a plurality of modules, disposed symmetrically with respect to a central module, in the plan view that has been used previously, showing an example of the connections using lanes. A possible routing of the busses on the printed circuit board PCB is shown in the elevation view FIG. 103B, where the board has three layers and four surfaces. The busses may be conveniently routed so that line crossings, multiple vias, blind vias and the like may be minimized or avoided.

In connectorized motherboard designs, the pins on the connectors penetrate the PCB and serve to connect with the traces on each layer, so that the vertical portion of each of the bus is actually a connector pin. Pins of a connector are usually all of the same physical length and extend through the multiple layers of the circuit board, even where there are no connections required on some of the layers. Such pins may act as radiating points for spurious signals at the high frequencies associate with the clock and signal data rates.

While multiple layer PCBs may be useful, there is nothing to preclude the routing of all or substantially all of the bus interconnections on a single layer. Moreover, the arrangements described herein may be partitioned in many different configurations. For example, some or all of the components and interconnections, including the CSE and memory, may be incorporated into a semiconductor circuit on a substrate, dies may be mounted on an interconnection substrate or substrates, and the like. That is, the construction and packaging of the product may differ substantially from the specific examples provided herein.

Figures 104A, 104B, 104C:
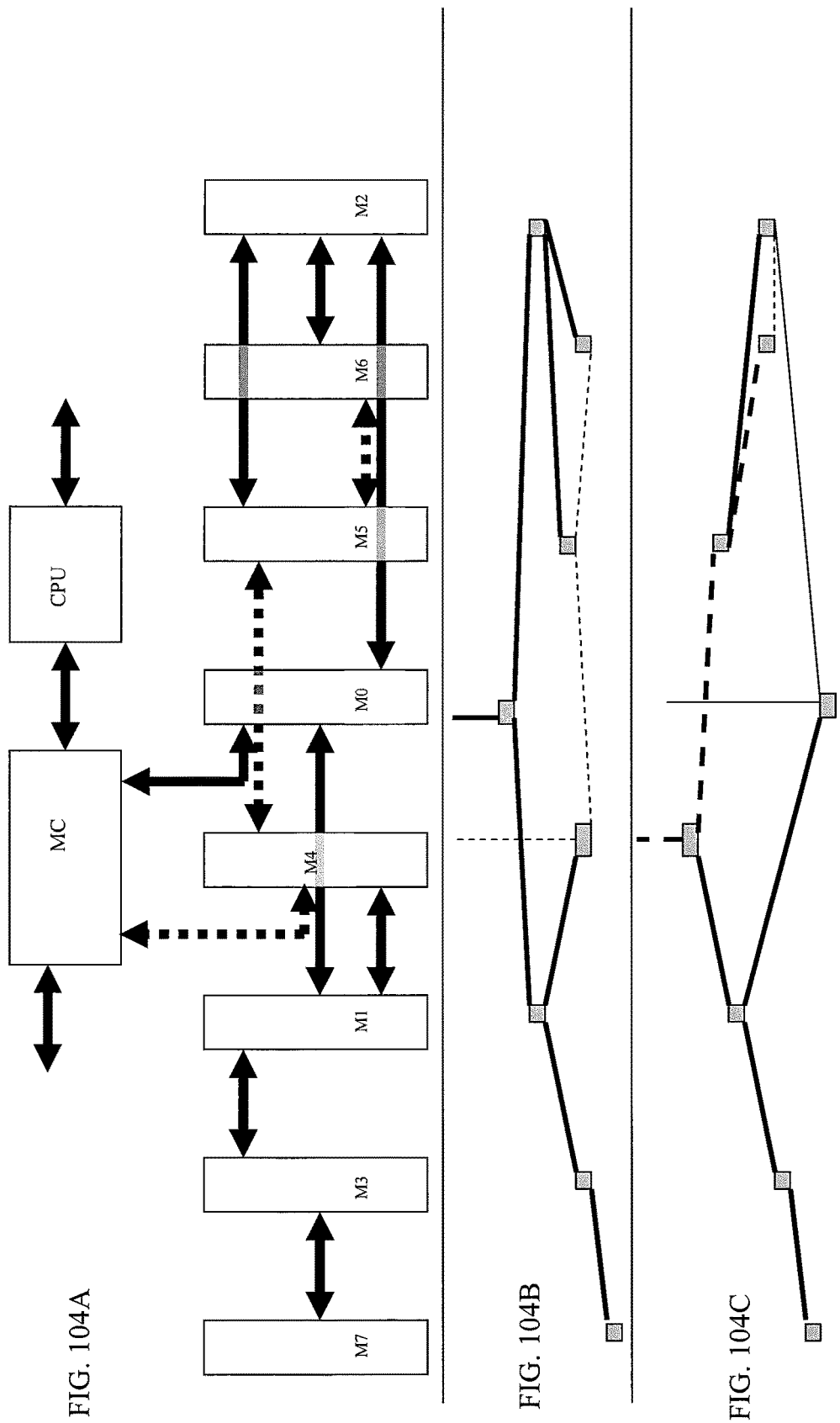
FIG. 104A-C shows a multiple-rooted arrangement with redundancy.

A multiple root arrangement such as is shown in FIG. 104 may be used to achieve some redundancy in the case of a root module failure by provision of some additional connection traces, and the software and hardware capability to reconfigure the routing in each module. The basic tree arrangement is shown as being connected by the solid lines representing busses in FIG. 104A, and the logical connections are shown in FIG. 104B. Each block representing a memory module in the tree is disposed beneath the corresponding memory module in FIG. 104A. In this situation, module M0 is the root and is connected to the memory controller.

Additional interconnections are provided as shown by the heavy dashed lines in FIG. 104A, and may be used in the case of a failure modality. In the situation where the port connecting the root module M0 to the MC fails, the tree may be reconfigured as shown in FIG. 104C. In this circumstance, certain of the lanes previously used may not not used (such as the lanes between M0 and M2) and certain of the previously dormant lanes may be placed in service (such as the lanes between M4 and M5, shown as the heavy dashed line). Concomitantly, the level of the individual modules in the tree may change. For example, module M0 was at level 0, but now is at level 3, and module M4, which was at level 1 is now at level 0. While providing some redundancy, the arrangement of FIG. 104 does not provide for redundancy in the case of failure of any one node or link.

Figures 105A, 105B:
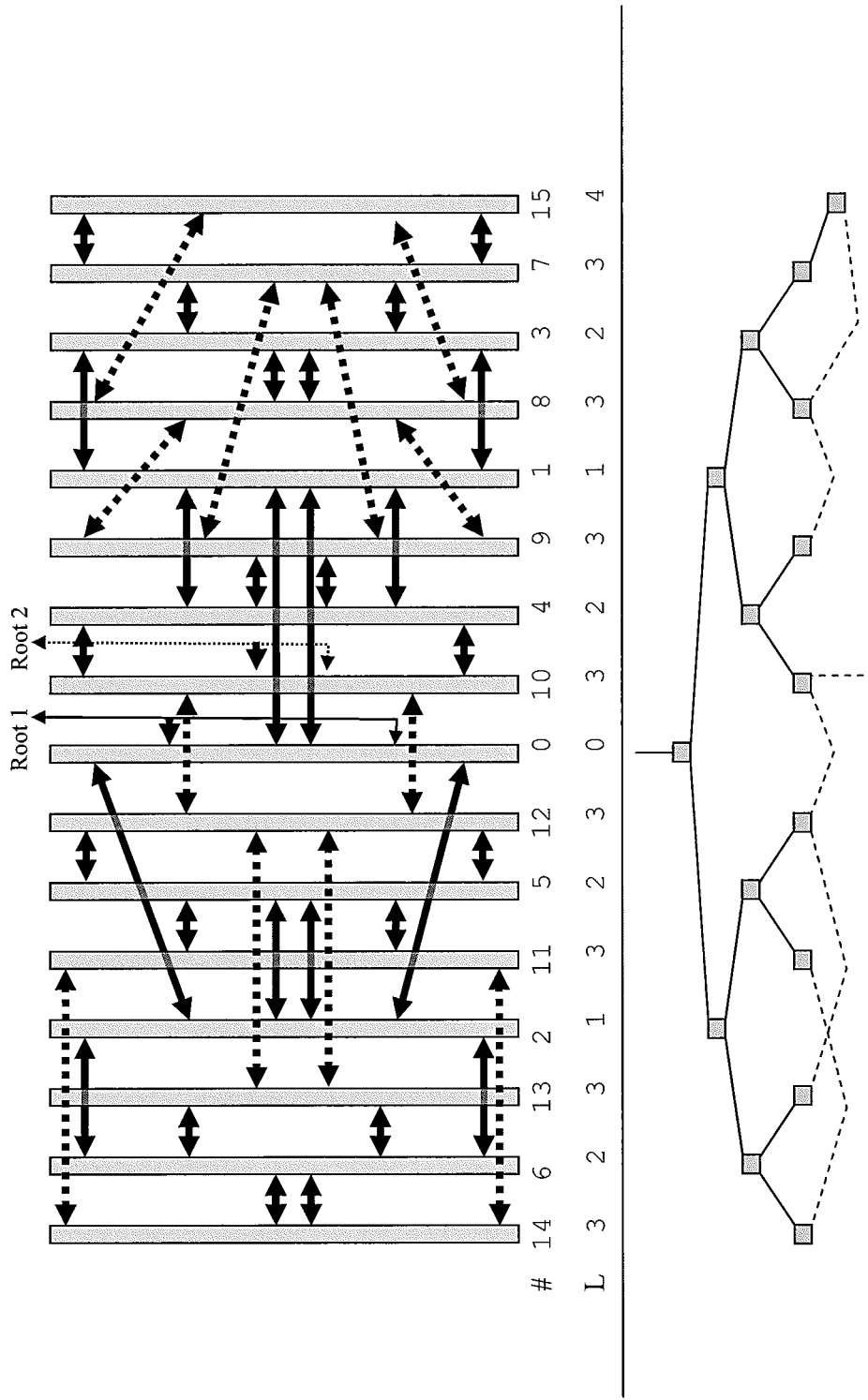
FIG. 105A-B shows another example of a multiple-rooted tree with redundancy.

FIG. 105 illustrates a tree and connections that can accommodate a single failure anywhere in the tree, without loss of data from other than, at most, the failed element. The connectivity to all of the modules and to all of the operable links is maintained. FIG. 105B illustrates the logical arrangement of the modules in a tree, with the solid link lines representing the baseline condition of the tree with all lanes and nodes operable. The connections shown as dashed lines are those links which may be dormant, but would be activated in the event of the failure of the root module 0. In this circumstance, the module previously designated as 10, at level 3 in the tree is re-designated as the operating root. This is shown in FIG. 105B by the dashed line extending vertically downward from the representation of the module.

FIG. 105A is a plan view of the mother board lanes and the modules that is associated with the logical tree of FIG. 105B. Links shown as solid lines are active when the tree is fully operational with no failures. The links shown as dashed lines are provided so that the tree may be reconfigured to continue to operate in the event of a failure. The particular failure shown was for the root module, which may be the most severe failure, and the one that may be statistically more likely to happen as the root module is the module dissipating the most power. All other factors being equal, the failure rate of a specific type of semiconductor circuit increases with temperature. When the tree is reconfigured, not all of the previously operating links will continue to be used.

Figures 106A, 106B, 106C:
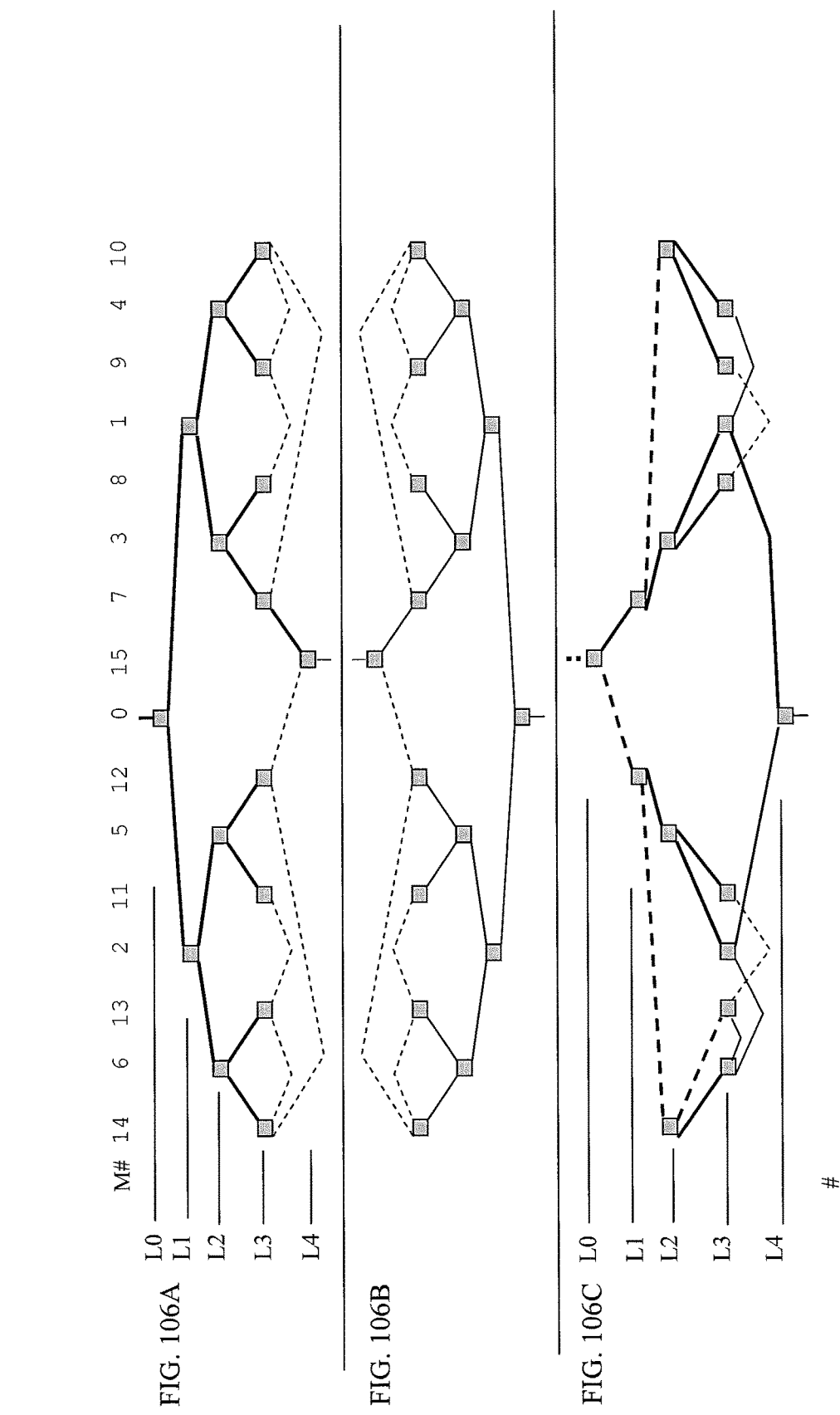
FIG. 106A-C illustrates the re-arrangement of the tree of FIG. 105 in the case of a module failure.

The reconfiguration of the tree results in a change in the data and control paths and the level of some of the modules in the tree. It may be helpful to visualize this transformation by reference to FIG. 106. FIG. 106A is the baseline configuration where there is no failure, and the auxiliary links are shown not operating (light dashed lines). When a failure occurs in module 0, consider FIG. 106B, where the tree has been flipped so that module 0 is on the bottom and module 15 is on the top. In FIG. 106C, the operating auxiliary links are shown as heavy dashed lines, and the non-operating links are shown as light lines.

Figure 107:
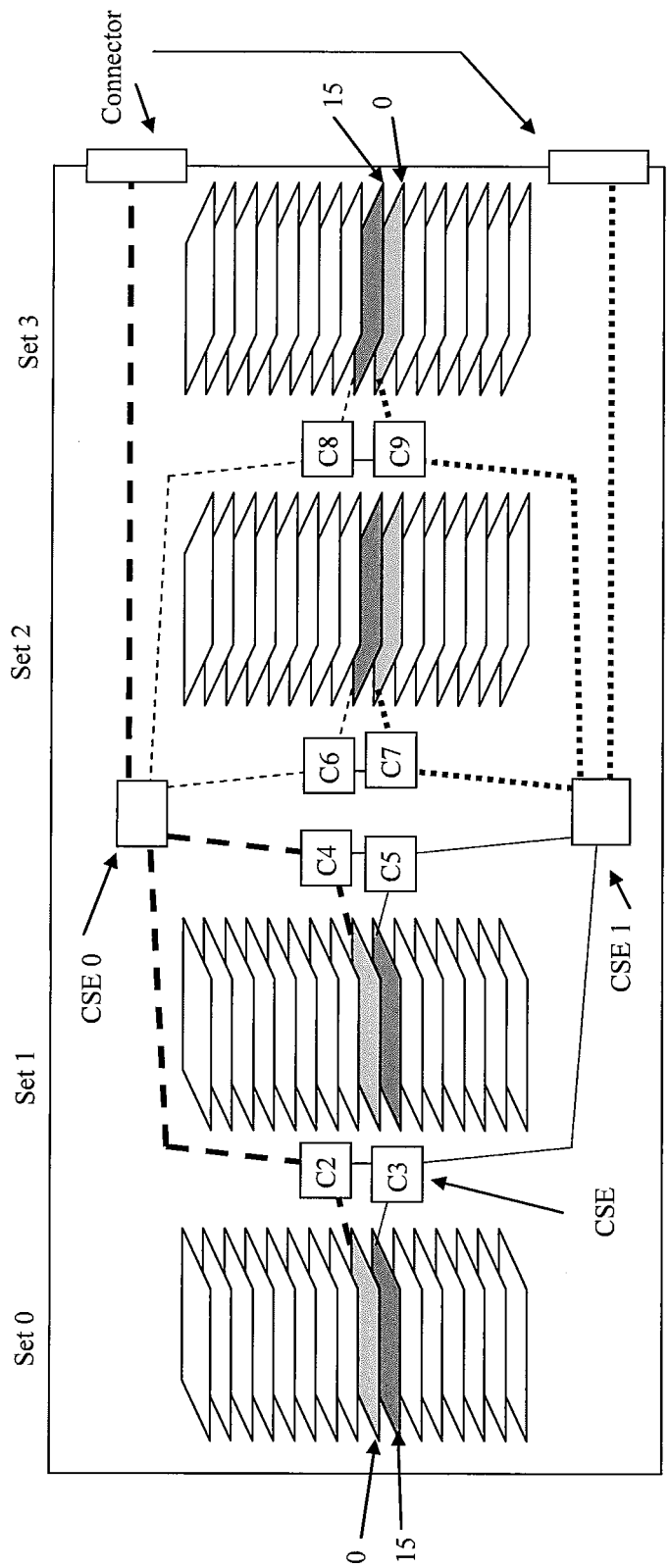
FIG. 107 shows an arrangement having 4 groups of 16 modules.

FIG. 107 is a schematic representation of a larger capacity mother board, where 4 groups of 16 modules are mounted. This is representative an approach to further increasing the capacity of a mother board while maintaining redundant operation. Each of the groups of modules, which may be designated as a "set" may have the attributes of the module array of FIGS. 105 and 106. The connection of the four sets is performed by circuit elements C, which may be CSE devices or similar, so that a single failure of any of the devices C or the CSE 1 and CSE 2, or of any of the modules in any of the sets will not result in data loss. This attribute also permits hot swapping of modules so that a failed module may be replaced without taking the unit out of service.

Figure 108:
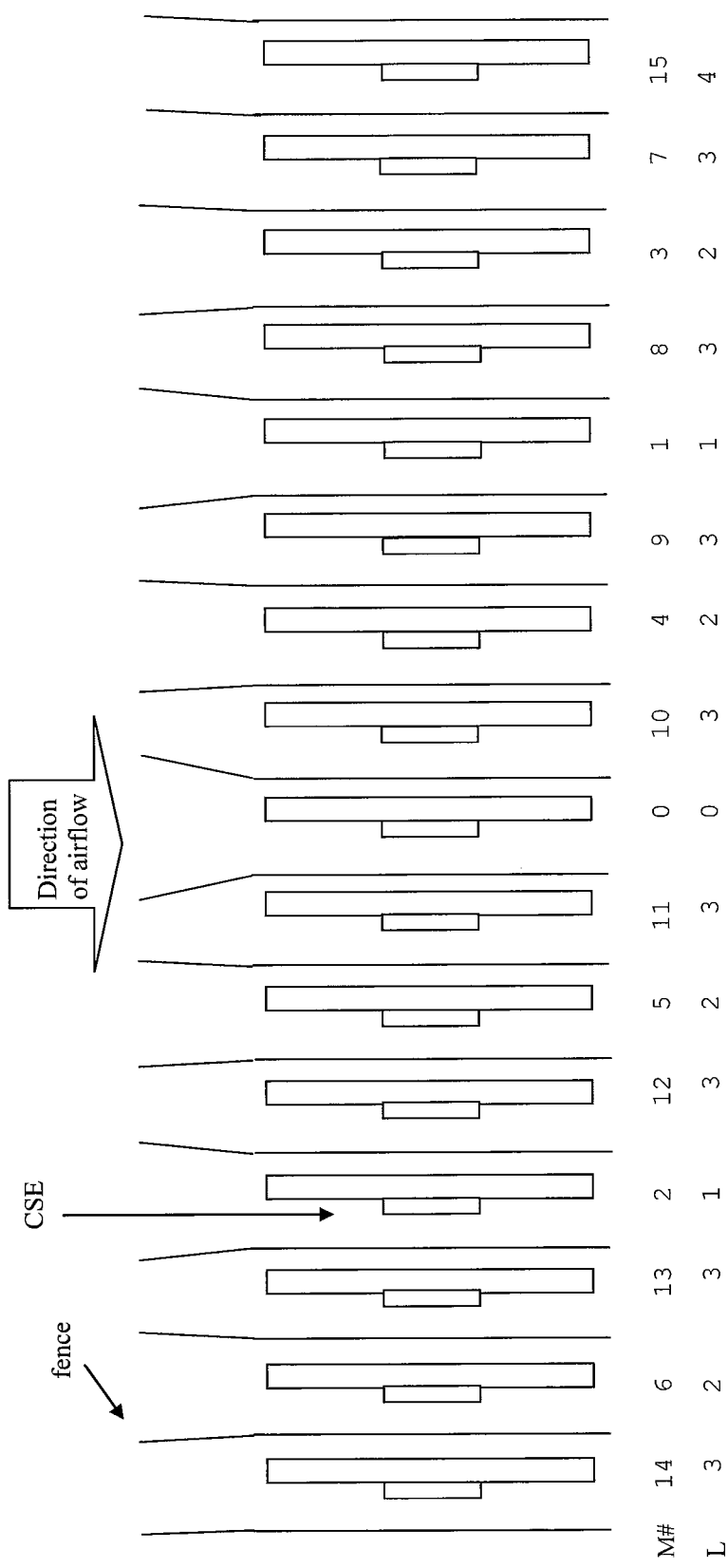
FIG. 108 shows the air flow arrangement for a group of modules having fences therebetween.
Figure 109:
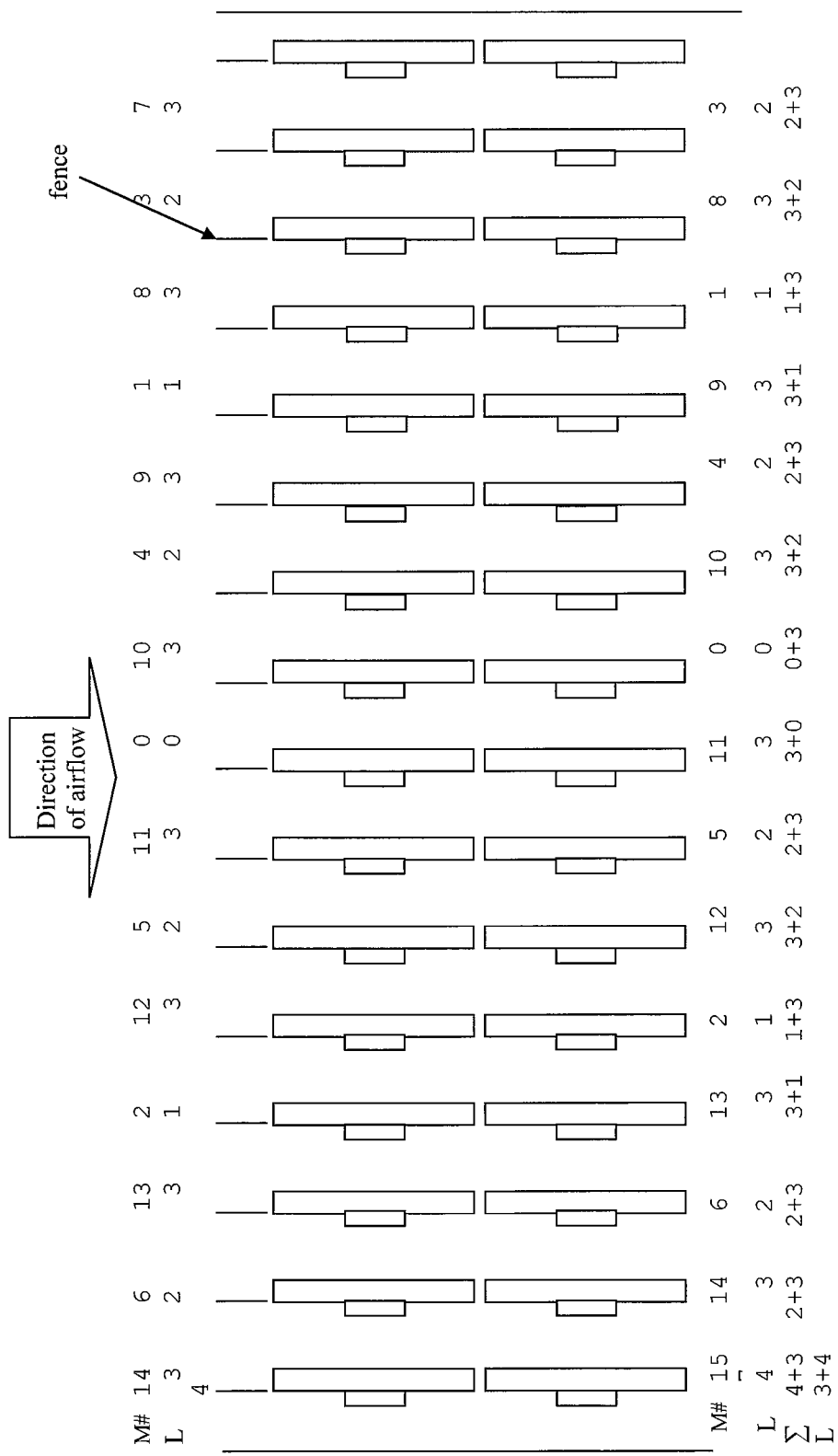
FIG. 109 shows the air flow arrangement for groups of modules arranged so that the temperature variation may be controlled.

As previously described, the power dissipation of a module depends on the level of the tree in which the module is situated, as the level is also associated with the average data throughput in many circumstances. As the power dissipation at each module location may then be estimated, more effective use of cooling resources may be made and hot spots reduced. As an example, FIG. 108 shows a plan view of a group of 15 modules, similar to previous examples, where the position of the CSE on the module is shown. The direction of air flow is shown by a broad arrow, and metal fences 1100 are attached to the mother board so as to direct the cooling air onto the modules. The fences extend from the mother board to approximately the height of the modules as inserted into the connectors of the mother board. In the case of module 0 at level 0, which has the highest power consumption, the fence 1100 is disposed so that a larger opening area is presented to the input air flow and a greater quantity of air will flow over module 0 as compared to module 11 and 10, which are both at level 3. Similar allocations may be made but appropriate disposition of the remaining air flow fences 1100, giving more air flow to modules 1 and 2 at level 1 than to adjacent modules 8, 9 12, 13, which are at level 3 in the tree.

Where more than one group of modules is to be cooled, and the cooling air may be routed through a second set of modules prior to being exhausted from the region of the mother board, a similar approach may be used to even out the temperature distribution of the air. FIG. 109 shows two groups of 16 modules arranged so that modules at higher levels in the first tree are disposed behind modules at lower levels, such that the sum of the two levels is reduced from a situation where the same module configuration is used for both groups of modules. The lower the sum of the module tree level numbers, the higher the power dissipation of the two modules taken as a group. As an example, where module 0 at level 0 in the group of modules closest to the air input is in front of module 11 at level 3 of the other group of modules, the sum of the power consumptions may be only about 60 percent of that which would obtain when the configuration of each group of modules was the same and, for example, two level 0 modules were in a line with the air flow direction.

In another aspect, as the physical position of the modules on a mother board is associated with the level of the module in the tree, the spacing between modules may be varied so that the modules at lower ranks in the tree (e.g., the root or roots) are spaced further from adjacent modules and are expect to dissipate more power than when the modules are at a higher rank in the tree (e.g., leaves). Where more than one module may be a root, either in an operating or redundancy situation, the power dissipation in each configuration may be considered in planning the board layout.

Figure 110:
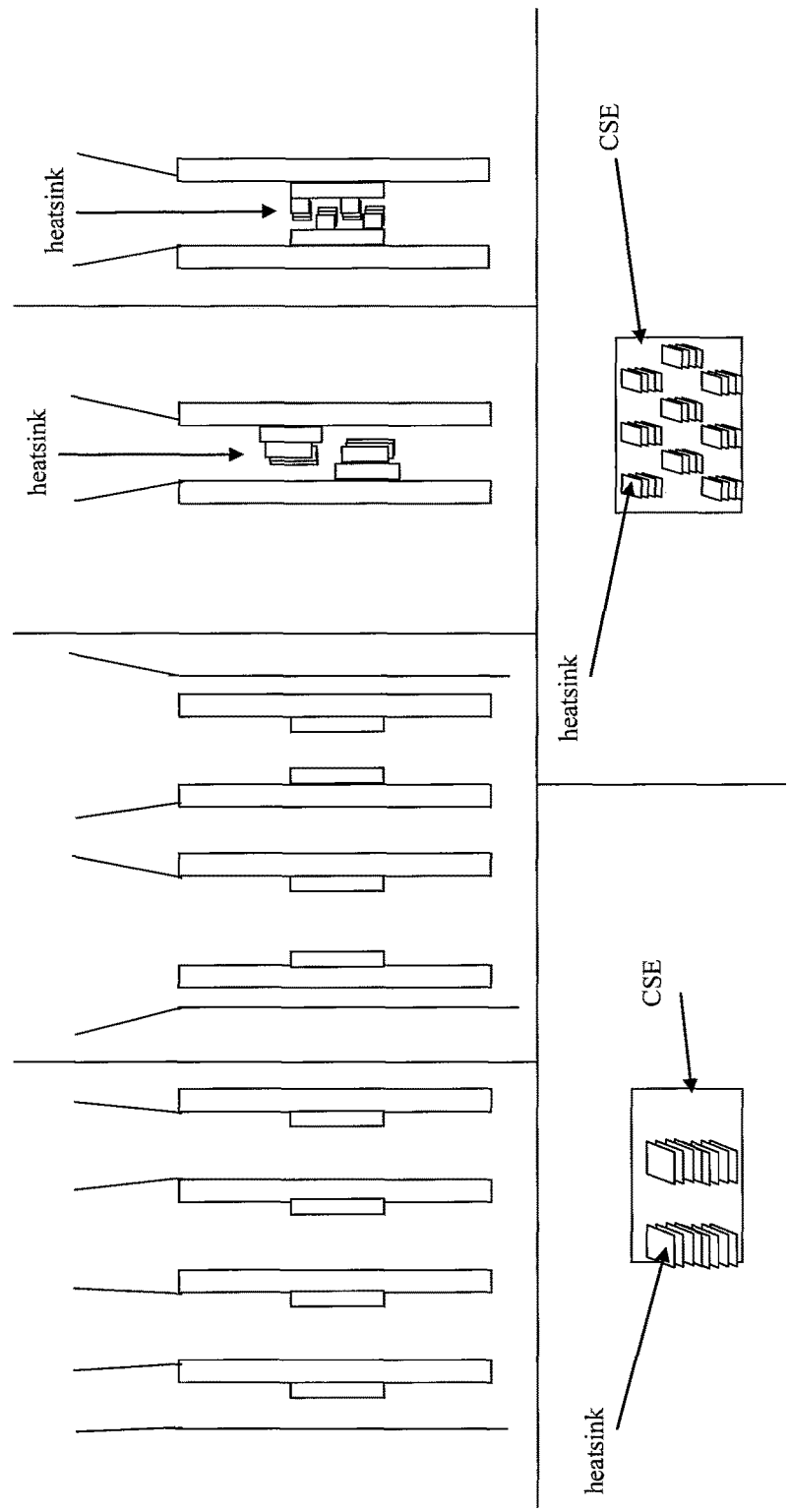
FIG. 110 shows additional arrangement of heat dissipation elements.

FIG. 110 shows how different placements and orientations of the CSE and/or heat sinks mounted on the CSE and/or module may provide for improvements in the airflow and/or the module spacing.

Figures 111A, 111C:
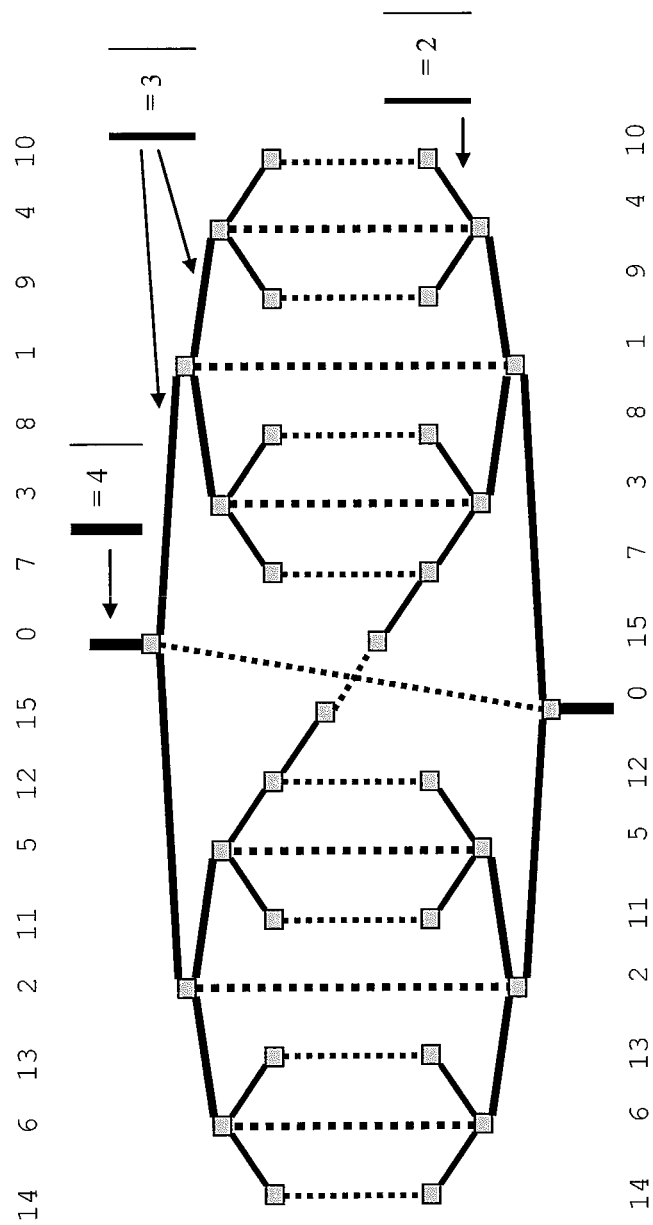
FIG. 111A-C shows a dual-rooted tree configuration where the nodes have links composed of lanes.
Figure 111B:
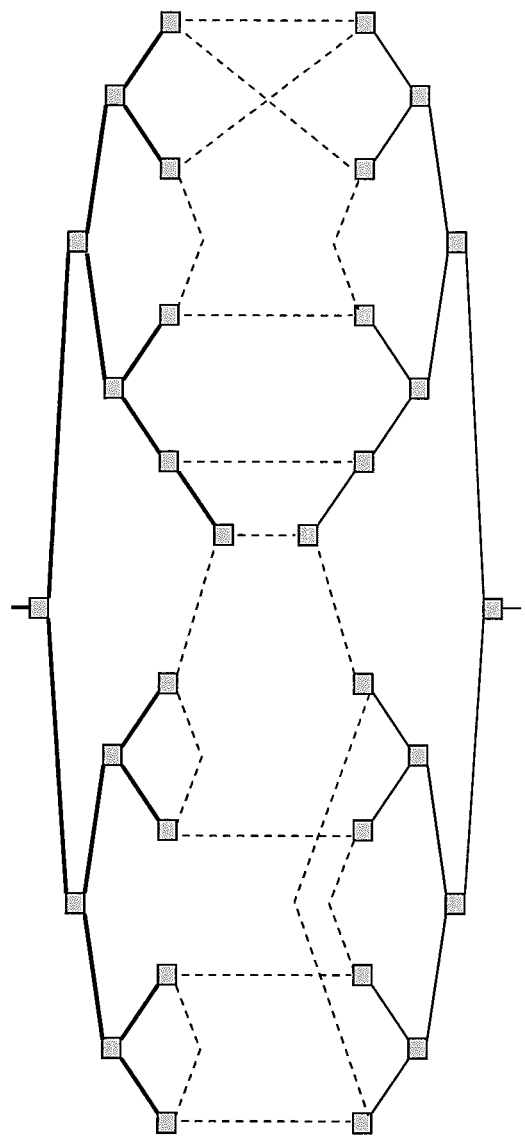

FIG. 111 *a-c* shows a dual-rooted tree configuration where the nodes have links that may be constructed from 12 lanes. The root node has 4 lanes to the MC (not shown), 3 lanes to each of its children and 2 lanes to the other root. The children of the root have 3 lanes to the root and to each of their children as well as 3 lanes to the node which is the corresponding child of the other root.

Figure 112A:
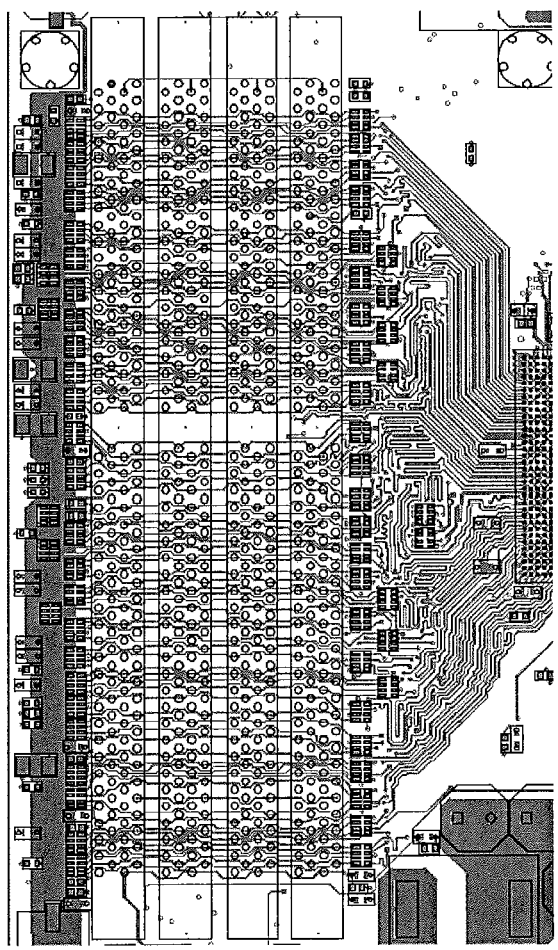
FIG. 112A-C illustrates the layout of traces in a connectorized mother board of existing design.
Figure 112B:
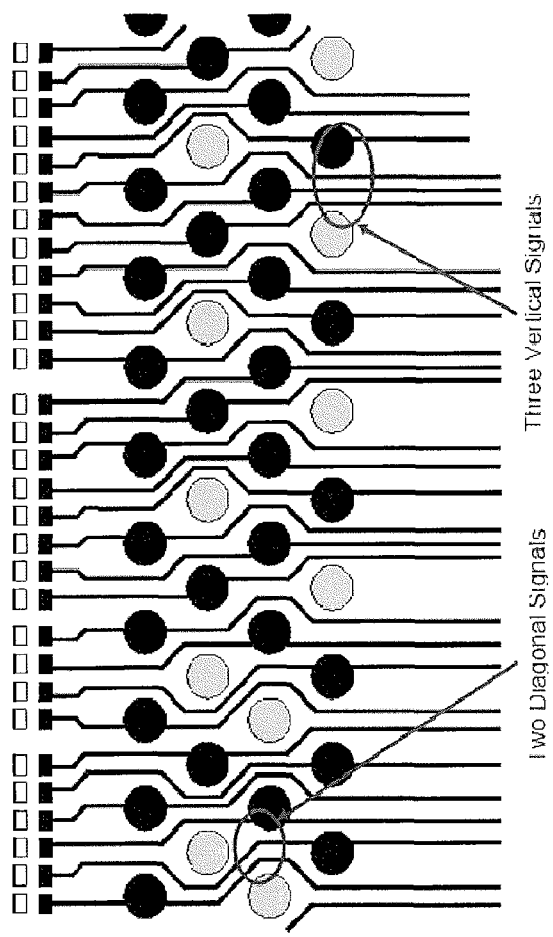
Figure 112C:
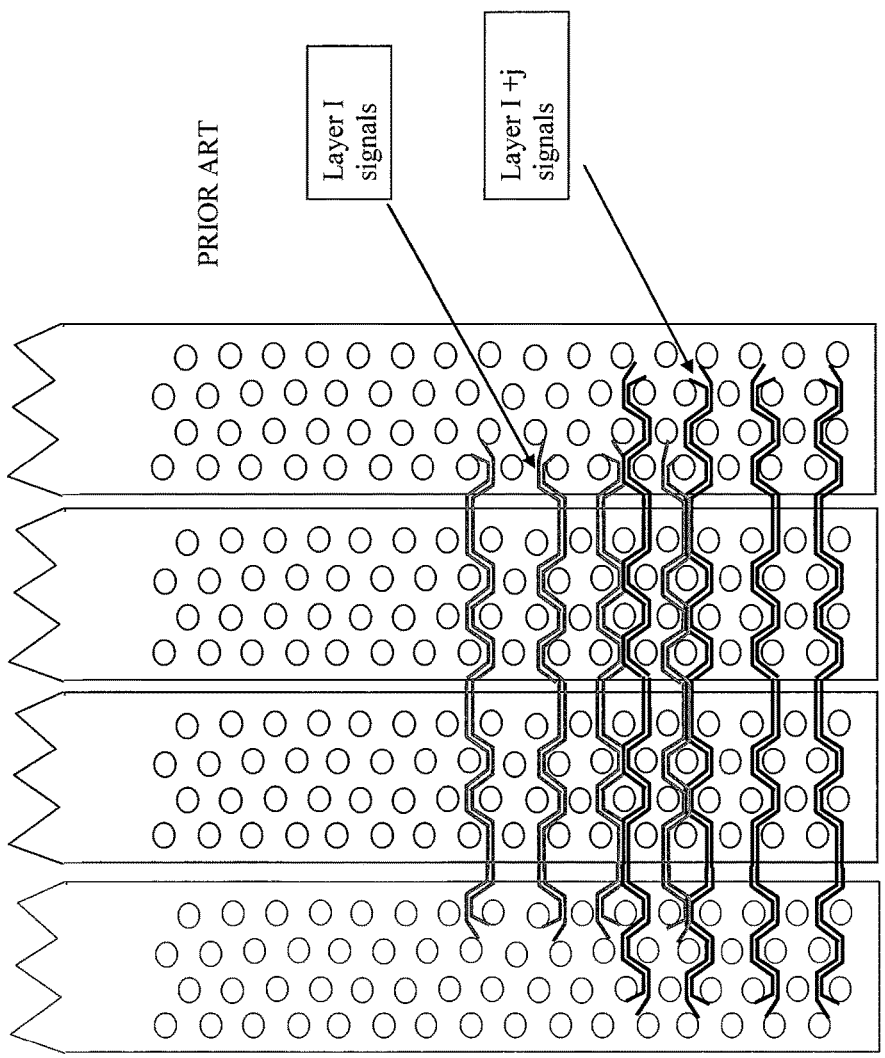

The physical layout of large memory arrays presents numerous problems, including requiring a large number PCB layers, vias and bends in the conductors constituting the traces on the board layers, or equivalent considerations on a substrate. The electromagnetic radiation from the length of the connector pins, and the effects on ground and power plane integrity are known to persons of skill in the art. FIG. 112A illustrates a mask for a single layer of a PCB connecting to four connectors and to a board interface connector or an existing memory. The density of traces, and the variation of distance between the traces, which may be associated with signal coupling and propagation time variations, and the deviation from straight line traces, resulting in impedance variations for high frequency signals, and which may result in signal waveform distortion are also known. FIG. 112B is an example of the details of the layout of the layer in FIG. 112A. The circles represent the pins of the connector, where the dark circles are associated with connections to traces on the board layer shown, and the light circles are pins passing through the layer and connecting to traces on another layer. Far from the pins, the traces are disposed with varying distances between adjacent traces, and some of the traces are close together, increasing the coupling. In the vicinity of the pins, groups of traces are routed between pins, reducing the distance between traces and between the traces and the pin. In this region as well there are multiple bends in many of the traces, resulting in impedance discontinuities. FIG. 112C illustrates the paths which may be taken by connections between two connectors A and D, where the traces must pass between the pins of intervening connectors B and C. The pairs of traces shown may represent the layout where differential signaling is used. A second layer is also shown, where the signals may travel along paths that bring portions of the signal traces on one layer close to those of an adjacent layer. This may pose problems in board layout.

Figure 113:
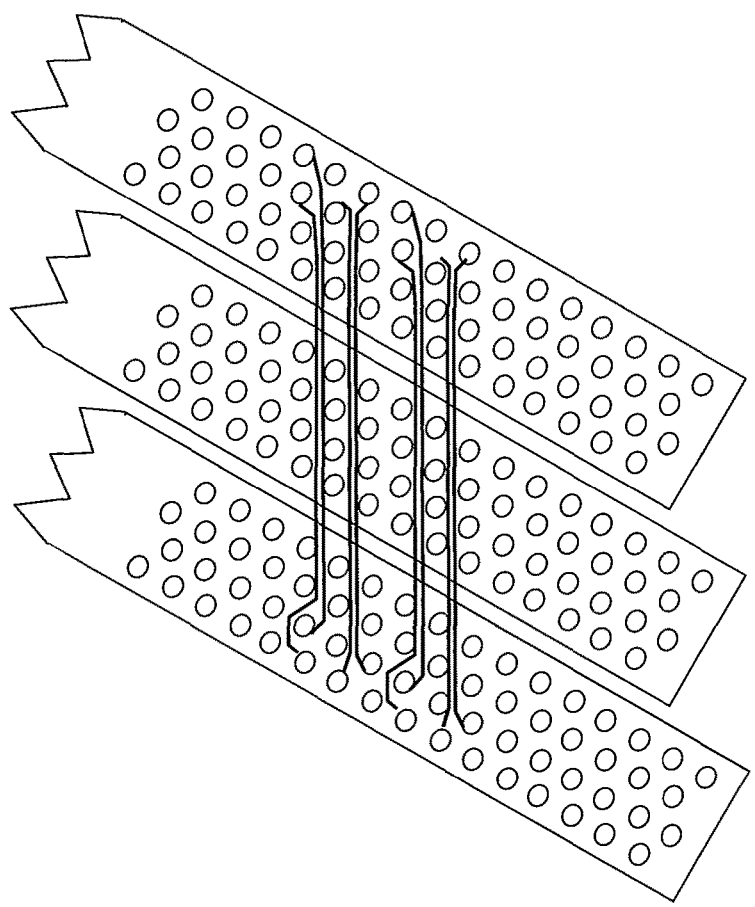
FIG. 113 illustrates a layout of traces on a motherboard where the connectors have been rotated by 30 degrees.
Figure 114:
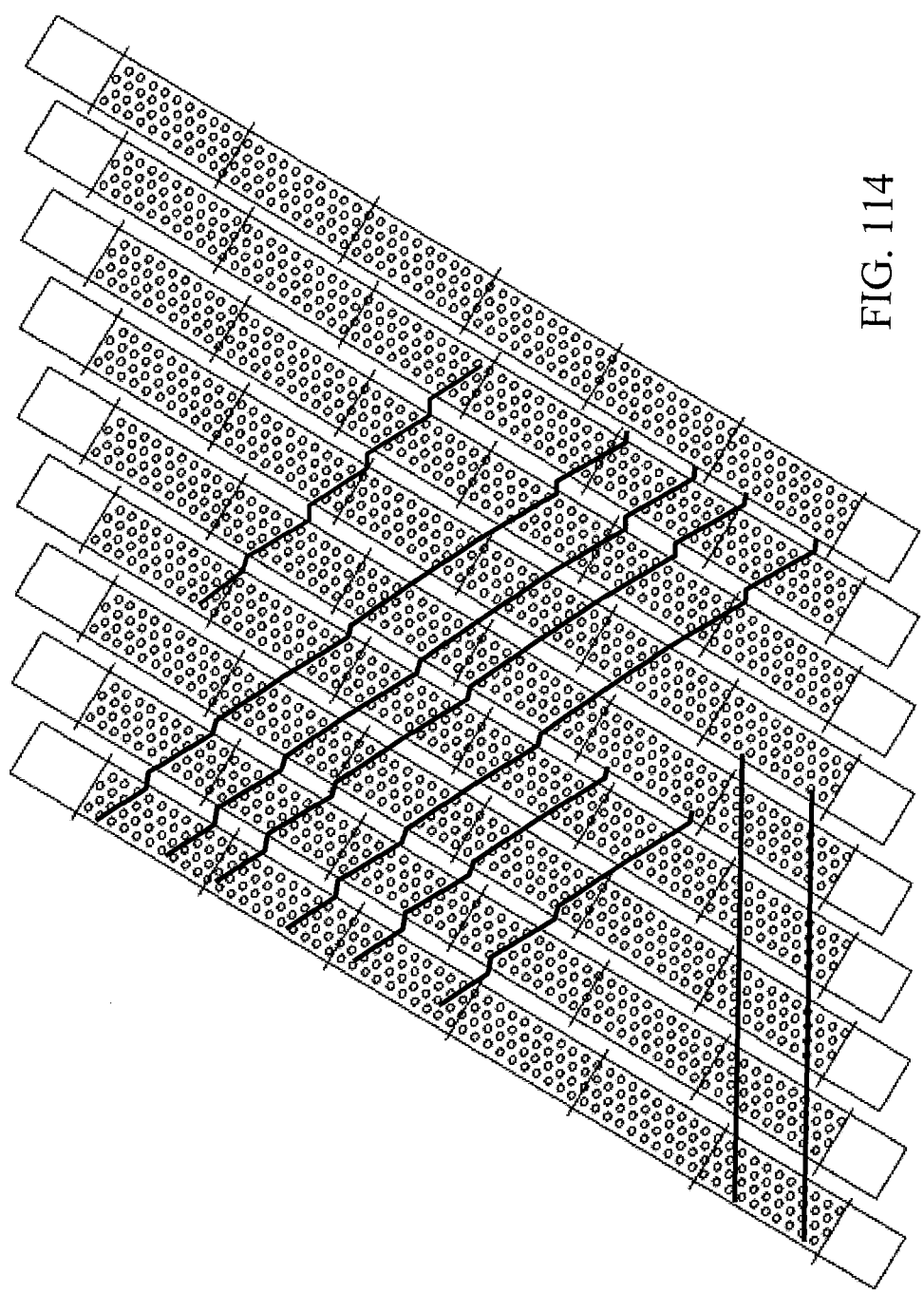
FIG. 114 illustrates that more than one set of lines may be disposed with minimal bending for the connector arrangement of FIG. 113.

FIG. 113 illustrates a method of mitigating board layout constraints. In this example, each connector 1200 is rotated on the board so that the connector is oriented at an angle of approximately 30 degrees with respect to the parallel arrangement of connectors in many memory boards, or similar applications. When the connectors are arranged in a canted manner as shown, the traces 1300 can be routed between non-contiguous connectors with little or no bending to avoid the connector pins 1400. The angle of canting depends on the spacing and number of rows. More than one minimal bending path exists in this arrangement and FIG. 114 illustrates a configuration where two paths with minimal bending are possible, for a group of 240-pin connectors. A slight change in spacing between adjacent boards or in the spacing of the pins may further minimize the required bending.

Figure 115:
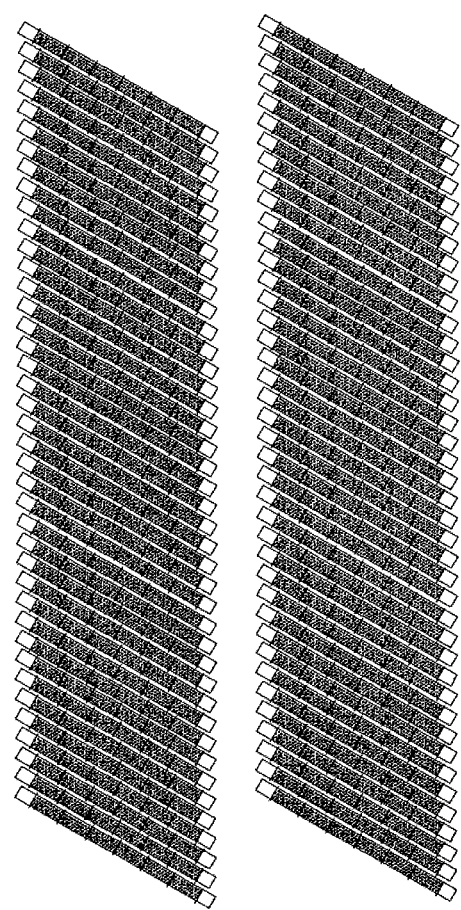
FIG. 115 shows the layout of a larger scale motherboard with the connector orientation of FIG. 113.

FIG. 115 illustrates an arrangement of connectors on a motherboard to accommodate 84 DIMM boards disposed in a canted manner. Only minimal board area may be left unoccupied when a large number of connectors are disposed thereon, and such unoccupied area may be conveniently used for board interfaces, memory controllers, ancillary services, filtering and the like. Such canting of the connectors may be used with any of the connector and module arrangements described herein. For simplicity of presentation, the connectors in the other examples are oriented in a parallel manner.

Figure 116:
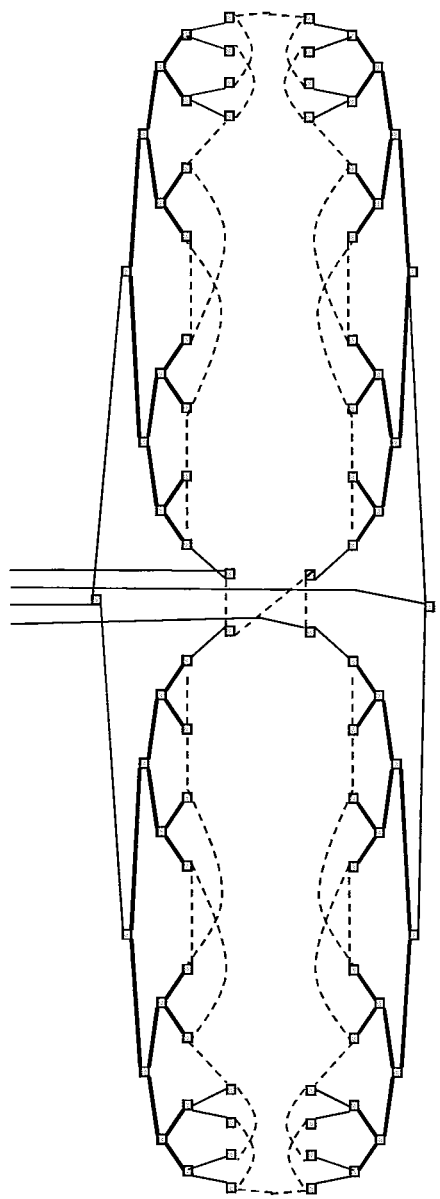
FIG. 116 shows a logical arrangement of 82 modules configured as 64 memory modules with RAID error correction and 2 spare modules.

Large memory boards may be laid out using the apparatus and methods described herein, and FIG. 116 represents an arrangement of 82 DIMM modules configured as 64 DIMM memory modules with RAID 5 error correction capability in a 4+1 configuration, with 2 spare DIMM modules. The memory board supports two trees, connected at the leaves. Even with the loss of any two modules, all of the other modules may be accessed by appropriate reconfiguration of the remaining data and control paths. Thus, maintenance of the memory board may be performed before data is unrecoverably lost, and may be performed by hot swapping of the failed module for a new module. Where the hot swapping is performed when only one DIMM has failed, the configuration prevents data loss in the event that the maintenance technician removes the wrong module for replacement. In this example, the logical arrangement is shown in FIG. 116 and the corresponding board layout in FIG. 117.

Figure 117:
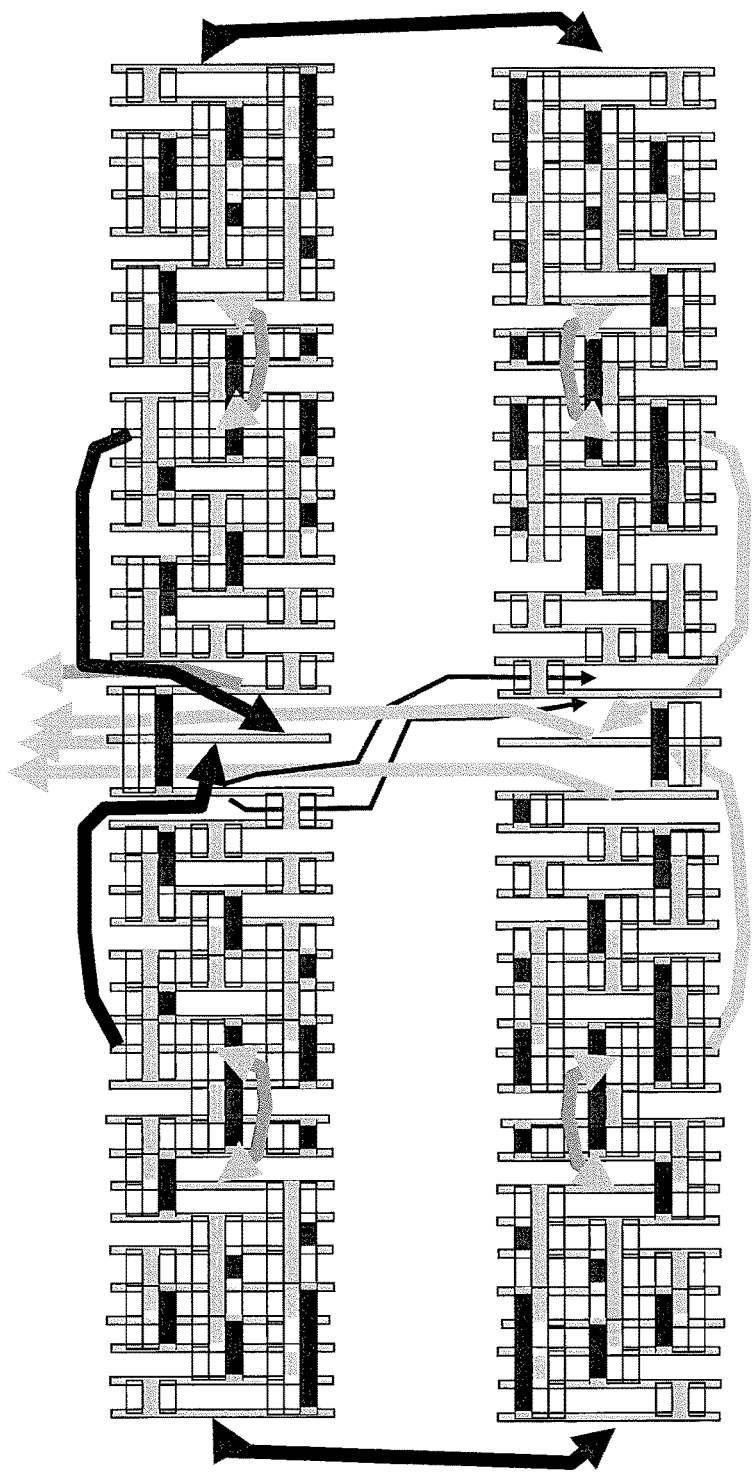
FIG. 117 shows the physical board layout for the arrangement of FIG. 116.

In FIG. 117, the solid lines represent the baseline tree configuration and the dashed lines are links that need not be used in the baseline configuration, but may be used when a module failure occurs and a re-configuration of the tree is needed to maintain connectivity between the roots and the remaining modules. The dashed lines represent links that are capable of operating at half of the throughput of the solid lines. At level 0 of the tree shown with solid line connections, each tree has a root and this is shown as connecting to the memory controller (not shown). In another aspect, the arrangement may be considered as four sub trees, with pairs of sub-trees being combined to form each tree. Each of the sub-trees in the upper tree is a mirror symmetric version of the other tree, where the line of symmetry passes through the node acting as the root node to combine the sub-trees. The lower tree has similar mirror symmetry with respect to the associated root node. In addition to the ancillary connections in each tree providing for redundancy, the leaves of the two trees are interconnected with ancillary connections, including the designation of a module as a root of the redundant tree, that module having a connection to a MC, which may be a redundant MC.

Figure 118:
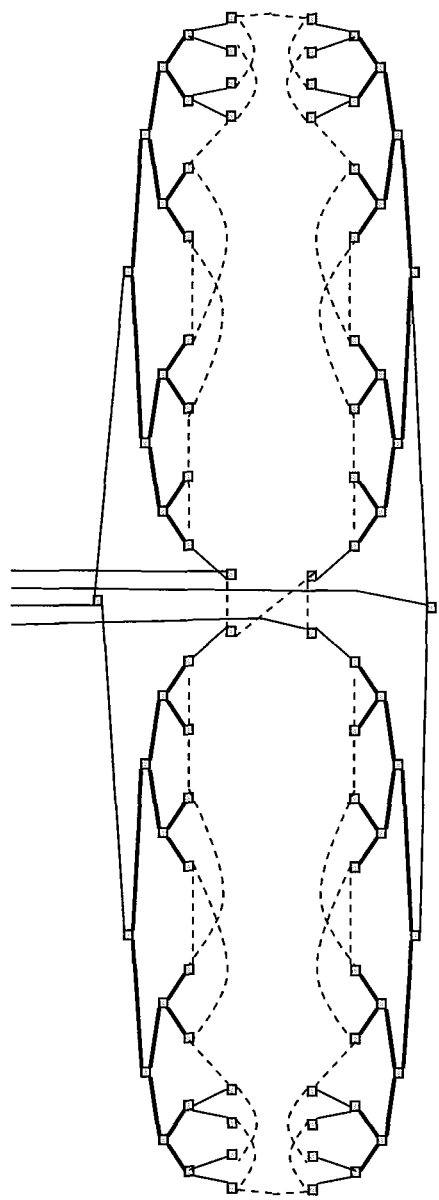
FIG. 118 shows an 82 module tree having two roots.

FIG. 118 shows another 82 module tree having two roots. This tree will be utilized to illustrate an example of a mother board layout technique suitable for large interconnection systems. Such techniques may be used on interconnection substrates and within semiconductor circuits or dies as well. The term "motherboard" is used for convenience only.

Each of the two trees has a depth of 5, and a first configuration uses roots R1 and R2 to connect to a memory controller MC. A redundant configuration may be formed using one of R1' and R2' in place of a failed root to continue to operate with no data loss. The links shown as solid lines represent the first configuration, and the links shown as dashed lines are provided so that alternate configurations may be used in the event of the failure of two or fewer modules. The mother board layout may be considered as two similar interconnected trees. An upper tree, which may be considered to be the modules connected to R1 by solid lines, and a lower tree which may be considered to be the modules connected to R2 by solid lines.

FIG. 119 shows schematic representation of a physical layout of the upper tree connectors and the corresponding portion of the tree logical diagram. The module R1 is at level 0 of the tree, and in this example is located at the center of the row of connectors, and has one link to the memory controller MC. The MC is not shown and may be located wherever convenient, either on or off of the mother board. The links between the modules of this binary tree are coded by shading and there are three levels of shading. For convenience they are associated with colors, being blue (the darkest), green (intermediate) and red (lightest). Each of the shaded broad lines represents a link between two modules that are connected to the ends of the lines. Lines not terminating at a module pass beneath the interposed modules without connecting thereto. The links have the properties of links previously described and the broad line may represent bidirectional lanes, groups of unidirectional lanes, channelized lanes, and the like for making connections between modules and connectors.

Most of the links may be represented by straight lines, and very few or none of the links need cross each other. This simplifies board layout, enables reduced signal coupling and may reduce the number of PCB layers needed to construct the board. Links such as those designated a and b, which connect the root module to the first level in the tree are shown as being green. After the cross-sectional aspects of the board are discussed, a person of ordinary skill in the art will appreciate that the links a and b may be routed on the red level of the PCD, with a shorter length and fewer trace bends. Hence, the board layouts shown may be susceptible to further optimization, and are merely illustrative of the ability to simplify the arrangement and interconnection of large numbers of connectorized memories, or of memories mounted to a circuit board or incorporated in an integrated circuit, on a substrate, or in a package.

Figure 120:
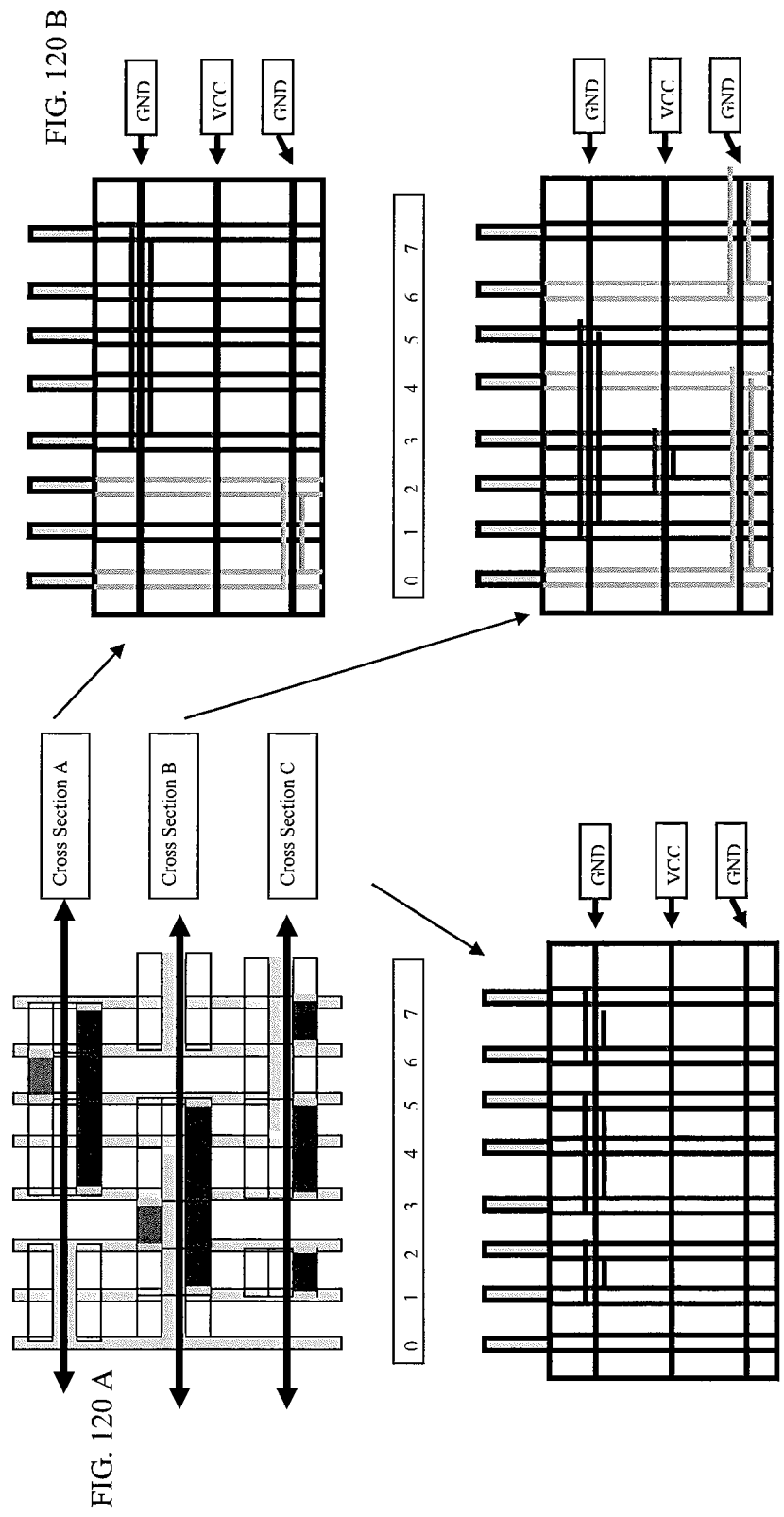

Cross-sections of the mother board, encompassing the modules located between I-I are shown in FIG. 120. There are three relevant cross-sections A-C, representing three groups of traces, being links connecting to the modules. It should be understood that the broad lines are schematic representations of the lines in the links and may connect to pins of the connectors that may be uniformly or non-uniformly distributed on the circuit card. Further, the links of different colors may lie directly above each other, and are separated in the drawing in order to facilitate description. FIG. 120A shows the plan view of the motherboard so as to identify the cross-sections being described. For convenience the individual circuit cards are assigned number of 0-7, and the corresponding numbers are used for all of FIG. 120. In FIG. 120B, cross-section A of FIG. 120A is shown; cross section B is shown in FIG. 120C; and, cross section C is shown in FIG. 120D. In cross-section A, blue, green and red links are shown. The printed circuit board is shown as having two ground plane layers and a VCC (power) layer and the traces are disposed, using PCB technology in this example, so that a portion of the traces (lines) for each link are disposed on opposite sides of the ground or VCC layers. This may result in increased isolation between transmitting and receiving traces. The horizontal shaded lines thus represent a possible disposition of the links between the connectors shown where the links do not cross each other, and may be laid out in a generally straight direction. As shown, each of the links terminates in a pin, representing a group of pins, associated with the connector for the module to be connected, and the vertical shaded lines are associated with the connector pins.

In FIGS. 120C and D, the routing for cross-sections B and C are shown to have similar properties.

The example used connectors with pins, but surface mount technology (SMT) connectors may also be used. For SMT connectors, the horizontal traces rise to the connector using through-plated vias in place of the pins. However each of the vias may not have to extend the full thickness of the board to reach the desired trace, and the vias may be back-drilled to remove the plating in board layers more distal from the connector than the trace to be connected. This minimizes the length of the vertical conductive elements, which may reduce radiation and coupling between traces while avoiding "blind" vias. In addition, the fewer the number of layers involved in interconnection, a tolerance may be used in the alignment thereof, and this may be used to minimize the relief provided in the ground and Vcc planes, thus providing increased shielding. While this example showed the traces for the links to be disposed in three colors, it is equally possible to lay out the board with only two colors, although some bending of the traces may result.

Many alternative mother board layouts are possible, and two additional layouts are shown as examples. In FIG. 121 another 82 DIMM logical arrangement is shown where the tree is intended to be laid out in three rows of connectors. This tree may also be seen to have further redundancy characteristics.

FIG. 122 shows the layout corresponding to the logical tree of FIG. 121, using the same notation as in FIG. 119. The spacing between adjacent connectors may be adjusted. For, example, the spacing between modules designated as root modules or redundant root modules may be increased to accommodate the additional power distribution of a module when acting as a root. Also, the modules in the center row may be grouped more closely to provide space for, for example, module controllers, CPUs and the like. In an aspect, a root module may be replaced by a CSE without storage memory, or with minimal memory to reduce the power consumption of the module when acting as a root.

When an 82 DIMM motherboard is fully populated with DIMMs, and configured as 62 memory modules with RAID 5, and each DIMM used has, for example, 2 Gbytes of memory, the capacity of the motherboard will be 164 Gbytes. Such a motherboard may have dimensions of approximately 15.4×21.4 inches. Of course other DIMM memory capacities and other memory types may be used in a similar manner. The example given is merely for illustrative purposes. Various redundancy methods as are known in the art may be used on each of the DIMM modules, a plurality of DIMM modules may also be used in achieving redundant operation when interconnected and operated as described herein.

In FIG. 123, another 82 DIMM logical arrangement is shown where the tree is intended to be laid out in three rows of connectors, and to make use of the front-to-back cooling arrangement as described in conjunction with FIG. 109. FIG. 124 shows the corresponding motherboard layout.

The motherboard link layouts are seen to be formed from a small number of unit cells, each associated with a module as shown in FIG. 125. Cells designated A through H represent the module types that may be used in a binary tree layout. The cells are schematically represented by a vertical line representing the connector and three horizontal stubs, each stub representing a link or any of the types previously described. The lines in the link may be grouped together, separated into channels, or individually routed, and the cell types are merely indicative of the direction that the links take with respect to the connector. Moreover, the cell designation does not limit the side of the connector through which the traces connect to the memory module. An example of a 16 connector layout is shown and most, but not all of the cell types are used in the layout. The cell type associated with specific connectors is indicated. Where less than three links are used to connect the connector to the tree, a cell type is not shown, as several of the cell types, with one link removed, would permit the arrangement shown.

In memories disposed as trees, clocks may be local, area or system clocks, RAMBUS clocks or the like, and combinations of clocking techniques. For example, each of the DIMM modules may have a local clock for managing the memory and performing local processing functions. A mesosynchronous clock may be provided by distributing a central clock to a plurality of the memory modules, where the phase of the clock at the individual memory module CSE is not known, but the phase is assumed to be slowly varying. In such a circumstance, only the phase need be resynchronized when a link is activated, and the startup time may be made short. The phase may need to be recovered on each of the lines of the link, but a group of lines may exhibit similar phase variations and may be adjusted as a group. In another aspect, the clock may be distributed on the address lines, one of which is active between all links at all of the times. Alternatively, one of the links may be used to transmit signals such as NOP commands when the interval between data, command or address data has not been transmitted to or from the adjacent modules for a predetermined period of time.

In another aspect, a memory controller MC may be used to interface to one or more root modules on one hand, and directly or indirectly to another communications bus or a computer element on the other. The interface between the MC and the root module may be by way of a link of the type the root module uses to communicate with other modules in the tree. Alternative a one or more CSEs may be provided between the MC and the modules of the tree, where one of CSEs performs the function of the root module or a node so that that a module with lower power consumption may be obtained at a point in the tree where the CSE has the highest throughput, A MC may perform the functions of, for example, de-skewing, addressing, frame management, buffering of data and commands in the upstream and downstream directions, initialization, including skew determination, module integrity and other turn-on tests, and reconfiguring the trees in the event of a module failure. The MC may also manage the power consumption during turn on, so that the peak power required by the attached memory is consistent with the capability of the associated power supplies.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A memory module, comprising:
   a read-write memory device; and
   a configurable switching element (CSE), having a plurality of lanes for transmitting or receiving signals,
   wherein the CSE is configurable to change a power state of a lane of the plurality of lanes at a predetermined future time, and to exchange data between a first lane and a second lane so as to alter a time delay difference between signals on the first lane and the second lane when the signals are received at another memory module, the exchange of data being based on reduction in a differential time delay of the received signals between the lanes.

2. The memory module according to claim 1, wherein the predetermined future time has a time value determined by a control signal.

3. The memory module according to claim 2, wherein the value of the predetermined future time associated with at least one of the plurality of lanes is individually specified.

4. The memory module according to claim 1, wherein the power state of at least one of the plurality of lanes is configurable.

5. The memory module of claim 1, wherein the power state of each of the plurality of lanes is one of powered up, or powered down.

6. The memory module of claim 1, wherein the power state of each of the plurality of lanes is one of powered up, powered down, or standby.

7. The memory module of claim 1, wherein the CSE is configurable such that a logical assignment of data received by a signal lane of the plurality of lanes and a logical assignment of data to be transmitted by a lane of transmitting lanes is alterable.

8. The memory module of claim 1, further comprising first, second and third ports, wherein the CSE is configurable such that a signal received one lane of the second or the third ports is transmittable on least one lane of the first, the second or the third ports.

9. The memory module of claim 8, wherein at least one of the lanes is reconfigurable as a receiving or a transmitting lane.

10. The memory module of claim 1, wherein a signal is transmitted on at least one of the lanes during a fixed time interval.

11. The memory module of claim 10, wherein the fixed time interval is determined such that at least one of data edge tracking, clock, clock phase, or frame synchronization is maintained.

12. A computer program product including software instructions stored on a non-transitory computer readable medium, comprising:

instructions for configuring an apparatus including a processor and a plurality of ports for at least one of receiving or transmitting signals, each port having a plurality of lanes and at least one lane of the plurality of lanes having a controllable power state; and wherein the instructions for configuring the apparatus, when executed by the processor, configures the apparatus to perform: (a) a change to a future-time power state for at least one lane of the plurality of lanes at a predetermined time based on a first received signal when the first received signal has a first value; and (b) an exchange of a second received signal and a third received signal between pairs of lanes of the plurality of lanes to reduce a differential time delay of the received signals between the lanes based on the first received signal when the first received signal has a second value.

* * * * *